US010609867B1

(12) United States Patent
Kile

(10) Patent No.: US 10,609,867 B1
(45) Date of Patent: Apr. 7, 2020

(54) CONCAVES FOR AN AGRICULTURAL COMBINE

(71) Applicant: Kevin J. Kile, Spokane, WA (US)

(72) Inventor: Kevin J. Kile, Spokane, WA (US)

( * ) Notice: Subject to any disclaimer, the term of this patent is extended or adjusted under 35 U.S.C. 154(b) by 0 days.

(21) Appl. No.: 16/285,423

(22) Filed: Feb. 26, 2019

Related U.S. Application Data

(63) Continuation-in-part of application No. 15/919,960, filed on Mar. 13, 2018, now Pat. No. 10,440,893, which is a continuation-in-part of application No. 15/652,691, filed on Jul. 18, 2017, now Pat. No. 10,390,490, which is a continuation of application No. 15/224,054, filed on Jul. 29, 2016, now Pat. No. 9,723,792, which is a continuation of application No. 14/197,595, filed on Mar. 5, 2014, now Pat. No. 9,504,204.

(51) Int. Cl.
*A01F 12/26* (2006.01)
*A01F 12/28* (2006.01)

(52) U.S. Cl.
CPC .............. *A01F 12/26* (2013.01); *A01F 12/28* (2013.01)

(58) Field of Classification Search
CPC .......... A01F 12/26; A01F 12/28; A01F 12/24; A01F 12/22; A01F 12/442; A01F 12/446; A01F 7/06; A01D 41/06; A01D 41/12
See application file for complete search history.

(56) References Cited

U.S. PATENT DOCUMENTS

| | | | | | | |
|---|---|---|---|---|---|---|
| 755,152 | A | * | 3/1904 | Mishler | A01F 12/28 | 460/109 |
| 1,570,898 | A | * | 1/1926 | Landis | A01F 12/22 | 460/110 |
| 3,537,459 | A | * | 11/1970 | Thomas | A01F 12/20 | 460/110 |
| 3,568,682 | A | * | 3/1971 | Knapp | A01F 12/24 | 460/108 |
| 4,192,322 | A | * | 3/1980 | Wilson | A01F 12/22 | 460/70 |
| 4,383,652 | A | * | 5/1983 | Osborne | A01F 29/06 | 241/101.742 |

(Continued)

FOREIGN PATENT DOCUMENTS

| | | | | | |
|---|---|---|---|---|---|
| DE | 3303413 | A1 | * | 8/1984 | A01F 12/24 |
| DE | 102011055493 | A1 | * | 5/2013 | A01F 12/26 |
| WO | WO-2014191804 | A1 | * | 12/2014 | A01F 12/24 |

*Primary Examiner* — Arpad Fabian-Kovacs
(74) *Attorney, Agent, or Firm* — Michael W. Goltry; Robert A. Parsons; Parsons & Goltry, PLLC

(57) ABSTRACT

A concave for an agricultural combine includes threshing bars carried by a base frame and forming openings therebetween for grain to pass through. Each threshing bar includes an inner extremity, a deflecting extremity including a deflecting surface, a separating grate between the inner extremity and the deflecting extremity, the separating grate extends across an adjacent one of the openings between the inner extremity and the deflecting extremity for separating grain from threshed crop material, the deflecting surface projects angularly upward relative to the separating grate, and the deflecting surface and the separating grate are arranged at an obtuse angle therebetween forming a grain-collecting trough between the deflecting surface and the separating grate.

30 Claims, 82 Drawing Sheets

(56) References Cited

U.S. PATENT DOCUMENTS

| | | | | | |
|---|---|---|---|---|---|
| 4,711,252 | A * | 12/1987 | Bernhardt | A01F 12/28 | 460/107 |
| 4,875,891 | A * | 10/1989 | Turner | A01F 12/24 | 460/110 |
| 5,489,239 | A * | 2/1996 | Matousek | A01F 12/28 | 460/109 |
| 5,569,080 | A * | 10/1996 | Estes | A01F 12/24 | 460/110 |
| 5,613,907 | A * | 3/1997 | Harden | A01F 12/26 | 460/109 |
| 6,193,604 | B1 * | 2/2001 | Ramp | A01F 12/24 | 460/109 |
| 6,358,142 | B1 * | 3/2002 | Imel | A01F 12/26 | 460/107 |
| 6,398,639 | B1 * | 6/2002 | Dammann | A01F 12/26 | 460/107 |
| 6,447,394 | B1 * | 9/2002 | Gryspeerdt | A01D 41/1271 | 460/109 |
| 8,133,100 | B2 * | 3/2012 | Regier | A01F 12/181 | 460/109 |
| 8,313,361 | B2 * | 11/2012 | Flickinger | A01F 12/24 | 460/110 |
| 8,454,416 | B1 * | 6/2013 | Estes | A01F 12/24 | 460/107 |
| 8,721,411 | B2 * | 5/2014 | Reiger | A01F 12/26 | 460/108 |
| 9,149,001 | B2 * | 10/2015 | Holtmann | A01F 12/28 | |
| 9,504,204 | B2 * | 11/2016 | Kile | A01D 41/12 | |
| 9,723,791 | B1 * | 8/2017 | Kile | A01F 12/24 | |
| 10,045,487 | B1 * | 8/2018 | Robertson | A01F 12/24 | |
| 2002/0005034 | A1 * | 1/2002 | Schwersmann | A01F 12/442 | 56/80 |
| 2005/0197176 | A1 * | 9/2005 | Foster | A01F 12/24 | 460/108 |
| 2006/0019731 | A1 * | 1/2006 | Ricketts | A01F 12/26 | 460/108 |
| 2007/0178951 | A1 * | 8/2007 | Voss | A01F 12/28 | 460/109 |
| 2014/0087793 | A1 * | 3/2014 | Regier | A01F 12/446 | 460/59 |
| 2014/0171164 | A1 * | 6/2014 | Foster | A01F 12/26 | 460/107 |
| 2016/0295802 | A1 * | 10/2016 | De Witte | A01F 12/26 | |
| 2017/0164559 | A1 * | 6/2017 | Matousek | A01F 7/062 | |
| 2017/0347529 | A1 * | 12/2017 | Bussmann | A01F 12/26 | |
| 2018/0103588 | A1 * | 4/2018 | Ritter | A01F 12/26 | |
| 2018/0132421 | A1 * | 5/2018 | Ohms | A01F 12/26 | |

* cited by examiner 400
405
410
411
411A
412
413
415
417
475
500
511
512
513
514
520
522
530
540
401
402
420
470

661
602
750
A
611A
611
612
617
714
725
610
613
614
605
618
660
700
710
712
713
721
665
662

CONCAVES FOR AN AGRICULTURAL COMBINE

FIELD OF THE INVENTION

The present invention relates to agricultural combines and, more particularly, to concaves for agricultural combines.

BACKGROUND OF THE INVENTION

Agricultural combines are large machines that harvest, thresh, separate and clean an agricultural crop. The resulting clean grain is stored in a grain tank located on the combine. The clean grain is transported from the grain tank to a truck, grain cart or other receiving bin by an unloading auger.

In general, an agricultural combine includes a harvesting platform, a feederhouse, a threshing drum mounted near a concave, sieves, a collection or bulk tank, and various conveyors, such as rotating belts and spinning augers. The harvesting platform gathers and cuts the crop near ground level and directs the harvested crop to the feederhouse, which applies the harvested crop to the threshing drum. The harvested crop is threshed between the rotating threshing drum and the concave separating the grains from the chaff to form threshings, namely, the chaff and the separated grains. The threshings are applied to a cleaning system, which separates the grains from the chaff, applies the grains to the collection or bulk tank that is periodically emptied into a truck, grain cart or other receiving bin by an unloading auger, and discharges the chaff onto the field.

The concave generally includes an array of straight bars that extend parallel to the threshing drum axis of rotation. The curved bars are permanently welded to curved end members. Curved wires, which project through the bars in some concaves and that underlie the bars in other concave designs, extend circumferentially along the concave. A concave of this type forms a grate through which most of the threshed grain and chaff fall onto a collecting assembly where it is directed to the cleaning system of the combine.

A concave must be periodically replaced when the bars wear down or when they are bent or broken by rocks, wire, and other foreign matter that is inadvertently drawn into the combine. Replacing a concave is difficult and time-consuming work, and especially costly when the need arises during a harvest. Accordingly, there is a need in the art for concaves that are easily and inexpensively serviceable without the need for replacement or removal from a combine, are easy to construct and to assemble, that eliminate extended down-times during harvest, and while at the same time are uniquely designed to favorably influence grain loss and grain damage by favorably influencing grain cracking and fracturing during crop threshing operations.

SUMMARY OF THE INVENTION

According to the principle of the invention, a concave for an agricultural combine includes first and second frames connected together for movement between closed and open positions. The first frame includes curved members axially spaced from one another, and bars each movable between a first position removably connected to the first frame and a second position detached from the first frame. The bars are spaced from one another and extend axially between the curved members forming openings therebetween for grain to pass through in the first position of each of the bars. The second frame restricts movement of each of the bars between the first and second positions in the closed position of the first and second frames. The second frame allows movement of each of the bars between the first and second positions in the open position of the first and second frames. The first and second frames are pivotally connected for movement between the closed and open positions. The second frame includes curved stops axially spaced from one another, and in the closed position of the first and second frames the curved stops are juxtaposed on either side of the respective curved members to restrict movement of each of the bars between the first and second positions. There is an engagement assembly for removably connecting each of the bars in the first position thereof to the first frame including elements thereof carried by each of the bars and complemental elements thereof carried by the first frame. In the first position of the bars the engagement assemblies prevent axial rotation of the bars relative to the first frame. Each of the elements is one of a tongue and a slot, and each of the complemental elements is the other one of the tongue and the slot.

According to the principle of the invention, a concave for an agricultural combine includes first and second frames connected together for movement between closed and open positions. The first frame includes curved members axially spaced from one another, and bars each formed with a separating grate. The bars are each movable between a first position removably connected to the first frame and a second position detached from the first frame. In the first position of each of the bars, the bars are spaced from one another and extend axially between the curved members forming openings therebetween for grain to pass through, and the separating grate of each bar extends across an adjacent opening to an adjacent bar for separating grain from threshed crop material. The second frame restricts movement of each of the bars between the first and second positions in the closed position of the first and second frames. The second frame allows movement of each of the bars between the first and second positions in the open position of the first and second frames. In the first position of each of the bars the separating grate of each bar is in direct contact against a shoulder of the adjacent bar. The separating grate of each bar consists of parallel fingers axially spaced from one another. The first and second frames are pivotally connected for movement between the closed and open positions. The second frame includes curved stops axially spaced from one another, and in the closed position of the first and second frames the curved stops are juxtaposed on either side of the respective curved members to restrict movement of each of the bars between the first and second positions. There is an engagement assembly for removably connecting each of the bars in the first position thereof to the first frame including elements thereof carried by each of the bars and complemental elements thereof carried by the first frame. In the first position of the bars the engagement assemblies prevent axial rotation of the bars relative to the first frame. Each of the elements is one of a tongue and a slot, and each of the complemental elements is the other one of the tongue and the slot.

According to the principle of the invention, a concave for an agricultural combine includes a frame having curved members axially spaced from one another, and bars each formed with a separating grate. The bars are spaced from one another and extend axially between the curved members forming openings therebetween for grain to pass through, and the separating grate of each bar extends across an adjacent opening to an adjacent bar for separating grain from threshed crop material. The separating grate of each bar includes parallel fingers axially spaced from one another. The parallel fingers of each bar each has a free end in direct contact against a shoulder of the adjacent bar.

According to the principle of the invention, a concave for an agricultural combine includes a frame assembly including first frames and a second frame connected together for movement between a closed position of the frame assembly and an open position of the frame assembly. Each of the first frames includes curved members axially spaced from one another, and bars each movable between a first position removably connected to the first frame and a second position detached from the first frame, wherein the bars are spaced from one another and extend axially between the curved members forming openings therebetween for grain to pass through in the first position of each of the bars. The second frame restricts movement of each of the bars of the first frames between the first and second positions in the closed position of the frame assembly. The second frame allows movement of each of the bars between the first and second positions in the open position of the frame assembly. The first frames and the second frames are pivotally connected for movement between the closed and open positions of the frame assembly. The second frame includes curved stops axially spaced from one another, and in the closed position of the first frames and the second frame the curved stops are juxtaposed on either side of one of the curved members of the respective first frames to restrict movement of each of the bars of the first frames between the first and second positions. There is an engagement assembly for removably connecting each of the bars in the first position thereof to a corresponding one of the first frames including elements thereof carried by each of the bars and complemental elements thereof carried by the corresponding one of the first frames. In the first position of the bars the engagement assemblies prevent axial rotation of the bars relative to the corresponding one of first frames. Each of the elements is one of a tongue and a slot, and each of the complemental elements is the other one of the tongue and the slot.

According to the principle of the invention, a concave for an agricultural combine includes a frame assembly including first frames and a second frame connected together for movement between a closed position of the frame assembly and an open position of the frame assembly. Each of the first frames includes curved members axially spaced from one another, and bars each formed with a separating grate, the bars each movable between a first position removably connected to the first frame and a second position detached from the first frame, and in the first position of each of the bars the bars are spaced from one another and extend axially between the curved members forming openings therebetween for grain to pass through, and the separating grate of each bar extends across an adjacent opening to an adjacent bar for separating grain from threshed crop material. The second frame restricts movement of each of the bars of the first frames between the first and second positions in the closed position of the frame assembly. The second frame allows movement of each of the bars between the first and second positions in the open position of the frame assembly. In the first position of each of the bars the separating grate of each bar is in direct contact against a shoulder of the adjacent bar. The separating grate of each bar includes parallel fingers axially spaced from one another. The first frames and the second frames are pivotally connected for movement between the closed and open positions of the frame assembly. The second frame includes curved stops axially spaced from one another, and in the closed position of the first frames and the second frame the curved stops are juxtaposed on either side of one of the curved members of the respective first frames to restrict movement of each of the bars of the first frames between the first and second positions. There is an engagement assembly for removably connecting each of the bars in the first position thereof to a corresponding one of the first frames including elements thereof carried by each of the bars and complemental elements thereof carried by the corresponding one of the first frames. In the first position of the bars the engagement assemblies prevent axial rotation of the bars relative to the corresponding one of first frames. Each of the elements is one of a tongue and a slot, and each of the complemental elements is the other one of the tongue and the slot.

According to the principle of the invention, a concave for an agricultural combine includes a first frame, a second frame, and a threshing mat. The threshing mat includes threshing bars each including a separating grate, an engagement assembly non-destructively connects each of the threshing bars to the first frame, the threshing bars form openings therebetween for grain to pass through, the separating grate of each of the threshing bars extends across an adjacent one of the openings for separating grain from threshed crop material, and the separating grate of each of the threshing bars is fixedly connected to an adjacent one of the threshing bars. The engagement assemblies enable non-destructive removal of the threshing mat from the first frame, when the second frame is spaced apart from the first frame. The second frame restrains non-destructive removal of the threshing mat from the first frame via the engagement assemblies, when the second frame is juxtaposed to the first frame. The threshing mat is non-destructively connected to the first frame via the engagement assemblies, when the second frame is spaced apart from the first frame and when the second frame is juxtaposed to the first frame. The second frame includes stops, the stops are juxtaposed on either side of the first frame and interact with the threshing mat restraining the threshing mat from being non-destructively removed from the first frame, when the second frame is juxtaposed to the first frame. Each engagement assembly includes engagement elements carried by each of the threshing bars and corresponding complemental engagement elements carried by the first frame. Each of the engagement elements is one a tongue, and each of the complemental engagement elements is a slot. A catch assembly non-destructively catches each of the threshing bars to the second frame, when the second frame is juxtaposed to the first frame. Each catch assembly includes catch elements carried by each of the threshing bars and corresponding complemental catch elements carried by the second frame. Each of the catch elements is one of a key and a keyway, and each of the complemental catch elements is the other one of the key and the keyway. The second frame includes stops, the stops are juxtaposed on either side of the first frame, interact with the threshing bars restraining the threshing bars from being non-destructively removed from the first frame, when the second frame is juxtaposed to the first frame, and carry the complemental catch elements.

According to the principle of the invention, a method of assembling a concave for an agricultural combine includes providing a first frame, a second frame, and threshing bars each including a separating grate, removably connecting the threshing bars to the first frame via non-destructive removable connections, the threshing bars being spaced apart forming openings therebetween for grain to pass through, and the separating grate of each of the threshing bars extends across an adjacent one of the openings for separating grain from threshed crop material, and juxtaposing the second frame relative to the first frame, fixedly connecting the separating grate of each of the threshing bars to an adjacent one of the threshing bars, and the second frame restraining removal of the threshing bars from the first frame via the non-destructive removable connections all without disabling the non-destructive removable connections thereby leaving the threshing bars non-destructively connected to the first frame. The step of fixedly connecting the separating grate of each of the threshing bars to an adjacent one of the threshing bars further includes welding the separating grate of each of the threshing bars to an adjacent one of the threshing bars. The method further includes releasably securing the second frame to the first frame. The non-destructive removable connections each includes a tongue-and-groove assembly.

According to the principle of the invention, a method of assembling a concave for an agricultural combine includes providing a first frame, a second frame, and threshing bars each including a separating grate, removably connecting the threshing bars to the first frame via non-destructive removable connections, the threshing bars being spaced apart forming openings therebetween for grain to pass through, and the separating grate of each of the threshing bars extends across an adjacent one of the openings for separating grain from threshed crop material; and juxtaposing the second frame relative to the first frame, removably catching the threshing bars to the second frame via non-destructive removable catch connections, fixedly connecting the separating grate of each of the threshing bars to an adjacent one of the threshing bars, and the second frame restraining removal of the threshing bars from the first frame via the non-destructive removable connections, all without disabling the non-destructive removable connections thereby leaving the threshing bars non-destructively connected to the first frame. The step of fixedly connecting the separating grate of each of the threshing bars to an adjacent one of the threshing bars further includes welding the separating grate of each of the threshing bars to an adjacent one of the threshing bars. The method further includes releasably securing the second frame to the first frame. The non-destructive removable connections each includes a tongue-and-groove assembly, and the non-destructive removable catch connections each includes a key-and-keyway assembly.

According to the principle of the invention, a method of assembling a concave for an agricultural combine includes providing a frame, stops, and threshing bars each including a separating grate, removably connecting the threshing bars to the frame via non-destructive removable connections, the threshing bars being spaced apart forming openings therebetween for grain to pass through, and the separating grate of each of the threshing bars extends across an adjacent one of the openings for separating grain from threshed crop material, and juxtaposing the stops on either side of the frame, fixedly connecting the separating grate of each of the threshing bars to an adjacent one of the threshing bars, and the stops restraining removal of the threshing bars from the frame via the non-destructive removable connections, all without disabling the non-destructive removable connections thereby leaving the threshing bars non-destructively connected to the frame. The step of fixedly connecting the separating grate of each of the threshing bars to an adjacent one of the threshing bars further includes welding the separating grate of each of the threshing bars to an adjacent one of the threshing bars. The method further includes releasably securing the stops to the frame. The non-destructive removable connections each includes a tongue-and-groove assembly.

According to the principle of the invention, a method of assembling a concave for an agricultural combine includes providing a frame, stops, and threshing bars each including a separating grate, removably connecting the threshing bars to the frame via non-destructive removable connections, the threshing bars being spaced apart forming openings therebetween for grain to pass through, the separating grate of each of the threshing bars extends across an adjacent one of the openings for separating grain from threshed crop material, and juxtaposing the stops on either side of the frame, removably catching the threshing bars to the stops via non-destructive removable catch connections, fixedly connecting the separating grate of each of the threshing bars to an adjacent one of the threshing bars, and the stops restraining removal of the threshing bars from the frame via the non-destructive removable connections, all without disabling the non-destructive removable connections thereby leaving the threshing bars non-destructively connected to the frame. The step of fixedly connecting the separating grate of each of the threshing bars to an adjacent one of the threshing bars further includes welding the separating grate of each of the threshing bars to an adjacent one of the threshing bars. The method further includes releasably securing the stops to the frame. The non-destructive removable connections each includes a tongue-and-groove assembly, and the non-destructive removable catch connections each includes a key-and-keyway assembly.

According to the principle of the invention, a concave for an agricultural combine includes threshing bars carried by a base frame and forming openings therebetween for grain to pass through. Each threshing bar includes an inner extremity, a deflecting extremity including a deflecting surface, and a separating grate between the inner extremity and the deflecting extremity. The separating grate extends across an adjacent one of the openings between the inner extremity and the deflecting extremity for separating grain from threshed crop material, the deflecting surface projects angularly upward relative to the separating grate, and the deflecting surface and the separating grate are arranged at an obtuse angle therebetween forming a grain-collecting trough between the deflecting surface and the separating grate. The obtuse angle is from 125 degrees to 145 degrees. Part of the separating grate formed across the trough and in the deflecting extremity. The deflecting surface is between the part of the separating grate formed in the deflecting extremity and a threshing edge of the deflecting extremity. The separating grate has a first width between the inner extremity and the deflecting extremity, the deflecting extremity has a second width between the separating grate and the threshing edge, and the first width is greater than the second width. An engagement assembly non-destructively connecting each of the threshing bars to the base frame. Additionally included is a restraining frame. The engagement assemblies enable non-destructive removal of the threshing bars from the base frame, when the restraining frame is spaced apart from the base frame. The restraining frame restrains non-destructive removal of the threshing bars from the base frame via the engagement assemblies, when the restraining frame is juxtaposed to the base frame. The threshing bars are non-destructively connected to the base frame via the engagement assemblies, when the restraining frame is spaced apart from the base frame and when the restraining frame is juxtaposed to the base frame. Each engagement assembly includes engagement elements carried by each of the threshing bars and corresponding complemental engagement elements carried by the base frame. Each engagement element includes a tongue, and each complemental engagement element includes a slot. Additionally included is a catch assembly non-destructively catching each of the threshing bars to the restraining frame, when the restraining frame is juxtaposed to the base frame. Each catch assembly includes catch elements carried by each of the threshing bars and corresponding complemental catch elements carried by the restraining frame. Each catch element includes one of a key and a keyway, and each complemental catch element includes the other one of the key and the keyway. The restraining frame includes stops. The stops are juxtaposed on either side of the base frame, interact with the threshing bars restraining the threshing bars from being non-destructively removed from the base frame, when the restraining frame is juxtaposed to the base frame, and carry the complemental catch elements.

According to the principle of the invention, a concave for an agricultural combine includes threshing bars carried by a base frame and forming openings therebetween for grain to pass through. Each threshing bar includes an inner extremity, a deflecting extremity including a deflecting surface, and a plurality of separating grates extending across an adjacent one of the openings between the inner extremity and the deflecting extremity for separating grain from threshed crop material. The plurality of separating grates includes a first separating grate and a second separating grate. The first separating grate is between the inner extremity and the second separating grate. The second separating grate is between the first separating grate and the deflecting extremity. The second separating grate projects angularly upward relative to first second separating grate. The deflecting surface projects angularly upward relative to the second separating grate. The second separating grate and the first separating grate are arranged at a first obtuse angle therebetween forming a first grain-collecting trough between the first separating grate and the second separating grate. The deflecting surface and the second separating grate are arranged at a second obtuse angle therebetween forming a second grain-collecting trough between the deflecting surface and the second separating grate. The second obtuse angle is different from the first obtuse angle. The second obtuse angle is less than the first obtuse angle. The second obtuse angle is from 125 degrees to 145 degrees. The first obtuse angle is from 155 degrees to 175 degrees. Part of the first separating grate is formed across the first trough and part of the second separating grate is formed across the second trough. The deflecting surface is between the part of the second separating grate formed across second trough and a threshing edge of the deflecting extremity. The second separating grate has a width between the first separating grate and the deflecting extremity, the deflecting extremity has a width between the second separating grate and the threshing edge, and the width of the second separating grate is greater than the width of the deflecting extremity. The first separating grate has a width between the inner extremity and the second separating grate, and the width of the first separating grate is greater than the width of the deflecting extremity. An engagement assembly non-destructively connecting each of the threshing bars to the base frame. Additionally included is a restraining frame. The engagement assemblies enable non-destructive removal of the threshing bars from the base frame, when the restraining frame is spaced apart from the base frame. The restraining frame restrains non-destructive removal of the threshing bars from the base frame via the engagement assemblies, when the restraining frame is juxtaposed to the base frame. The threshing bars are non-destructively connected to the base frame via the engagement assemblies, when the restraining frame is spaced apart from the base frame and when the restraining frame is juxtaposed to the base frame. Each engagement assembly includes engagement elements carried by each of the threshing bars and corresponding complemental engagement elements carried by the base frame. Each engagement element includes a tongue, and each complemental engagement element includes a slot. Additionally included is a catch assembly non-destructively catching each of the threshing bars to the restraining frame, when the restraining frame is juxtaposed to the base frame. Each catch assembly includes catch elements carried by each of the threshing bars and corresponding complemental catch elements carried by the restraining frame. Each catch element includes one of a key and a keyway, and each complemental catch element includes the other one of the key and the keyway. The restraining frame includes stops. The stops are juxtaposed on either side of the base frame, interact with the threshing bars restraining the threshing bars from being non-destructively removed from the base frame, when the restraining frame is juxtaposed to the base frame, and carry the complemental catch elements.

BRIEF DESCRIPTION OF THE DRAWINGS

Referring to the drawings:

FIG. 70 is a right side bottom perspective view of the embodiment of FIG. 67;

DETAILED DESCRIPTION

Figure 1:
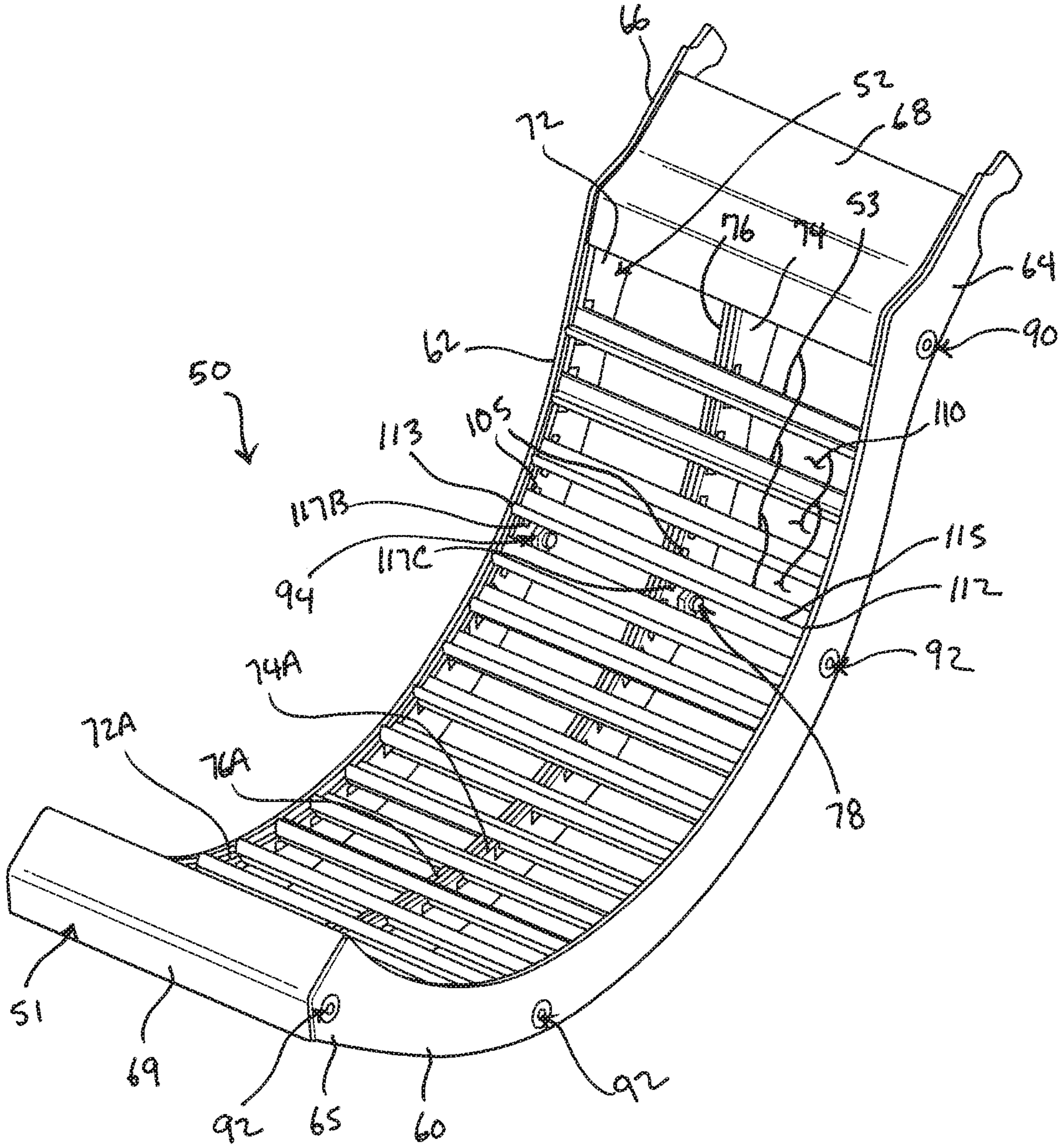
FIGS. 1-3 are perspective views of a concave section constructed and arranged in accordance with the principle of the invention, the concave section includes parallel bars carried by an inner frame connected to an outer frame.

A known agricultural combine includes a harvesting platform for harvesting a crop and directing it to a feederhouse. The harvested crop is applied from the feederhouse to a rotary crop processing unit that threshes and separates the harvested crop. The rotary crop processing unit includes a rotating threshing drum or rotor radially surrounded by a casing that together define an inlet section, a threshing section, and a separating section. The rotor is a hollow cylindrical drum having numerous crop processing elements that engage the harvested crop and rotate it in the casing. The bottom of the casing has a concave under the threshing section and a separating grate under the separating section. Grain and chaff falling through the concave and the separating grate are directed to a cleaning system, which removes the chaff and directs the clean grain to a clean grain elevator that conveys the clean grain to a grain or bulk tank. The clean grain in the bulk tank is periodically unloaded into a grain cart or truck by an unloading auger, and the threshed and separated chaff is discharged from the combine through an outlet at the rear of the combine. The customary discharge beater at the rear of the combine propels the discharged chaff onto the field. The operation of the combine is controlled from an operator's cab.

The present invention is directed to the concave located under the threshing section of the rotary processing unit. One concave section is used to form the concave, or a plurality of concave sections are used to form the concave. A concave section 50 constructed and arranged in accordance with the principle of the invention is shown in FIGS. 1-8. Concave section 50 incorporates numerous hardware fasteners in the form of conventional nut-and-bolt assemblies. Each nut-and-bolt assembly in concave section 50 includes the customary bolt and the customary corresponding nut. The bolt is inserted through corresponding openings in the pieces to be connected, the nut is threaded onto the threaded shank of the bolt, and the nut is tightened via rotation to secure the connected pieces between the head of the bolt and the nut threaded onto the threaded shank of the bolt. This operation is reversed to detach the connected pieces. This is a normal and customary nut-and-bolt fastening assembly. For clarity, different reference numerals are used to call out the various nut-and-bolt assemblies of concave section 50.

Referencing FIGS. 1-8 in relevant part, concave section 50 includes frame 51, frame 52, and threshing elements or bars 53. Bars 53 carried by frame 52 provide aggressive threshing edges. Bars 53 are independently removably connected to frame 52 to be selectively and independently attached to or otherwise installed on frame 52 in preparation for threshing and detached or otherwise released from frame 52 for individual bar 53 repair or replacement. Frames 51 and 52 cooperate to form a frame assembly, and are connected together for movement between a nested or closed position in FIGS. 1-3 to define the nested or closed position of the frame assembly and also concave section 50, and an open position in FIGS. 4, 5, and 7 to define the open position of the frame assembly and also concave section 50. In the closed position as in FIGS. 1-3, there is an interaction between frame 51 and bars 53 removably connected to frame 52, which holds and locks or otherwise secures bars 53 in place to the frame assembly in preparation for threshing. In the open position as in FIGS. 4, 5, and 7, frames 51 and 52 are spread apart, such that bars 53 are free from the influence of frame 51 to allow bars 53 to be readily, independently, and selectively removed, detached, or otherwise de-united from frame 52, and readily, independently, and selectively attached, installed, or otherwise united to frame 52, such as for bar repair or bar replacement purposes. Frame 51 is an outer or restraining frame, and frame 52 is an inner or base frame in that frame 52 is positioned within frame 51 in the nested or closed position of concave section 50. Frames 51 and 52, and bars 53 are made of the customary steel as is normal in the art of concaves.

Referencing in relevant part FIGS. 1-5, FIG. 7, and FIG. 8, frame 51 includes members 60 and 62. Members 60 and 62 are end members and are substantially identical and coextensive. Members 60 and 62 are thin and elongate and are axially spaced from one another and extend parallel to one another, and are curved to extend circumferentially about a portion of the rotor of the rotary processing unit. Given that members 60 and 62 are end members and are curved, they may be referred to as either curved members, or curved end members. Curved end member 60 has opposite ends 64 and 65, and curved end member 62 has opposite ends 66 and 67. Transverse support member 68 extends between and is joined to ends 64 and 66 of curved members 60 and 62 via welding, and transverse support member 69 extends between and is joined to ends 65 and 67 of curved end members 60 and 62 via welding. Transverse support members 68 and 69 are relatively thin, elongate plates.

Frame 52 includes members 70, 72, 74, and 76. Members 70, 72, 74, and 76 are substantially identical and coextensive. Members 70 and 72 are thin and elongate and are axially spaced from one another, and members 74 and 76 are thin and elongate and are axially juxtaposed relative to each other and axially spaced from members 70 and 72. Members 70, 72, 74, and 76 extend parallel relative to each other, and relative to members 60 and 62. Members 70 and 72 are the outermost or end members of frame 52, and members 74 and 76 are between members 70 and 72 and are the innermost or intermediate members of frame 52. Members 74 and 76 are substantially equidistant between members 70 and 72, and extend parallel to one another. Member 74 is axially positioned alongside member 76 and is between member 76 and member 70. Member 76 is axially positioned alongside member 74 and is between member 74 and member 72. Members 74 and 76 are releasably connected to each other with fasteners, here in the form of two nut-and-bolt assemblies 78, which are longitudinally spaced apart between, on the one hand, ends 84 and 86, and, on the other hand, ends 85 and 87. Less or more such assemblies 78 can be used. Members 70, 72, 74 and 76 are curved like that of end members 60 and 62 to similarly extend circumferentially about a portion of the rotor of the rotary processing unit. Members 60, 62, 70, 72, 74, and 76 have matching curvatures. Given that members 70 and 72 are end members and are curved, they may be referred to as either curved members, or curved end members. Given that members 74 and 76 are intermediate members and are curved, they may be referred to as either curved members, or curved intermediate members. Curved end member 70 has opposed ends 80 and 81, curved end member 72 has opposed ends 82 and 83, curved intermediate member 74 has opposed ends 84 and 85, and curved intermediate member 76 has opposed ends 86 and 87.

Figure 2:
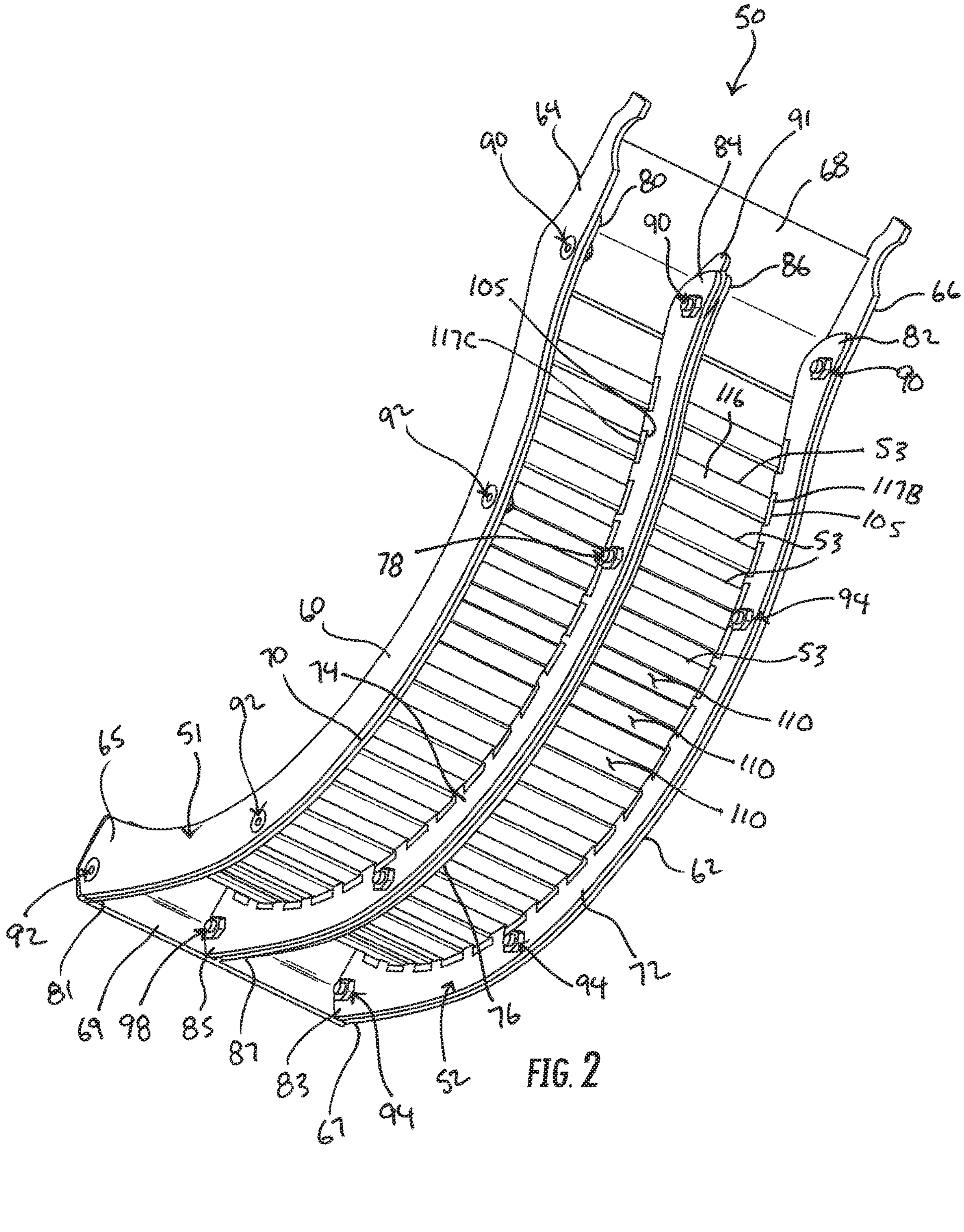
Figure 3:
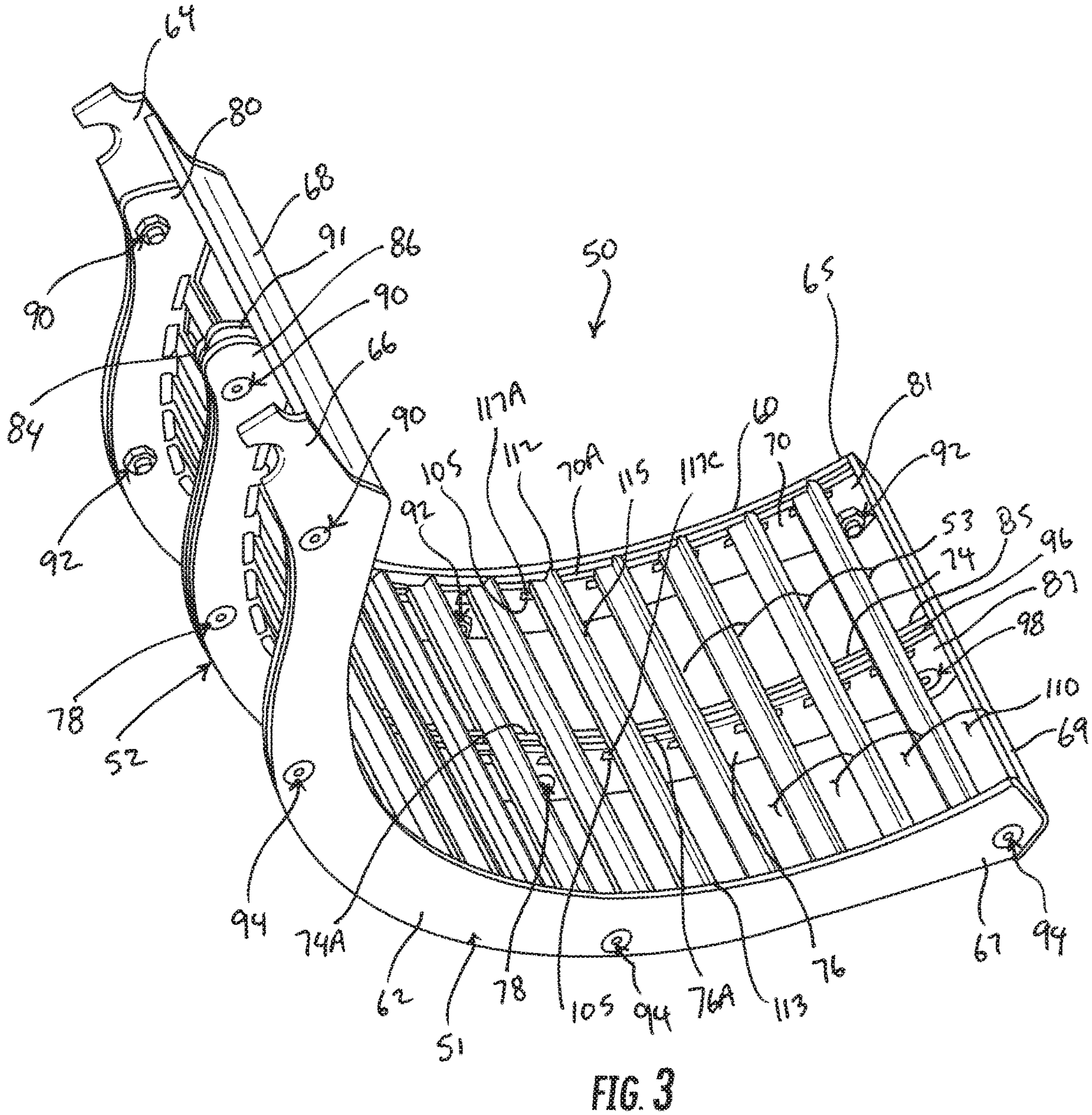
Figure 4:
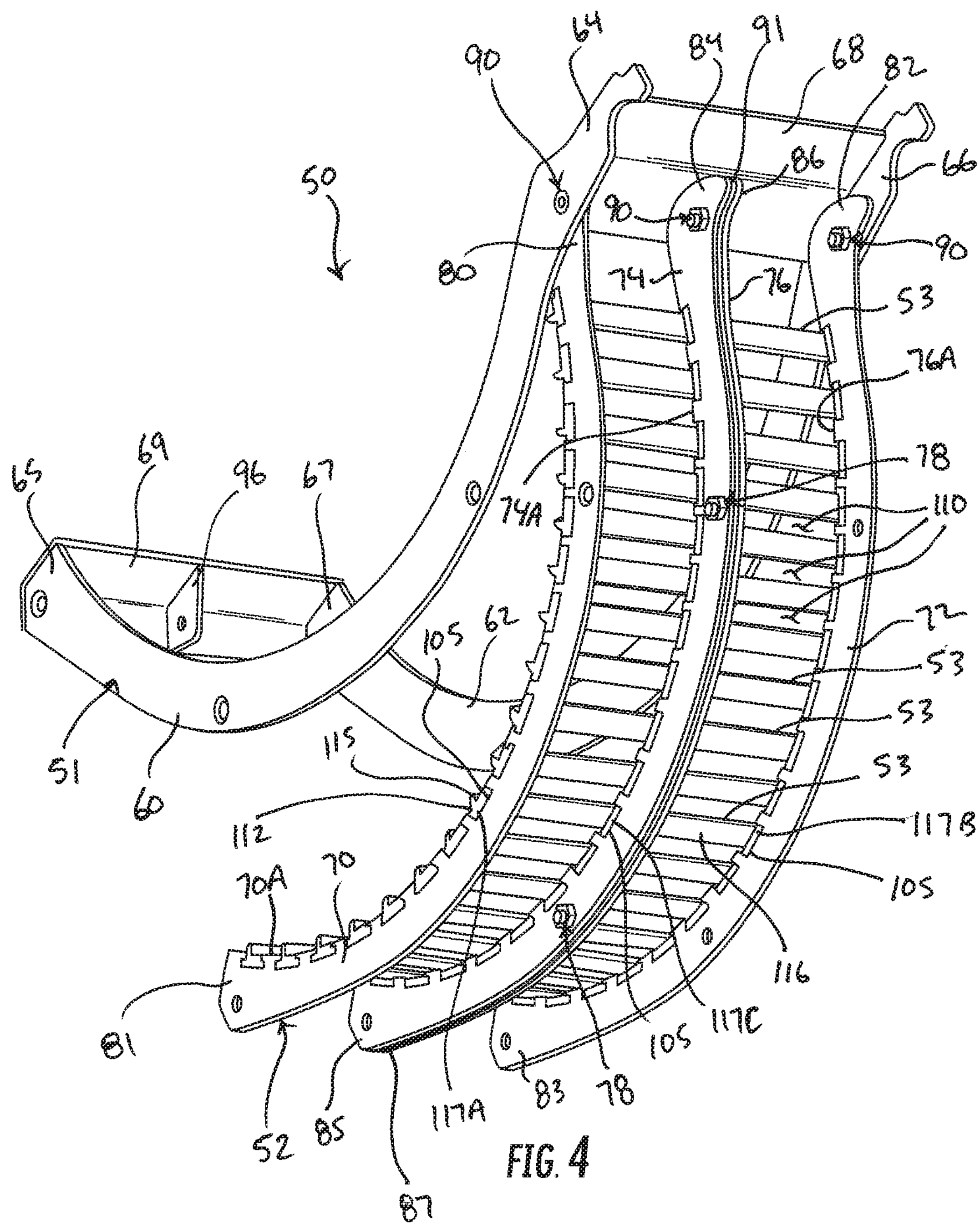
FIG. 4 is a perspective view of the embodiment of FIGS. 1-3 shown as it would appear open.
Figure 5:
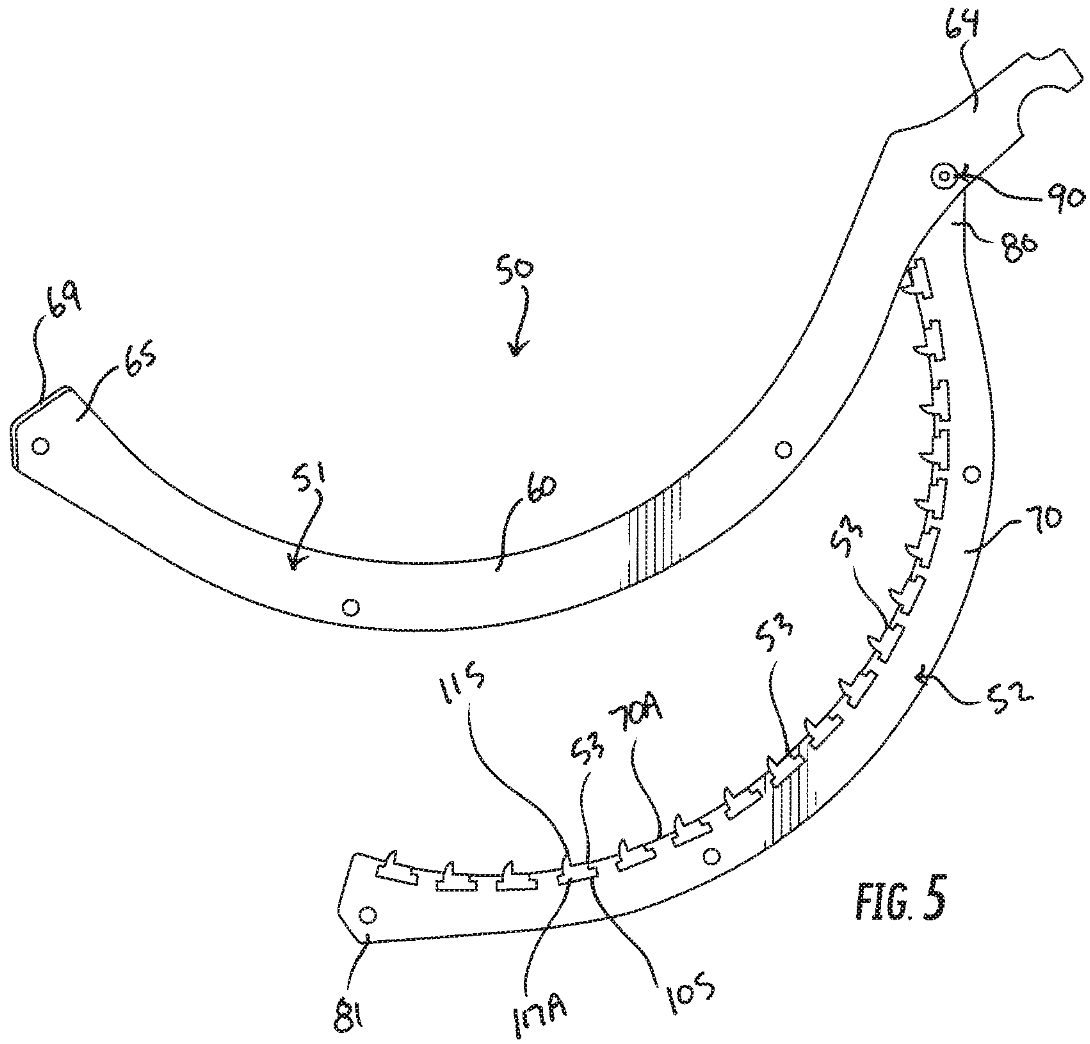
FIG. 5 is a side elevation view of the embodiment of FIG. 4.
Figure 7:
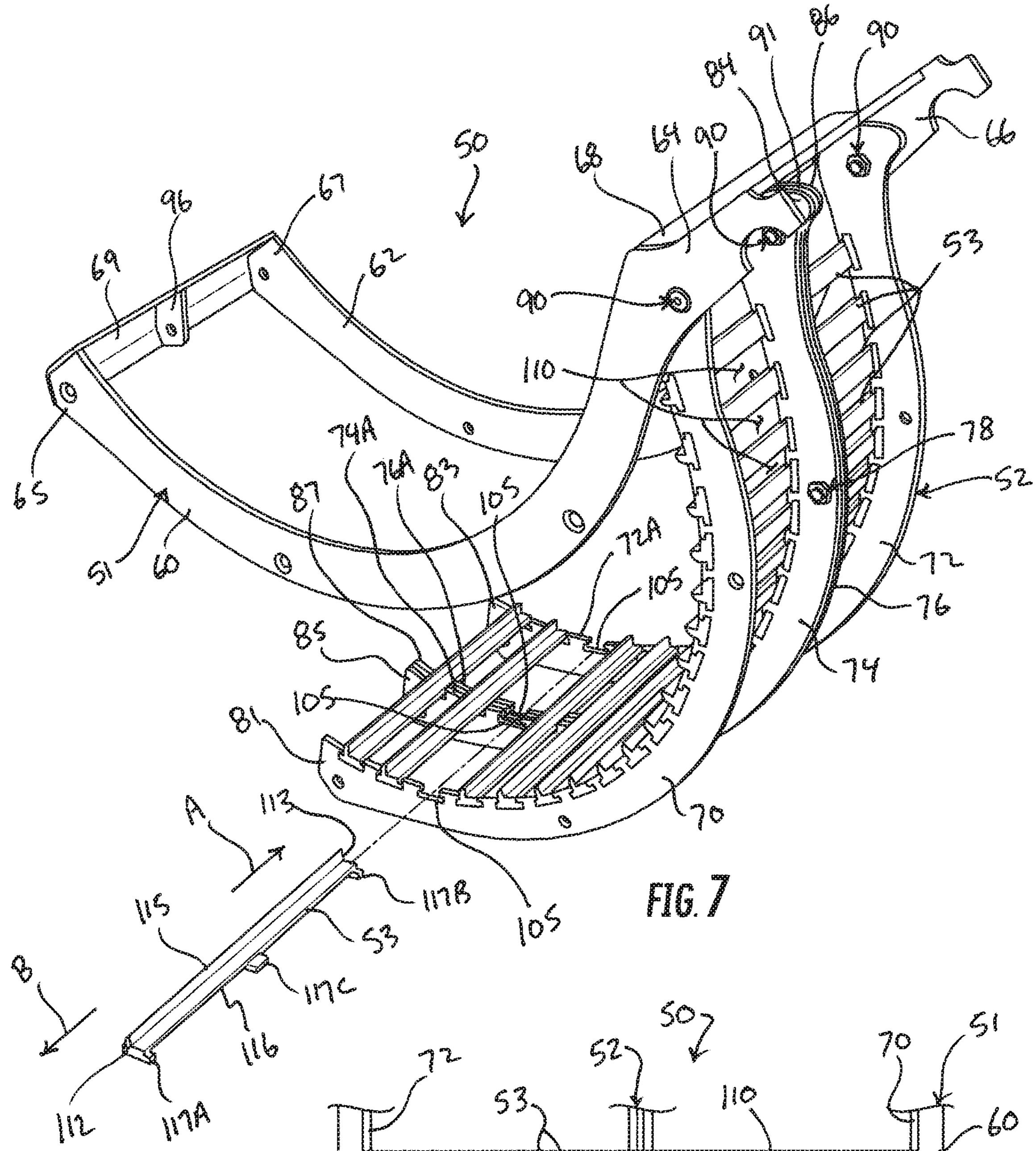
FIG. 7 is a view similar to that of FIG. 4 illustrating a bar removed from the inner frame of the concave section.

Frames 51 and 52 are connected together to be movable between the nested or closed position in FIGS. 1-3 in the assembly of concave section 50 in preparation for threshing in which frames 51 and 52 are axially aligned, and the open position in FIGS. 4, 5, and 7 in which frames 51 and 52 are spread apart like co-acting jaws for bar 53 maintenance and replacement purposes. Curved end member 70 is juxtaposed along, and is in direct contact against, the inner side of curved end member 60, and curved end member 72 is juxtaposed along, and is in direct contact against, the inner side of curved end member 62. End 80 of curved end member 70 is connected to end 64 of curved end member 60, end 82 of curved end member 72 is connected to end 66 of curved end member 72, and ends 84 and 86 of curved intermediate members 74 and 76 are connected to transverse support member 68 at an intermediate location between end 80 of curved end member 70 connected to end 64 of curved end member 60, and end 82 of curved end member 72 connected to end 66 of curved end member 62. The connections of ends 80, 82, 84, and 86 of frame 52 to frame 51 are pivotal connections, here via nut-and-bolt fasteners 90, that provide concurrent pivotal movement of members 70, 72, 74, and 76 that make up frame 52 between a first position downwardly and away from frame 51 as in FIGS. 4, 5, and 7 to define the open position of frame 52 and, moreover, the open position of the frame assembly and of concave section 50, and a second position upwardly toward frame 52 as in FIGS. 1-3 to define the nested or closed position of frame 52 and, moreover, the nested or closed position of the frame assembly and of concave section 50. Ends 64 and 80 are pivotally connected with one nut-and-bolt fastener 90, ends 82 and 66 are pivotally connected with one nut-and-bolt fastener 90, and ends 84 and 86 are pivotally connected to transverse support member 68 with one nut-and-bolt fastener 90. As seen in FIGS. 2 and 3, transverse support member 68 has an intermediate lug 91 formed on its under or inner side. Lug 91 is equidistant between ends 64 and 66 of curved end members 60 and 62. Lug 91 extends between ends 84 and 86 of curved intermediate members 74 and 76, and one nut-and-bolt assembly 90 pivotally connects lug 91 to ends 84 and 86 on either side of lug 91. Pivot pins or other forms of pivotal connections or fasteners can be used to pivotally connect ends 80, 82, 83, and 84 of frame 52 to described connecting points of frame 51 without departing from the invention.

And so ends 80, 82, 84, and 86 of frame 52 are mounted to frame 51 for pivotal movement, here via nut-and-bolt fasteners 90, for movement between the first or open position of frame 52 extending downwardly and away from frame 51 as in FIGS. 4, 5, and 7 to define the open position of the frame assembly and of concave section 50, and the second or nested or closed position of frame 52 upwardly toward and within frame 51 as in FIGS. 1-3 to define the nested or closed position of the frame assembly and of concave section 50. In the nested or closed position with reference in relevant part to FIGS. 1-3 and 8, frame 52 is within frame 51, curved end member 70 extends parallel to and is axially juxtaposed along and is in direct contact with the inner side of curved end member 60 that in turn extends parallel to and is axially juxtaposed along the outer side of curved end member 60, curved end member 72 extends parallel to and is axially juxtaposed along and is in direct contact with the inner side of curved end member 62 that in turn extends parallel to and is axially juxtaposed along the outer side of curved end member 62, and parallel and axially juxtaposed curved intermediate members 74 and 76 extend parallel relative to curved end members 60, 62, 70 and 72 and are equidistant between and are axially spaced from curved end members 70 and 72 extending parallel along the inner sides of the respective curved end members 60 and 62. Curved end member 70 extends concurrently along the length of curved end member 60 of frame 51 from end 80 connected to end 64, to end 81 at end 65 at the inner side of transverse support member 69. Curved end member 72 extends concurrently along the length of curved end member 62 of frame 51 from end 82 connected to end 66, to end 83 at end 67 at the inner side of transverse support member 69. Curved intermediate members 74 and 76 extend concurrently along the length of frame 51 from ends 84 and 86 connected to transverse support member 68 to ends 85 and 87 at the inner side of transverse support member 69.

Fasteners are used to removably connect frame 52 to frame 51 in the second or closed position of frame 52 defining the nested or closed position of frames 51 and 52 to secure concave section 50 in the nested or closed position in preparation for threshing. Specifically, end members 60 and 70 are releasably connected to each other with longitudinally spaced fasteners, here in the form of three nut-and-bolt assemblies 92 and less or more of such assemblies 92 can be used, and end members 62 and 72 are releasably connected to each other with longitudinally spaced fasteners, here in the form of three nut-and-bolt assemblies 94 and lest or more of such assemblies 84 can be used. As seen in FIGS. 4 and 7, transverse support member 69 has an intermediate lug 96 formed on its inner side equidistant between ends 64 and 66 of curved end members 60 and 62. In the second position of frame 52 defining the nested or closed position of frames 51 and 52, lug 91 is applied between ends 85 and 87 of curved intermediate members 74 and 76 as shown in FIG. 3, and one fastener, here in the form of one nut-and-bolt assembly 98, releasably connects lug 96 to ends 85 and 87 on either side of lug 96, and this further secures concave section 50 in its nested or closed position.

In FIGS. 1-5, 7, and 8, frame 52 carries bars 53. Bars 53 are identical and are spaced from one another and are parallel relative to each other and extend axially between curved end members 70 and 72, and across curved intermediate members 74 and 76, forming openings 110 therebetween for grain to pass through, as shown in FIGS. 1-4. Referencing the bar 53 in FIG. 7 shown removed from frame 52 of concave section 50, each bar 53 is elongate and longitudinally straight and integrally formed via machining or molding and has opposed ends 112 and 113, an upper aggressive threshing edge 115 that extends between ends 112 and 113 and a lower end 116 that extends between ends 112 and 113. Bars 53 are each independently removably connected to frame 52 via an engagement assembly. Each engagement assembly for removably connecting each of the bars 53 to frame 52 includes elements thereof carried by each of the bars 53 and complemental elements thereof carried by frame 52, specifically members 70, 72, 74, and 76. The element and the complemental element of each engagement assembly are a tongue 117 and a slot 105, respectively. Tongue 117, which is exemplary of a male engagement element, and slot 105, which is exemplary of a female engagement element, have conforming or complementing shapes that allow them to interlock. Although the element of each engagement assembly is tongue 117 and the complemental element of each engagement assembly is slot 105, this arrangement can be reversed.

Figure 6:
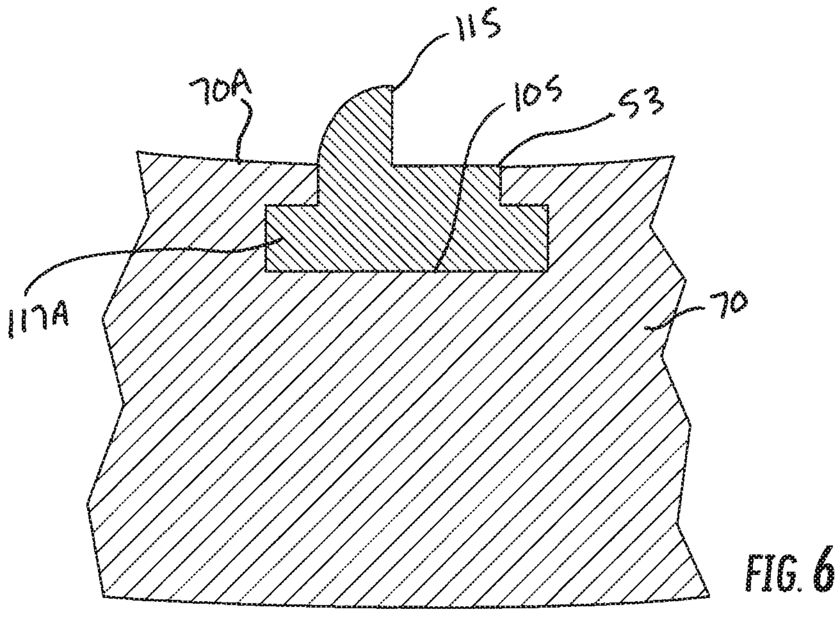
FIG. 6 is a transverse section view illustrating an engagement assembly between a bar and a curved member of the concave section of FIGS. 1-5.

Referencing FIGS. 1-5 and 7 in relevant part, members 70, 72, 74, and 76 have top edges 70A, 72A that lie along a common curved surface to extend circumferentially about a portion of the rotor of a rotary processing unit. Members 70, 72, 74, and 76 each have slots 105. Slots 105 are identical and are identically longitudinally spaced along the lengths of the respective members 70, 72, 74, and 76. Slots 105 are formed in top edges 70A, 72A, 74A, and 76A of the respective members 70, 72, 74, and 76. FIG. 6 shows one such slot 105 in top edge 70A of member 70. Slots 105 in top edge 70A of member 70 are axially aligned or otherwise correspond with the slots 105 in top edges 72A, 74A, and 76A of the other members 72, 74, and 76. The slots 105 of each set of axially aligned slots 105 of members 70, 72, 74, and 76 form the complemental elements of an engagement assembly that relate to the elements of the engagement assembly of each corresponding bar 53.

Each bar 53 has three axially spaced tongues 117 formed in lower end 116, including end tongue 117A near end 112, end tongue 117B near end 113, and intermediate tongue 117C equidistant between end tongues 117A and 117B. The tongues 117A, 117B, and 117C of each bar 53 form the elements of the engagement assembly that relate to the complemental elements of the engagement assembly defined by the slots 105 of each set of axially aligned slots 105 of members 70, 72, 74, and 76. Tongues 117A, 117B, and 117C of each bar 53 are seated in a set of axially aligned slots 105 of the corresponding members 70, 72, 74, and 76. Tongues 117A are seated in slots 105 of curved end member 70, tongues 117B are seated in corresponding slots 105 of curved end member 72, and tongues 117C are seated the corresponding slots 105 of curved intermediate members 74 and 76. In this embodiment, slots 105 and tongues 117A, 117B, and 117C of the engagement assemblies have corresponding T-shapes, which secure bars 52 prevent axial rotation of the bars 53 relative to frame 52, permit movement of bars 53 along only one axis, which is the longitudinal axis of each bar 53, and restrict movement of each bar 53 in any other axis or direction, including axes/directions that are transverse or perpendicular relative to the curvature of frame 52. FIG. 6 shows one tongue 117A of one bar 53 seated in one slot 105 in top edge 70A of member 70.

The bars 53, including at their opposite ends 112 and 113, are not affixed to be immovable using any suitable technique, such as by welding, to members 70, 72, 74, after uniting the elements and the complemental elements of each engagement assembly removably connecting each bar 53 to frame 52. Because of this, bars 53 are left removably connected to frame 52 simply by seating/inserting the tongues 117 of each bar into a corresponding set of axially aligned slots 105 in members 70, 72, 74, and 76, and readily removed from frame 52 by releasing the tongues 117 of each bar 53 from the corresponding set of axially aligned slots 105 in members 70, 72, 74, and 76.

Installation of each bar 53 is carried out simply by axially aligning its tongues 117 with a preselected set of axially aligned slots of members 70, 72, 74, and 76, and then moving the bar 53 axially along its longitudinal axis to concurrently slide tongue 117A into the preselected slot 105 of member 70, tongue 117B into the corresponding slot 105 of member 72, and tongue 117C concurrently into the corresponding slots 105 of members 74 and 75. The removal of each bar 53 is done simply by reversing this operation. This way, the bars 53 may be readily attached or united to frame 52 and detached or de-united from frame 52 as desired, such as for repair or replacement in the case of bar 53 wear or damage. And when bars 53 are so removably connected to frame 52, the tongues 117 of the bars 53 are seated in the shape-conforming slots 105 formed in members 70, 72, 74, and 76 at their respective top edges 70A, 72A, 74A, and 76A, and the threshing edges 115 extend above top edges 70A, 72A, 74A and 76A of the respective members 70, 72, 74, and 76 of frame 52 to be located for threshing a harvested crop. FIG. 6 not only shows one tongue 117A of one bar 53 seated in one slot 105 in top edge 70A of member 70, but also shows one threshing edge 115 extending above top edge 70A.

As described above, the bars 53 are not affixed to frame 52 using any suitable technique, such as by welding, to members 70, 72, 74, and 76 to be permanently connected to frame 52, such that the only way to remove them would be to destroy such a permanent connection. The described engagement assembly between each bar 53 and frame 52 is a non-destructive, removable and impermanent connection, which means that the connection between the various tongues and slots does not require the destruction of the engagement assembly, such as by cutting, in order to remove the various bars 53 from frame 52.

Figure 8:
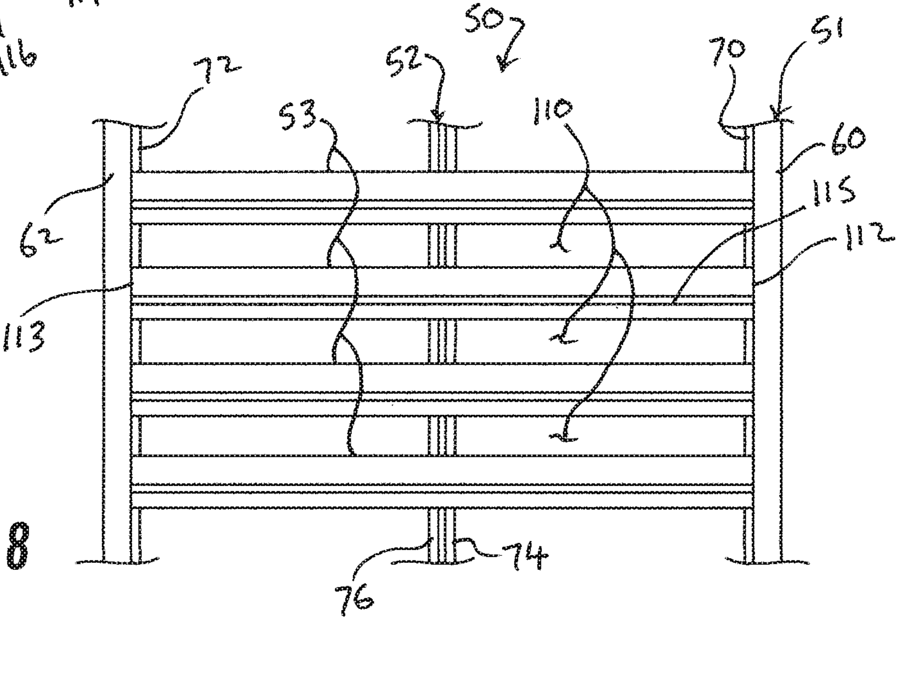
FIG. 8 is a top plan view of a section of the concave section of FIGS. 1-3 illustrating the outer frame capturing bars carried by the inner frame.

To removably install bars 53 on frame 52 in an example, frame 52 is located in the open position as in FIGS. 4, 5, and 7, and each bar 53 is removably connected to frame 52 by axially aligning its tongues 117 with a preselected set of axially aligned slots 105 of members 70, 72, 74, and 76, and then simply moving the bar 53 axially along its longitudinal axis to concurrently slide tongue 117A into the preselected slot 105 of member 70, tongue 117B into the corresponding slot 105 of member 72, and tongue 117C into the corresponding slots 105 of members 74 and 75. In FIG. 7 one bar 53 is shown positioned upright from lower end 116 to upper threshing edge 115 with its tongues axially aligned with a set of axially aligned slots 105 in preparation for installation on frame 52, which is carried out simply by moving bar 53 axially along its longitudinal axis in the direction of arrowed line A, whereby tongue 117B is passed sequentially through a slot 105 of member 70 and then through axially aligned slots 105 of members 74 and 76 to its final resting place in axially aligned slot 105 of member 72. As the bar 53 is so moved in the direction of arrowed line A, tongue 117C follows tongue 117B and passes first through slot 105 of member 70 to its final resting place in axially aligned slots 105 of members 74 and 76, and tongue 117A follows tongue 117C to its final resting place in the slot 105 of member 70. The removal of such bar 53 from frame 52 is done by reversing this operation simply by moving such bar axially along its longitudinal axis in the direction of arrowed B opposite to that of the direction of arrowed line A. The remaining bars 53 in FIG. 7 are installed in the same way and are shown so installed on frame 52, whereby each installed bar 53 extends axially from end 112 of bar 53 at member 70 and across members 74 and 76 to end 113 of bar 53 at member 72, which is also illustrated in FIG. 8. With further reference to FIG. 8, end 112 of each installed bar 53 is substantially flush with respect to the outer side of member 70, the opposed end 113 of each installed bar 53 is identically substantially flush with respect to the outer side of member 72, and the threshing edge 115 of each installed bar 53 extends above top edges 70A, 72A, 74A and 76A of the respective members 70, 72, 74, and 76 of frame 52 to be located for threshing a harvested crop. Openings 110 are formed between the installed bars 53 for grain to pass through. To removably install a bar 53 on frame 52 in another embodiment, the bar 53 can be simply positioned over frame 52 to axially align tongue 117A on one side of one slot 105 in member 70, axially align tongue 117B on one side of a corresponding slot 105 in member 72, and axially align tongue 117C on one side of corresponding slots 105 in members 74 and 76, and then the bar 53 can be moved in one direction along its longitudinal axis toward the respective slots 105 to concurrently insert the tongues 117 into the corresponding slots 105 to install the bar 53 on frame 52, and in the opposite direction to remove tongues 117 from the respective slots 105 to detach the bar 53 from frame 52.

In the open position of concave section 50 shown in FIGS. 4 5 and 7, frame 52 is pivoted away from frame 51 to extend downwardly and away from frame 52 from ends 80, 82, 84 and 86 connected to frame 52 to ends 81, 83, 85, and 87, which allows the selective installation and removal of bars 53 with respect to frame 52 without interference from frame 51. In other words, in the open position of concave section 50, frame 51 is pivoted away from bars 53 on frame 52 to allow movement of bars 53 between their installed and released positions relative to frame 52. Once all the bars 53 are installed on frame 52 as in FIGS. 4 and 5, completion of the assembly of concave section 50 in preparation for threshing is done by securing concave section 50 into its nested or closed position by pivoting frame 52 upwardly in the direction of arrowed line C from its open position in FIGS. 4 and 5 to its nested or closed position in FIGS. 1-3 nested in frame 51, and then securing members 60 and 70 with nut-and-bolt assemblies 92, securing members 62 and 72 with nut-and-bolt assemblies 94, and securing members 74 and 76 to lug 91 with nut-and-bolt assembly 98.

In the nested or closed position of frame 52 defining the closed position of concave section 50 shown in relevant part in FIGS. 1-3 and 8, frame 51 interacts with bars 53 to restrict or otherwise restrain each of the bars 53 from moving between installed and released positions to secure and hold/lock bars 53 in place to frame 52 and, thus, to the frame assembly. Specifically, in the nested or closed positions of frame 51, curved end member 60 of frame 51 that extends parallel to and is axially juxtaposed along the outer side of curved end member 70 of frame 52 closely confronts and makes direct contact against ends 112 of bars 53 on one side of concave section 50, and curved end member 62 of frame 51 that extends parallel to and is axially juxtaposed along the outer side of curved end member 72 of frame 52 closely confronts and makes direct contact against the opposed ends 113 of bars 53 on the opposed side of concave assembly 50, whereby curved end members 60 and 62 thusly act as curved stops axially spaced from one another and juxtaposed on either side of the respective curved end members 70 and 72 of frame 52 and the respective ends 112 and 113 of the respective bars 53 functioning to capture bars 53 therebetween to restrict movement of bars 53 between their installed and released positions, and which also prevents the ability to install a bar 53 on frame 53 should one be inadvertently missing.

With concave section 50 so assembled, concave section 50 is ready for threshing in the customary manner in a rotary processing unit. In the rotary processing unit, bars 53 extend parallel to the axis of rotation of the rotating threshing drum, and upper threshing edges 115 extend upward from top edges 70A, 70B, 70C, and 70D of members 70, 72, 74, and 76 of frame 52 to provide aggressive threshing of the harvested crop and openings 110 between bars 53 are for grain to pass through. In a rotary combine, a single long concave section 50 can be utilized as the concave or multiple shorter concave sections 50 can be arranged end-to-end to form the concave. Should bars 53 become worn or damaged to require replacement or repair, nut-and-bolt fasteners 92, 94, and 98 are simply removed to release frame 52 from frame 51, and frame 52 is pivotally moved downwardly in the direction of arrowed line D in FIGS. 1-3 from the nested or closed position of frame 52 defining the closed position of the frame assembly and of concave section 50 to the open position of frame 52 in FIGS. 4, 5, and 7 defining the open position of the frame assembly and of concave section 50 to allow any of the bars needing replacement or repair to be easily removed, repaired or replaced, and reinstalled, in accordance with the principle of the invention. FIGS. 4 and 5 show frames 51 and 52 in the open position with the nut-and-bolt assemblies 92, 94, and 98, shown in FIG. 2, removed. After selected bars 53 are quickly repaired or replaced and installed on frame 52, frame 52 may then be moved upwardly in the direction of arrowed line C in FIGS. 4 and 5 from its open position in FIGS. 4 and 5 to its closed position in FIGS. 1-3, and then secured in place with nut-and-bolt assemblies 92, 94, and 98 to secure concave section 50 in the nested or closed position in preparation for the resumption of threshing in the normal manner.

In the embodiment denoted at 50, bars 53 extending between curved end members 70 and 72 and across curved intermediate members are single bars 53. As such, in concave section 50 frame 52 has parallel single bars 53. In an alternate embodiment of a concave section constructed and arranged in accordance with the principle of the invention, frame 52 can be formed with parallel rows of split bars. Such a concave section 130 is discussed in conjunction with FIGS. 9-12.

Concave section 130 is identical in every respect to concave section 50 in that it shares frame 51 and frame 52 and all associated nut-and-bolt assemblies. In this example, the bars, which are identical and are each denoted at 131, are each identical to bars 53 in that they share ends 112 and 113, upper threshing edge 115, lower end 116, and tongues 117. Bars 131 are each independently removably connected to frame 52 via the engagement assembly. Each engagement assembly for removably connecting each of the bars 53 to frame 52 includes elements thereof carried by each of the bars 53, namely, tongues 117, and complemental elements thereof carried by frame 52, namely, slots 105 in members 70, 72, 74, and 76. Again, the positioning of tongues 117 and slots 105 can be reversed.

Figure 9:
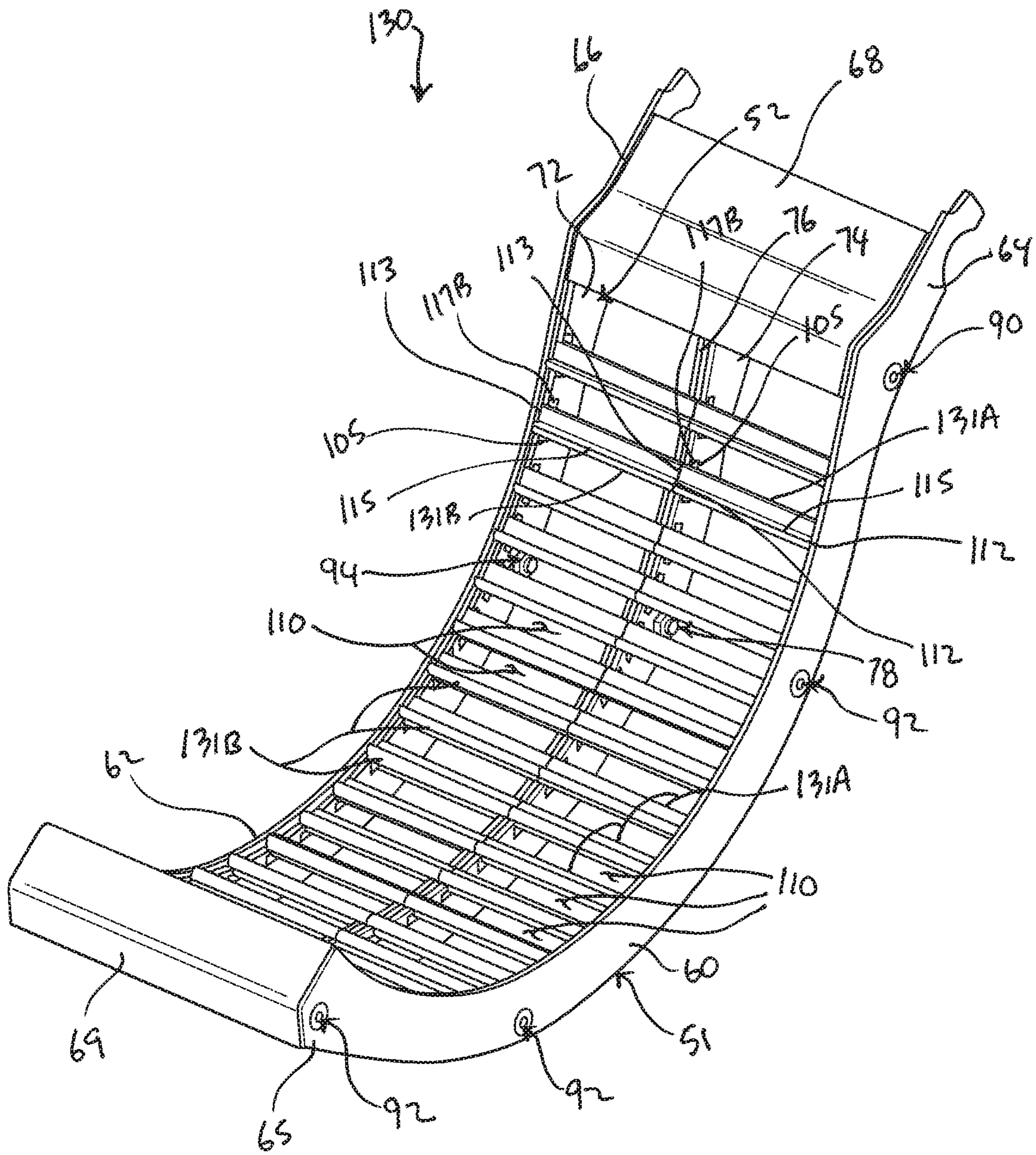
FIG. 9 is a perspective view of a concave section constructed and arranged in accordance with an alternate embodiment of the invention, the concave section includes parallel rows of bars carried by an inner frame connected to an outer frame.
Figure 10:
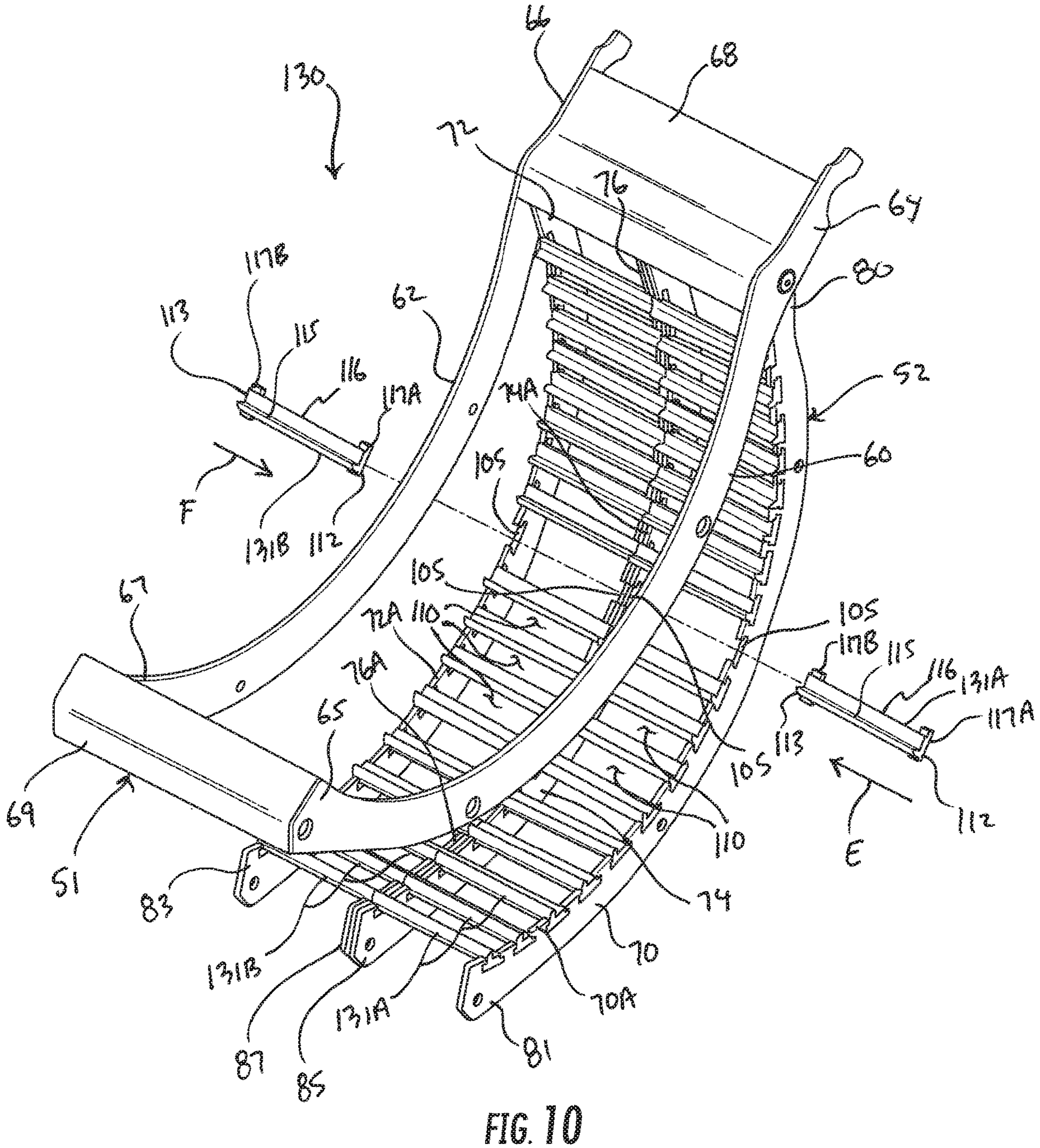
FIG. 10 is a perspective view of the embodiment of FIG. 9 shown as it would appear open with a pair of opposed bars removed from the inner frame of the concave section.

In concave section 130 bars 131 are half the length of bars 53 and include just two tongues 117, namely, tongue 117A near end 112 and tongue 117B near end 113. In this example, there are two axially aligned bars 131 for each row of bars 131, and rows of bars 131, of course, form openings 110 therebetween for grain to pass through as in concave section 50. Two bars 131 are axially aligned for each row. One bar 131A extends axially from member 70 to member 74, and the other bar 131B extends axially from member 76 to member 72. Specifically, one bar 131A extends axially from end 112 thereof at member 70 to end 113 thereof at member 74, and the corresponding tongues 117A and 117B are applied to axially aligned slots 105 in members 70 and 74 respectively. The other bar 131B extends axially from end 113 thereof at member 72 to end 112 thereof at member 76, and the corresponding tongues 117B and 117A are applied to axially aligned slots 105 in members 72 and 76 respectively. Each pair of bars 131A and 131B are axially aligned, and the end 113 of bar 131A extending between members 70 and 74 confronts and diametrically opposes the end 112 of bar 131B extending between members 72 and 76. FIG. 9 shows concave section 130 as it would appear closed with parallel rows of two bars 131A and 131B each. FIG. 10 shows concave section 130 as it would appear open to allow independent installation and removal of the various bars 131, and two corresponding bars 131A and 131B to make a row of two bars are shown detached from frame 52 in preparation for installation into the corresponding available set of axially aligned slots 105. To install these detached bars 131 into the axially aligned set of slots 105 in members 70, 72, 74, and 76, one bar 131A is positioned to axially align tongues 117A and 117B with axially aligned slots 105 in members 70 and 74, and bar 131A is then moved axially along its longitudinal axis in the direction of arrowed line E to set tongues 117A and 117B into slots 105 of the respective members 70 and 74. To detach bar 131A from frame 52, this operation need only be reversed. The other bar 131B is, in turn, positioned to axially align tongues 117A and 117B with axially aligned slots 105 in members 72 and 76, and bar 131B is then moved axially along its longitudinal axis in the direction of arrowed line F to set tongues 117A and 117B into slots 105 of the respective members 76 and 72. To detach bar 131B from frame 52, this operation need only be reversed. After bars 131A and 131B of each parallel row of bars 131A and 131B are so removably installed on frame 52, frames 51 and 52 may be adjusted via pivoting from the open position in FIG. 10 to the closed position in FIG. 9, and then secured with the corresponding nut-and-bolt fasteners in the closed position to ready concave section 130 for threshing.

Figure 11:
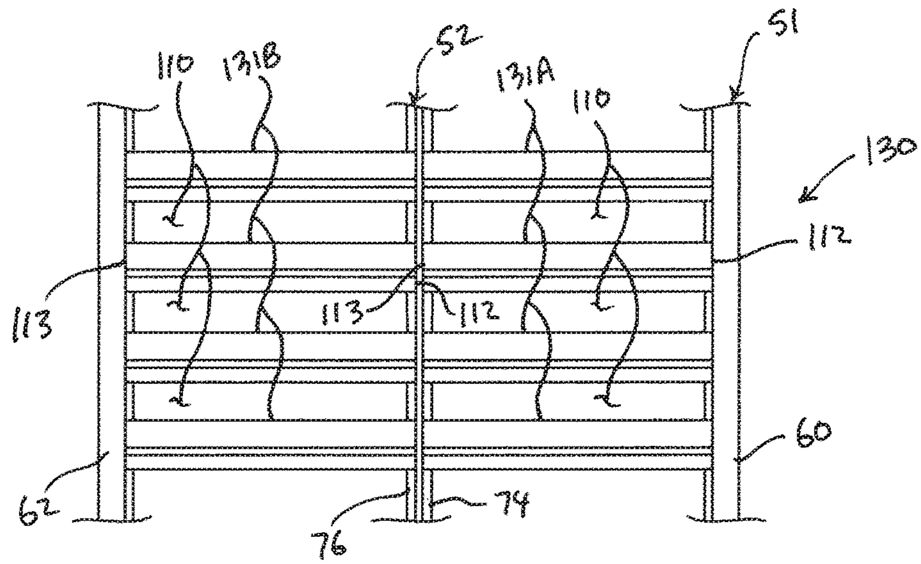
FIG. 11 is a top plan view of a section of the embodiment of FIG. 9 illustrating the outer frame capturing rows of bars carried by the inner frame.
Figure 12:
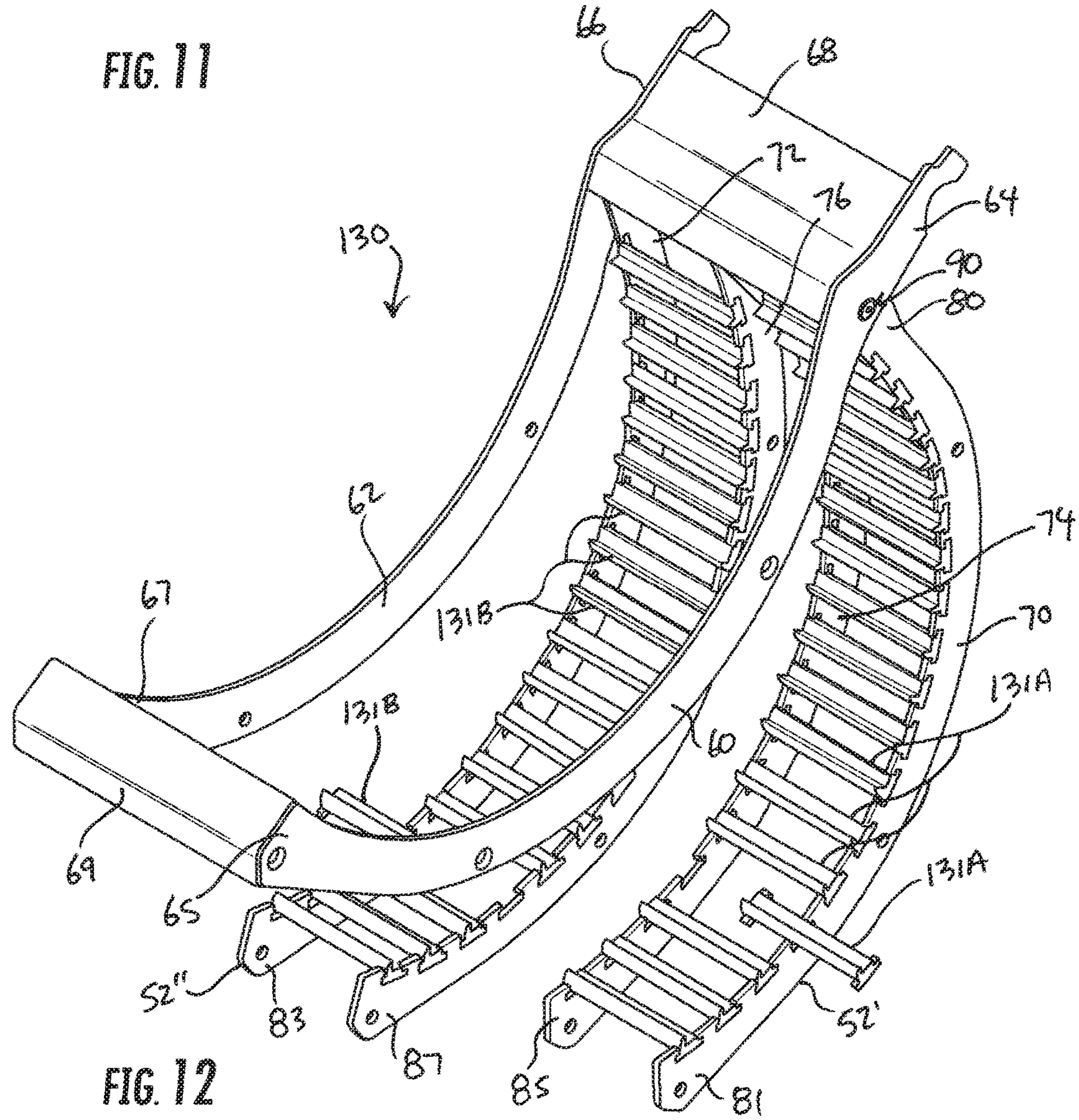
FIG. 12 is a perspective view of an alternate configuration of the embodiment of FIG. 10.

In the nested or closed position of frame 52 defining the closed position of concave section 130 in FIGS. 9 and 11, frame 51 restricts or otherwise restrains the rows of bars 131 from moving between installed and released positions. Specifically, in the nested or closed positions of frame 51, curved end member 60 of frame 51 that extends parallel to and is axially juxtaposed along the outer side of curved end member 70 of frame 52 closely confronts and makes direct contact against ends 112 of bars 131A extending between member 70 and member 74, and curved end member 62 of frame 51 that extends parallel to and is axially juxtaposed along the outer side of curved end member 72 of frame 52 closely confronts and makes direct contact against ends 113 of bars 131B extending between members 72 and 76, whereby curved end members 60 and 62 act as curved stops axially spaced from one another and juxtaposed on either side of the respective curved end members 70 and 72 of frame 52 and the respective ends 112 and 113 of the respective bars 131A and 131B capturing each row of bars 131A and 131B therebetween to restrict movement of bars 131 between their installed and released positions, and which also prevents the ability to install one or more bars 131 on frame 53 should one or more be inadvertently missing.

In concave section 130, members 70 and 72 are considered one frame or otherwise a sub-frame 52' of frame 52, and members 72 and 76 are considered another frame or sub-frame 52" of frame 52. Frames 52' and 52" cooperate to form frame 52 and are, of course, connected together for movement of frame 52 between the closed position of the open and closed positions as herein specifically described. Again, as discussed in conjunction with concave section 50, should bars 131 become worn or damaged to require replacement or repair, nut-and-bolt fasteners 92, 94, and 98, illustrated in FIG. 8, are simply removed to release frame 52 from frame 51, and frame 52 is pivotally moved downwardly to the open position as in FIG. 10. If desired, nut-and-bolt assemblies 78 in FIG. 2 connecting members 74 and 76 may be removed along with nut-and-bolt assembly 98 connecting ends 85 and 87 of members 74 and 76 to frame 51 to release frame 52' from frame 52" as in FIG. 12 to allow independent pivotal movement of frames 52' and 52" from open positions as in FIG. 12 to the closed positions as in FIG. 9, at which point the various nut-and-bolt assemblies 92, 94, 78, and 98, depicted in FIG. 2, may be re-installed to secure concave section 130 in the closed position in FIG. 9 in preparation for threshing. With this arrangement, nut-and-bolt assemblies 78, 92, and 98 may be removed to release frame 52' from frames 51 and 52" to allow independent pivotal movement of frame 52' from its closed position to its open position independently of frame 52" to allow a user to service bars 131 of frame 52', after which frame 52' may be pivoted back to its closed position and secured via nut-and-bolt assemblies 78, 92, and 98 to frames 52" and 51. Moreover, nut-and-bolt assemblies 78, 94, and 98 may be removed to release frame 52" from frames 51 and 52' to allow pivotal movement of frame 52" from its closed position to its open position independently of frame 52' to allow a user to service bars 131 of frame 52", after which frame 52" may be pivoted back to its closed position and secured via nut-and-bolt assemblies 78, 94, and 98 to frames 52' and 51.

Concave section 130 is exemplary of a "split-bar" construction. Another "split-bar" concave section 150 is shown in FIGS. 13-15.

Concave section 150 is identical in every respect to concave sections 50 and 130 in that it shares frame 51 and frame 52 and all associated nut-and-bolt assemblies. In this example, the bars, which are identical and are each denoted at 160, are half the length of bars 53 of concave section 50 like that of bars 131 of concave section 130. Referencing FIGS. 16-19, each bar 160 has a threshing component and a separating component. Each bar 160 is elongate and longitudinally straight and integrally formed via machining or molding and has opposed ends 162 and 163, an aggressive upper threshing edge 165 that extends between ends 162 and 163, a lower end 166 that extends between ends 162 and 163, a back 167 and an opposed front 168 that each extend between ends 162 and 163, a grate denoted generally at 170 formed in front 168, and a shoulder 180 formed in back 167. Upper threshing edge 165 is the threshing component of bar 160, and grate 170 is the separating component of bar 160. Grate 170 is formed in front 168 of bar 160 between upper threshing edge 165 and lower end 166, and extends along the length of bar 160 from end 162 to end 163. In this embodiment, grate 170 consists of identical and coextensive axially-aligned parallel fingers 171 that extend outwardly from front 168 to free ends 172. Fingers 171 are axially spaced forming openings 175 therebetween for grain to pass through. Fingers 171 are equally spaced apart and openings 175 are identically sized. Shoulder 180 is formed in back 167 of bar 160 between upper threshing edge 165 and lower end 166, and extends along the length of bar 160 from end 162 to end 163.

Just like bars 131 of concave section 130, bars 160 are each independently removably connected to frame 52 via the tongues 117 and slots 105 engagement assembly. Each engagement assembly for removably connecting each of the bars 160 to frame 52 includes the elements thereof in the form of tongues 117 carried by each of the bars 160 and the complemental elements thereof in the form of slots 105 carried by frame 52, specifically members 70, 72, 74, and 76. Like bars 131 of concave section 130, bars 160 each have two tongues 117, namely, tongue 117A near end 162 and tongue 117B near end 163.

Figure 13:
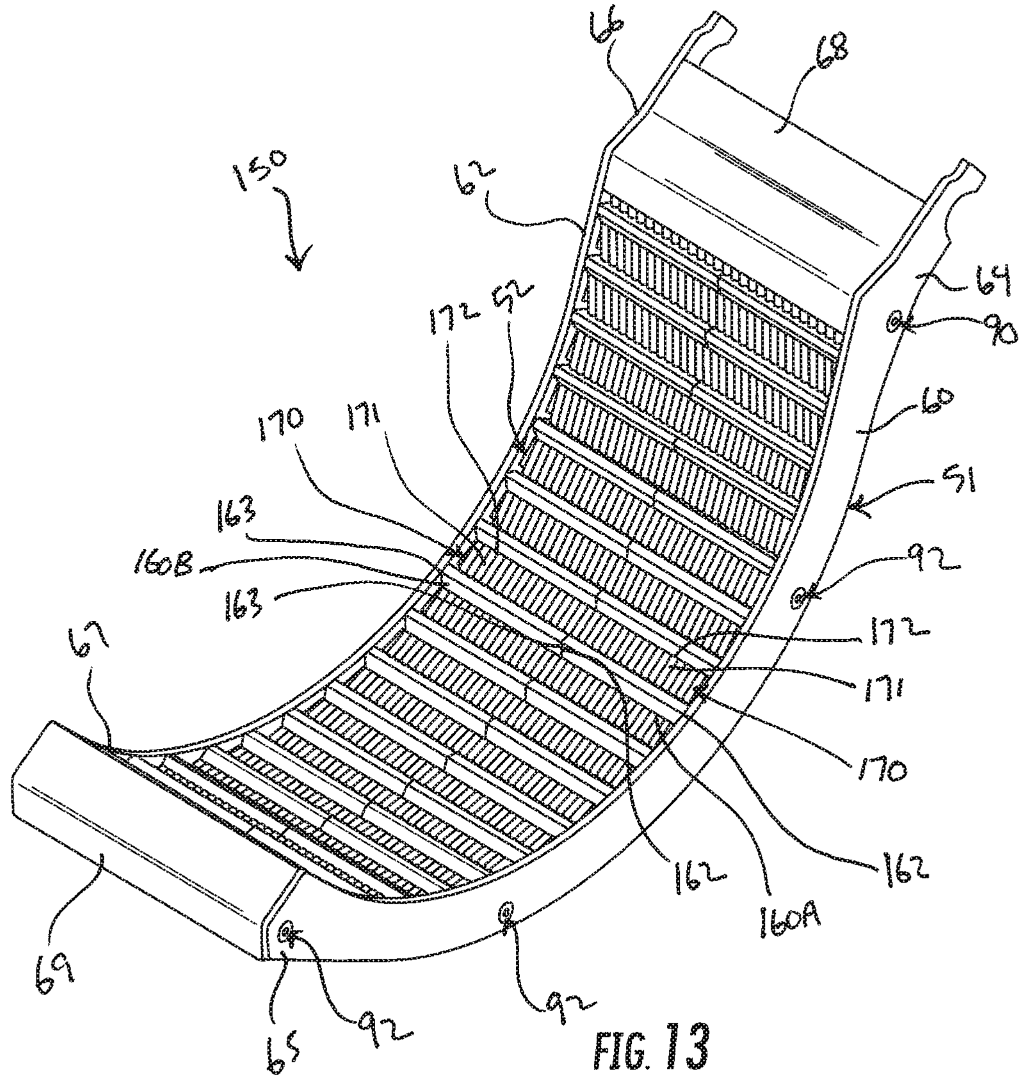
FIG. 13 is a perspective view of a concave section constructed and arranged in accordance with an alternate embodiment of the invention, the concave section includes parallel rows of bars carried by an inner frame connected to an outer frame, the bars each being formed with an integrated grate.
Figure 14:
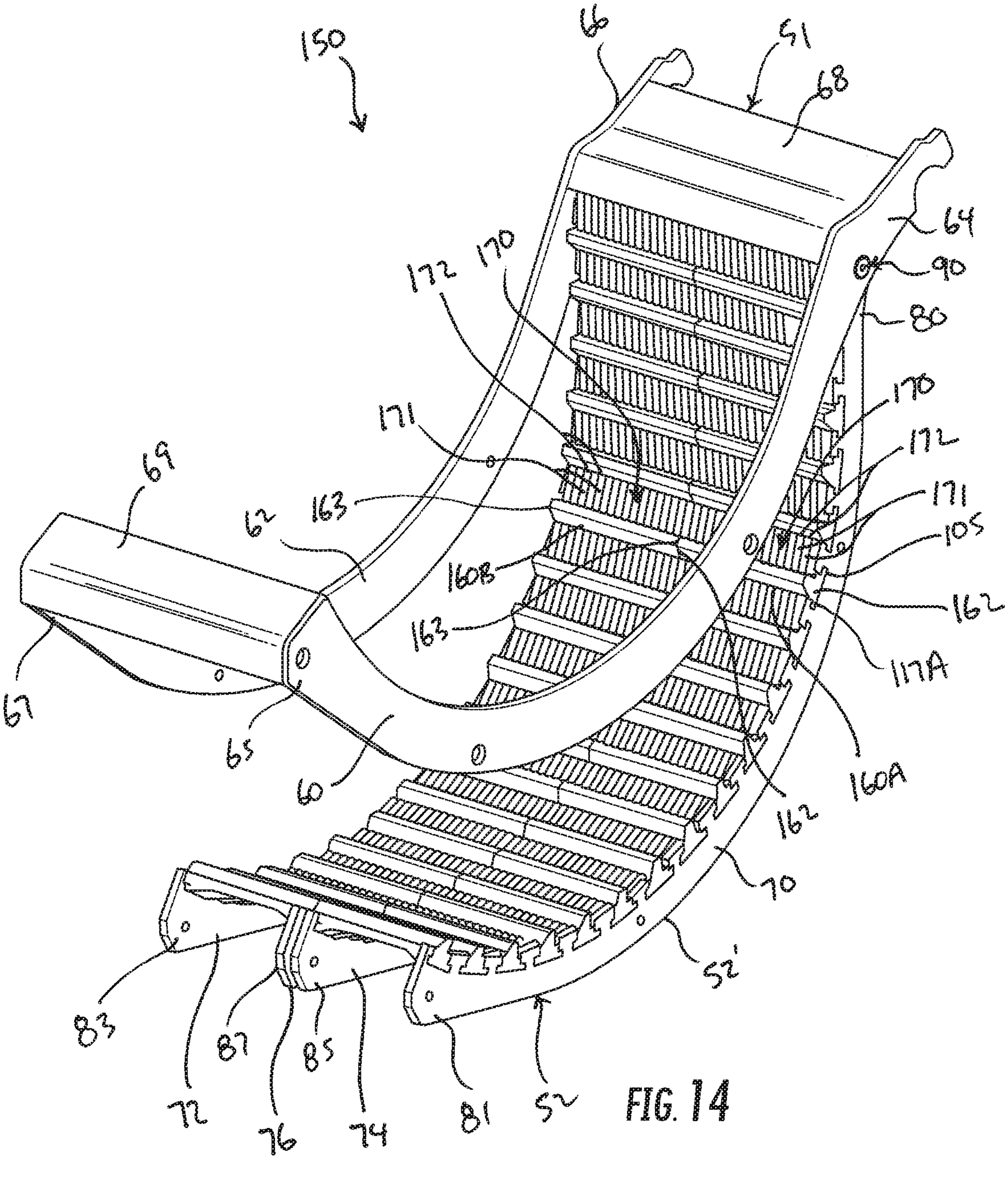
FIG. 14 is a perspective view of the embodiment of FIG. 13 shown as it would appear open.
Figure 15:
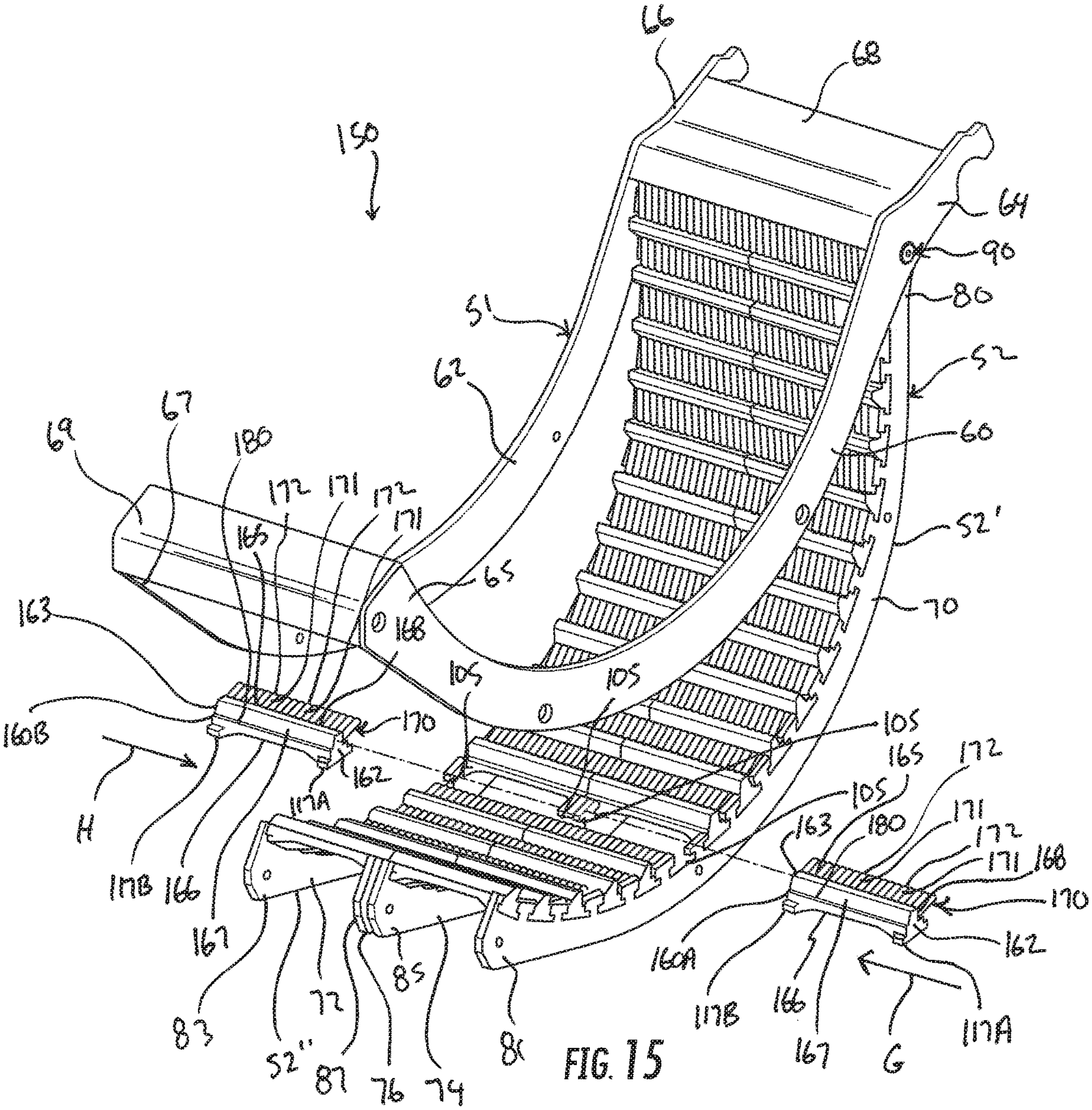
FIG. 15 is a view similar to that of FIG. 14 illustrating a pair of opposed bars removed from the inner frame of the concave section.
Figure 16:
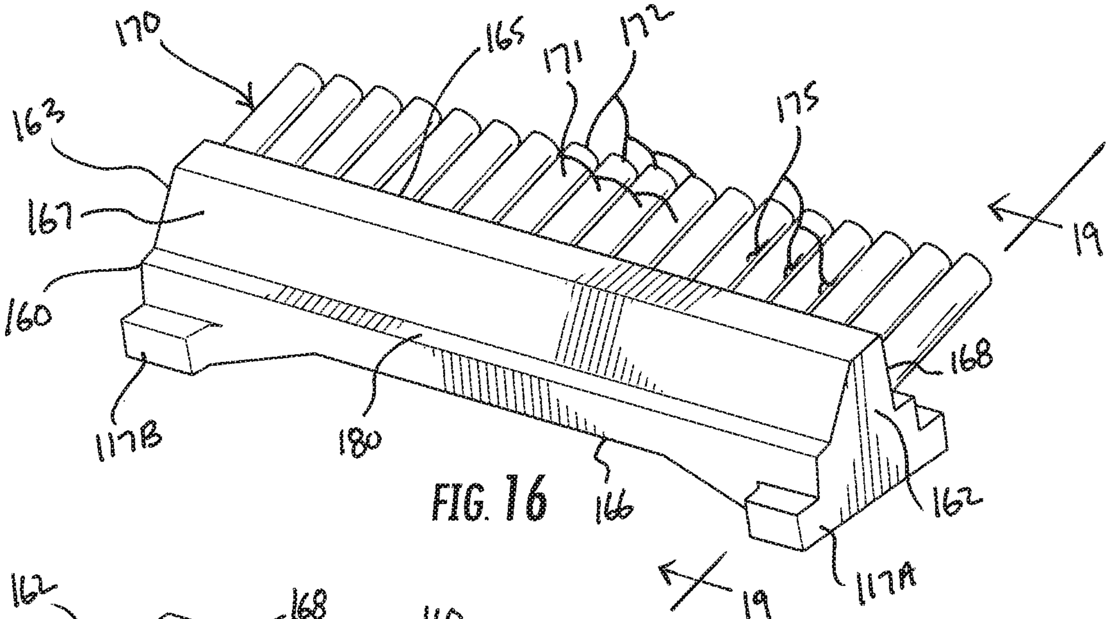
FIG. 16 is a rear perspective view of a bar of the concave section depicted in FIGS. 13-15.
Figure 17:
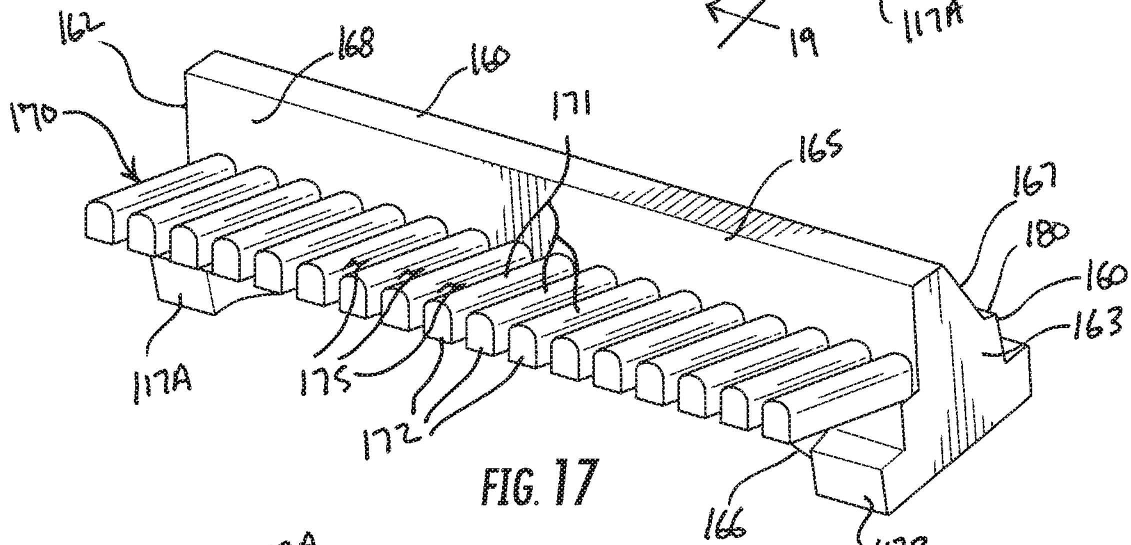
FIG. 17 is a front perspective view of the embodiment of FIG. 16.
Figure 18:
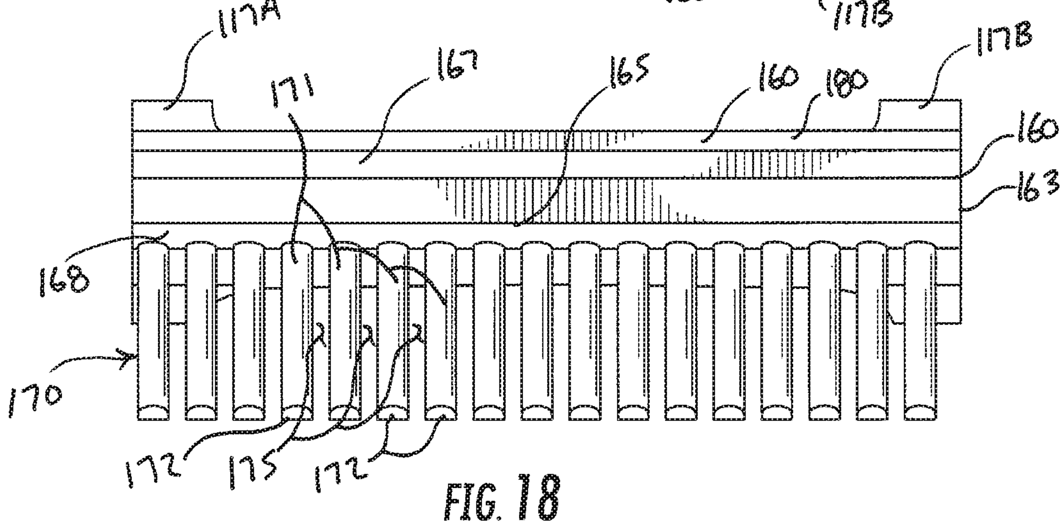
FIG. 18 is a top plan view of the embodiment of FIG. 16.
Figure 19:
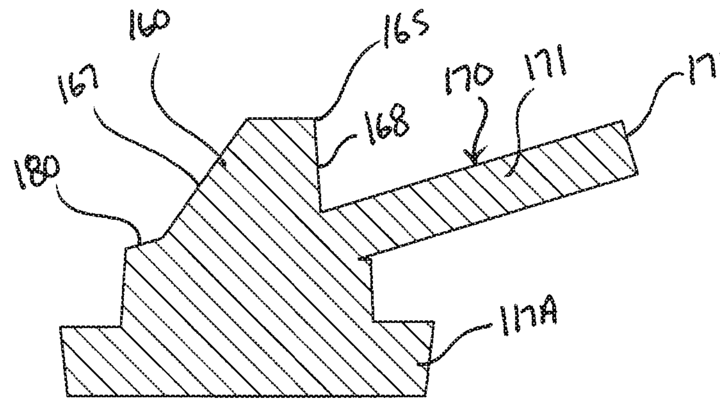
FIG. 19 is a section view taken along line 19-19 of FIG. 16.

In this example with reference to FIGS. 13-15, there are two axially aligned bars 160 for each row of bars 160, and rows of bars 160, of course, form openings 110 therebetween for grain to pass through as in concave sections 50 and 130. Two bars 160 are axially aligned for each row. One bar 160A extends axially from member 70 to member 74, and the other bar 160B extends axially from member 76 to member 72. Specifically, one bar 160A extends axially from end 162 thereof at member 70 to end 163 thereof at member 74, and the corresponding tongues 117A and 117B are applied to axially aligned slots 105 in members 70 and 74 respectively. The other bar 160B extends axially from end 162 thereof at member 72 to end 163 thereof at member 76, and the corresponding tongues 117B and 117A are applied to axially aligned slots 105 in members 72 and 76 respectively.

Each pair of bars 160A and 160B are axially aligned, and the end 163 of bar 160A extending between members 70 and 74 confronts and diametrically opposes the end 162 of bar 160B extending between members 72 and 76. FIG. 13 shows concave section 130 as it would appear closed with parallel rows of two bars 160A and 160B each. FIG. 14 shows concave section 130 as it would appear open to allow independent installation and removal of the various bars 160. FIG. 15 is a view similar to that of FIG. 14 illustrating two corresponding bars 160A and 160B to make a row of two bars detached from frame 52 in preparation for installation. To install these detached bars 160 into the axially aligned set of slots 105 in members 70, 72, 74, and 76, one bar 160A is positioned to axially align tongues 117A and 117B with axially aligned slots 105 in members 70 and 74, and bar 160A is then moved axially along its longitudinal axis in the direction of arrowed line G to set tongues 117A and 117B into slots 105 of the respective members 70 and 74. To detach bar 160A from frame 52, this operation need only be reversed. The other bar 160B is, in turn, positioned to axially align tongues 117A and 117B with axially aligned slots 105 in members 76 and 72, and bar 160B is then moved axially along its longitudinal axis in the direction of arrowed line H to set tongues 117A and 117B into slots 105 of the respective members 76 and 72. To detach bar 160B from frame 52, this operation need only be reversed. After bars 160A and 160B of each parallel row of bars 160A and 160B are so removably installed on frame 52, frames 51 and 52 may be adjusted via pivoting from the open position in FIG. 14 to the closed position in FIG. 13, and then secured with the corresponding nut-and-bolt fasteners in the closed position to ready concave section 130 for threshing.

Figure 22:
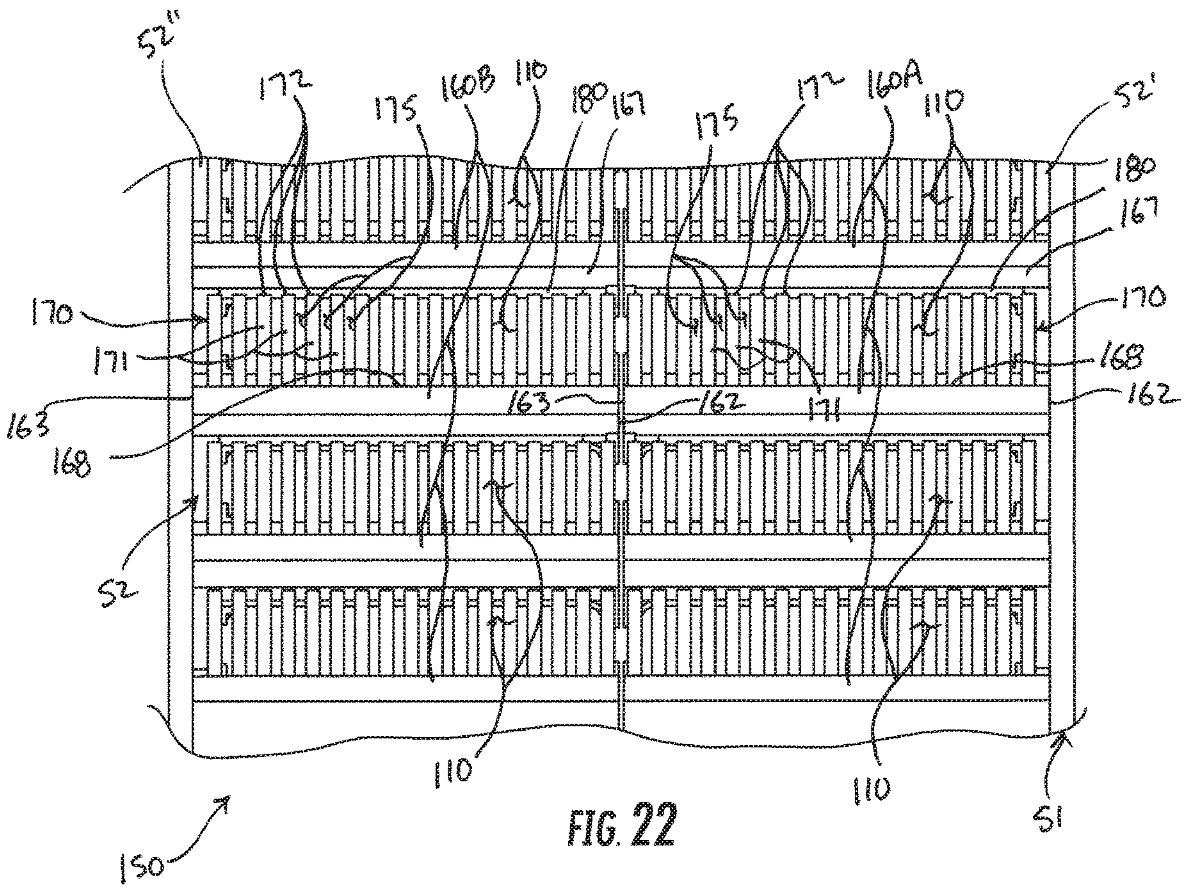
FIG. 22 is a top plan view of a section of the embodiment of FIG. 13 illustrating the outer frame capturing rows of bars carried by the inner frame.
Figure 23:
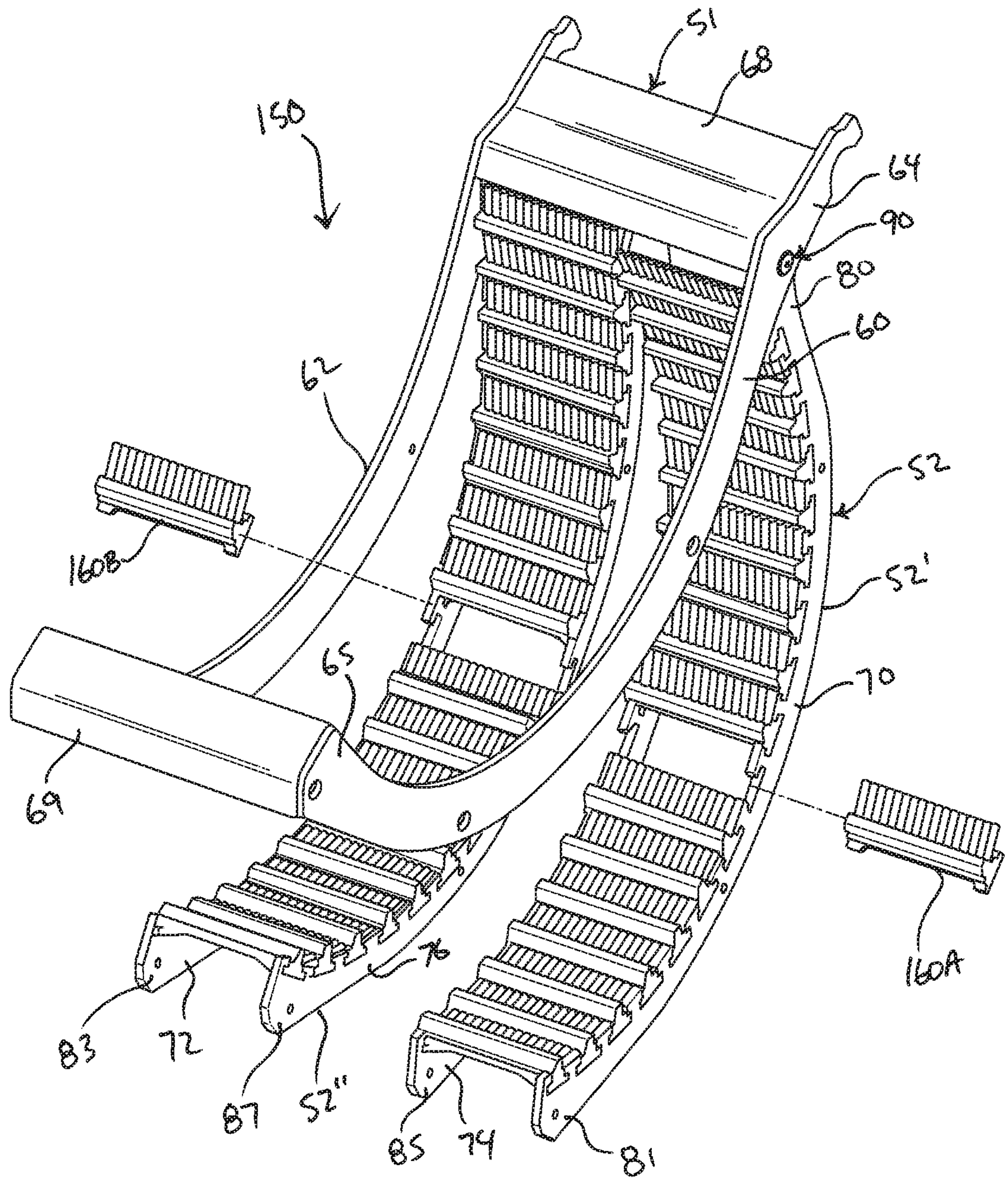
FIG. 23 is a perspective view of an alternate configuration of the embodiment of FIG. 14.

In the nested or closed position of frame 52 defining the closed position of concave section 150 in FIGS. 13 and 22, frame 51 restricts or otherwise restrains the rows of bars 160 from moving between installed and released positions. Specifically, in the nested or closed positions of frame 51, curved end member 60 of frame 51 that extends parallel to and is axially juxtaposed along the outer side of curved end member 70 of frame 52 closely confronts and makes direct contact against ends 162 of bars 160A extending between member 70 and member 74, and curved end member 62 of frame 51 that extends parallel to and is axially juxtaposed along the outer side of curved end member 72 of frame 52 closely confronts and makes direct contact against ends 163 of bars 160B extending between members 72 and 76, whereby curved end members 60 and 62 act as curved stops axially spaced from one another and juxtaposed on either side of the respective curved end members 70 and 72 of frame 52 and the respective ends 162 and 163 of the respective bars 160A and 160B capturing each row of bars 160A and 160B therebetween to restrict movement of bars 160 between their installed and released positions, and which also prevents the ability to install one or more bars 160 on frame 53 should one or more be inadvertently missing.

Figure 20:
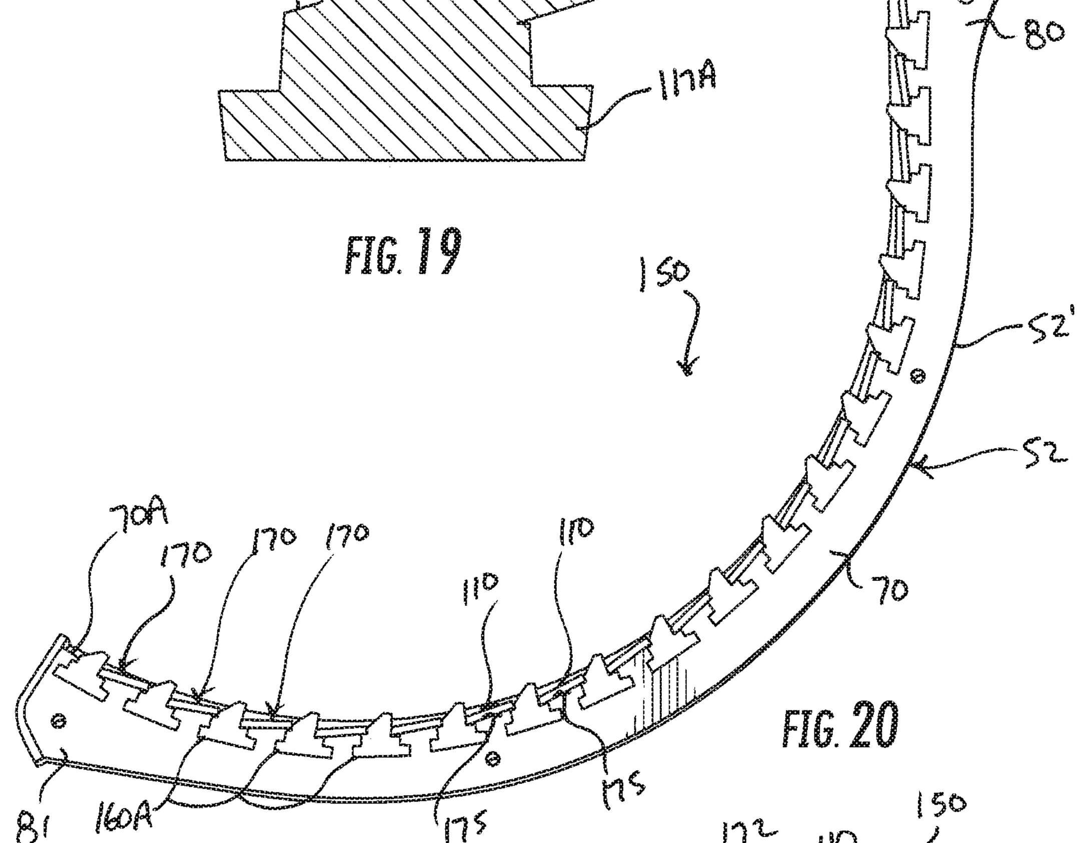
FIG. 20 is a side elevation view of the inner frame and the bars installed on the inner frame.
Figure 21:
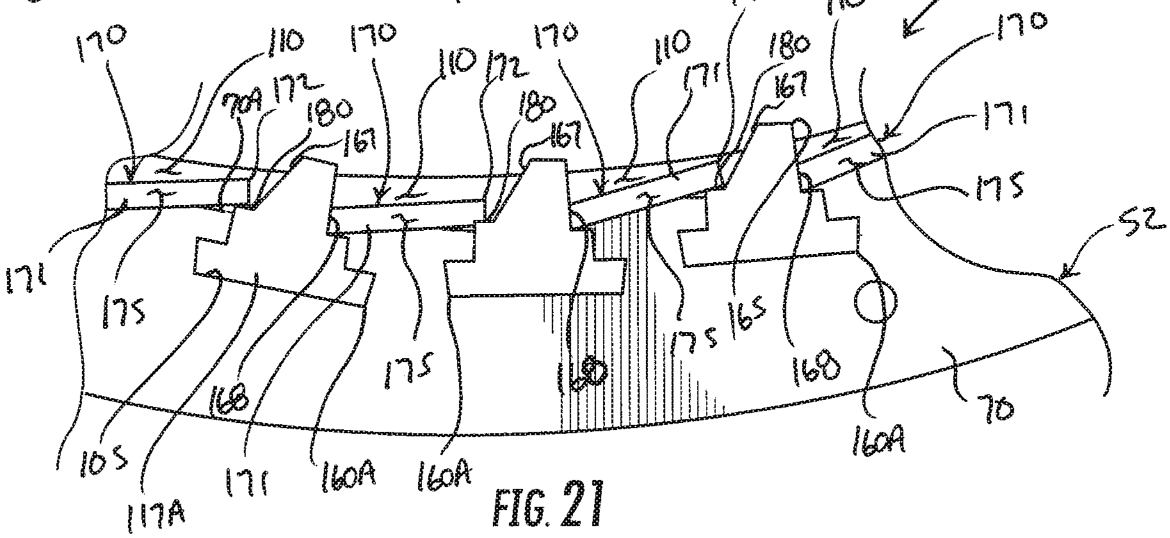
FIG. 21 is an enlarged fragmented view of a segment of the inner frame of FIG. 20 showing the interaction between bars installed on the inner frame.

In the installed position of the various bars 160 on frame 52 of concave assembly 150 in reference to FIGS. 20-22, the grate 170 of each bar 160 extends from front 168 across an adjacent opening 110 to back 167 of an adjacent bar 160 for separating grain at the corresponding opening 110 from threshed crop material. Specifically, the grate 170 of each bar 160 extends from front 168 thereof across an adjacent opening 110 to back 167 of an adjacent bar 160 and is in direct contact against the shoulder 180 of the adjacent bar 160. And so, each grate 170 of one bar 160 extends across an adjacent opening 110 to the adjacent bar 160 where it rests against the shoulder 180 of the adjacent bar 160. More specifically, fingers 171 of each bar 160 are parallel relative to members 60, 62, 70, 72, 74, and 76 and extend across the adjacent opening 110 to free ends 172 at the adjacent bar 160, which are in direct contact to rest against the shoulder 180 of the adjacent bar 160. Grates 170 thus form a continuity at openings 110 between the bars 160 of adjacent rows of bars 160. Grain falls concurrently through openings 175 between fingers 171 and each corresponding opening 110 between adjacent rows of bars 160 for separating grain from threshed crop material. Openings 175 of each grate 170 reduce the corresponding opening 110 size for smaller grains. In the rotary processing unit, bars 160 extend parallel to the axis of rotation of the rotating threshing drum, and fingers 171 of the grate 170 of each bar 160 extend transverse to the axis of rotation of the rotating threshing drum, upper threshing edges 165 extend upward from top edges 70A, 70B, 70C, and 70D of members 70, 72, 74, and 76 of frame 52 to provide aggressive threshing of the harvested crop and grate openings 175 and openings 110 between bars 160 are for grain to pass through and for separating grain from threshed crop material. Should any bars 160 become worn or damaged to require replacement or repair, or should the fingers 171 of the separating grate 170 of any bars become worn or damaged to require replacement or repair, frame 52 may be adjusted from its closed position in FIG. 13 to its open position in FIGS. 14 and 15 to allow any of the bars 160 needing replacement or repair to be easily removed, repaired or replaced, and reinstalled, in accordance with the principle of the invention.

In concave section 150 as in concave section 130, members 70 and 72 are considered one frame or otherwise a sub-frame 52' of frame 52, and members 72 and 76 are considered another frame or sub-frame 52" of frame 52. Frames 52' and 52" are, of course, connected together for movement of frame 52 between the closed position of the frame assembly the open position of the frame assembly as herein specifically described. Again, as discussed in conjunction with concave section 130, should bars 160 become worn or damaged to require replacement or repair, nut-and-bolt fasteners 92, 94, and 98, as illustrated in FIG. 8, are simply removed, and frame 52 is pivotally moved downwardly to the open position as in FIGS. 14 and 15. If desired, nut-and-bolt assemblies 78 in FIG. 2 connecting members 74 and 76 may be removed along with nut-and-bolt assembly 98 connecting ends 85 and 87 of members 74 and 76 to frame 51 to release frame 52' from frame 52" as in FIG. 12 to allow independent pivotal movement of frames 52' and 52" from open positions as in FIG. 22 to the closed positions as in FIG. 13, at which point the various nut-and-bolt assemblies 92, 94, 78, and 98, depicted in FIG. 2, may be re-installed to secure concave section 150 in the closed position in FIG. 13 in preparation for threshing. With this arrangement, nut-and-bolt assemblies 78, 92, and 98 may be removed to release frame 52' from frames 51 and 52" to allow pivotal movement of frame 52' from its closed position to its open position independently of frame 52" to allow a user to service bars 160 of frame 52', after which frame 52' may be pivoted back to its closed position and secured via nut-and-bolt assemblies 78, 92, and 98 to frames 52" and 51. Moreover, nut-and-bolt assemblies 78, 94, and 98 may be removed to release frame 52" from frames 51 and 52' to allow independent pivotal movement of frame 52" from its closed position to its open position independently of frame 52' to allow a user to service bars 160 of frame 52", after which frame 52" may be pivoted back to its closed position and secured via nut-and-bolt assemblies 78, 94, and 98 to frames 52' and 51.

Figure 24:
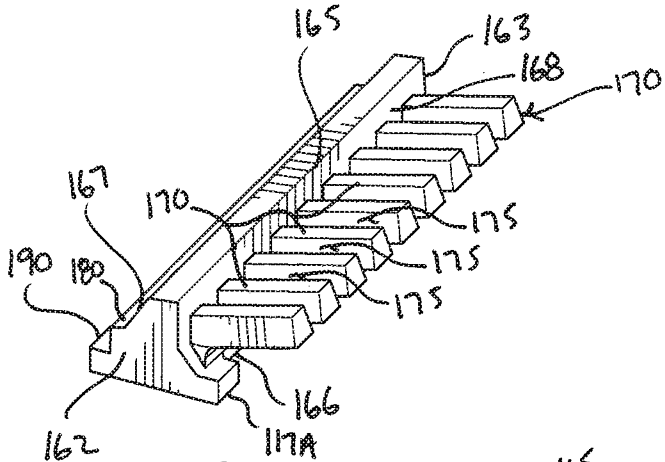
FIG. 24 is a perspective view of an alternate embodiment of a bar formed with an integrated grate according to the principle of the invention.
Figure 25:
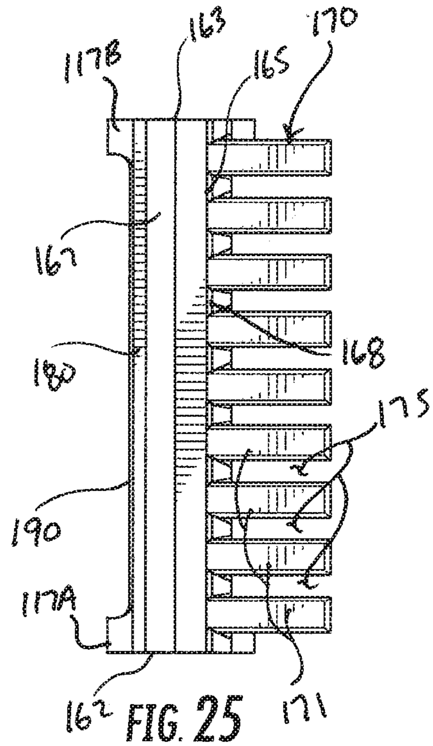
FIG. 25 is a top plan view of the embodiment of FIG. 24.
Figure 26:
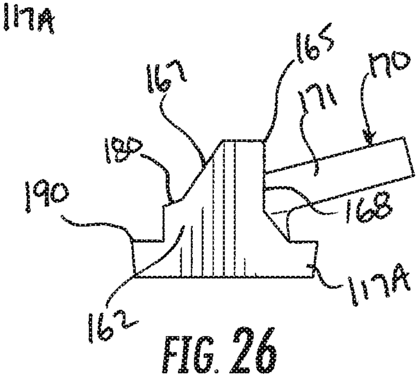
FIG. 26 is a side elevation view of the embodiment of FIG. 24, the opposite side elevation view being the same thereof.

The grate 170 of each bar 160 of concave section 150 includes eighteen axially spaced parallel fingers. Bars having similar constructions with different grate configurations can be used without departing from the invention. As matter of example, FIG. 24 is a perspective view a bar 190 formed with a grate constructed and arranged in accordance with an alternate embodiment of the invention, FIG. 25 is a top plan view of the embodiment of FIG. 24, and FIG. 26 is a side elevation view of the embodiment of FIG. 24, the opposite side elevation view being the same thereof. Like bars 160, bar 190 shares ends 162 and 163, upper threshing edge 165, lower end 166, back 167, front 168, grate 170 formed of axially aligned parallel fingers 171, tongues 117A and 117B, and shoulder 180. In bar 190, grate 170 includes nine axially spaced parallel fingers 171, which are different in cross-section, which are somewhat larger than fingers 171 of bars 160, and which are spaced further apart such that openings 175 of bar 190 are larger than openings 175 of bars 160 for relating to larger grains.

Figure 27:
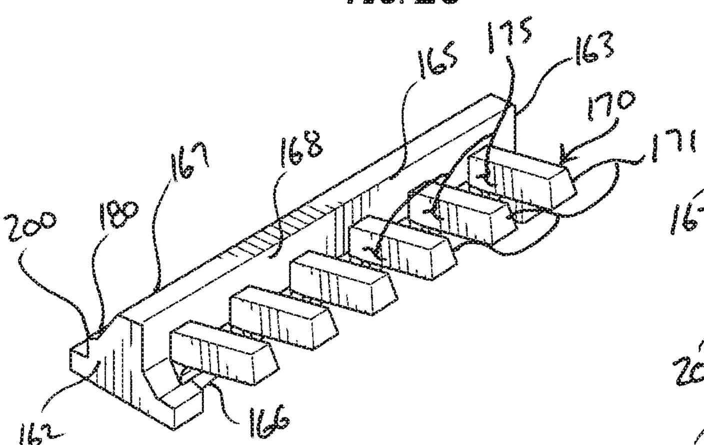
FIG. 27 is a perspective view of an alternate embodiment of a bar formed with an integrated grate according to the principle of the invention.
Figure 28:
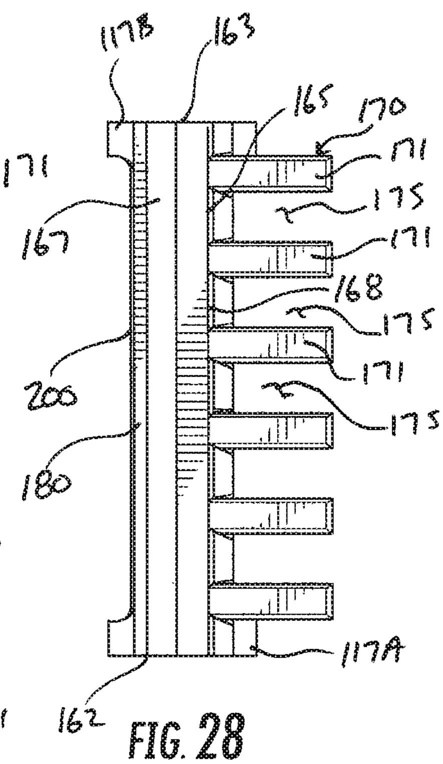
FIG. 28 is a top plan view of the embodiment of FIG. 27.
Figure 29:
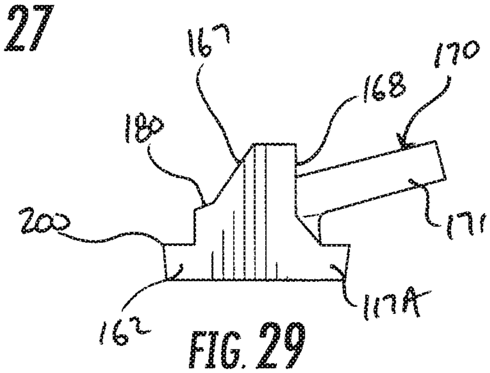
FIG. 29 is a side elevation view of the embodiment of FIG. 27, the opposite side elevation view being the same thereof.

In another example, FIG. 27 is a perspective view a bar 200 formed with a grate constructed and arranged in accordance with an alternate embodiment of the invention, FIG. 28 is a top plan view of the embodiment of FIG. 27, and FIG. 29 is a side elevation view of the embodiment of FIG. 27, the opposite side elevation view being the same thereof. Like bars 160 and 190, bar 200 shares ends 162 and 163, upper threshing edge 165, lower end 166, back 167, front 168, grate 170 formed of axially aligned parallel fingers 171, tongues 117A and 117B, and shoulder 180. In bar 200, grate 170 includes six axially spaced parallel fingers 171, which are generally the same in cross section as in bar 190, which are somewhat larger than fingers 171 of bars 160 and 190, and which are spaced further apart such that openings 175 of bar 200 are larger than openings 175 of bars 160 and 190 for relating to even larger grains.

Figure 30:
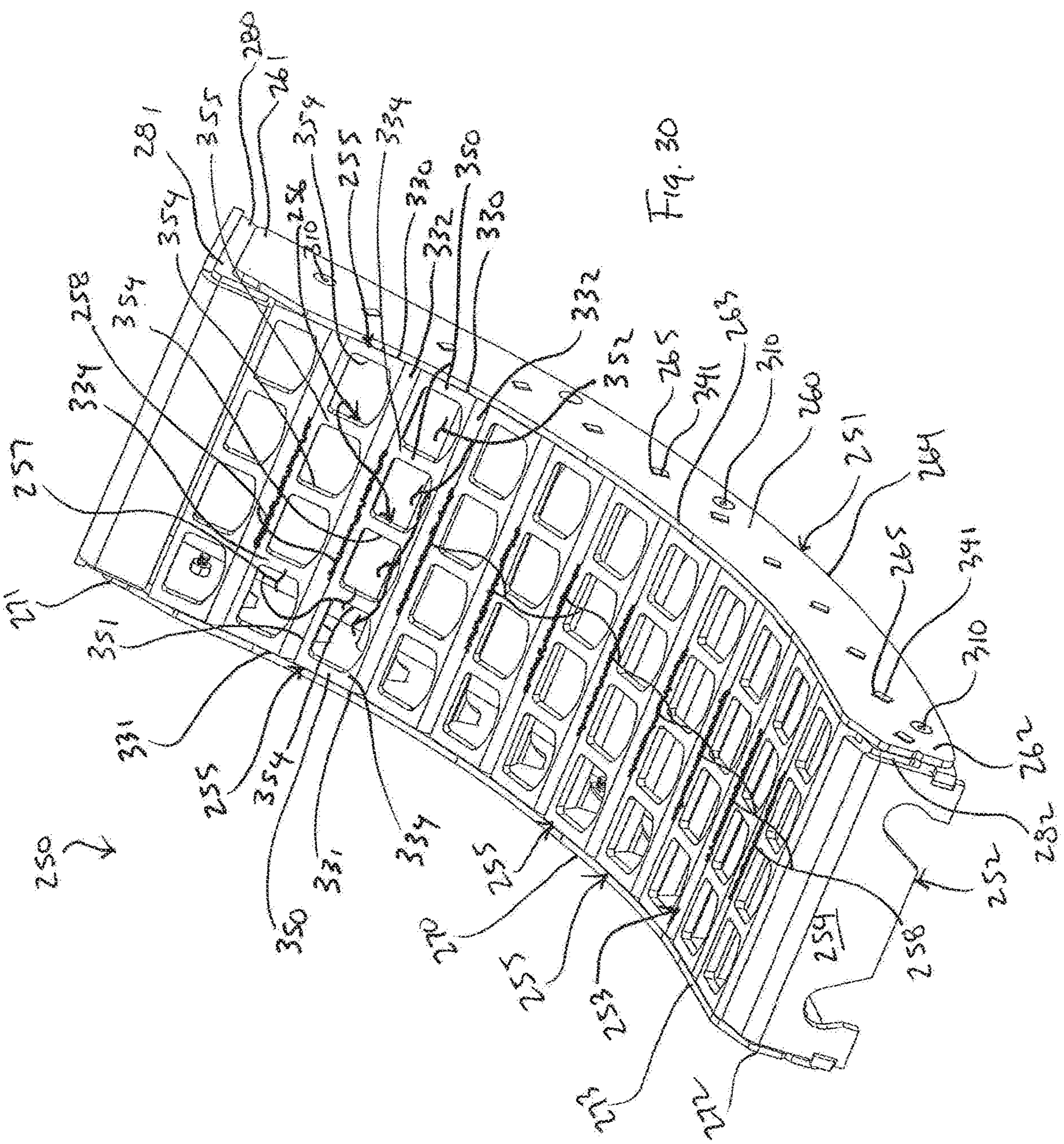
FIGS. 30 and 31 are perspective views of a concave constructed and arranged in accordance with the principle of the invention, the concave includes a threshing mat carried by an inner frame connected to an outer frame, the threshing mat includes threshing bars, the threshing bars each include a separating grate, an engagement assembly non-destructively connects each of the threshing bars to the first frame, the threshing bars form openings therebetween for grain to pass through, the separating grate of each of the threshing bars extends across an adjacent one of the openings for separating grain from threshed crop material, and the separating grate of each of the threshing bars is fixedly connected to an adjacent one of the threshing bars.
Figure 31:
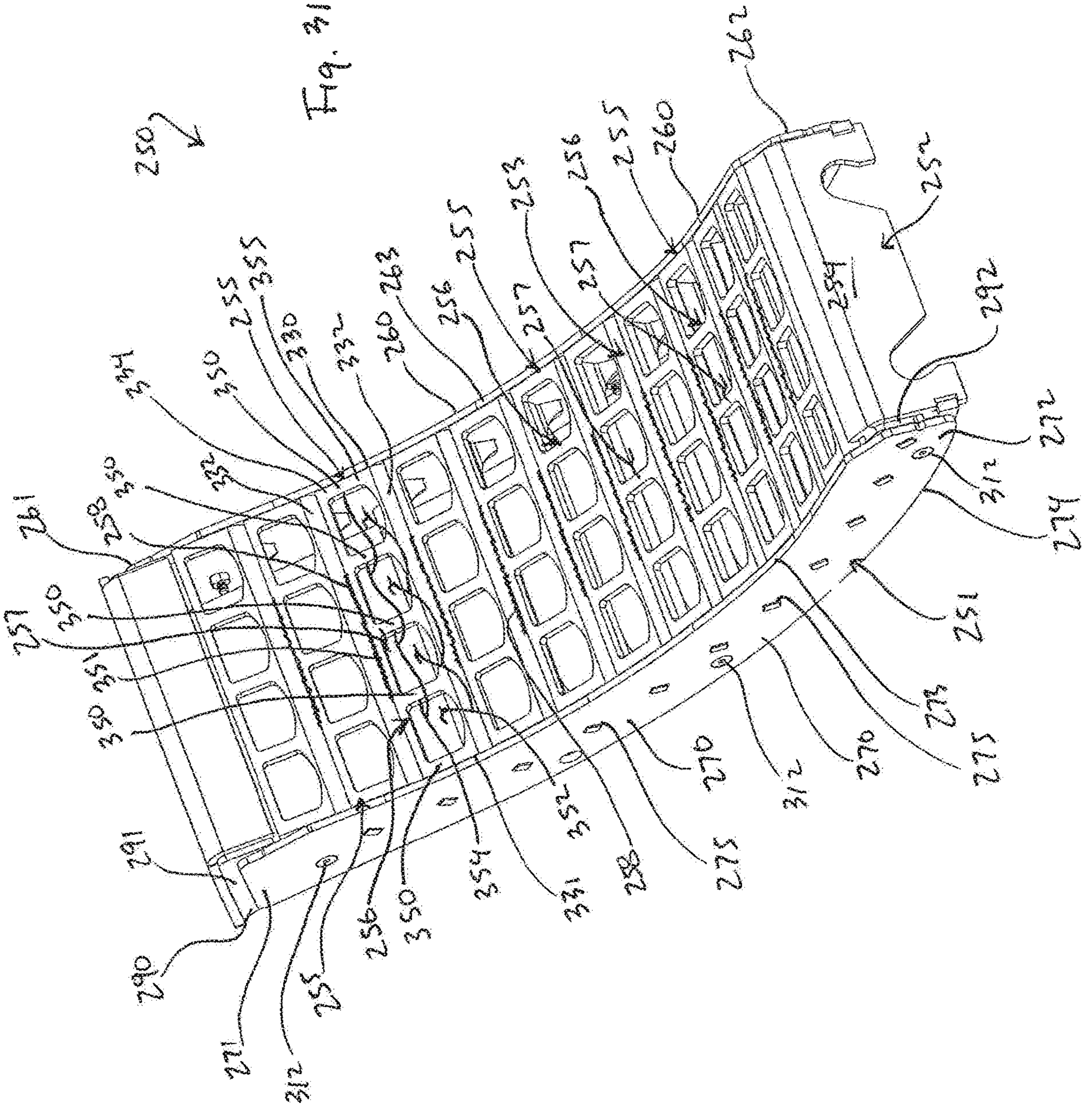

Attention is now directed to FIGS. 30 and 31 illustrating another embodiment of a concave 250 constructed and arranged in accordance with the principle of the invention. Concave 250 includes frame 251, frame 252, and threshing mat 253. Frame 251 is an outer or restraining frame. Frame 252 is an inner or base frame. In concave 250, threshing mat 253 is carried by frame 252, and frame 251 is juxtaposed to, and is connected to, frame 252. Threshing mat 253 includes threshing bars 255 each including a separating grate 256, and an engagement assembly that non-destructively connects each of threshing bars 255 to frame 252. Threshing bars 255 form openings 257 therebetween for grain to pass through. Separating grate 256 of each of threshing bars 255 extends across an adjacent one of openings 257 for separating grain from threshed crop material. Separating grate 256 of each of threshing bars 255 is fixedly connected to an adjacent one of threshing bars 255, in which there is a fixed connection 258 of separating grate 256 of each of threshing bars 255 to an adjacent one of threshing bars 255, according to the invention. Each fixed connection 258 is a destructive, irremovable and permanent connection, a destructive connection, which means that each fixed connection 258 requires its destruction, such as by cutting, to separate adjacent threshing bars 255 from one another. The welds, the fixed connections 258, disable threshing bars 255 from being detached/separated from one another without destroying the fixed connections 258. Each fixed connection 258 is at least one weld, a weld being known by the skilled artisan as a destructive connection as defined herein. The engagement assemblies that non-destructively connect each of threshing bars 255 to frame 252 allow/enable the non-destructive removal of threshing mat 253 from frame 252, when frame 252 is spaced apart from frame 251, as in FIG. 48. Frame 251 restrains non-destructive removal of threshing mat 253 from frame 252 via the engagement assemblies that non-destructively connects each of threshing bars 255 to frame 252, when frame 251 is juxtaposed to frame 252 in FIGS. 30 and 31. Threshing mat 253 is non-destructively connected to frame 252 via the engagement assemblies that non-destructively connects each of threshing bars 255 to frame 252, when frame 251 is spaced apart from frame 252, such as in FIG. 48, and when frame 251 is juxtaposed to frame 251 in FIGS. 30 and 31. Frames 251 and 252, and bars 255 are made of the customary steel as is normal in the art of concaves.

Threshing bars 255 of threshing mat 253, while not being affixed to frame 252 or to frame 251, are not independently removably connected to frame 252 because in threshing mat 253 threshing bars 255 are rigidly affixed to one another via fixed connections 258, which in concave 250 disables each of threshing bars 255 in threshing mat 253 from being separated from one another and removed from threshing mat 253 and from frame 252 independently from each of the other threshing bars 255. Threshing mat 253 is removably connected to frame 252 but is not affixed to frame 252, or to frame 251, such as by welding or other fixed or destructive connection, which enables threshing mat 253 to be selectively detached, withdrawn, or otherwise released from frame 252 enabling frames 251 and 252 to be reused with a new threshing mat without having to modify frames 251 and 252.

Frames 251 and 252 cooperate to form a frame assembly denoted at 254. Frames 251 and 252 are adjustable between a closed position in FIGS. 30 and 31, which defines the closed position of the frame assembly 254 and also concave 250 when threshing mat 253 is carried by frame 252, and an open position in FIG. 47, which defines the open position of the frame assembly 254 and also concave 250 when threshing mat 253 is carried by frame 252. In the closed position of the frame assembly 254 in FIGS. 30 and 31, when frame 251 is juxtaposed relative to frame 252, frame 251 interacts with threshing mat 253 removably connected to frame 252 to entrap threshing mat 253 between frames 251 and 252 and thereby hold and lock or otherwise secure threshing mat 253 in place to the frame assembly 254. When frame 251 is juxtaposed relative to frame 252, frame 252 is, of course, juxtaposed relative to frame 251, and the order of juxtaposing one frame relative to the other can be referred as either frame 251 juxtaposed relative to frame 252 or frame 252 juxtaposed relative to frame 251. In the open position of the frame assembly 254 in FIG. 47, when frame 251 is spaced apart from frame 252, threshing mat 253 is free from the influence of frame 251, which allows threshing mat 253 to be readily and selectively removed, detached, or otherwise de-united or withdrawn from frame 252, such as for repair or replacement purposes. Threshing mat 253 is not affixed to either frame 251 or frame 252, such as by welding or other fixed or destructive connection, both in the open position and in the closed position of the frame assembly 254. The assembly of threshing mat 253 and frames 251 and 252 is concave 250, or a concave section to which it may be referred. Accordingly, the engagement assemblies of threshing bars 255 that non-destructively connects each of threshing bars 255 to frame 252 enable/allow non-destructive removal of threshing mat 253 from frame 252, when frame 251 is spaced apart from frame 252, frame 251 disables/ restrains non-destructive removal of threshing mat 253 from frame 252 via the engagement assemblies that non-destructively connects each of threshing bars 255 to frame 252, when frame 251 is juxtaposed to frame 252, and threshing mat 253 is non-destructively connected to frame 252 via the engagement assemblies that non-destructively connects each of threshing bars 255 to frame 252, when frame 251 is spaced apart from frame 252 in FIG. 47 and when frame 251 is juxtaposed to frame 252 in FIGS. 30 and 31.

Referencing FIGS. 30, 31, 47, and 48, frame 251, the outer or restraining frame, includes members 260 and 270. Members 260 and 270 are end members and are substantially identical and coextensive. Members 260 and 270 are thin and elongate and, in concave 250, are axially spaced from one another and extend parallel to one another, and are curved to extend circumferentially about a portion of the rotor of the rotary processing unit. Given that members 260 and 270 are end members and are curved, they may be referred to as either curved members, or curved end members.

Curved end member 260 has opposite ends 261 and 262, upper edge 263, lower edge 264, and keyways 265. Upper edge 263 and lower edge 264 concurrently extend from end 261 to end 262. Each keyway 265 is a through-hole formed through the middle thickness of member 260 between upper edge 263 and lower edge 264. Keyways 265 are equally spaced apart longitudinally from end 261 to end 261.

Curved end member 270 has opposite ends 271 and 272, upper edge 273, lower edge 274, and keyways 275. Upper edge 273 and lower edge 274 concurrently extend from end 271 to end 272. Each keyway 275 is a through-hole formed through the middle thickness of member 270 between upper edge 273 and lower edge 274. Keyways 275 are equally spaced apart longitudinally from end 271 to end 272.

Keyways 265 and 275 are identical in size and in shape, and are equal in number, there being eleven keyways 265 and eleven keyways 275, and less or more keyways 265 and 275 can be provided in alternative embodiments as long as keyways 265 are equal in number to keyways 275. The longitudinal spacing of keyways 265 between end 261 and 262 is identical to the longitudinal spacing of keyways 275 between end 271 and end 272, which results in keyways 265 and keyways 275 being axially aligned when frame 251 is in its closed position relative to frame 252, when frames 251 and 252 that form the frame assembly 254 of concave 250 are closed. Keyways 265 and 275 are each square in shape in this example, being not round.

Referring in relevant part to FIGS. 30-34B, 41-45, and 47-48, frame 252 includes members 280 and 290. Members 280 and 290 are substantially identical and coextensive. Members 280 and 290 are thin and elongate and are axially spaced from one another. Members 280 and 290 extend parallel relative to each other, and relative to members 260 and 270 in concave 250. Members 280 and 290 are curved like that of end members 260 and 270 to similarly extend circumferentially about a portion of the rotor of the rotary processing unit. Given that members 280 and 290 are end members and are curved, they may be referred to as either curved members, or curved end members. Members 260, 270, 280, and 290 have matching curvatures.

Figure 32:
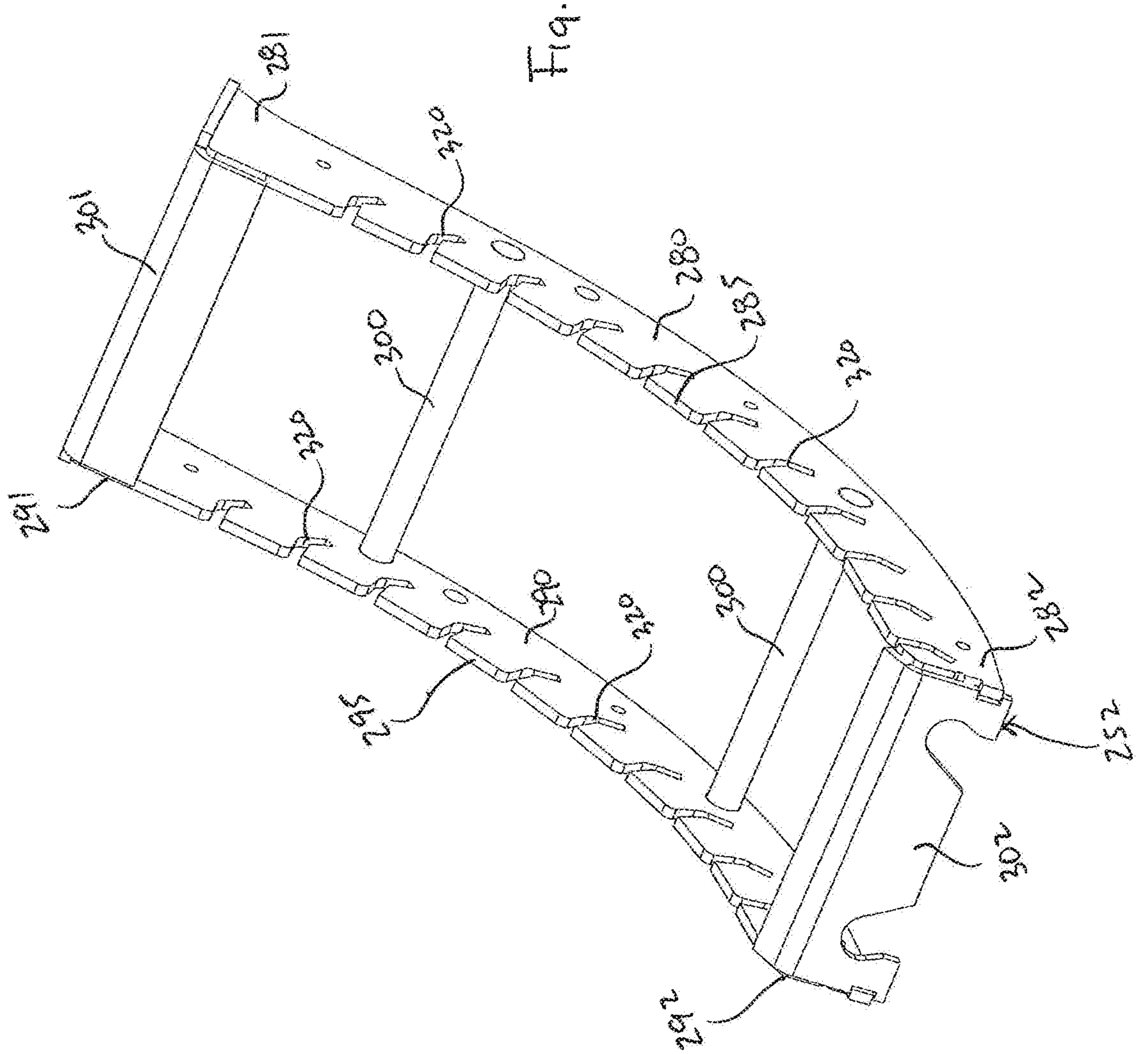
FIGS. 32 and 33 are perspective views of the inner frame of the concave of FIGS. 30 and 31.
Figure 33:
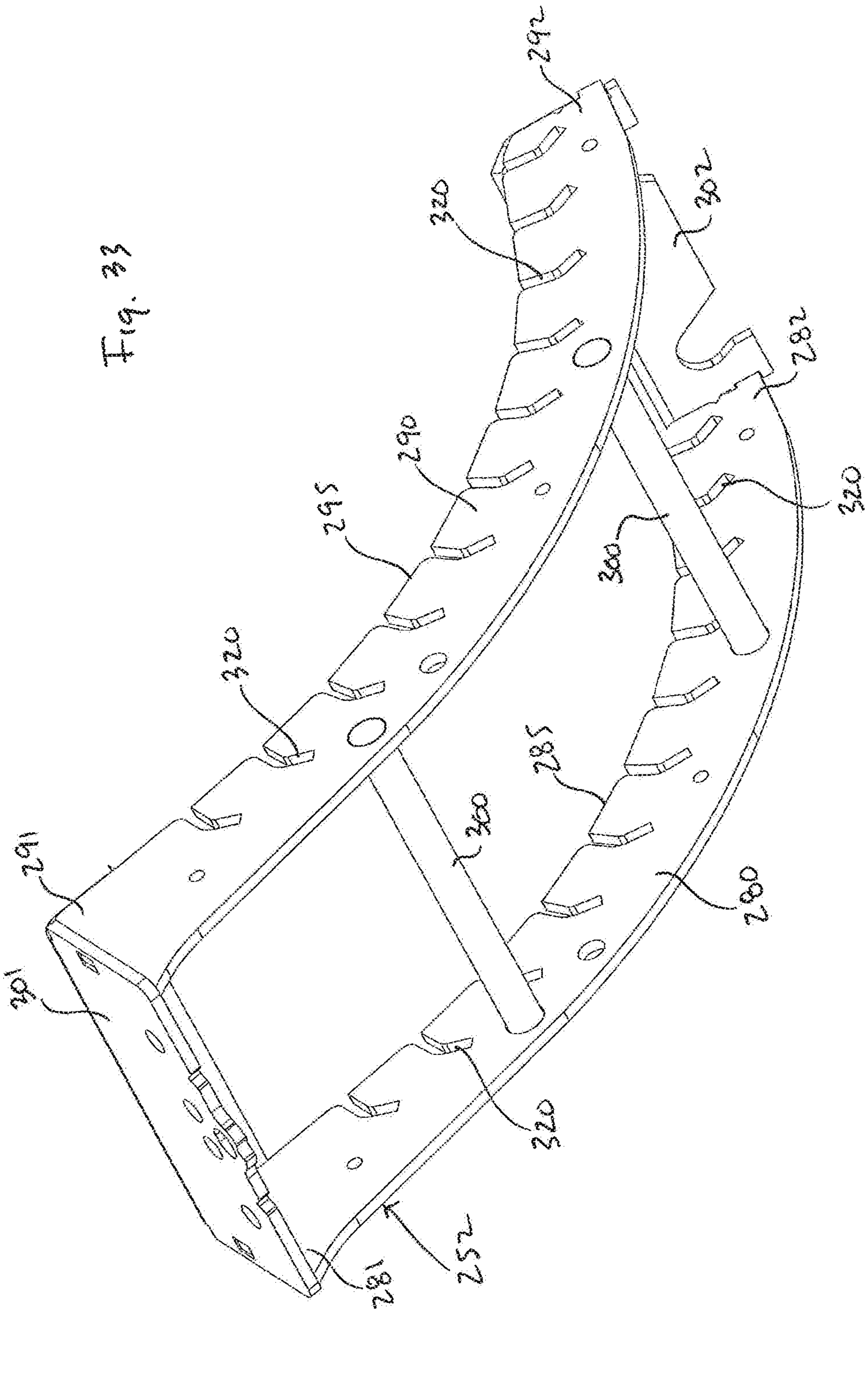
Figure 34A:
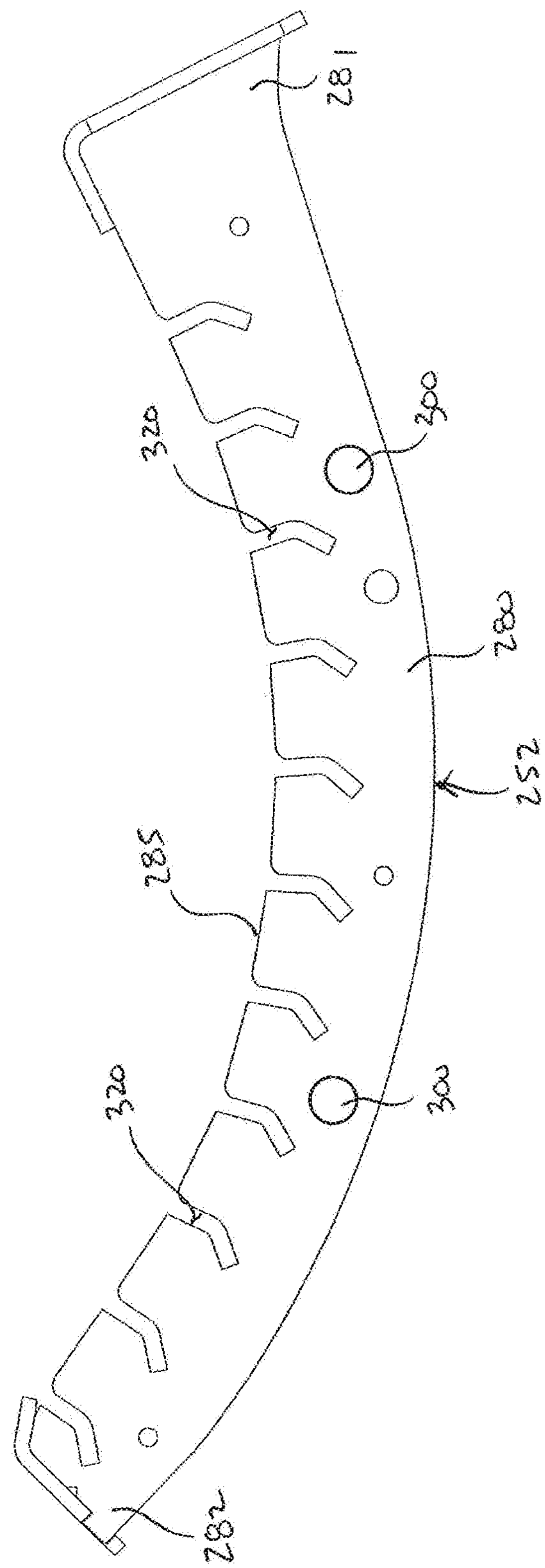
FIG. 34A is a left side elevation view of the embodiment of FIGS. 32 and 33.
Figure 34B:
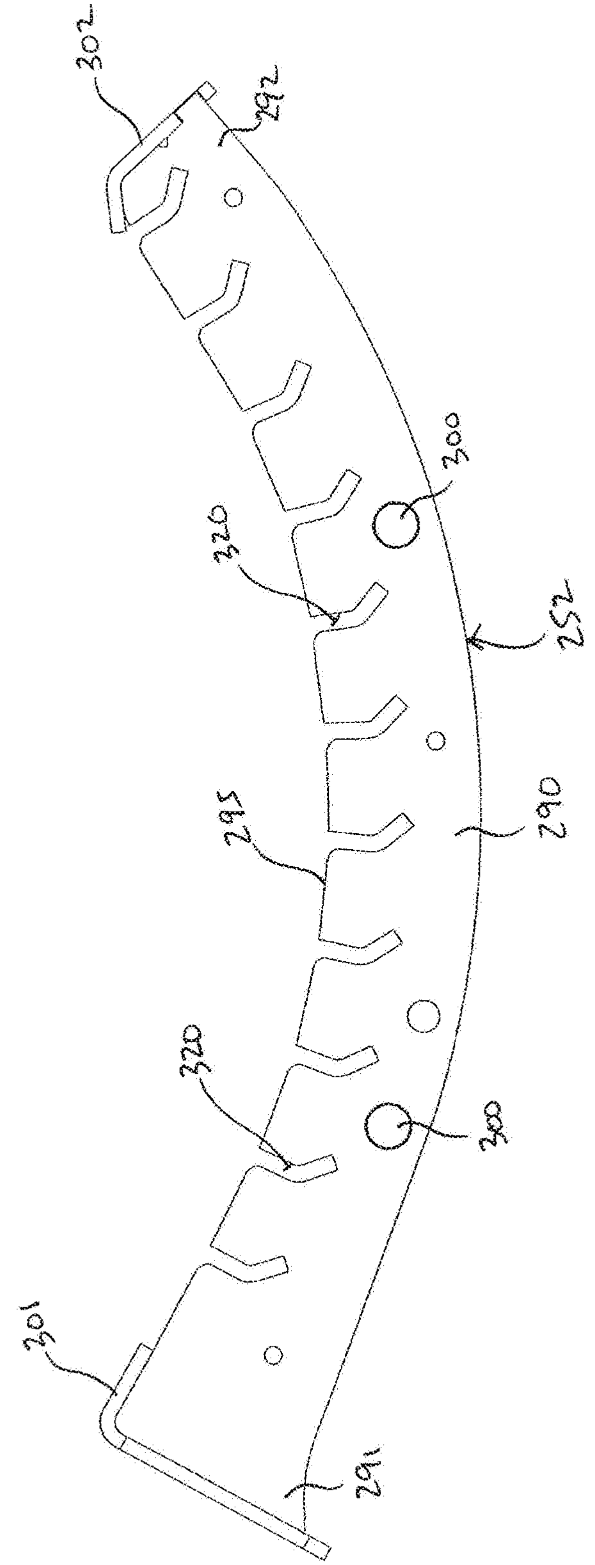
FIG. 34B is a right side elevation view of the embodiment of FIGS. 32 and 33.
Figure 35:
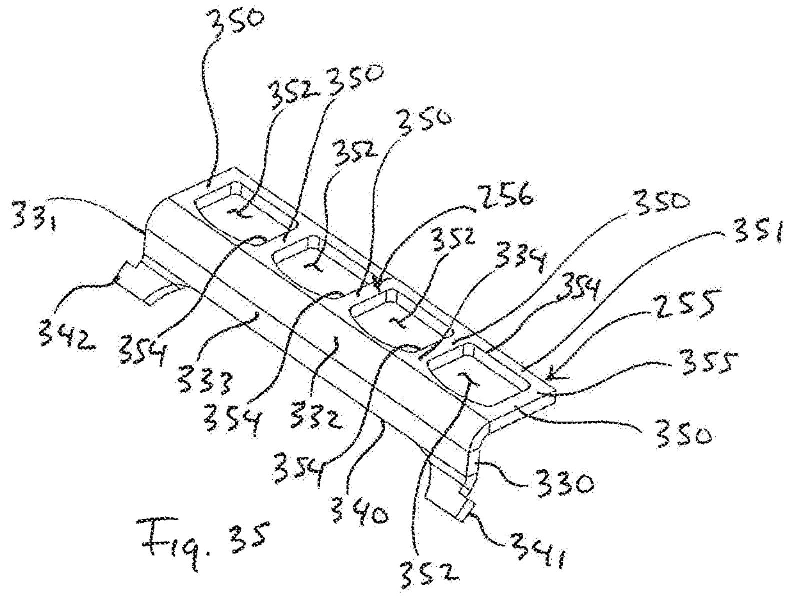
FIG. 35 is a top perspective view of one of the threshing bars of the threshing mat of the embodiment of FIGS. 30 and 31.
Figure 36:
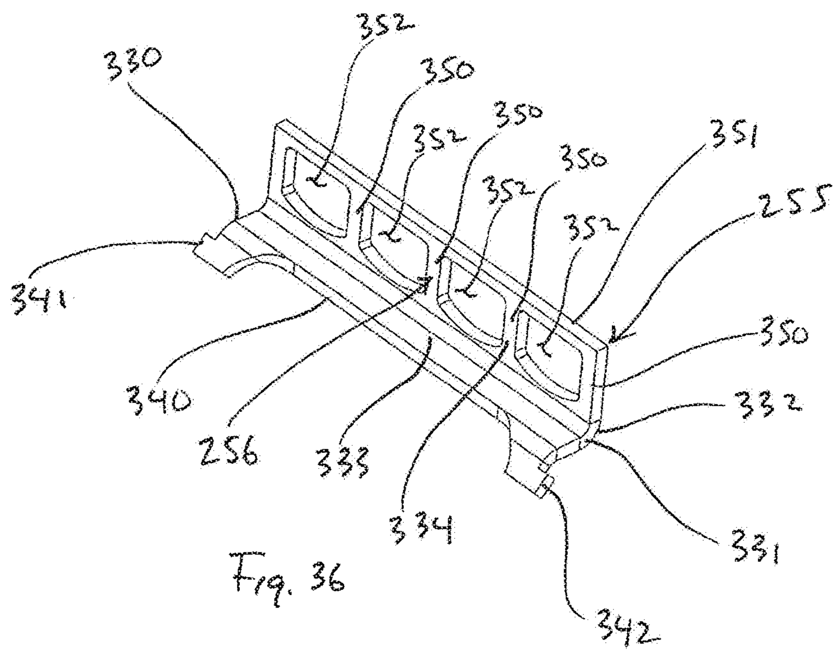
FIG. 36 is a bottom perspective view of the embodiment of FIG. 35.

Curved end member 280 has opposed ends 281 and 282, and curved end member 290 has opposed ends 291 and 292. In FIGS. 32 and 33, frame 252 has spaced-apart, elongate, and parallel struts 300, two in this example, that connect member 280 to member 290, imparting rigidity and ruggedness to frame 251. The opposite ends of struts 300 are preferably welded to the respective members 280 and 290, being rigidly affixed to the respective members 280 and 290. Transverse support member 301 extends between and is joined to ends 281 and 291 of curved members 280 and 290 via welding, and transverse support member 302 extends between and is joined to ends 282 and 292 of curved end members 280 and 290 via welding. Transverse support members 301 and 3029 are relatively thin, elongate plates or caps.

Figure 47:
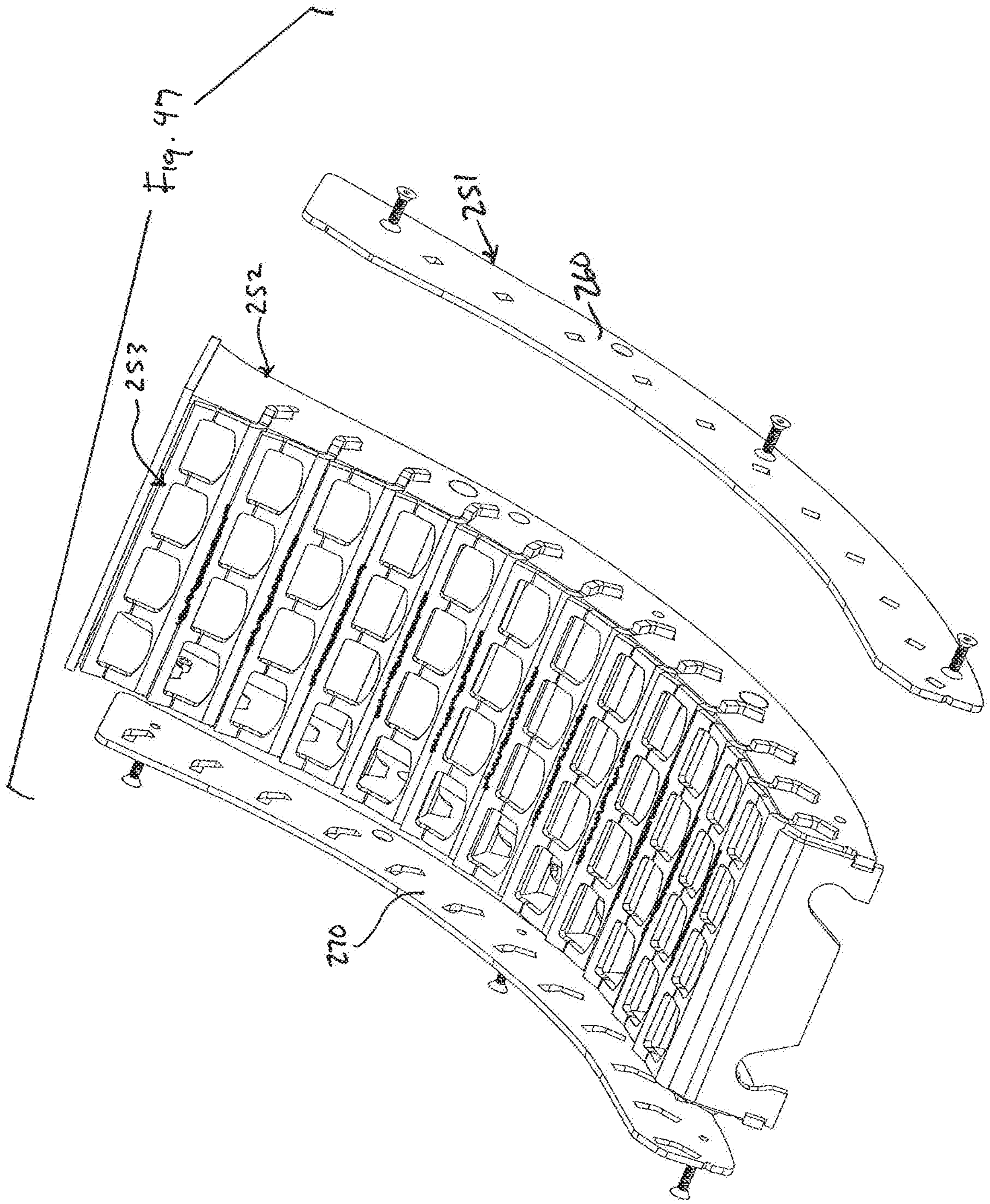
FIG. 47 is a perspective view of the embodiment of FIGS. 43 and 44 illustrating the separating grate of each of the threshing bars fixedly connected to an adjacent one of the threshing bars to form the threshing mat first illustrated in FIGS. 30 and 31, and stops, the stops, being the outer frame first illustrated in FIGS. 30 and 31, illustrated as they would appear detached from, and axially aligned on either side of, the inner frame.
Figure 48:
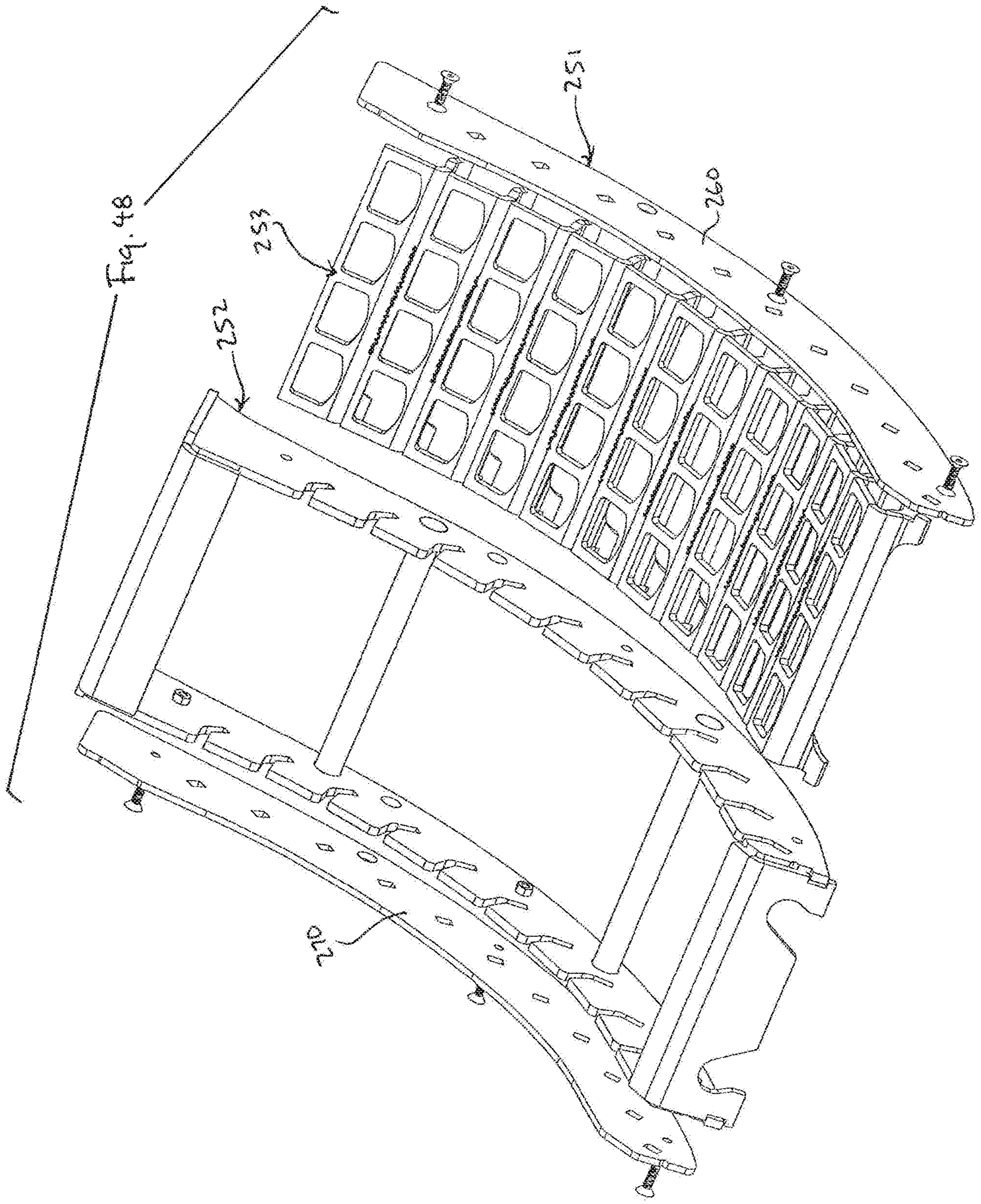
FIG. 48 is a view corresponding to FIG. 47 illustrating the stops as they would appear detached from the inner frame and the threshing mat as it would appear withdrawn from the inner frame.

Frames 251 and 252 are adjustable between the closed position in FIGS. 30 and 31 defining the closed position of frame assembly 254, and the open position in FIGS. 47 and 48 defining the open position of frame assembly 254. Frames 251 and 252 are axially aligned, and keyways 265 and 275 are axially aligned, in the closed position of frame assembly 254. Frame 251 is juxtaposed to frame 252, when frames 251 and 252 are in the closed position defining the closed position of frame assembly 254. Frame 252 is spaced apart from frame 252, when frames 251 and 252 are in the open position defining the open position of frame assembly 254.

When frames 251 and 252 are in the closed position in FIGS. 30 and 31, curved end member 260 is juxtaposed along, and is in direct contact against, the outer side of curved end member 280, curved end member 270 is juxtaposed along, and is in direct contact against, the outer side of curved end member 290, curved end member 260 extends along the length of curved end member 280 from end 261 juxtaposed to end 281 to end 262 juxtaposed to end 282, and curved end member 270 extends along the length of curved end member 290 from end 271 juxtaposed to end 291 to end 272 juxtaposed to end 292. Accordingly, in the closed position of frames 251 and 252, frame 252 is within frame 251, curved end member 280 extends parallel to and is axially juxtaposed along and is in direct contact with the inner side of curved end member 260 that in turn extends parallel to and is axially juxtaposed along the outer side of curved end member 280, curved end member 290 extends parallel to and is axially juxtaposed along and is in direct contact with the inner side of curved end member 270 that in turn extends parallel to and is axially juxtaposed along the outer side of curved end member 290, curved end member 280 extends concurrently along the length of curved end member 260 of frame 251 from end 281 juxtaposed to end 261 to end 282 juxtaposed to end 262, and curved end member 290 extends concurrently along the length of curved end member 270 of frame 251 from end 291 juxtaposed to end 271 to end 292 juxtaposed to end 272. In the assembly of concave 250, when frames 251 and 252 are in the closed position in FIGS. 30 and 31, curved end member 260 is releasably connected to curved end member 280, and curved end member 270 is releasably connected to curved end member 290.

Fasteners are used to removably connect frame 252 to frame 251, when frames 251 and 252 are in the closed position in FIGS. 30 and 31. Specifically, end members 260 and 280 are releasably connected to each other with longitudinally spaced fasteners, here in the form of three nut-and-bolt assemblies 310 and less or more of such assemblies can be used, and end members 270 and 290 are releasably connected to each other with longitudinally spaced fasteners, here in the form of three nut-and-bolt assemblies 312 and less or more of such assemblies can be used.

In FIGS. 32 and 33, curved end members 280 and 290 of frame 252 have top edges 285 and 295, respectively, and slots 320. Top edges 285 and 295 lie along a common curved surface to extend circumferentially about a portion of the rotor of a rotary processing unit. Slots 320 are spaced apart from one another longitudinally along the lengths of the respective curved end members 280 and 290, between ends 281 and 282 of curved end member 280 and between ends 291 and 292 of curved end member 290. Slots 320 are formed through the thickness of curved end members 280 and 290 in the upper portions of each of the curved end members 280 and 290 and are open at top edges 285 and 295, and spaced apart slots 320 formed curved end member 280 correspond, respectively, being axially aligned with, the spaced apart slots 320 formed in curved end member 290. Each one of angle slots 320 has an angle profile. Accordingly, slots 320 are angle slots. Slots 320 are identical in size and shape, wherein the angle profile of slots 320 is identical.

In FIGS. 30 and 31, frame 252 carries threshing bars 255, which forms a concave or concave section. Threshing bars 255, which can be referred to simply as bars, are identical, and in threshing mat 253 of concave 250 are set one adjacent to another and are parallel relative to each other from transverse support member 301 to transverse support member 302, and extend axially between curved end members 280 and 290.

Figures 37, 38, 39, 40:
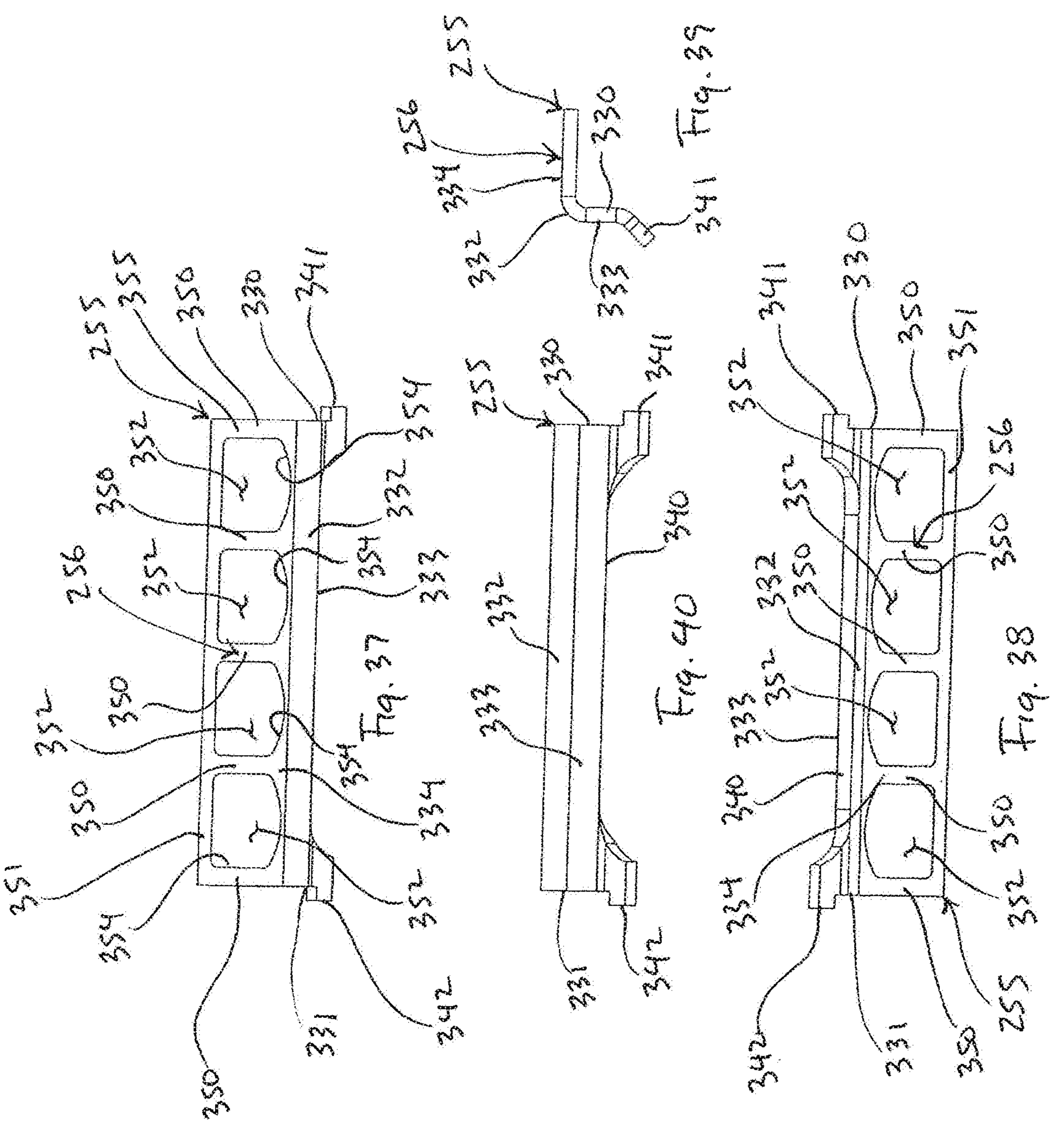
FIG. 37 is a top plan view of the embodiment of FIG. 35.
FIG. 38 is a bottom plan view of the embodiment of FIG. 35.
FIG. 39 is a side elevation view of the embodiment of FIG. 35, the opposite side elevation view being the same thereof.
FIG. 40 is an end elevation view of the embodiment of FIG. 35.

Referring in relevant part to FIGS. 35-40, each threshing bar 255 has opposite ends 330 and 331 and is straight in longitudinal extent from end 330 to end 331. Bar 255, an angle member, has an angle profile from end 330 to end 331. The angle profile of bar 255 is the same from end 330 to end 331, and is characterized by a corner segment 332, a base segment 333, and separating segment 334 that has separating grate 256. Corner segment 332, base segment 333, and separating segment 334 are straight in longitudinal extent from end 330 to end 331. Base segment 333 extends downwardly from corner segment 332 to lower end 340 that extends from key 341 formed in end 330 of base segment 333 to key 342 formed in end 331 of base segment 333. Keys 341 and 342 each correspond to each of keyways 265 and each of keyways 275, being identical in size and shape and being square in cross section, being not round, to correspond with the corresponding shape of each of keyways 265 and each of keyways 275. In FIG. 39, end 330 of base segment 333 is generally S-shaped from corner segment 332 to lower end 340 when bar 255 is viewed from end 330, in which base segment 333 has a generally S-shaped angle profile from corner segment 332 to lower end 340. The angle profile of end 331 of base segment 333 from corner segment 332 to lower end 340 is the mirror image of the angle profile of end 330 of base segment 333 from corner segment 332 to lower end 340, in which end 331 of base segment 333 is generally reverse S-shaped from corner segment 332 to lower end 340 when bar 255 is viewed from end 331.

Separating segment 334 is at the upper end of bar 255, and extends horizontally from corner segment 332 to separating grate 256. In this example, base segment 333 and separating segment 334 are generally perpendicular relative to one another, defining a 90-degree angle therebetween at corner segment 332. Base segment 333 and corner segment 332 extend along the length of bar 255 between ends 330 and 331. Corner segment 332 and separating segment 334 formed with grate 256 extend along the length of bar 255 between ends 330 and 331 and define the threshing and separating component of bar 255.

Grate 256 includes axially-aligned parallel fingers 350 that extend outwardly from corner segment 332 to elongate member 351, the distal extremity of grate 356, that interconnects the outer ends of fingers 350 and that extends from end 330 to end 331. Fingers 350 are axially spaced apart forming openings 352 therebetween. Each opening 352 is defined between adjacent fingers 350 and is closed proximally by corner segment 332 and distally by elongate member 351. Fingers 350 are equally spaced apart, and openings 352 are equal in size and shape, there being four openings 352 in this bar 255 embodiment. Openings 350, each of which is encircled by adjacent fingers 250, corner segment 332, and elongate member 351, are for grain to pass through. The continuous edge 354 to each opening 352 at uppermost surface 355 of grate 256 that faces the rotary processing unit when concave 250 is installed in an agricultural combine is a continuous threshing edge of grate 256.

Bar 255 is formed from a piece of flat stock cut with separating grate 356, which is bent to shape to form the described angle profile. Each of the angle slots 320 of members 280 and 290 of frame 252, in FIGS. 32, 33, and 45, has an angle profile that corresponds to the angle profile of each of the opposite ends 330 and 331, respectively, of base segment 333 of each one of the bars 255, in accordance with the principle of the invention.

Referring in relevant part to FIGS. 41-46B, the opposite ends 330 and 331 of the base segment 333 of each of bars 255 are tongues and are non-destructively and removably held in corresponding, axially-aligned angle slots 320 of curved end members 280 and 290. Accordingly, an engagement assembly, a non-destructive removable connection, non-destructively connects each of bars 255 to frame 252, in which each engagement assembly includes engagement elements carried by each of the threshing bars and corresponding complemental engagement elements carried by frame 251, wherein the engagement elements of each bar are ends 330 and 331, tongues, and the complemental engagement elements for each bar 255 are a pair of axially-aligned slots 320 of members 280 and 290, respectively. The corresponding angle profiles of angle slots 320 and the opposite ends 330 and 331 of the base segments 333 of the bars 255 correspond and disable axial rotation of each of the bars 255 53 relative to frame 252. The angle profile of slots 320 of member 280 when view from the side of frame 252 defined by member 280 is generally S-shaped to correspond to the angle profiles of ends 330 of bars 255 as seen in FIGS. 32, 34A, 41, and 43, whereas the angle profile of slots 320 of member 290 when viewed from the opposed side of frame 252 defined by member 290 is generally reverse S-shaped to correspond to the angle profiles of ends 331 of bars 255 as seen in FIGS. 33, 34B, 42, 44, and 46A. Referring in relevant part to FIGS. 43, 44, 45, 46A, and 46B, ends 330 and 331 of base member 33 of each bar 255 extends downwardly from corner segment 332 through the corresponding axially-aligned angle slots 320 of members 280 and 290, respectively. Given the shapes of ends 330 and 331 and the corresponding shapes slots 320 of members 280 and 290, ends 330 and 331 of the base sections 333 extend downwardly through and follow the corresponding slots 320 in members 280 and 290, extending downwardly along an upper pitch as shown and then extending angularly relative to the upper pitch in the direction of ends 282 and 292, respectively, of members 280 and 290 along a lower pitch as shown. Bars 255 extend between curved end members 280 and 290, from curved end member 280 to curved end member 290, are parallel relative to one another and to transverse support members 301 and 302, are perpendicular relative to members 280 and 290, and are spaced from one another and extend axially between curved end members 280 and 290 forming openings 257 between corner segments 332 for grain to pass through. The corner segment 332 of each one of the bars 255 is adjacent or otherwise proximate to the top edges 285 and 295 of the respective curved end members 280 and 290. The outermost fingers 350 of each separating segment 356 rest in direct contact against top edges 285 and 295, respectively, of members 280 and 290. The separating grate 256 of each one of the bars 255, the separating segment 334 of each bar 255, is adjacent to and above the top edges 285 and 295 of the respective curved end members 280 and 290 and extends across an adjacent one of the openings 257 over top edges 285 and 295 of the respective curved end members 280 and 290 to corner segment 332 of an adjacent bar 225 for separating grain from threshed crop material.

In the installed position of the various bars 255 on frame 252, the separating grate 256 of each bar 255 extends across an adjacent opening 257 to the outer or back side of corner segment 332 of an adjacent bar 255 for separating grain at the corresponding opening 340 from threshed crop material, in which the elongate member 351 of each separating grate 256 is adjacent to, and confronts, the corner segment 332 of the adjacent bar 255. Each separating grate 256 extends across an adjacent opening 257 to its elongate member 351 at the outer or back side of corner segment 332 of the adjacent bar 255. More specifically, fingers 350 of each bar 255 are parallel relative to members 260, 270, 280, and 290, and extend across the adjacent opening 340 to elongate member 351 at the outer or back side of the corner segment 332 of the adjacent bar 255. Grain falls concurrently through openings 352 and each corresponding opening 257 between corner segments 332 of adjacent bars 255 for separating grain from threshed crop material. Openings 352 of each separating grate 256 reduce the corresponding opening 257 size for smaller grains. In the rotary processing unit, separating grate 256 and corner segment 332 adjacent to top edges 285 and 295 provide threshing of the harvested crop and openings 352 of the separating grates 256 and the openings 257 between corner segments 332 are for grain to pass through and for separating grain from threshed crop material. Again, the continuous edge 354 to each opening 352 at uppermost surface 355 of each grate 256 that faces the rotary processing unit when concave 250 is installed in an agricultural combine is a continuous threshing edge of each grate 256.

The bars 255, including at their opposite ends 330 and 331, are not affixed to be immovable using any suitable technique, such as by welding, to curved end members 280 and 290, after seating the opposite ends 330 and 331, opposed tongues, one after the other, into the corresponding angle slots 320, which removably connects bars 255 to frame 252. As a result, bars 255 are removably connected to frame 252 simply by seating/inserting the opposite ends 330 and 331, one after the other, of each bar 255 into a corresponding pair of aligned slots 320 of the respective curved end members 280 and 290, and readily removed from frame 252 by withdrawing the opposite ends 110 and 111, one after the other, from the respective angle slots 320.

As described above, the bars 255 are not affixed to frame 252 using any suitable technique, such as by welding, to members 280 and 290, to be permanently connected to frame 252, such that the only way to remove them would be to destroy such a permanent connection. The described engagement assembly between each bar 255 and frame 252, each engagement assembly being pairs of tongue-and-slot engagement assemblies, one being end 330 and a corresponding slot 320 of member 280 and the other being end 331 and a corresponding slot 320 of member 290, is a non-destructive, removable and impermanent connection, which means that the tongue-and-slot connection between each of ends 330 and 331 and each corresponding slot 320 does not require the destruction of the engagement assembly, such as by cutting, in order to remove the various bars 255 from frame 252.

Figure 41:
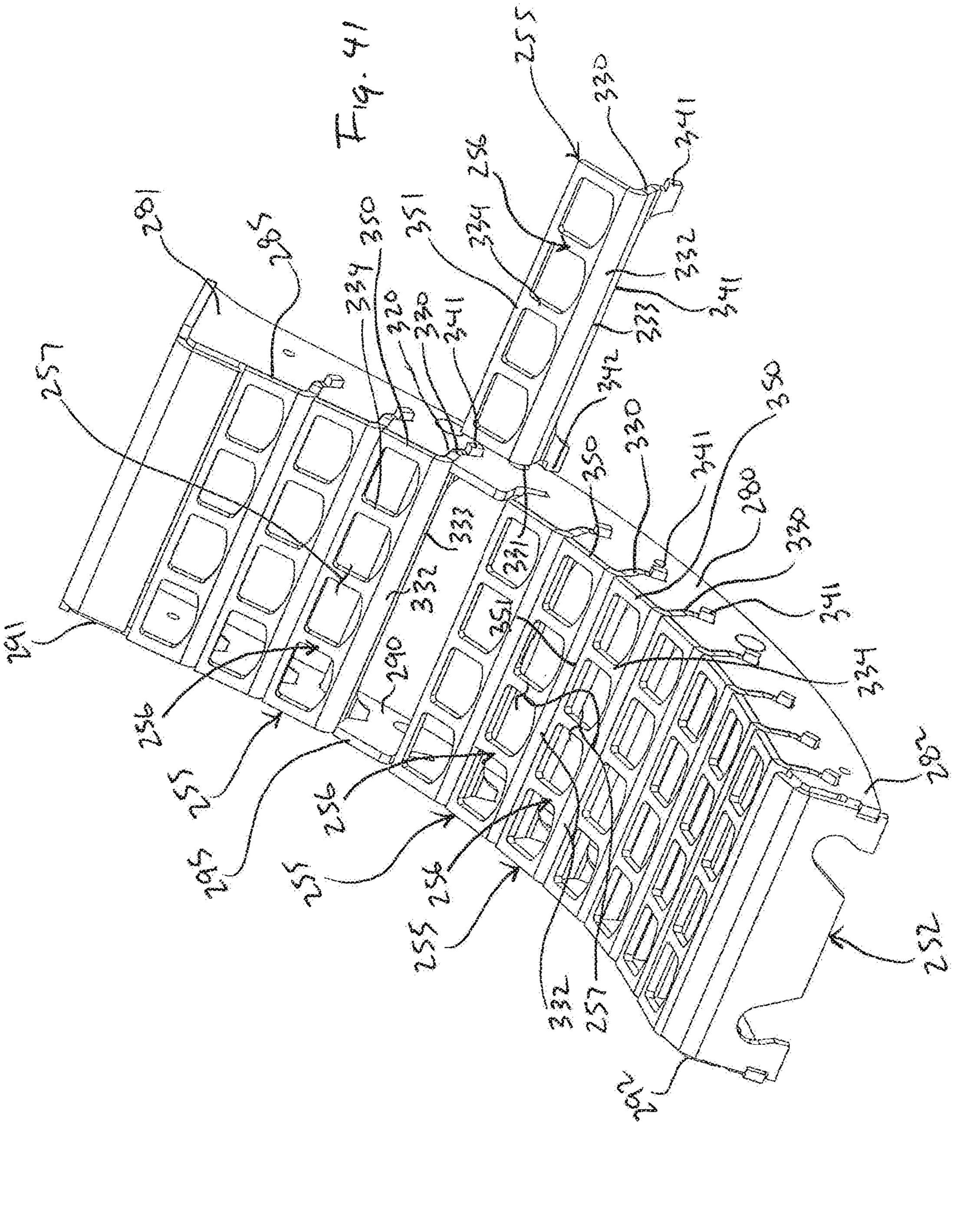
FIGS. 41 and 42 are perspective views of the inner frame of FIGS. 32 and 33, and the threshing bars of the embodiment of FIGS. 30 and 31, one of the threshing bars shown as it would appear removed from the inner frame, and the remaining threshing bars shown as they would appear installed on the inner frame.
Figure 42:
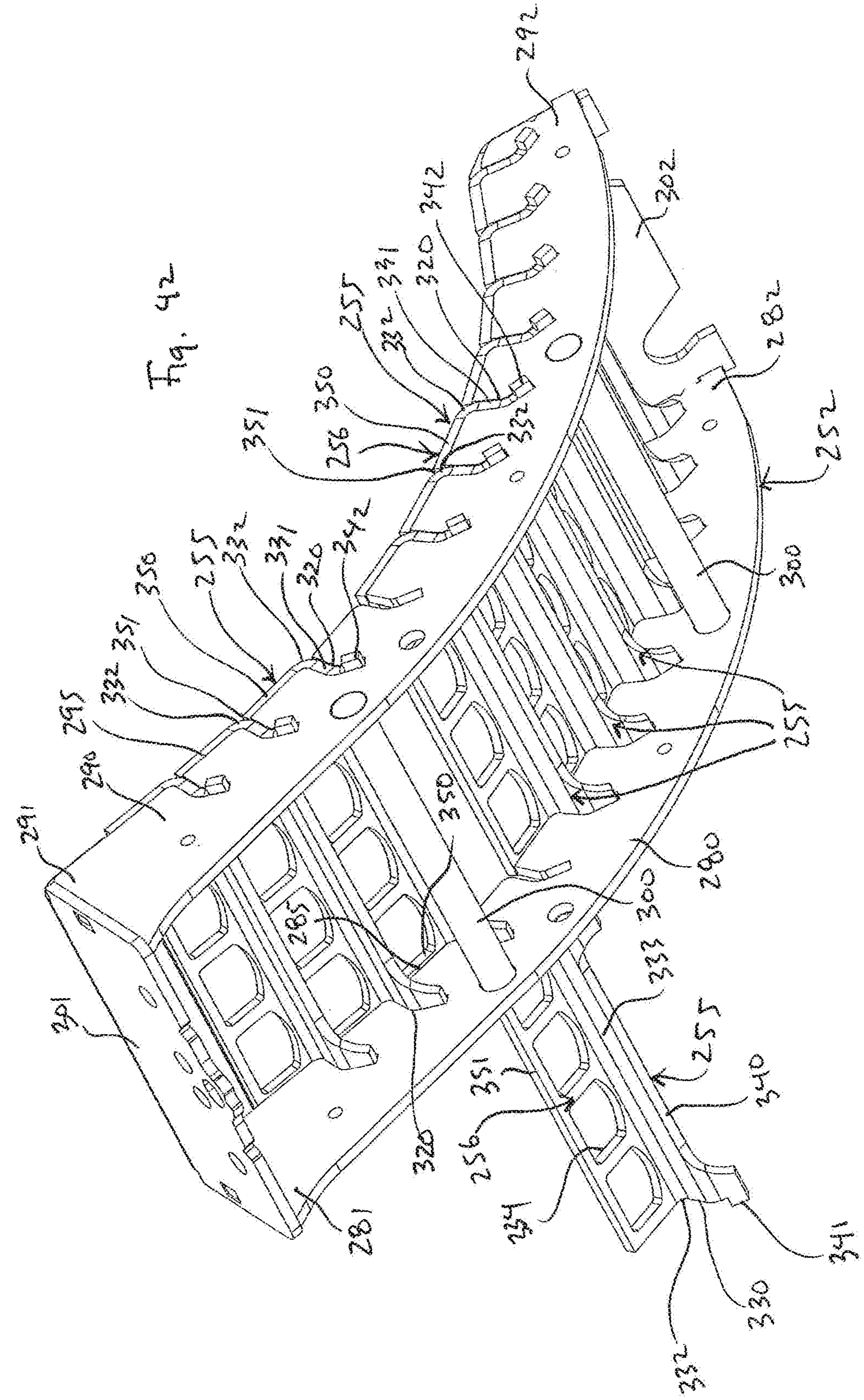
Figure 43:
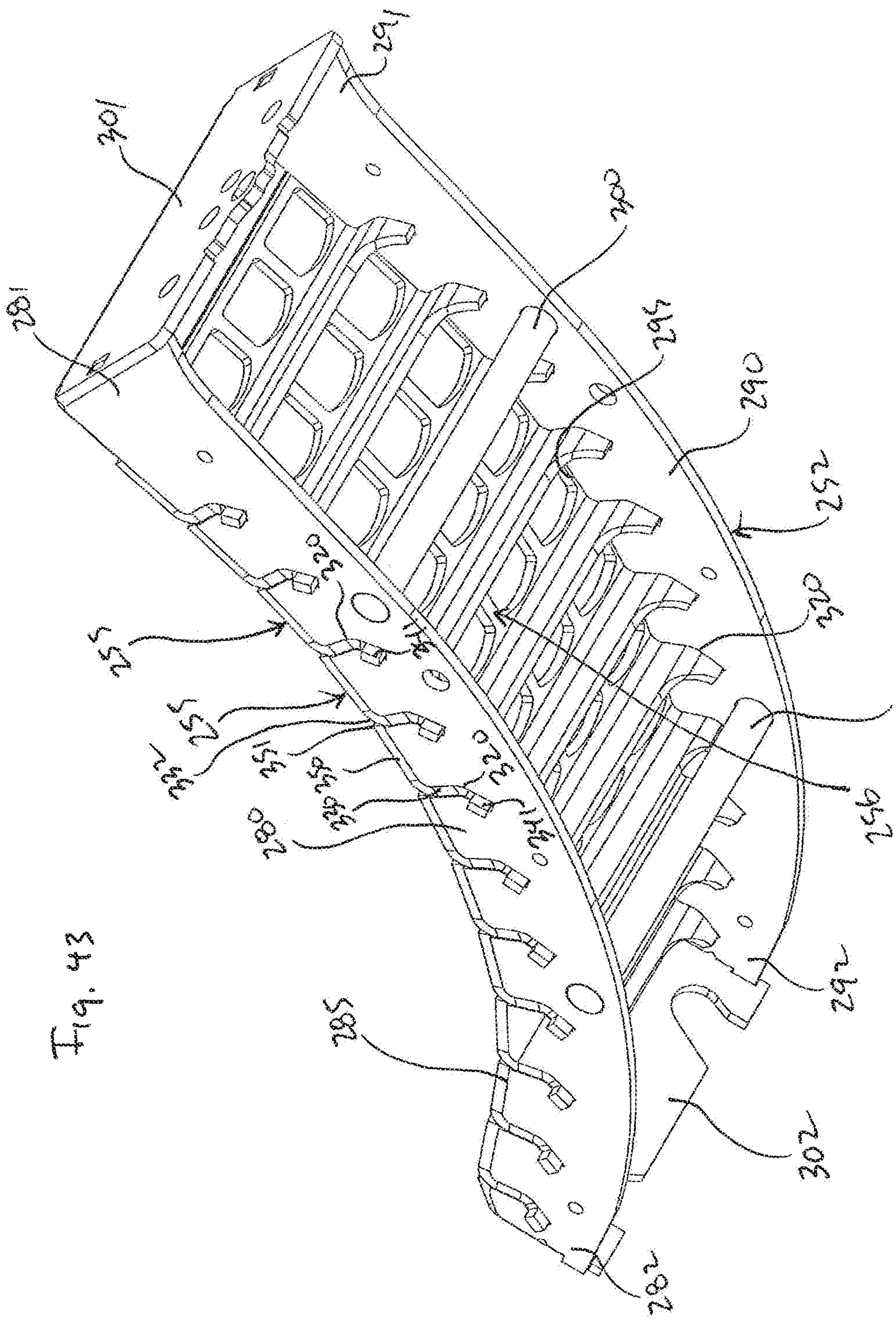
FIGS. 43 and 44 are perspective views corresponding to FIG. 42 illustrating all the threshing bars as they would appear installed on the inner frame.
Figure 44:
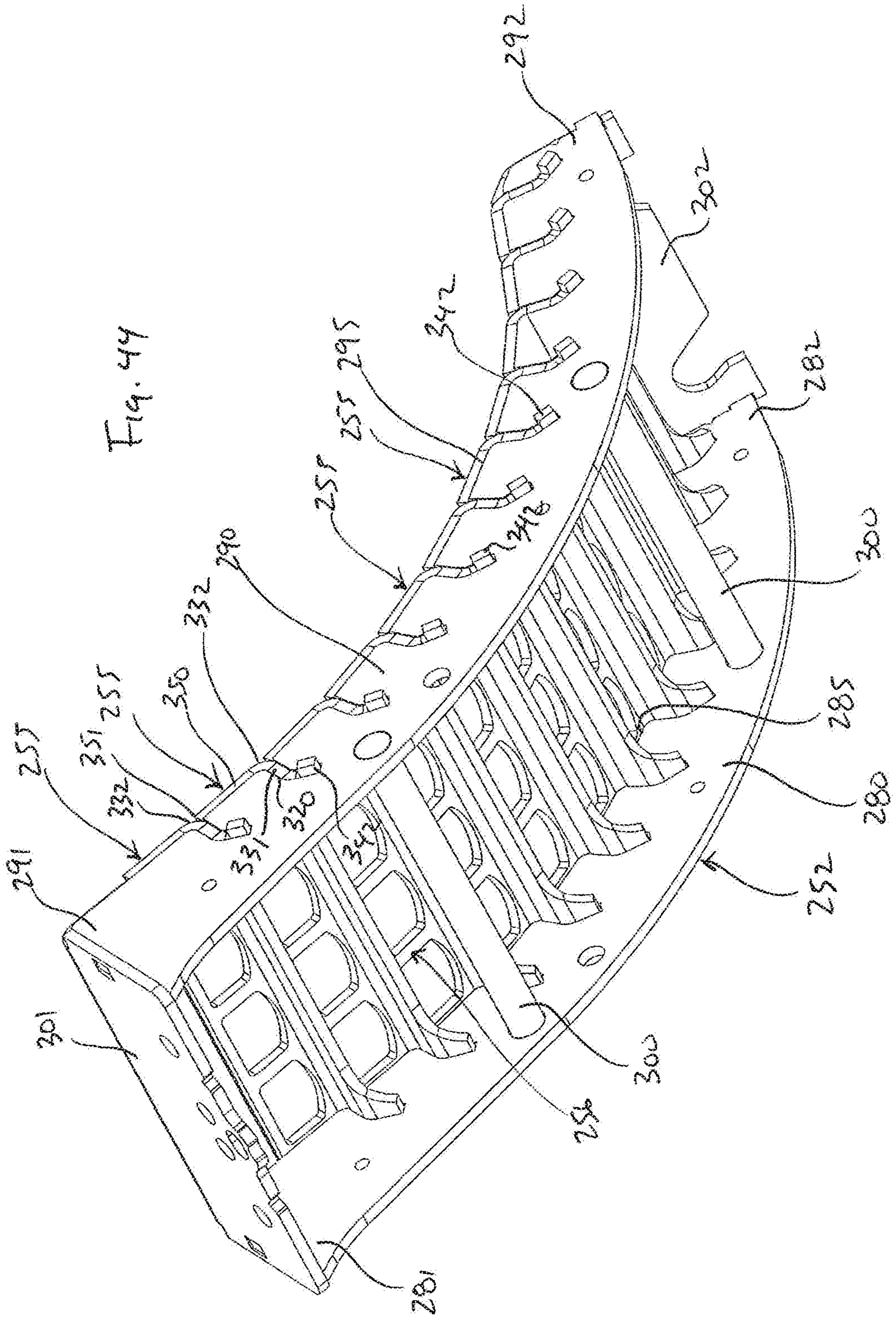
Figure 45:
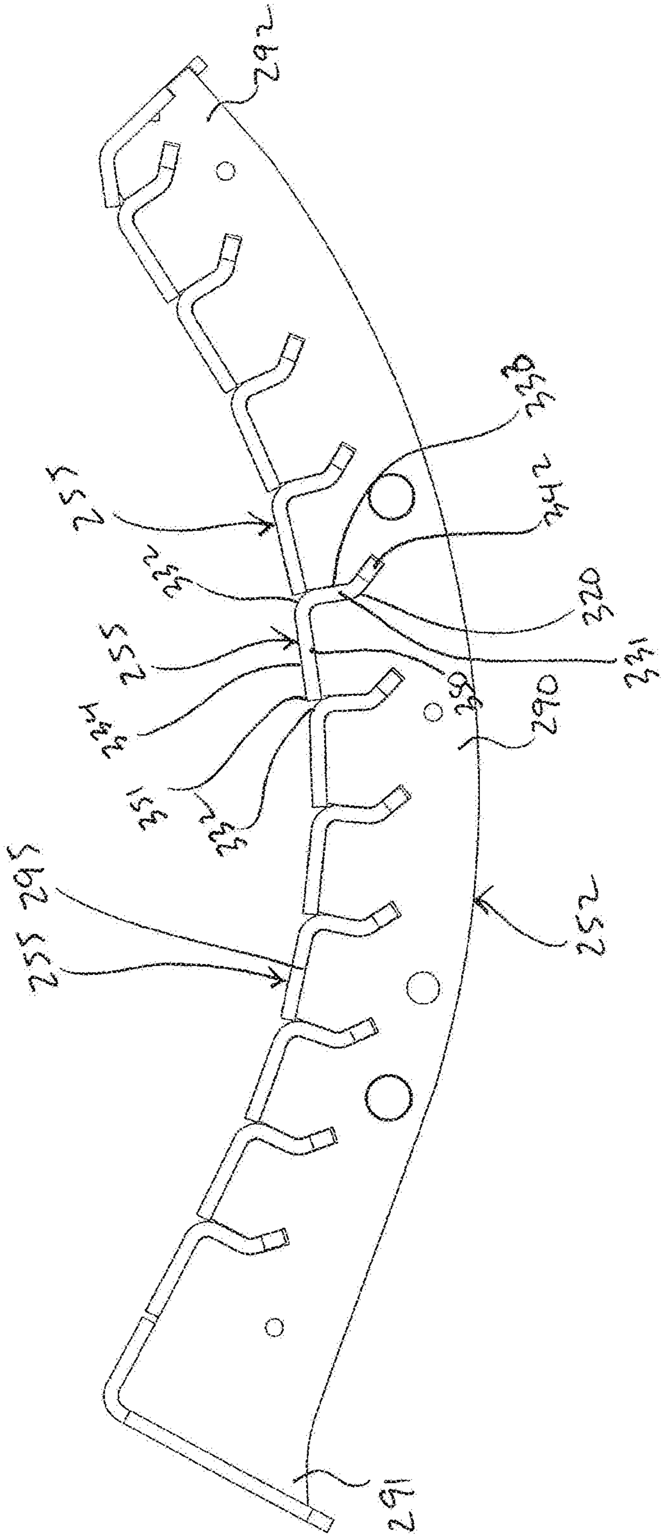
FIG. 45 is a right side elevation view of the embodiment of FIGS. 43 and 44, the opposite left side elevation view being the same thereof.
Figure 46A:
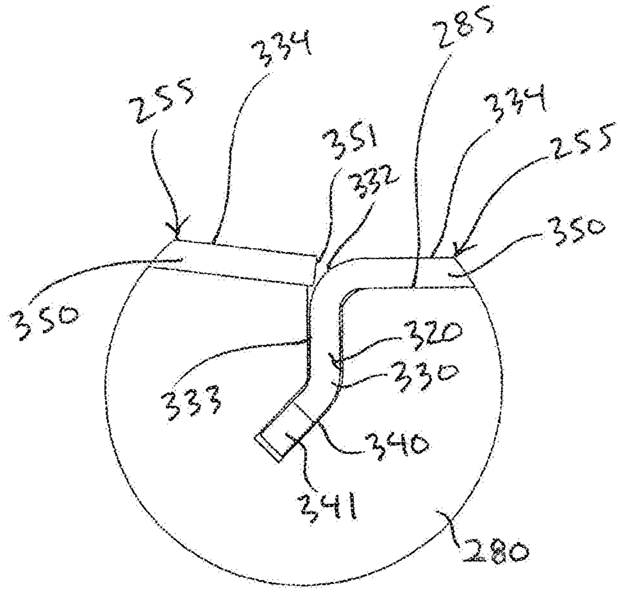
FIGS. 46A and 46B are enlarged, fragmentary side elevation views corresponding to FIG. 35 illustrating a tongue-and-groove engagement between either side of threshing bar and the inner frame.
Figure 46B:
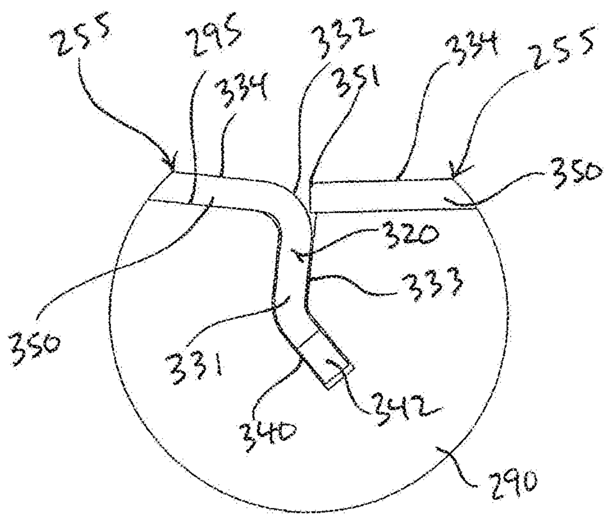

To removably install the separate bars 255 on frame 252 in FIGS. 32 and 33 in an example, when frame 251 is spaced apart from frame 252 when the frame assembly 254 is in the open position, each bar 255 is removably connected to frame 252 orienting the bar 255 between curved end members 280 and 290 and then axially aligning and axially seating the opposite ends 330 and 331, one after the other, into a corresponding pair of axially aligned angle slots 320 by maneuvering the bars 255 back and forth in one direction to insert one of the opposite ends 330 and 331 into one of a pair of corresponding slots 320 and then in another direction to insert the other one of the opposite ends 330 and 331 into the other one of the pair of corresponding slots 320. Each bar 255 is removed by reversing this operation. In FIGS. 41 and 42, one bar 255 is shown as it would appear removed from frame 252, and the remaining bars 255 are shown as they would appear applied to frame 252. FIGS. 43 and 44 are perspective views corresponding to FIG. 42 illustrating all the bars 255 as they would appear installed on frame 252. In FIGS. 43 and 44, the opposite ends 330 and 331 of the installed bars 255 are substantially flush with respect to the outer sides of the respective curved end members 280 and 290, except for keys 341 and 342, and the corner segment 332 and the separating grate 256 of the installed bars 255 are adjacent to top edges 285 and 295 of the respective curved end members 280 and 290 as also seen in FIGS. 45, 46A, and 47A, when bars 255 are installed on frame 255. When bars 255 are installed on frame 252, keys 341 of end 330 extend outwardly from the outer side of curved end member 280 in FIG. 43 being available to be inserted into keyways 265 of member 260 when member 260 is juxtaposed to member 280, and keys 342 of end 331 extend outwardly from the outer side of curved end member 290 in FIG. 44 being available to be inserted into keyways 275 of member 270 when member 270 is juxtaposed to member 280.

Keys 341 are equally spaced apart longitudinally on the outer side of member 280 from end 281 to end 282, and keys 342 are equally spaced apart longitudinally on the outer side of member 290 from end 291 to end 292, when bars 255 are installed on frame 252. The spacing of keys 341 corresponds to the spacing of keyways 265 of member 260, and the spacing keys 342 corresponds to the spacing of keyways 275 of member 270, when bars 255 are installed on frame 252.

Once all the bars 255 are installed on frame 252 as in FIGS. 43, 44, and 47, the continued assembly of concave 250 includes juxtaposing frame 251 to frame 252, which is carried out by axially aligning members 260 and 270 relative to members 280 and 290, which, at the same time, axially aligns keys 265 relative to keyways 341 and keys 275 relative to keyways 342. In FIG. 47, member 260 is then juxtaposed to member 280 by bringing it in direct contact against the outer side of curved end member 280 while at the same time inserting keys 265 into corresponding keyways 341, and member 270 is juxtaposed to member 290 by bringing it in direct contact against the outer side of curved end member 290 while at the same time inserting keys 265 into corresponding keyways 341. Since keys 341 and 342 correspond spatially to keyways 265 and 275, respectively, when bars 255 are installed on frame 252 as in FIGS. 43, 44, and 47, keys 341 insert into keyways 265 and keys 342 insert into keyways 275 when members 260 and 270 are juxtaposed on either side of members 280 and 290 in FIGS. 30 and 31, which concurrently catches and arrests bars 255 to members 260 and 270. Having juxtaposed members 260 and

270 to members 280 and 290, curved end member 260 is juxtaposed along, and is in direct contact against, the outer side of curved end member 280, curved end member 270 is juxtaposed along, and is in direct contact against, the outer side of curved end member 290, keys 341 extend into keyways 265 of member 260, keys 342 extend into keyways 275, curved end member 260 extends along the length of curved end member 280 from end 261 juxtaposed to end 281 to end 262 juxtaposed to end 282, and curved end member 270 extends along the length of curved end member 290 from end 271 juxtaposed to end 291 to end 272 juxtaposed to end 292. Bars 255 are releasably secured and locked in place to frames 251 and 252, when bars 255 are installed on frame 252 and when frame 252 is juxtaposed to frame 251, in which the tongue-and-slot engagement assemblies between bars 255 and frame 252 define non-destructive removable connections releasably connecting bars 255 to frame 252 and the key-and-keyway engagement assemblies between bars 255 and frame 251 define non-destructive removable catch connections releasably catching bars 255 to frame 251. Curved end member 260 is releasably connected to curved end member 280 with nut-and-bolt fasteners 310, and curved end member 270 is releasably connected to curved end member 290 with nut-and-bolt fasteners 312. Accordingly, in the closed position of frames 251 and 252 when bars 255 are installed on frame 252, frame 252 is within frame 251, curved end member 280 extends parallel to and is axially juxtaposed along and is in direct contact with the inner side of curved end member 260 that in turn extends parallel to and is axially juxtaposed along the outer side of curved end member 280, keys 341 extend into, being keyed into, keyways 265 of member 260, curved end member 290 extends parallel to and is axially juxtaposed along and is in direct contact with the inner side of curved end member 270 that in turn extends parallel to and is axially juxtaposed along the outer side of curved end member 290, keys 342 extend into, being keyed into, keyways 275 of member 270, curved end member 280 extends concurrently along the length of curved end member 260 of frame 251 from end 281 juxtaposed to end 261 to end 282 juxtaposed to end 262, and curved end member 290 extends concurrently along the length of curved end member 270 of frame 251 from end 291 juxtaposed to end 271 to end 292 juxtaposed to end 272.

In the closed position of frame 252 defining the closed position of concave 250 in FIGS. 30 and 31 when concave 250 is assembled, bars 255 are entrapped by frames 251 and 252. Frame 251 interacts with bars 255 preventing the opposite ends 330 and 331 of each of the bars 255 from being non-destructively removed/withdrawn from the corresponding angle slots 320 thereby preventing independent non-destructive removal of the bars 255 relative to each other from frame 252. The engagement of keys 341 to keyways 265 and the engagement of keys 342 to keyways 275 provide the added advantage of releasably coupling/restraining bars 255 to members 260 and 270 and entrapping bars 255 to frames 251 and 252. Each of the bars 255 is not affixed to either frame 251 or frame 252, when concave 250 is assembled in FIGS. 30-32, using any suitable technique, such as by welding, to be permanently connected to either frame 251 or frame 252, such that the only way to remove them would be to destroy such a permanent connection. The engagement between each bar 255 and frames 251 and 252 is non-destructive, removable, and impermanent, which means that the engagement between bars 255 and frames 251 and 252 does not require the destruction of the engagement, such as by cutting, in order to remove the various bars 255 from frame 252 and to remove frame 251 from frame 252 and from bars 255.

In the closed position of the frame assembly 254 of concave 250, curved end member 260 of frame 251 extends parallel to and is axially juxtaposed along the outer side of curved end member 280 of frame 252 and confronts and makes direct contact against ends 330 of bars 255 on one side of concave 250, and curved end member 270 of frame 251 extends parallel to and is axially juxtaposed along the outer side of curved end member 290 of frame 252 and confronts and makes direct contact against the opposed ends 331 of bars 255 on the opposed side of concave assembly 250, which interaction entraps bars 255 by and between frames 251 and 252. Curved end members 260 and 270 act as curved stops axially spaced from one another and juxtaposed on either side of the respective curved end members 280 and 290 of frame 252 and the respective ends 330 and 331 of the respective bars 255 for entrapping bars 255 to frame 252 by contacting the respective bar 255 ends 330 and 331 preventing the bars 255 from being displaced for, in turn, preventing the opposite ends 330 and 331 of each of the bars 255 from being non-destructively removed from the corresponding slots 320 thereby preventing independent non-destructive removal of the bars 255 relative to each other from frame 252.

Keys 341 and 342 carried by bars 255 are catch elements, and keyways 265 and 275 of members 260 and 270 of frame 251 are corresponding complemental catch elements. Keys 341 and 342 of each bar 255 and the corresponding keyways 265 and 275 that relate to keys 342 and 342 of each bar 255 define a catch assembly, in which each catch assembly non-destructively catches each of bars 255 to frame 251, when frame 252 is juxtaposed to frame 251 and when keys 341 and 342 are inserted into the respective keyways 265 and 275, in which the engagement of each of keys 341 and 342 to a corresponding one of keyways 265 and 275 forms a non-destructive removable catch connections. Although in each catch assembly keys 341 and 342 are carried by a bar 255 and the corresponding keyways 265 and 275 are carried by the respective members 260 and 270, this arrangement can be reversed in an alternate embodiment, in which keys 341 and 342 can be carried by members 260 and 270 and keyways 265 and 275 can be carried by the respective ends 330 and 331 of bars 255.

With concave 250 so assembled at this stage, concave 250 can be used in the customary manner in a rotary processing unit. In the rotary processing unit, bars 255 extend parallel to the axis of rotation of the rotating threshing drum, and corner segment 332 and separating grate 256 adjacent to top edges 285 and 295 of curved end members 280 and 290 of frame 252 to provide threshing of the harvested crop and openings 257 between corner segments 332 and openings 352 of separating grates 256 are for grain to pass through, in which continuous edges 354 of each separating grate 256 each define an aggressive continuous threshing edge for threshing crop material. Accordingly, each separating grate 256 concurrently serves the purposes threshing the crop and separating grain through openings 352 from the threshed crop material. In a rotary combine, a single concave 250 can be utilized as the concave or multiple shorter concaves 250 can be arranged end-to-end and side-to-side to form the concave. Should bars 255 become worn or damaged to require replacement or repair, nut-and-bolt fasteners 310 and 312 are simply removed to release frame 252 from frame 251, and frame 251 is removed from frame 252 to place frame 252 in its open position defining the open position of the frame assembly 254 and of concave 250 to allow any of the bars 255 needing replacement or repair to be easily removed, repaired or replaced, and reinstalled, in accordance with the principle of the invention.

During threshing, bars 255 can chatter against one another, namely, vibrate against one another, that can produce surface flaws in bars 255 and, in some instances, can cause bars 255 to crack or fracture, which can send fragments hurtling into the rotary processing unit and the complex and expensive crop-processing machinery of the agricultural combine. To eliminate this unwanted chatter between bars 255 to prevent bars 255 from cracking or fracturing as a result of this described chatter between bars 255, the vibration of bars 255 against one another, the separating grate 256 of each of the threshing bars 255 is fixedly connected to an adjacent bar 255 without disabling the non-destructive removable connections and the non-destructive removable catch connections. After bars 255 are assembled with frame 252, whether before frame 251 is juxtaposed to frame 252 or after frame 251 is juxtaposed to frame 252, the separating grate 256 of each of the threshing bars 255 is fixedly connected to the adjacent bars 255 without disabling the non-destructive removable connections of bars 255 to frame 252 and the non-destructive removable catch connections defined by keys 341 and 342 and the corresponding keyways 265 and 275 when frame 251 is juxtaposed relative to frame 252 in the assembly of concave 250. Fixedly connecting the separating grate 256 of each of the threshing bars 255 to an adjacent one of the threshing bars 255 includes forming fixed connection 258 of the separating grate 256 of each of the threshing bars 255 to an adjacent one of the threshing bars 255, in which each fixed connection 258 is a destructive, irremovable and permanent connection, a destructive connection, which means that each fixed connection 258 requires its destruction, such as by cutting, to separate adjacent threshing bars from one another. Preferably, the step of forming fixed connection 258 of the separating grate 256 of each of the threshing bars 255 to an adjacent one of the threshing bars 255 includes welding the separating grate 256 of each of the threshing bars 255 to an adjacent one of the threshing bars 255, in which each fixed connection 258 is at least one weld. In the assembly of bars 255 to frame 252 the elongate member 351 of each bar 255 is juxtaposed adjacent to the outer or back side of the corner segment 332 of the adjacent bar 255. According to this arrangement of bars 255, the step of forming fixed connection 258 of the separating grate 256 of each of the threshing bars 255 to an adjacent one of the threshing bars 255 includes welding the elongate member 351 of the separating grate 256 of each of the threshing bars 255 to the outer or back side of the corner segment 332 of an adjacent one of the threshing bars 255, in which each fixed connection 258 is at least one weld.

Fixed connections 258 do not disable the operation of separating grates 258. Threshing mat 253 is formed after each bar 255 is fixedly connected to an adjacent bar 255, in which threshing mat 253 includes threshing bars 255, the threshing bars 255 each include separating grate 256, the engagement assembly, ends 330 and 331 received in corresponding slots 320 in members 280 and 290, non-destructively connects each of threshing bars 255 to frame 252, threshing bars 255 form openings 257 therebetween for grain to pass through, the separating grate 256 of each of the threshing bars 255 extends across an adjacent one of the openings 257 for separating grain from threshed crop material, and the separating grate 256 of each of the threshing bars 255 is fixedly connected to an adjacent one of the threshing bars 255. Threshing mat 253 is an integrated threshing mat, being a combining of separate bars 255 into a harmonious and interrelated whole as described, each bar 255 being fixedly connected to an adjacent bar 255. Again, after bars 255 are installed on frame 252, which can be considered a "dry fit" of bars 255 on frame 252 before bars 255 are affixed one to the other, bars 255 can be rigidly affixed together via fixed connections 258 to form threshing mat 253 before the frame assembly 254 is closed, before members 260 and 270 are juxtaposed to members 280 and 290 of frame 252, and before members 260 and 270 are releasably connected to members 280 and 290, respectively, or after the frame assembly 254 is closed, after members 260 and 270 are juxtaposed to members 280 and 290 of frame 252, and after members 260 and 270 are releasably connected to members 280 and 290. Should bars 255 of threshing mat 253 become worn or damaged, or should threshing mat 253 need replacement with another different threshing mat depending on the crop-to-be-threshed, in FIG., 48 nut-and-bolt fasteners 310 and 312 are simply removed to release frame 252 from frame 251, frame 251 is removed from frame 252 to place frame 252 in its open position defining the open position of the frame assembly 254 and of concave 250 to allow threshing mat 253 to be easily removed from frame 252, and threshing mat 253 is then withdrawn from frame 252 simply by sliding threshing mat 253 laterally away from either side of frame 252, at which point frame 252 can then be equipped with a new threshing mat according to this disclosure. After threshing mate 253 is removed, frames 251 and 252 can be reused and re-equipped with a new threshing mat according to this disclosure as needed.

In summary of concave 250, concave 250 includes frame 251, frame 252, and threshing mat 253. Threshing mat 253 includes threshing bars 255 each including separating grate 256, an engagement assembly non-destructively connects each of threshing bars 255 to frame 252, threshing bars 255 form openings 257 therebetween for grain to pass through, separating grate 256 of each of threshing bars 255 extends across an adjacent one of openings 257 for separating grain from threshed crop material, and separating grate 256 of each of threshing bars 255 is fixedly connected to an adjacent one of threshing bars 255. The engagement assemblies that non-destructively connects threshing bars 255 to frame 252 enable non-destructive removal of threshing mat 253 from frame 252, when frame 252 is spaced apart from frame 251. Frame 251 restrains non-destructive removal of threshing mat 253 from frame 242 via the engagement assemblies that non-destructively connects threshing bars 255 to frame 252, when frame 252 is juxtaposed to frame 251. Threshing mat 253 is non-destructively connected to frame 252 via the engagement assemblies that non-destructively connect threshing bars 255 to frame 252, when frame 252 is spaced apart from frame 251 and when frame 252 is juxtaposed to frame 251. Frame 251 includes stops, members 260 and 270 in concave 250, in which the stops of frame 251 are juxtaposed on either side of frame 252, member 280 being one side of frame 252 and member 290 being the other side of frame 252, and interact with threshing mat 253 restraining threshing mat 253 from being non-destructively removed from frame 252, when frame 252 is juxtaposed to frame 251, the stops of frame 251. Each engagement assembly that non-destructively connects each of threshing bars 255 to frame 252 includes engagement elements, ends 330 and 331 being tongues, carried by each of threshing bars 255 and corresponding complemental engagement elements, corresponding slots 320, carried by frame 251, by the stops of frame 251. And so, each of the engagement elements is a tongue, and each of the complemental engagement elements is a slot. A catch assembly non-destructively catches each of threshing bars 255 to frame 251, when frame 252 is juxtaposed to frame 251. Each catch assembly includes catch elements carried by each of threshing bars 255 and corresponding complemental catch elements carried by frame 251. Each of the catch elements is one of a key, key 341 or key 342, and a keyway, keyway 265 or keyway 275, and each of the complemental catch elements is the other one of the key, key 341 or key 342, and the keyway, keyway 265 or keyway 275. Of course, frame 251 includes stops, members 260 and 270, the stops are juxtaposed on either side of frame 252, interact with threshing bars 255 restraining threshing bars 255 from being non-destructively removed from frame 252, when frame 252 is juxtaposed to frame 251, and carry the complemental catch elements.

According to the invention, a method of assembling a concave for an agricultural combine includes providing frame 251, frame 252, and threshing bars 255 each including separating grate 256, removably connecting threshing bars 255 to frame 252 via non-destructive removable connections, threshing bars 255 being spaced apart forming openings 257 therebetween for grain to pass through, and separating grate 256 of each of threshing bars 255 extends across an adjacent one of openings 257 for separating grain from threshed crop material, juxtaposing frame 251 to frame 252, fixedly connecting separating grate 256 of each of threshing bars 255 to an adjacent one of threshing bars 255, and frame 251 restraining removal of threshing bars 255 from frame 252 via the non-destructive removable connections all without disabling the non-destructive removable connections thereby leaving threshing bars 255 non-destructively connected to frame 252. The step of fixedly connecting separating grate 256 of each of threshing bars 255 to an adjacent one of threshing bars 255 further includes welding separating grate 256 of each of threshing bars 255 to an adjacent one of threshing bars 255. The method further includes releasably securing frame 251 to frame 252. The non-destructive removable connections each includes a tongue-and-groove assembly, including tongues, ends 330 and 331 of each bar 255, and corresponding slots 320 of frame 251.

According to the invention, another method of assembling a concave for an agricultural combine includes providing frame 251, frame 252, and threshing bars 255 each including separating grate 256, removably connecting threshing bars 255 to frame 252 via non-destructive removable connections, threshing bars 255 being spaced apart forming openings 257 therebetween for grain to pass through, and separating grate 256 of each of threshing bars 255 extends across an adjacent one of openings 257 for separating grain from threshed crop material; and juxtaposing frame 252 to frame 251, removably catching threshing bars 255 to frame 251 via non-destructive removable catch connections, fixedly connecting separating grate 256 of each of threshing bars 255 to an adjacent one of threshing bars 255, and frame 251 restraining removal of threshing bars 255 from frame 252 via the non-destructive removable connections, all without disabling the non-destructive removable connections thereby leaving threshing bars 255 non-destructively connected to frame 252. The step of fixedly connecting separating grate 256 of each of threshing bars 255 to an adjacent one of threshing bars 255 further includes welding separating grate 256 of each of threshing bars 255 to an adjacent one of threshing bars 255. The method further includes releasably securing frame 251 to frame 252. The non-destructive removable connections each includes a tongue-and-groove assembly, including tongues, ends 330 and 331 of each bar 255, and corresponding slots 320 of frame 251. The non-destructive removable catch connections each includes a key-and-keyway assembly, a pair of keys 341 and 342 of each bar 255 and a corresponding pair of keyways 265 and 275.

According to the invention, yet another method of assembling a concave for an agricultural combine includes providing frame 252, stops, members 260 and 270, and threshing bars 255 each including separating grate 256, removably connecting threshing bars 255 to frame 252 via non-destructive removable connections, threshing bars 255 being spaced apart forming openings 257 therebetween for grain to pass through, and separating grate 256 of each of threshing bars 255 extends across an adjacent one of openings 257 for separating grain from threshed crop material, and juxtaposing the stops, members 260 and 270, on either side of frame 252, fixedly connecting separating grate 256 of each of threshing bars 255 to an adjacent one of threshing bars 255, and the stops, members 260 and 270, restraining removal of threshing bars 255 from frame 252 via the non-destructive removable connections, all without disabling the non-destructive removable connections thereby leaving the threshing bars 255 non-destructively connected to frame 252. The step of fixedly connecting the separating grate 256 of each of threshing bars 255 to an adjacent one of threshing bars 255 further includes welding the separating grate 256 of each of threshing bars 255 to an adjacent one of threshing bars 255. The method further includes releasably securing the stops, members 260 and 270, to frame 252. The non-destructive removable connections each includes a tongue-and-groove assembly, including tongues, ends 330 and 331 of each bar 255, and corresponding slots 320 of the stops.

According to the invention, yet still another method of assembling a concave for an agricultural combine includes providing frame 252, stops, members 260 and 270, and threshing bars 255 each including separating grate 256, removably connecting threshing bars 255 to frame 252 via non-destructive removable connections, threshing bars 255 being spaced apart forming openings 257 therebetween for grain to pass through, separating grate 256 of each of threshing bars 255 extends across an adjacent one of openings 257 for separating grain from threshed crop material, and juxtaposing the stops, members 260 and 270, on either side of frame 252, removably catching threshing bars 255 to the stops, members 260 and 270, via non-destructive removable catch connections, fixedly connecting separating grate 256 of each of threshing bars 255 to an adjacent one of threshing bars 255, and the stops, members 260 and 270, restraining removal of threshing bars 255 from frame 252 via the non-destructive removable connections, all without disabling the non-destructive removable connections thereby leaving threshing bars 255 non-destructively connected to frame 252. The step of fixedly connecting separating grate 256 of each of threshing bars 255 to an adjacent one of threshing bars 255 further includes welding separating grate 256 of each of threshing bars 255 to an adjacent one of threshing bars 255. The method further includes releasably securing the stops, members 260 and 270, to frame 252. The non-destructive removable connections each includes a tongue-and-groove assembly, including tongues, ends 330 and 331 of each bar 255, and corresponding slots 320 of frame 251. The non-destructive removable catch connections each includes a key-and-keyway assembly, a pair of keys 341 and 342 of each bar 255 and a corresponding pair of keyways 265 and 275.

The grate 256 of each bar 255 of concave 250 includes four relatively large openings defined by five axially spaced parallel fingers 350 connecting corner segment 332 to elongate member 351. Bars having similar constructions with different grate configurations can be used in concave 250 without departing from the invention, such as bars 360, 370, and 380 discussed briefly below.

Figure 49:
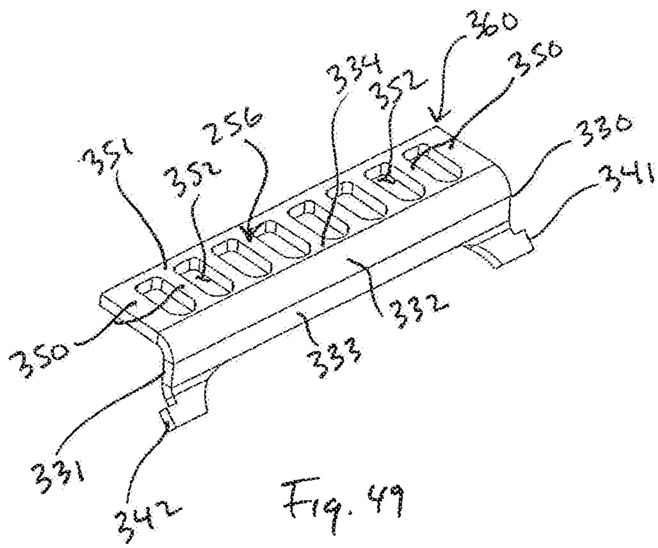
FIG. 49 is a top perspective view of a threshing bar constructed and arranged in accordance with the invention, a plurality thereof being useful for forming a threshing mat of a concave constructed and arranged in accordance with the invention.
Figure 50:
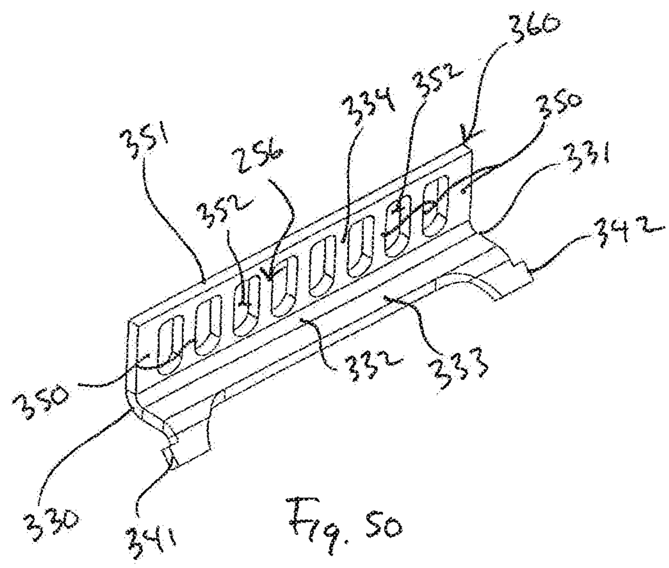
FIG. 50 is a bottom perspective view of the embodiment of FIG. 49.
Figure 53:
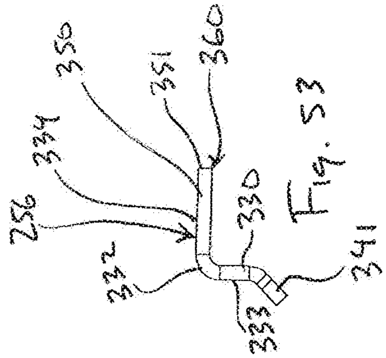
FIG. 53 is a side elevation view of the embodiment of FIG. 49, the opposite side elevation view being the same thereof.
Figure 51:
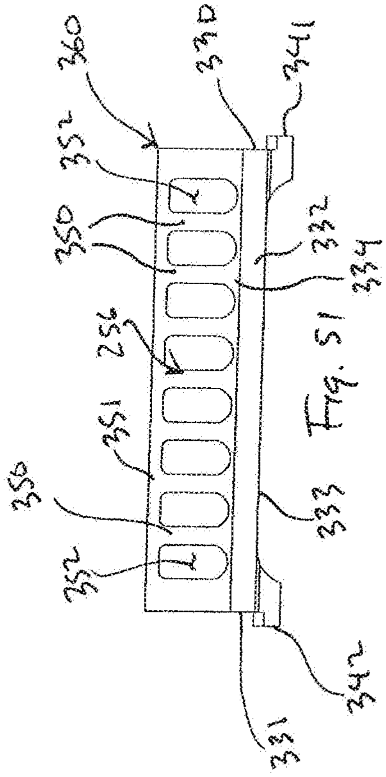
FIG. 51 is a top plan view of the embodiment of FIG. 49.
Figure 54:
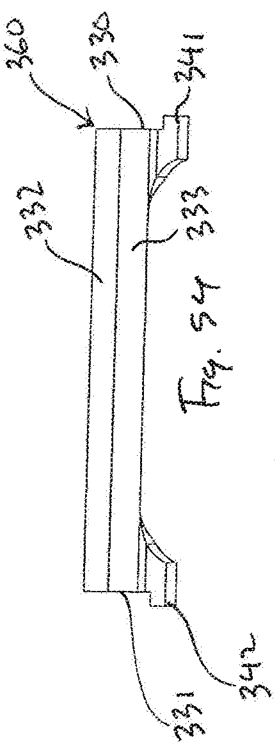
FIG. 54 is an end elevation view of the embodiment of FIG. 49.
Figure 52:
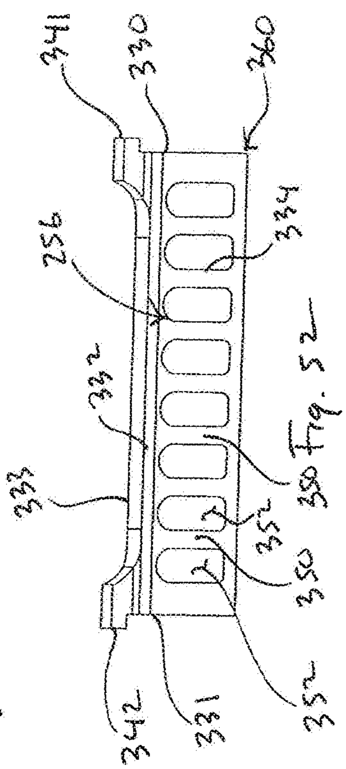
FIG. 52 is a bottom plan view of the embodiment of FIG. 49.

As matter of example, FIG. 49 is a top perspective view of a threshing bar 360 constructed and arranged in accordance with the invention, a plurality thereof being useful for forming a threshing mat of a concave constructed and arranged in accordance with the invention. FIG. 50 is a bottom perspective view of the embodiment of FIG. 49, FIG. 51 is a top plan view of the embodiment of FIG. 49, FIG. 52 is a bottom plan view of the embodiment of FIG. 49, FIG. 53 is a side elevation view of the embodiment of FIG. 49, the opposite side elevation view being the same thereof, and FIG. 54 is an end elevation view of the embodiment of FIG. 49. Like bars 255, bar 360 shares ends 330 and 331, corner segment 332, base segment 333, separating segment 334 forming separating grate 256, fingers 350, elongate member 351, openings 352, and keys 341 and 342. In bar 360, grate 256 includes nine axially spaced parallel fingers 350 defining eight corresponding openings 352 that are smaller than openings 352 of bars 255 for relating to smaller grains.

Figure 55:
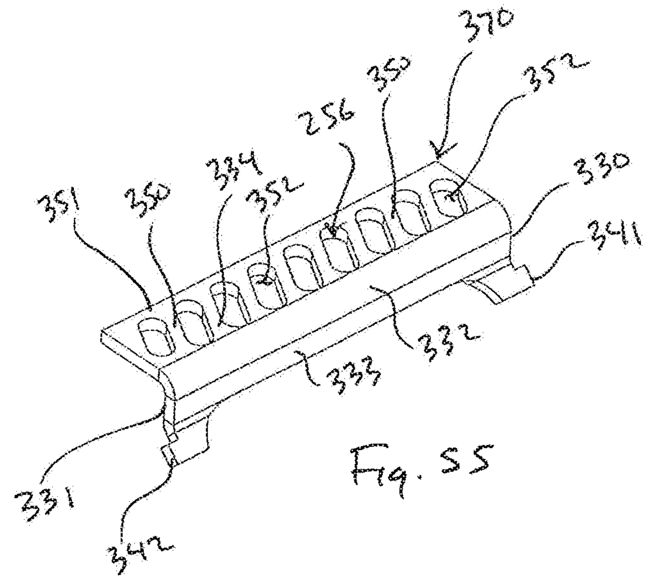
FIG. 55 is a top perspective view of a threshing bar constructed and arranged in accordance with the invention, a plurality thereof being useful for forming a threshing mat of a concave constructed and arranged in accordance with the invention.
Figure 56:
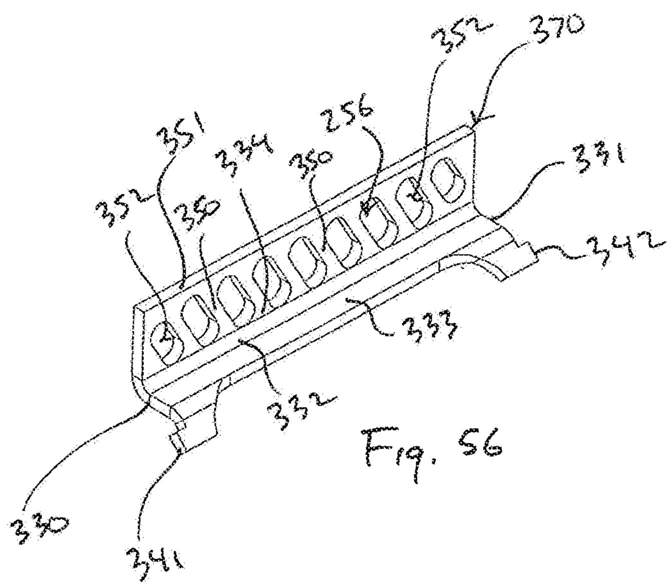
FIG. 56 is a bottom perspective view of the embodiment of FIG. 55.
Figure 59:
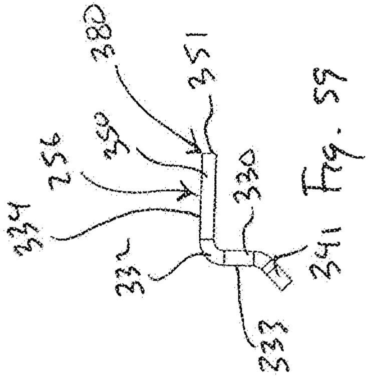
FIG. 59 is a side elevation view of the embodiment of FIG. 55, the opposite side elevation view being the same thereof.
Figure 57:
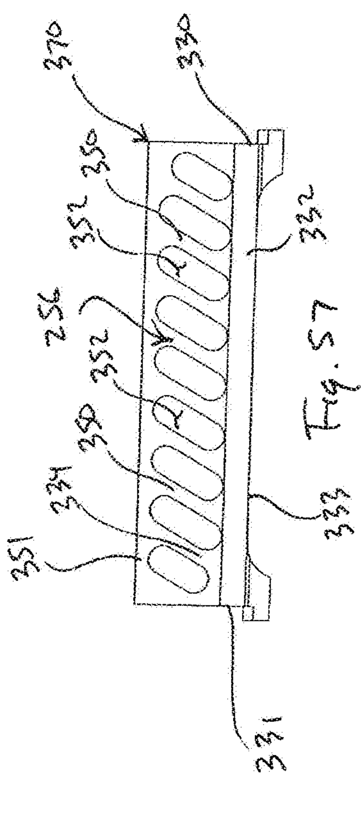
FIG. 57 is a top plan view of the embodiment of FIG. 55.
Figure 60:
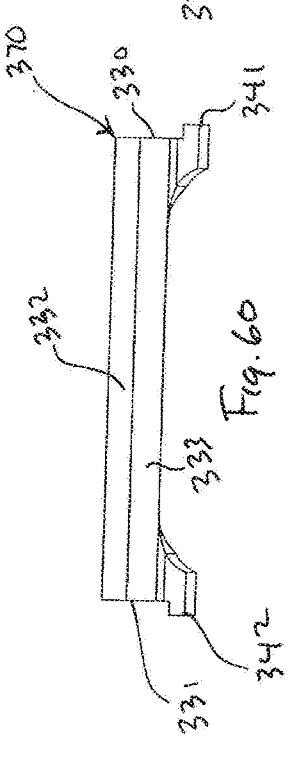
FIG. 60 is an end elevation view of the embodiment of FIG. 55.
Figure 58:
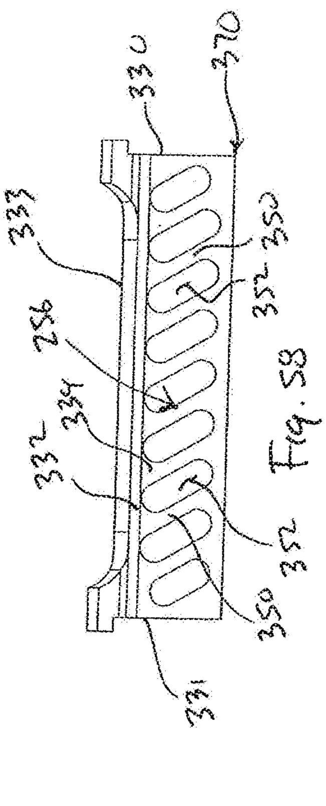
FIG. 58 is a bottom plan view of the embodiment of FIG. 55.

In another example, FIG. 55 is a top perspective view of a threshing bar 370 constructed and arranged in accordance with the invention, a plurality thereof being useful for forming a threshing mat of a concave constructed and arranged in accordance with the invention. FIG. 56 is a bottom perspective view of the embodiment of FIG. 55, FIG. 57 is a top plan view of the embodiment of FIG. 55, FIG. 58 is a bottom plan view of the embodiment of FIG. 55, FIG. 59 is a side elevation view of the embodiment of FIG. 55, the opposite side elevation view being the same thereof, and FIG. 60 is an end elevation view of the embodiment of FIG. 55. Like bars 255, bar 370 shares ends 330 and 331, corner segment 332, base segment 333, separating segment 334 forming separating grate 256, fingers 350, elongate member 351, openings 352, and keys 341 and 342. In bar 370, grate 256 includes ten axially spaced parallel fingers 350 that are angled to one side in a direction from corner segment 332 toward elongate member 251, toward end 330 in this example, defining nine correspondingly angled openings 352 that are smaller than openings 352 of bars 255 and openings 252 of bar 360 for relating to smaller grains.

Figure 61:
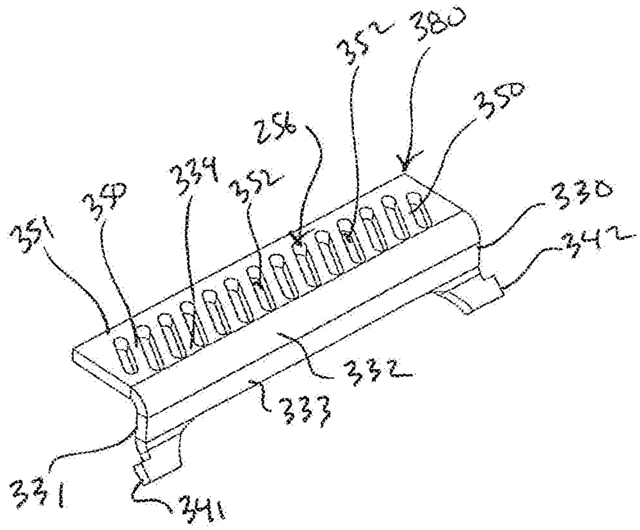
FIG. 61 is a top perspective view of a threshing bar constructed and arranged in accordance with the invention, a plurality thereof being useful for forming a threshing mat of a concave constructed and arranged in accordance with the invention.
Figure 62:
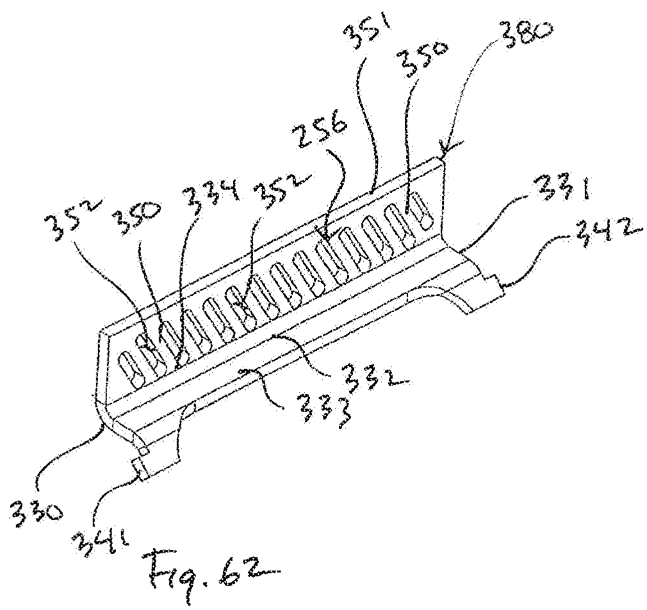
FIG. 62 is a bottom perspective view of the embodiment of FIG. 61.
Figures 63, 64, 65, 66:
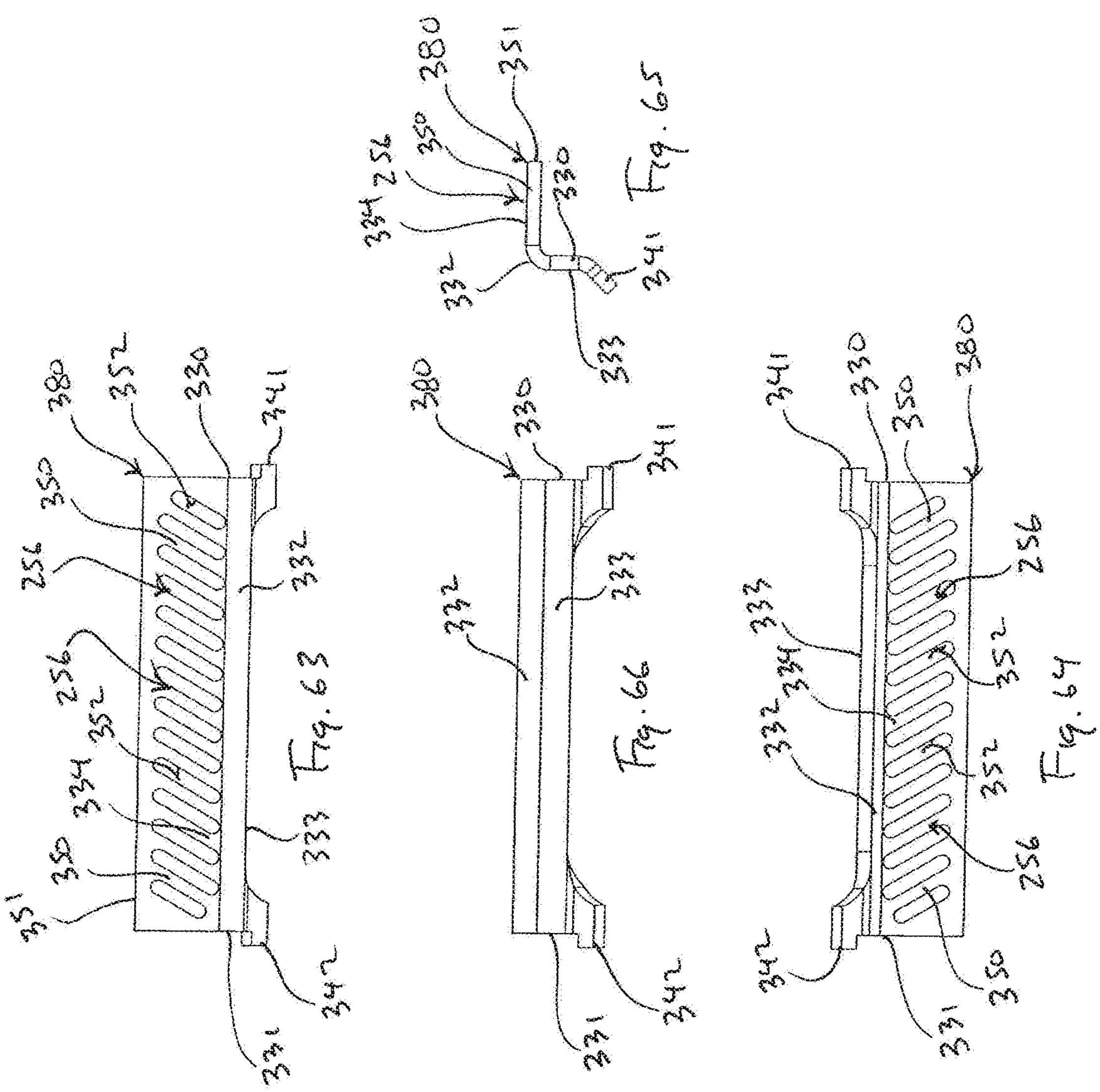
FIG. 63 is a top plan view of the embodiment of FIG. 61.
FIG. 64 is a bottom plan view of the embodiment of FIG. 61.
FIG. 65 is a side elevation view of the embodiment of FIG. 61, the opposite side elevation view being the same thereof.
FIG. 66 is an end elevation view of the embodiment of FIG. 61.

In yet another example, FIG. 61 is a top perspective view of a threshing bar 380 constructed and arranged in accordance with the invention, a plurality thereof being useful for forming a threshing mat of a concave constructed and arranged in accordance with the invention. FIG. 62 is a bottom perspective view of the embodiment of FIG. 61, FIG. 63 is a top plan view of the embodiment of FIG. 61, FIG. 64 is a bottom plan view of the embodiment of FIG. 61, FIG. 65 is a side elevation view of the embodiment of FIG. 61, the opposite side elevation view being the same thereof, and FIG. 66 is an end elevation view of the embodiment of FIG. 61. Like bars 255, bar 370 shares ends 330 and 331, corner segment 332, base segment 333, separating segment 334 forming separating grate 256, fingers 350, elongate member 351, openings 352, and keys 341 and 342. In bar 380, grate 256 includes fifteen axially spaced parallel fingers 350 that are angled to one side in a direction from corner segment 332 toward elongate member 251, toward end 330 in this example, defining fourteen correspondingly angled openings 352 that are smaller than openings 352 of bars 255 and openings 252 of bar 360 and openings 252 of bar 370 for relating to still smaller grains.

In the field of agriculture, the term "grain damage" means any degradation in the quality of grain. In the current grain trade, the local and international trade in food grains, grain damage can affect price, feed quality, food product quality, and susceptibility to pest and bacteria contamination. Between the field and the end use, grain can go through any number of handling operations which can each contribute to grain damage. The first handling operation is, of course, harvesting and threshing the crop from the field, where aggressive concaves in agricultural combines can inherently crack and pulverize grain thereby unfavorably influencing grain loss and grain damage. Accordingly, there is a need in the art for concaves discussed below in conjunction with FIGS. 67-110 that not only satisfy objectives of the previously-described concaves but also provide exemplary threshing while at the same time favorably influence not only grain loss but also grain damage.

Attention is now directed to FIGS. 67-72 illustrating another embodiment of a concave 400 constructed and arranged in accordance with the principle of the invention. Concave 400 includes frame 401, frame 402, and threshing bars 405. Frame 401 is an outer or restraining frame. Frame 402 is an inner or base frame. In concave 400, threshing bars 405 are carried by frame 402, and frame 401 is juxtaposed to, and is additionally connected to, frame 402. Threshing bars 405 form openings 415 therebetween for grain to pass through.

Threshing bars 405 each include inner extremity 410, outer deflecting extremity 411 including deflecting surface 412, and separating grate 413 between inner extremity 410 and deflecting extremity 411. Separating grate 413 extends across an adjacent one of openings 415 from inner extremity 410 to deflecting extremity 411 for separating grain from threshed crop material. Deflecting surface 412 projects angularly upward from separating grate 413 between inner extremity 410 and deflecting extremity 411 and into an upstream direction opposing the downstream direction of oncoming crop material to be threshed when driven by the rotor of the rotary processing unit. Deflecting surface 412 and separating grate 413 are arranged at an obtuse angle therebetween. The chosen angle of inclination of deflecting surface 412 is obtuse to the opposing downstream direction of the oncoming crop material, according to the principle of the invention. An engagement assembly non-destructively connects each threshing bar 405 to frame 402. Bars 405 are independently removably connected to frame 402 via the engagement assemblies enabling bars 405 to be selectively and independently attached to or otherwise installed on frame 402 in preparation for threshing and additionally detached or otherwise released from frame 402 for individual bar 405 repair or replacement.

Figure 86:
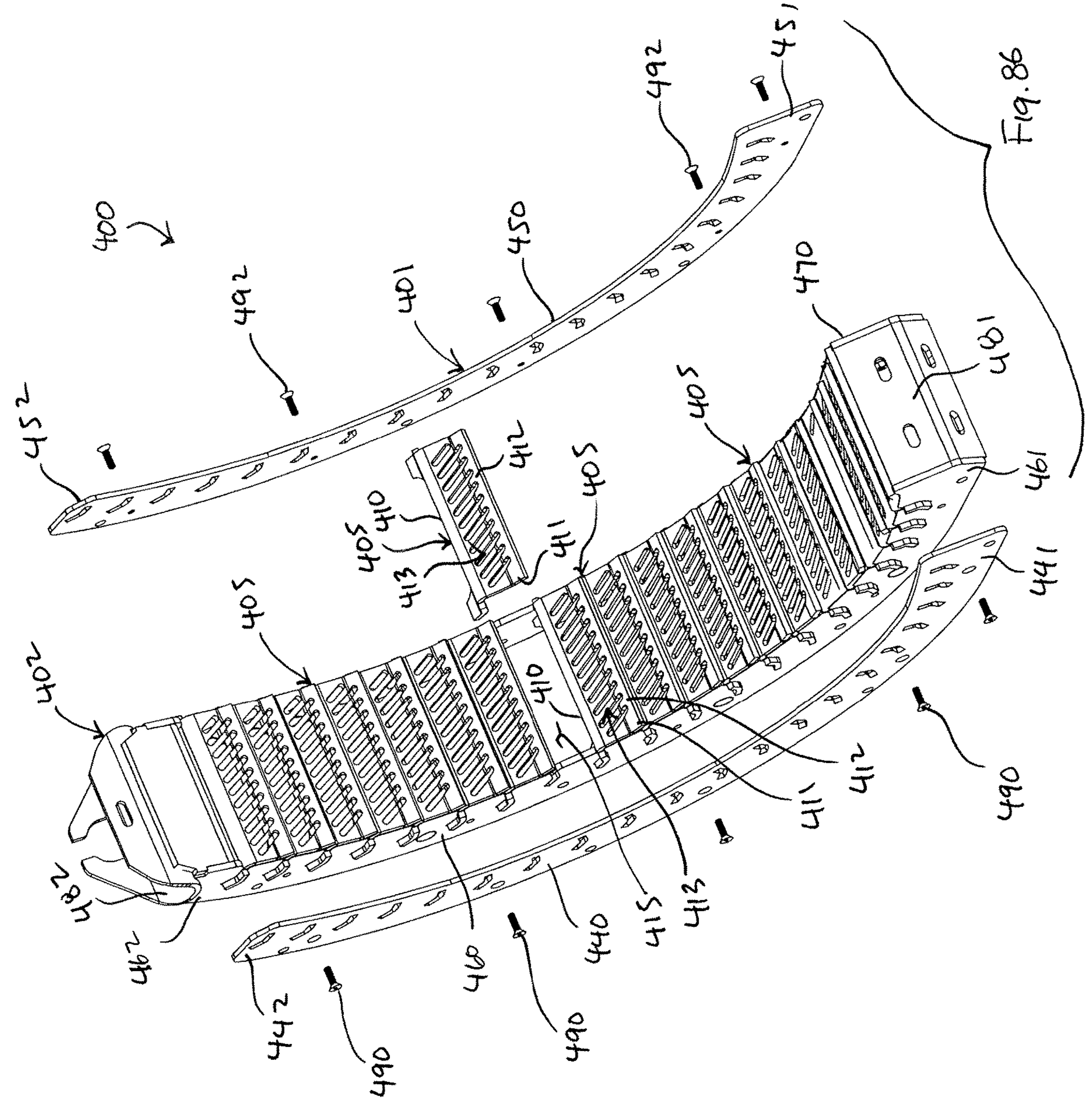
FIG. 86 is a perspective view corresponding to FIGS. 67 and 68 illustrating the base frame, one of the threshing bars removed from the base frame, the remaining threshing bars installed on the base frame, and the restraining frame spaced apart from the base frame.

The engagement assemblies that non-destructively connect each of threshing bars 405 to frame 402 allow/enable the non-destructive removal of threshing bars 405 from frame 402, when frame 402 is spaced apart from frame 401, as in FIG. 86. Frame 401 restrains non-destructive removal of threshing bars 405 from frame 402 via the engagement assemblies that non-destructively connect each of threshing bars 405 to frame 402, when frame 401 is juxtaposed to frame 402 in FIGS. 67-72. Threshing bars 405 are non-destructively connected to frame 402 via the engagement assemblies, when frame 401 is spaced apart from frame 402, and when frame 401 is juxtaposed to frame 402. Frames 401 and 402, and bars 405 are made of the customary steel as is normal in the field of concaves. Threshing bars 405 are not affixed to frame 402 or to frame 401, such as by welding or other fixed or destructive connection as defined above in previously embodiments, and are independently removably connected to frame 402, which enables threshing bars 405 to be selectively detached, withdrawn, or otherwise released from frame 402 for repair or replacement and enabling frames 401 and 402 to be reused all without having to modify frames 401 and 402.

Frames 401 and 402 cooperate to form a frame assembly 420. Frames 401 and 402 are adjustable between a closed position in FIGS. 67-72, which defines the closed position of the frame assembly 420 and also concave 400 when threshing bars 405 are carried by frame 402, and an open position in FIGS. 86 and 87, which defines the open position of the frame assembly 420 and also concave 400 when threshing bars 405 are carried by frame 402. In the closed position of the frame assembly 420 in FIGS. 67-72, when frame 401 is juxtaposed relative to frame 402, frame 401 interacts with threshing bars 405 removably connected to frame 402 to entrap threshing bars 405 between frames 401 and 402 and thereby hold and lock or otherwise secure threshing bars 405 in place to frame assembly 420. When frame 401 is juxtaposed relative to frame 402, frame 402 is, of course, juxtaposed relative to frame 401, and the order of juxtaposing one frame relative to the other can be referred to as either frame 401 juxtaposed relative to frame 402 or frame 402 juxtaposed relative to frame 401. In the open position of the frame assembly 420 in FIGS. 86 and 87, when frame 401 is spaced apart from frame 402, threshing bars 405 are free from the influence of frame 401, which allows each of threshing bars 405 to be readily and selectively removed, detached, or otherwise de-united or withdrawn from frame 402, such as for repair or replacement purposes, without modifying or altering frames 401 and 402.

Threshing bars 405 are not affixed to either frame 401 or frame 402, such as by welding or other fixed or destructive connection, both in the open position and in the closed position of frame assembly 420. The assembly of threshing bars 405 and frames 401 and 402 is concave 400, or a concave section to which it may be referred. Accordingly, the engagement assemblies that non-destructively connect the respective threshing bars 405 to frame 402 enable/allow non-destructive independent removal of threshing bars 405 from frame 402, when frame 401 is spaced apart from frame 402, frame 401 disables/restrains non-destructive removal of threshing bars 405 from frame 402 via the engagement assemblies that non-destructively connects each of threshing bars 405 to frame 402, when frame 401 is juxtaposed to frame 402, and threshing bars 405 are non-destructively connected to frame 402 via the engagement assemblies, when frame 401 is spaced apart from frame 402 in FIGS. 86 and 87 and when frame 401 is juxtaposed to frame 402 in FIGS. 67-72.

Referencing FIGS. 67-74 in relevant part, the outer or restraining frame 401 includes members 440 and 450. Members 440 and 450 are end members and are substantially identical and coextensive. Members 440 and 450 are thin and elongate and, in concave 400, are axially spaced from one another and extend parallel to one another, and are curved to extend circumferentially about a portion of the rotor of the rotary processing unit. Given that members 440 and 450 are end members and are curved, they may be referred to as either curved members, or curved end members.

Curved end member 440 has opposite ends 441 and 442, upper edge 443, lower edge 444, and keyways 445. Upper edge 443 and lower edge 444 concurrently extend from end 441 to end 442. Each keyway 445 is a through-hole formed through the middle thickness of member 440 between upper edge 443 and lower edge 444. Keyways 445 are equally spaced apart longitudinally from end 441 to end 441.

Curved end member 450 has opposite ends 451 and 452, upper edge 453, lower edge 454, and keyways 455. Upper edge 453 and lower edge 454 concurrently extend from end 451 to end 452. Each keyway 455 is a through-hole formed through the middle thickness of member 450 between upper edge 453 and lower edge 454. Keyways 455 are equally spaced apart longitudinally from end 451 to end 452.

Keyways 445 and 455 are identical in size and in shape, and are equal in number, there being twenty keyways 445 and twenty keyways 455, and less or more keyways 445 and 455 can be provided in alternative embodiments depending on the number of threshing bars 405 and as long as keyways 445 are equal in number to keyways 455. The longitudinal spacing of keyways 445 between end 441 and 442 is identical to the longitudinal spacing of keyways 455 between end 451 and end 452, which results in keyways 445 and keyways 455 being axially aligned when frame 401 is in its closed position relative to frame 402, when frames 401 and 402 that form the frame assembly 420 of concave 400 are closed. Keyways 445 and 455 are each generally V-shaped in this example, being not round.

With continuing reference in relevant part to FIGS. 67-74, frame 402, the inner or base frame of concave 400, includes members 460 and 470. Members 460 and 470 are substantially identical and coextensive. Members 460 and 470 are thin and elongate and are axially spaced from one another. Members 460 and 470 extend parallel relative to each other, and relative to members 440 and 450 in concave 400. Members 460 and 470 are curved like that of end members 440 and 450 to similarly extend circumferentially about a portion of the rotor of the rotary processing unit. Given that members 460 and 470 are end members and are curved, they may be referred to as either curved members, or curved end members. Members 440, 450, 460, and 470 have matching curvatures.

Curved end member 460 has opposed ends 461 and 462, and curved end member 470 has opposed ends 471 and 472. Spaced-apart, elongate, and parallel struts 480, three this example shown in FIGS. 69, 70, and 72, connect member 460 to member 470, imparting rigidity and ruggedness to frame 401. The opposite ends of struts 480 are preferably welded to the respective members 460 and 470, being rigidly affixed to the respective members 460 and 470. Transverse support member 481 at a downstream end of concave 400 extends between and is rigidly affixed to ends 461 and 471 of curved members 460 and 470 via welding, and transverse support member 482 at an upstream end of concave 400 extends between and is joined to ends 462 and 472 of curved end members 460 and 470 via welding. Transverse support members 481 and 482 are elongate caps.

Figure 87:
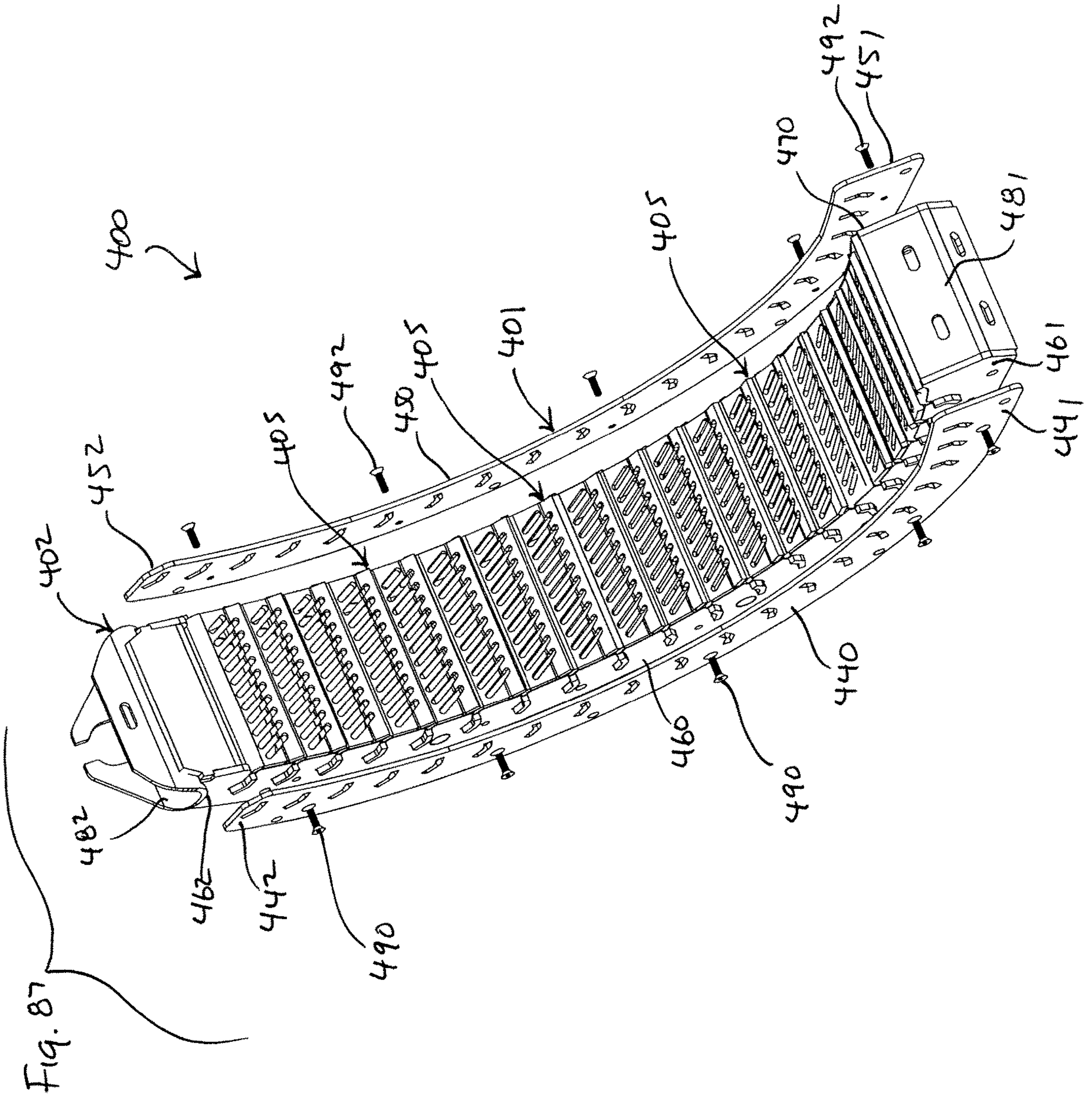
FIG. 87 is a view similar to that of FIG. 86 showing all of the threshing bars installed on the base frame.

Frames 401 and 402 are adjustable between the closed position in FIGS. 67-74 defining the closed position of frame assembly 420, and the open position in FIGS. 86 and 87 defining the open position of frame assembly 420. Frames 401 and 402 are axially aligned, and keyways 445 and 455 are axially aligned, in the closed position of frame assembly 420. Frame 401 is juxtaposed to frame 402, when frames 401 and 402 are in the closed position defining the closed position of frame assembly 420. Frame 402 is spaced apart from frame 402, when frames 401 and 402 are in the open position defining the open position of frame assembly 420 in FIGS. 86 and 87.

When frames 401 and 402 are in the closed position in FIGS. 67-72, curved end member 440 is juxtaposed along, and is in direct contact against, the outer side of curved end member 460, curved end member 450 is juxtaposed along, and is in direct contact against, the outer side of curved end member 470, curved end member 440 extends along the length of curved end member 460 from end 441 juxtaposed to end 461 at the downstream end of concave 400 to end 442 juxtaposed to end 462 at the upstream end of concave 400, and curved end member 450 extends along the length of curved end member 470 from end 451 juxtaposed to end 471 at the downstream end of concave 400 to end 452 juxtaposed to end 472 at the upstream end of concave 400. Accordingly, in the closed position of frames 401 and 402, frame 402, the base frame of concave 400, is within frame 401, the restraining frame of concave 400, curved end member 460 extends parallel to and is axially juxtaposed along and is in direct contact with the inner side of curved end member 440 that in turn extends parallel to and is axially juxtaposed along the outer side of curved end member 460, curved end member 470 extends parallel to and is axially juxtaposed along and is in direct contact with the inner side of curved end member 450 that in turn extends parallel to and is axially juxtaposed along the outer side of curved end member 470, curved end member 460 extends concurrently along the length of curved end member 440 of frame 401 from end 461 juxtaposed to end 441 at the downstream end of concave 400 to end 462 juxtaposed to end 442 at the upstream end of concave 400, and curved end member 470 extends concurrently along the length of curved end member 450 of frame 401 from end 471 juxtaposed to end 451 at the downstream end of concave 400 to end 472 juxtaposed to end 452 at the upstream end of concave 400. In the assembly of concave 400 when frames 401 and 402 are in the closed position, curved end member 440 is releasably connected to curved end member 460, and curved end member 450 is releasably connected to curved end member 470.

Fasteners are used to removably connect frame 402 to frame 401, when frames 401 and 402 are in the closed position. Specifically, end members 440 and 460 are releasably connected to each other with longitudinally spaced fasteners, here in the form of nut-and-bolt assemblies 490 applied through appropriate holes therein, and end members 450 and 470 are releasably connected to each other with longitudinally spaced fasteners, here in the form of nut-and-bolt assemblies 492 applied through appropriate holes therein.

In FIGS. 78, 79, 86, and 87, curved end members 460 and 470 of frame 402 have top edges 465 and 475, respectively, and slots 500. Top edges 465 and 475 reside along a common curved plane or surface to extend circumferentially about a portion of the rotor of a rotary processing unit. Slots 500 are spaced apart from one another longitudinally along the lengths of the respective curved end members 460 and 470, between ends 461 and 462 of curved end member 460 and between ends 471 and 472 of curved end member 470. Slots 500 are formed through the thickness of curved end members 460 and 470 in the upper portions of each of the curved end members 460 and 470. Slots 500 are open at top edges 465 and 475 and extend downwardly into end members 460 and 470 from the respective top edges 465 and 475. Spaced apart slots 500 formed in curved end member 460 are axially aligned with spaced apart slots 500 formed in curved end member 470. Each one of angle slots 500 has an angle profile, a generally S-shaped angle profile in this example. Accordingly, slots 500 are angle slots. Slots 500 are identical in size and shape, wherein the angle profile of slots 500 is identical.

In FIGS. 67-72, frame 402 carries threshing bars 405, which forms a concave or concave section. Threshing bars 405, which can be referred to simply as bars, are identical, are set one adjacent to another and are parallel relative to each other from transverse support member 481 at the downstream end of concave 400 to transverse support member 482 at the upstream end of concave 400, and extend axially between curved end members 460 and 470.

Referring in relevant part to FIGS. 80-85, each threshing bar 405 is of solid and unitary construction and has opposite ends 510 and 511 and is straight in longitudinal extent, i.e. length, from end 510 to end 511. Bar 405, an angle member, has an angle profile from end 510 to end 511. The angle profile of bar 405 is the same from end 510 to end 511, and is characterized by corner segment 512, base segment 513, and separating segment 514, which includes separating grate 413 and deflecting extremity 411. Corner segment 513 defines inner extremity 410 of bar 405. Separating grate 413 is between inner extremity 410 and deflecting extremity 411.

Figure 84:
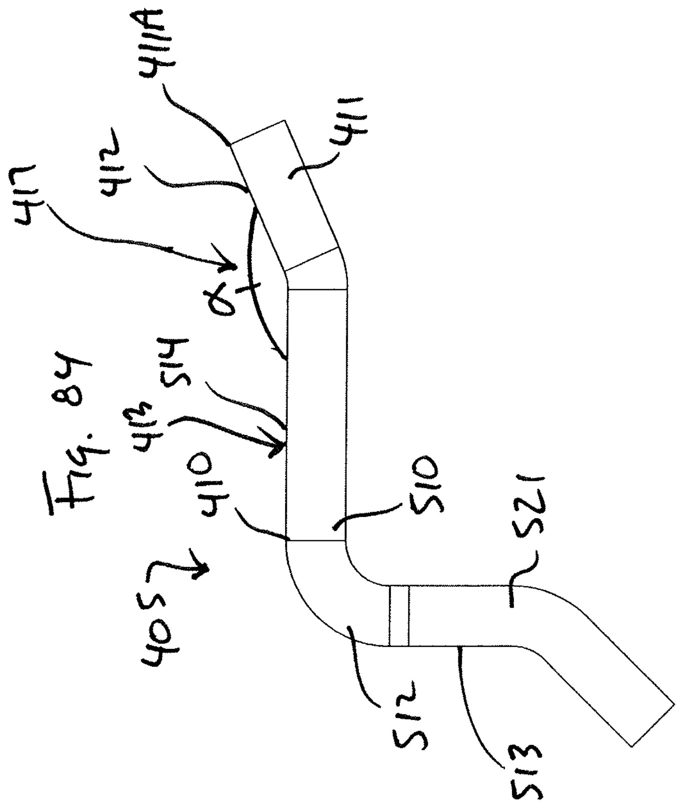
FIG. 84 is a side elevation view of the embodiment of FIG. 80, the opposite side elevation view being the same thereof.
Figure 85:
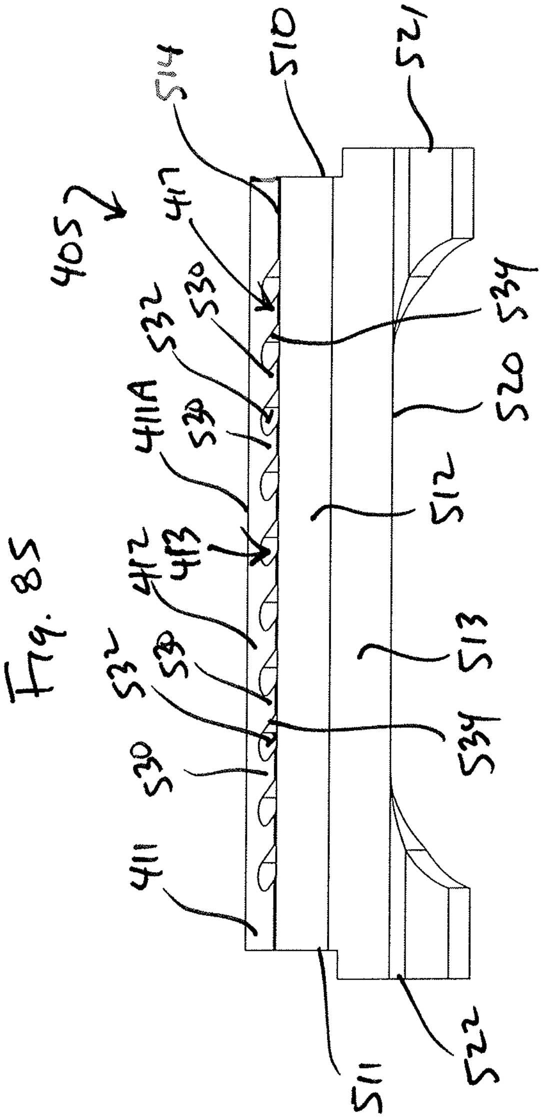
FIG. 85 is an end elevation view of the embodiment of FIG. 80.

Corner segment 512, base segment 513, and separating segment 514 are straight in longitudinal extent from end 510 to end 511. Base segment 513 extends downwardly from corner segment 512 to lower end 520 that extends from key 521 formed in end 510 of base segment 513 to key 522 formed in end 511 of base segment 513. Keys 521 and 522 each correspond to each of keyways 445 and each of keyways 455, being identical in size and shape and being generally V-shaped in this example, being not round, to correspond with the corresponding shape of each of keyways 445 and each of keyways 455. In FIG. 84, end 510 of base segment 513 is generally S-shaped from corner segment 512 to lower end 520 when bar 405 is viewed from end 510, in which base segment 513 has a generally S-shaped angle profile from corner segment 512 to lower end 520. The angle profile of end 511 of base segment 513 from corner segment 512 to lower end 520 is the mirror image of the angle profile of end 510 of base segment 513 from corner segment 512 to lower end 520, in which end 511 of base segment 513 is generally reverse S-shaped from corner segment 512 to lower end 520 when bar 405 is viewed from end 511. Base segment 513 and separating segment 514 are generally perpendicular relative to one another, defining a 90-degree angle therebetween at corner segment 512. Base segment 513 and corner segment 512, including inner extremity 410, extend along the length of bar 405 between ends 510 and 511. Corner segment 512 and separating segment 514 formed with grate 413 and deflecting extremity 411 including deflecting surface 412 extend along the length of bar 405 between ends 510 and 511 and define the threshing and separating component of bar 405, according to the principle of the invention.

Corner segment 512 defines inner extremity 410 of bar 405. Separating segment 514 is at the upper end of bar 405, and extends horizontally from inner extremity 410 of corner segment 512 to deflecting extremity 411 that terminates distally at threshing edge 411A of deflecting extremity 411. Separating grate 413 is between inner extremity 410 and deflecting extremity 411 and extends from proximate to inner extremity 410 of corner segment 512 to deflecting extremity 411.

Deflecting extremity 411 and deflecting surface 412 of deflecting extremity 411 are concurrently angled upwardly relative to separating grate 413 between inner extremity 410 and deflecting extremity 411. Deflecting extremity 411 and deflecting surface concurrently project angularly upwardly from separating grate 413 between inner extremity 410 and deflecting extremity 411 to threshing edge 411A. Preferably, deflecting surface 412 projects angularly upward from and relative to separating grate 413 to threshing edge 411A, wherein deflecting surface 412 and separating grate 413 extend along the length of bar 405 from end 510 to end 511 and are arranged at obtuse angle α denoted in FIG. 84. Obtuse angle α, an angle that that is greater than 90 degrees and less than 180 degrees, is from 125 degrees to 145 degrees in this example and, in a particular embodiment, is optimally 135 degrees. Obtuse angle α between deflecting surface 412 and separating grate 413 form pocket or trough 417 that extends along the length of bar 405 from end 510 to end 511, according to the principle of the invention. Trough 417, a shallow channel, is a grain receiving and holding trough, according to the principle of the invention. Separating grate 413 extends across trough 417 for enabling grain to fall therethrough and drain away from trough 417. Trough 417 is formed in bar 405, and not by adjacent bars 405.

Figure 82:
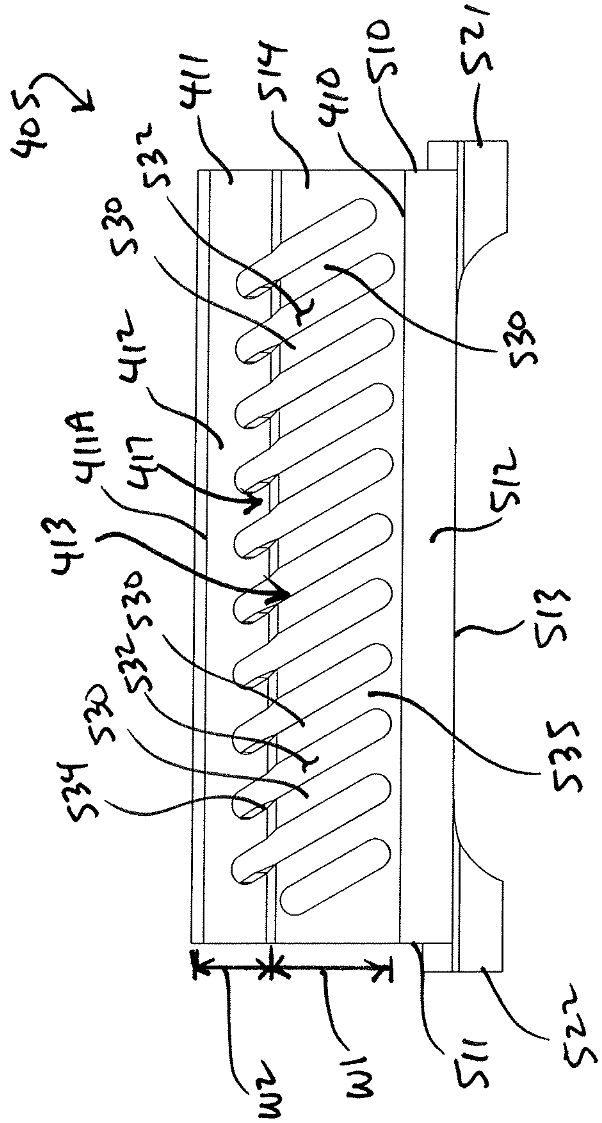
FIG. 82 is a top plan view of the embodiment of FIG. 80.
Figure 83:
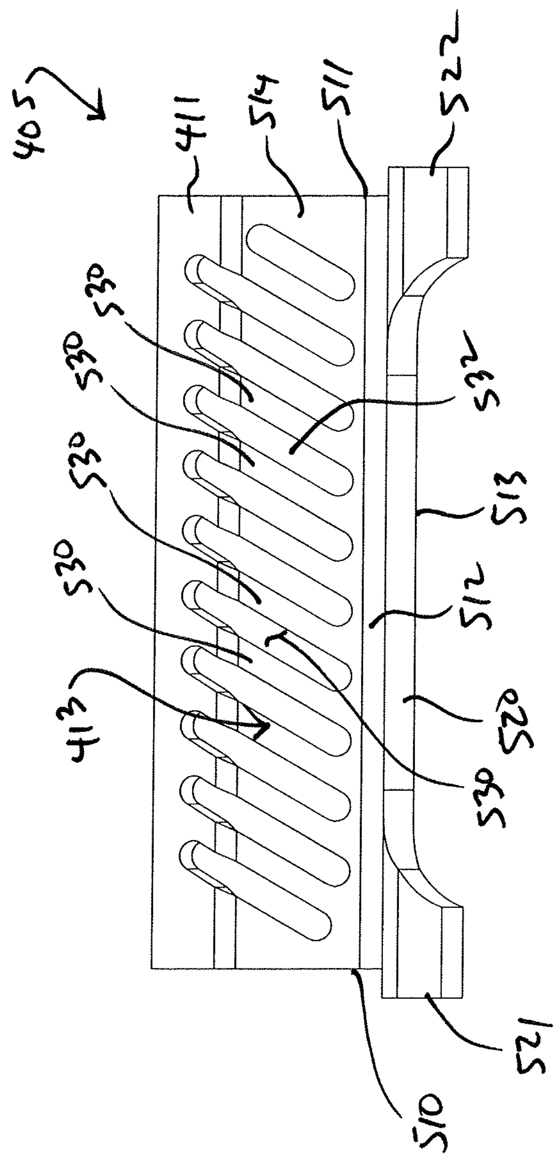
FIG. 83 is a bottom plan view of the embodiment of FIG. 80.

In FIGS. 80-83, part of separating grate 413 is formed in deflecting extremity 411, and unbroken part of deflecting surface 412 is between the part of separating grate 413 formed in deflecting extremity 411 and threshing edge 411A of deflecting extremity 411 and extends along the length of bar 405 from end 510 to end 511. In FIG. 82, separating grate 413 has a width W1 between inner extremity 410 and deflecting extremity 411, deflecting extremity 411 has a pitch or width W2 between separating grate 413 between inner extremity 410 and deflecting extremity 411 and threshing edge 411A, and width W1 is greater than width W2, in which width W1 is approximately 50% wider than width W2 in this example to enable separating grate 413 to aggressively separate grain from threshed crop material.

Grate 413 includes axially-aligned parallel fingers 530 that extend outwardly from proximate to inner extremity 410 of corner segment 512 to deflecting extremity 411 and further along a portion deflecting extremity 411 inboard of outer edge 411A that interconnects the outer ends of fingers 530 and that extends from end 510 to end 511. Accordingly, part of separating grate 413 is formed in deflecting extremity 411. Fingers 530 are axially spaced apart forming openings 532 therebetween that extend from inner extremity 410 to and through a portion of deflecting extremity 411 inboard of outer edge 411A. Each opening 532 is defined between adjacent fingers 530 and is closed proximally by corner segment 512 and distally by deflecting extremity 411. Fingers 530 are equally spaced apart, and there are eleven openings 532 in this bar 405 embodiment, in which ten of openings 532 end into and are formed additionally through part of deflecting extremity 411. Openings 532, each of which is encircled by adjacent fingers 530, corner segment 512, and deflecting extremity 411, are for grain to pass through. The continuous edge 534 to each opening 532 at uppermost surface 535 of grate 413 and deflecting surface 412, which is a part of uppermost surface 535 of bar 405, that face the rotary processing unit when concave 400 is installed in an agricultural combine is a continuous threshing edge of grate 413.

Bar 405 is formed from a piece of flat stock cut with separating grate 413 and which is bent to shape to form the described angle profile. Each of the angle slots 500 of members 460 and 470 of frame 402, in FIGS. 78 and 79, has an angle profile that corresponds to the angle profile of each of the opposite ends 510 and 511, respectively, of base segment 513 of each one of the bars 405, in accordance with the principle of the invention.

Figure 78:
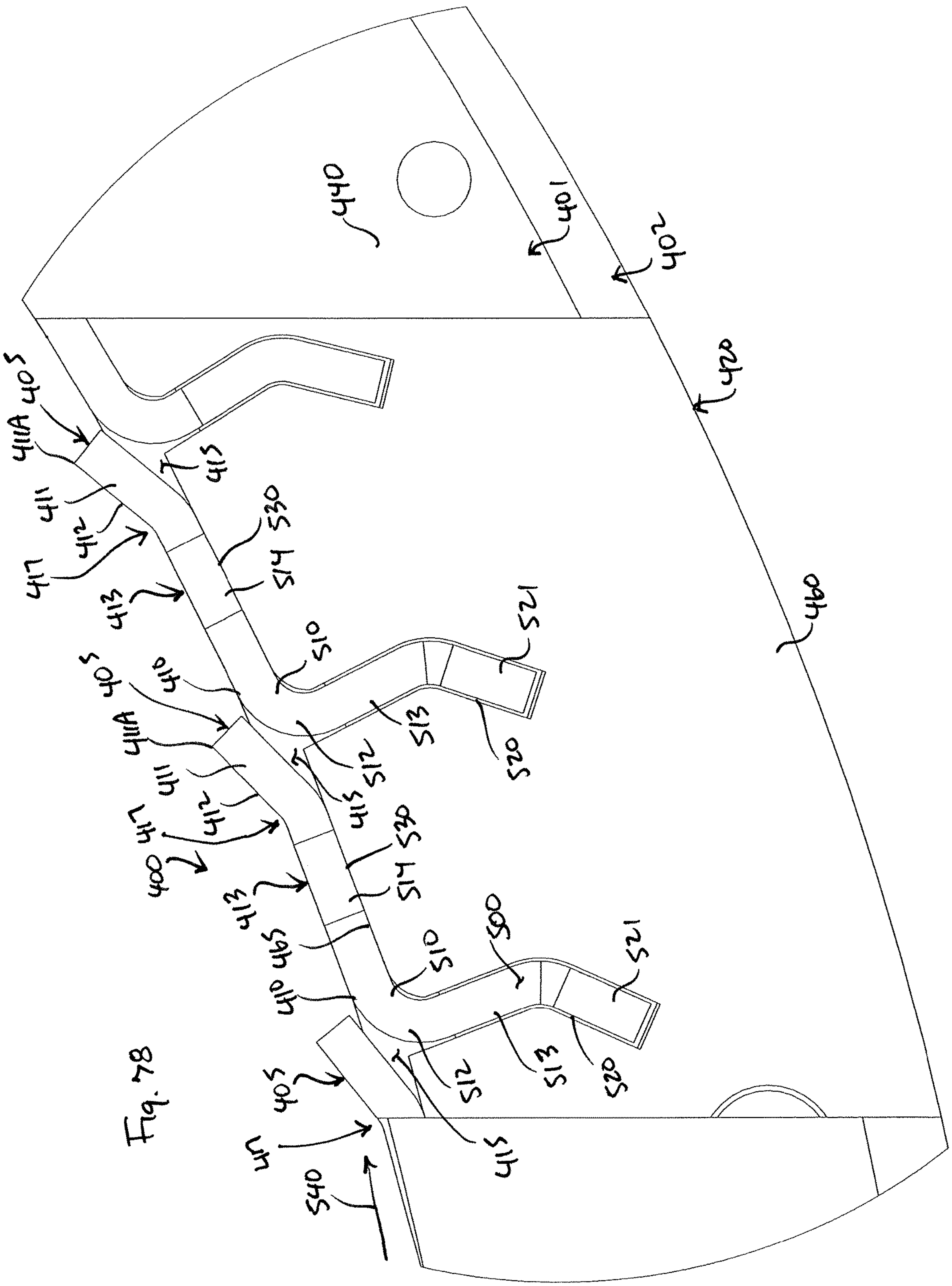
Figure 79:
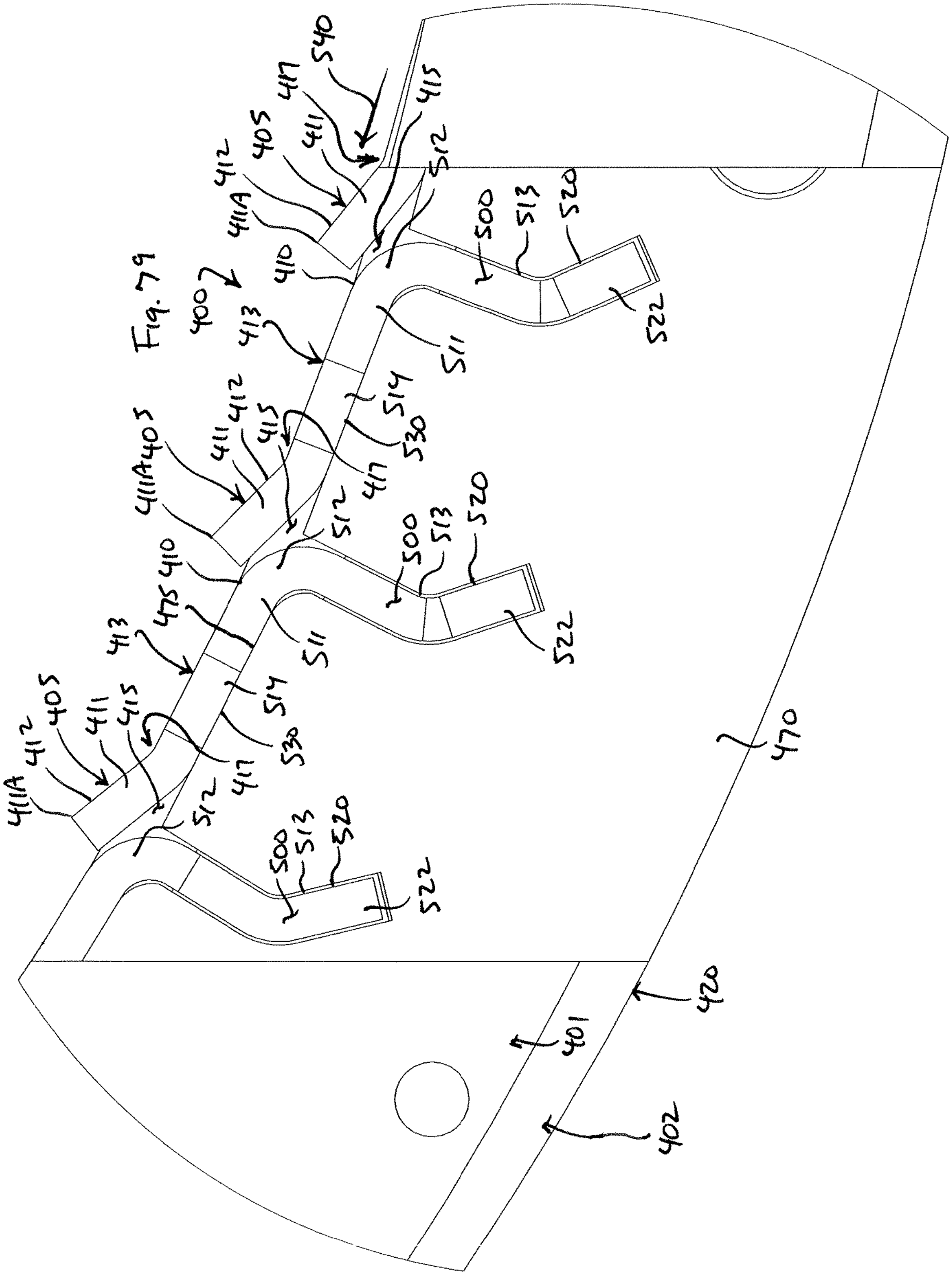
Figure 80:
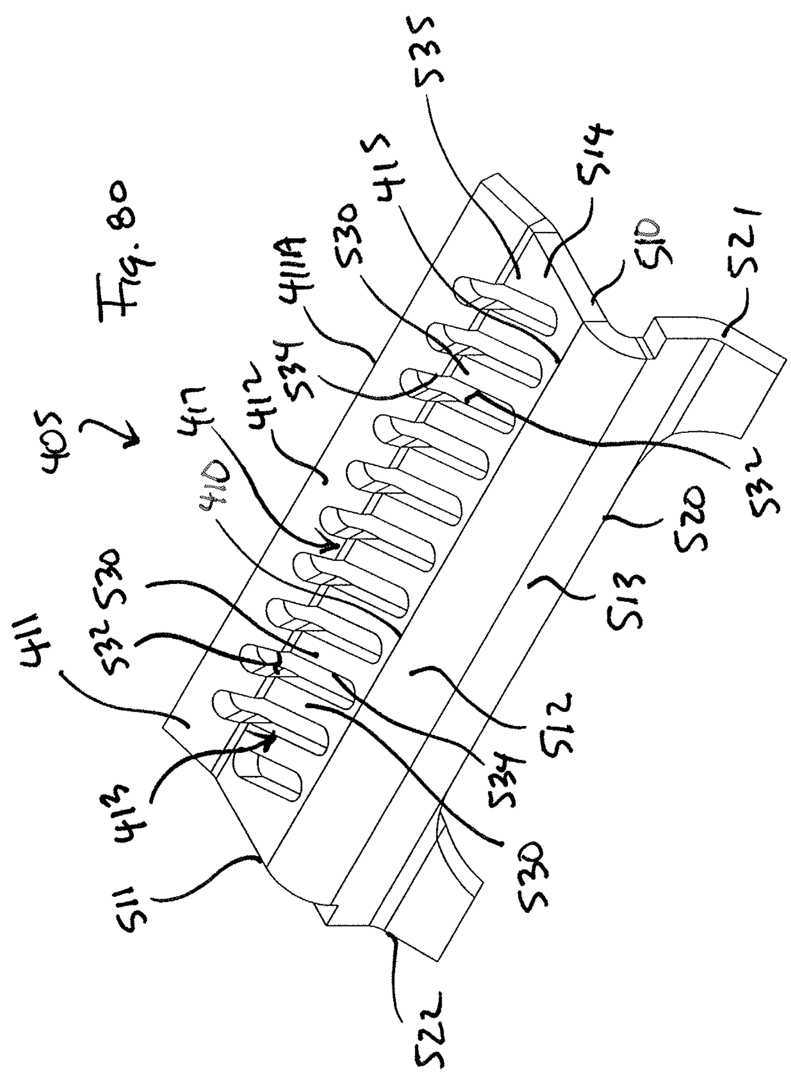
FIG. 80 is a top perspective view of one of the threshing bars of concave of FIGS. 67 and 68.
Figure 81:
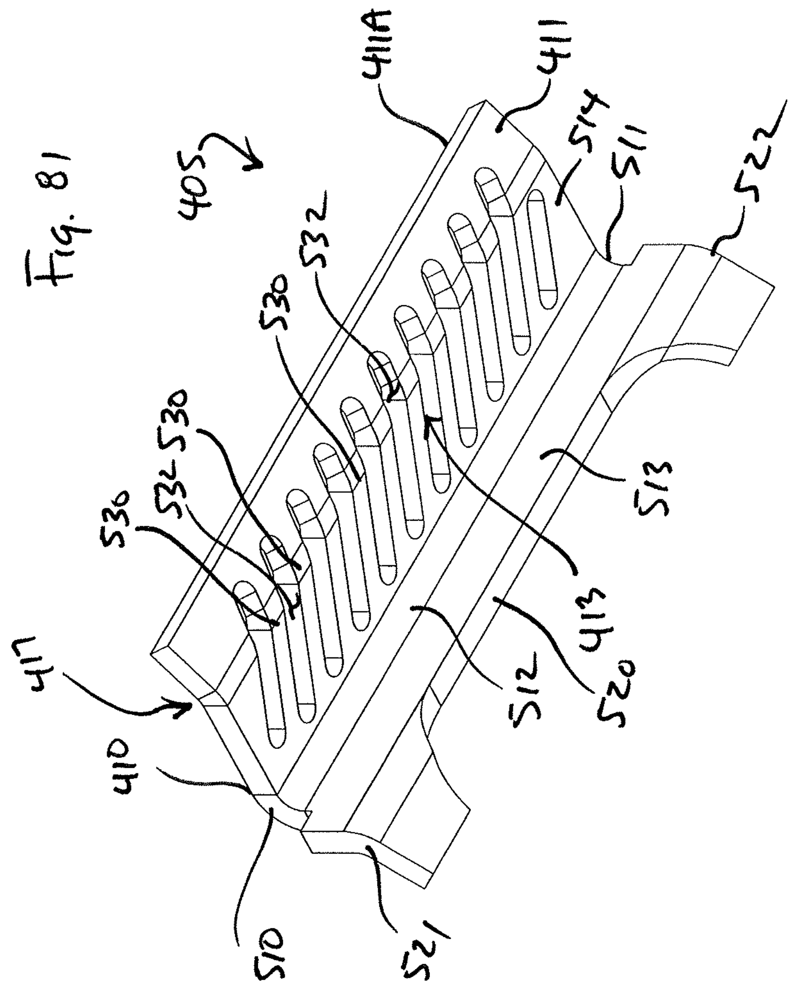
FIG. 81 is a bottom perspective view of the embodiment of FIG. 80.

Referring in relevant part to FIGS. 78, 79, 86, and 87, the opposite ends 510 and 511 of the base segment 513 of each of bars 405 are tongues and are non-destructively and removably held in corresponding, axially-aligned angle slots 500 of curved end members 460 and 470. Accordingly, an engagement assembly, a non-destructive removable connection, non-destructively connects each of bars 405 to frame 402, in which each engagement assembly includes engagement elements carried by each of threshing bars 405 and corresponding complemental engagement elements carried by frame 402. The engagement elements of each bar are ends 510 and 511, tongues, and the complemental engagement elements for each bar 405 are a pair of axially-aligned slots 500 of members 460 and 470, respectively. The angle profiles of angle slots 500 and the opposite ends 510 and 511 of the base segments 513 of the bars 405 correspond enabling slots 500 to accept ends 510 and 511 and disabling axial rotation of each of the bars 405 relative to frame 402. The angle profile of slots 500 of member 460 when viewed from the side of frame 402 defined by member 460 in FIG. 78 is generally S-shaped to correspond to the angle profiles of ends 510 of bars 405, and the angle profile of slots 500 of member 470 when viewed from the opposed side of frame 402 defined by member 470 in FIG. 79 is generally reverse S-shaped to correspond to the angle profiles of ends 511 of bars 405. Referring in relevant part to FIGS. 78 and 79, ends 510 and 511 of base member 33 of each bar 405 extends downwardly from corner segment 512 through the corresponding axially-aligned angle slots 500 of members 460 and 470, respectively. Given the shapes of ends 510 and 511 and the corresponding shapes slots 500 of members 460 and 470, ends 510 and 511 of the base sections 513 extend downwardly through and follow the corresponding slots 500 in members 460 and 470, extending downwardly along an upper pitch as shown and then extending angularly relative to the upper pitch along a lower pitch in the direction of the upstream end of concave 400.

In FIG. 87, the opposite ends 510 and 511 of the base segment 513 of each of bars 405 are non-destructively and removably held in corresponding, axially-aligned angle slots 500 of curved end members 460 and 470, bars 405 extend between curved end members 460 and 470, from curved end member 460 to curved end member 470, are parallel relative to one another and to transverse support members 481 and 482, are perpendicular relative to members 460 and 470, and are spaced from one another and extend axially between curved end members 460 and 470 forming openings 415 between adjacent corner segments 512 for grain to pass through. Base segments 513 of bar 405 depend downwardly from the respective corner segments 512 in FIG. 70, each corner segment 512 is adjacent to or otherwise proximate to the top edges 465 and 475 of the respective curved end members 460 and 470, and each separating segment 514 extends over top edges 465 and 475 and across an adjacent opening 415 from the corner segment 512 thereof to the corner segment 512 of an adjacent bar 405. The outermost fingers 530 of each separating segment 514 rest in direct contact against the respective top edges 465 and 475 of the respective members 460 and 470.

The separating segment 514 of each bar 405 is adjacent to and above the top edges 465 and 475 of the respective curved end members 460 and 470 and extends across an adjacent one of the openings 415 over top edges 465 and 475 of the respective curved end members 460 and 470 in the direction of the downstream end of concave 400 to corner segment 512 of an adjacent bar 405. More specifically, separating grate 413 of each bar 405 between inner extremity 410 and deflecting extremity 411 thereof extends across an adjacent one of openings 415 from inner extremity 410 to trough 417 and deflecting extremity 411, deflecting extremity 411 and deflecting surface 412 concurrently project angularly upwardly to threshing edge 411A toward the upstream end of concave 400 and away from the opposite downstream end of concave 400 and relative to separating grate 413 to adjacent to the back side of corner segment 512 of an adjacent bar 405, and deflecting surface 412 and separating grate 413 are arranged at obtuse angle α (FIG. 84) therebetween forming trough 417 between separating grate 413 and deflecting surface 412. Separating grate 413 across opening 415 separates grain from threshed crop material.

The chosen obtuse angle α between deflecting surface 412 and separating grate 413 inherently results in an upward angle of inclination of deflecting surface 412 relative to separating grate 413 between inner extremity 410 and deflecting extremity 411 that is obtuse to, being not acute or perpendicular to, the opposing downstream direction of the oncoming crop material. This is particularly advantageous because it enables deflecting surface 412 to gently loosen and peel the husks away from the grain driven thereagainst without cracking and fracturing the grains when the crop material is driven over deflecting surface 412 by the rotor of the rotary processing unit in a direction from the upstream end of concave 400 to the downstream end of concave 400 that would otherwise occur if deflecting surface 412 was set at an acute or a perpendicular angle relative to the direction of the oncoming crop material as is the case in conventional threshing bars. At the same time, the upward obtuse angle of inclination of deflecting surface 412 into the opposing downstream direction of the oncoming crop material inherently enables deflecting surface 412 to partially and not completely restrict the flow of the grains driven over deflecting surface 412 by the rotor of the rotary processing unit in a direction from the upstream end of concave 400 to the downstream end of concave 400 causing grains to temporarily collect and be held as a mass of grains in trough 417 from end 510 to end 511 of bar 405 before they fall and drain away through separating grate 413 extending across trough 417 under the mass of temporarily collected and held grain. It is particularly advantageous that trough 417, during operation of the rotary processing unit, temporarily collects and holds the mass of grains therein because it causes the oncoming flow of grains to inherently drive over the mass of grains temporarily collected and held in trough 417 advantageously resulting in a grain-on-grain threshing at trough 417, according to the principle of the invention. This grain-on-grain threshing persists at trough 417 during operation of the rotary processing unit, in which grain continuously temporarily collects and is held in trough 417 and steadily falls and is drained away from trough 417 through the section of separating grate 413 extending across trough 417, while at same time same time the oncoming grain is continuously driven over and threshed against and continually replenishes the temporarily collected and held mass of grain at trough 417 advantageously resulting in the continuing grain-on-grain threshing at trough 417. This grain-on-grain threshing is surprisingly inherently gentle and extraordinarily efficient compared to direct grain-on-threshing bar threshing and favorably influences grain loss and grain damage by favorably influencing grain cracking and fracturing, according to the principle of the invention.

And so in the installed position of the various bars 405 on frame 402, in reference in relevant part to FIGS. 67, 68, 75, 76, 78, 79, and 87, the separating grate 413 of each bar 405 extends across an adjacent opening 415 in a direction toward the downstream end of concave 400 from inner extremity 410 of corner segment 512 to deflecting extremity 411 adjacent to the outer or back side of corner segment 512 of an adjacent bar 405. Deflecting extremity 411 of the separating segment 514 of each bar 405 is, in turn, adjacent to, and confronts, the corner segment 512 of the adjacent bar 405, deflecting surface 412 projects angularly upward relative to separating grate 413, extending between inner extremity 410 and deflecting extremity 411, toward the upstream end of concave 400 and upstream into the opposing downstream direction of oncoming crop material that is to be threshed driven by the rotor of the rotary processing unit, and deflecting surface 412 and separating grate 413 are arranged at obtuse angle α (FIG. 84) therebetween inherently setting deflecting surface 412 at a corresponding obtuse angle relative to the downstream direction of the oncoming crop material. Fingers 530 of each bar 405 are oblique relative to members 440, 450, 460, and 470, and extend across the adjacent opening 415 to deflecting extremity 411 and to deflecting surface 412 between threshing edge 411A adjacent to the back side of the corner segment 512 of an adjacent bar 405. Grain falls concurrently through openings 532 and each corresponding opening 415 between corner segments 512 of adjacent bars 405 for separating grain from threshed crop material. Openings 532 of each separating grate 413, including the part of the openings of separating grate 413 form in deflecting extremity 411, reduce the corresponding opening 415 size for smaller grains.

In the rotary processing unit, the crop material is driven over concave 400 in the direction of arrowed line 540 in FIGS. 67, 68, 71, and 73-79 in a direction from transverse support member 482 at the upstream end of concave 400 in FIGS. 68, 69, 71, 73 and 74, to transverse support member 481 at the downstream end of concave 400 shown in the same referenced figures. Bars 405 and troughs 417 of bars 405 extend parallel to the axis of rotation of the rotating threshing drum and transverse to direction 540. Separating grate 413 and deflecting surface 412 of each bar 405 adjacent to top edges 465 and 475 thresh the harvested crop and openings 532 of the separating grates 413 and openings 415 between corner segments 512 are for grain to pass through and for separating grain from threshed crop material. The continuous edges 534 to openings 532 at uppermost surface 535 of each separating grate 413 that faces the rotary processing unit when concave 400 is installed in an agricultural combine are continuous threshing edges of each grate 413. Because of the chosen obtuse angle α between deflecting surface 412 and separating grate 413, the resulting upward angle of inclination of deflecting surface 412 into the direction of arrowed line 540 is obtuse to the opposing downstream direction 540 of the oncoming crop material enabling deflecting surface 412 to gently loosen and peel the husks away from the grain driven over deflecting surface 412 without cracking the grains when the crop material is driven over deflecting surface 412 by the rotor of the rotary processing unit in a direction from the upstream end of concave 400 to the downstream end of concave 400, according to the principle of the invention. At the same time, each threshing edge 411A, the point at which each deflecting surface 412 terminates distally, provides additional or supplemental crop threshing following separating grate 413 and deflecting surface 412, respectively, according to the principle of the invention. The chosen obtuse angle α between separating grate 413 and deflecting surface 412 of each bar 405 is sufficient to set deflecting surface 412 to a correspondingly sufficient obtuse angle to direction 540 of the oncoming crop material to enable each deflecting surface 412 to gently deflect the crop material and gently loosen and peel the husks from the grain inhibiting grain cracking and pulverizing.

In this example, obtuse angle α between separating grate 413 and deflecting surface 412 that inherently forms the corresponding obtuse angle between deflecting surface 412 and direction 540 of the oncoming crop material is from 125 degrees to 145 degrees, with an optimal angle being 135 degrees. Again, this chosen obtuse angle α between deflecting surface 412 and separating grate 413 inherently results in the same obtuse angle to, being not acute or perpendicular to, the opposing downstream direction 540 of the oncoming crop material, which advantageously enables deflecting surface 412 to gently loosen and peel the husks away from the grain driven thereagainst without cracking and fracturing the grains when the crop material is driven over deflecting surface 412 by the rotor of the rotary processing unit in direction 540. At the same time, the upward obtuse angle of inclination of deflecting surface 412 into direction 540 of the oncoming crop material advantageously enables deflecting surface 412 to partially and not completely restrict the flow of the grains driven over deflecting surface 412 by the rotor of the rotary processing unit in direction 540 causing grains to temporarily collect and hold as a mass of grains in trough 417 from end 510 to end 511 of bar 405 before they eventually fall and drain away through separating grate 413 extending across trough 417 under the mass of temporarily collected and held grain. This concurrently causes the oncoming flow of grains flowing in direction 540 to inherently drive over the mass of grains temporarily collected and held in trough 417 advantageously resulting in the grain-on-grain threshing at trough 417. As initially described above, this grain-on-grain threshing persists at trough 417, in which grain continuously temporarily collects and is held in trough 417 and steadily falls and is drained away from trough 417 through the section of separating grate 413 extending across trough 417, while at same time same time the oncoming grain flowing in direction 540 is continuously driven over and threshed against and continually replenishes the temporarily collected and held mass of grain held at trough 417 advantageously resulting in the continuing grain-on-grain threshing at trough 417, which is a surprisingly inherently gentle and extraordinarily efficient threshing of grain compared to direct grain-on-threshing bar threshing and favorably influences grain loss and grain damage by favorably influencing grain cracking and fracturing, according to the principle of the invention.

The bars 405, including at their opposite ends 510 and 511, are not affixed to be immovable using any suitable technique, such as by welding, to curved end members 460 and 470, after seating the opposite ends 510 and 511, opposed tongues, one after the other, into the corresponding angle slots 500, which removably connects bars 405 to frame 402. As a result, bars 405 are removably connected to frame 402 simply by seating/inserting the opposite ends 510 and 511, one after the other, of each bar 405 into a corresponding pair of aligned slots 500 of the respective curved end members 460 and 470, and readily removed from frame 402 by withdrawing the opposite ends 110 and 111, one after the other, from the respective angle slots 500.

As described above, the bars 405 are not affixed to frame 402 using any suitable technique, such as by welding, to members 460 and 470, to be permanently connected to frame 402, such that the only way to remove them would be to destroy such a permanent connection. The described engagement assembly between each bar 405 and frame 402, each engagement assembly being pairs of tongue-and-slot engagement assemblies, one being end 510 and a corresponding slot 500 of member 460 and the other being end 511 and a corresponding slot 500 of member 470, is a non-destructive, removable and impermanent connection, which means that the tongue-and-slot connection between each of ends 510 and 511 and each corresponding slot 500 does not require the destruction of the engagement assembly, such as by cutting, in order to remove the various bars 405 from frame 402.

To removably install the separate bars 405 on frame 402 in FIGS. 86 and 87 in an assembly method when frame 401 is spaced apart from frame 402 when the frame assembly 420 is in the open position, each bar 405 is removably connected to frame 402 orienting the bar 405 between curved end members 460 and 470 and then axially aligning and axially seating the opposite ends 510 and 511, one after the other, into a corresponding pair of axially aligned angle slots 500 by maneuvering the bars 405 back and forth in one direction to insert one of the opposite ends 510 and 511 into one of a pair of corresponding slots 500 and then in another direction to insert the other one of the opposite ends 510 and 511 into the other one of the pair of corresponding slots 500. Each bar 405 is removed by reversing this operation. In FIG. 86, one bar 405 is shown as it would appear removed from frame 402, and the remaining bars 405 are shown as they would appear applied to frame 402. FIG. 87 is a perspective view corresponding to FIG. 86 illustrating all the bars 405 as they would appear installed on frame 402. In FIG. 87, the opposite ends 510 and 511 of the installed bars 405 are substantially flush with respect to the outer sides of the respective curved end members 460 and 470, except for keys 521 and 522, and the corner segment 512 and the separating grate 413 of the installed bars 405 are adjacent to top edges 465 and 475 of the respective curved end members 460, when bars 405 are installed on frame 402. When bars 405 are installed on frame 402, keys 522 of end 511 extend outwardly from, i.e. are proud of, the outer side of curved end member 470 in FIG. 87 being available to be inserted into keyways 455 of member 450 when member 450 is juxtaposed to member 470. Identically, keys 521 of end 510 extend outwardly from, i.e. are proud of, the outer side of curved end member 460 being available to be inserted into keyways 445 of member 440 when member 440 is juxtaposed to member 460.

Keys 521 are equally spaced apart longitudinally on the outer side of member 460 from end 461 to end 462, and keys 522 are equally spaced apart longitudinally on the outer side of member 470 from end 471 to end 472, when bars 405 are installed on frame 402. The spacing of keys 521 corresponds to the spacing of keyways 445 of member 440, and the spacing keys 522 corresponds to the spacing of keyways 455 of member 450, when bars 405 are installed on frame 402.

Once all the bars 405 are installed on frame 402 in FIG. 87, the continued assembly of concave 400 includes juxtaposing frame 401 to frame 402, which is carried out by axially aligning members 440 and 450 relative to members 460 and 470, which, at the same time, axially aligns keys 445 relative to keyways 521 and keys 455 relative to keyways 522. Member 440 is then juxtaposed to member 460 by bringing it toward and in direct contact against the outer side of curved end member 460 while at the same time inserting keys 445 into corresponding keyways 521, and member 450 is juxtaposed to member 470 by bringing it toward and in direct contact against the outer side of curved end member 470 while at the same time inserting keys 445 into corresponding keyways 521, as shown, for example, in FIGS. 67 and 68, respectively, and in FIGS. 73 and 74, respectively. Since keys 521 and 522 correspond spatially to keyways 445 and 455, respectively, when bars 405 are installed on frame 402, keys 521 insert into keyways 445 and keys 522 insert into keyways 455 when members 440 and 450 are juxtaposed on either side of members 460 and 470, as in FIGS. 67 and 68, which concurrently catches and arrests bars 405 to members 440 and 450. Having juxtaposed members 440 and 450 to members 460 and 470, curved end member 440 is juxtaposed along, and is in direct contact against, the outer side of curved end member 460, curved end member 450 is juxtaposed along, and is in direct contact against, the outer side of curved end member 470, keys 521 extend into keyways 445 of member 440, keys 522 extend into keyways 455, curved end member 440 extends along the length of curved end member 460 from end 441 juxtaposed to end 461 to end 442 juxtaposed to end 462, and curved end member 450 extends along the length of curved end member 470 from end 451 juxtaposed to end 471 to end 452 juxtaposed to end 472.

Bars 405 are releasably secured and locked in place to frames 401 and 402, when bars 405 are installed on frame 402 and when frame 402 is juxtaposed to frame 401, in which the tongue-and-slot engagement assemblies between bars 405 and frame 402 define non-destructive removable connections releasably connecting bars 405 to frame 402 and the key-and-keyway engagement assemblies between bars 405 and frame 401 define non-destructive removable catch connections releasably catching bars 405 to frame 401. Curved end member 440 is releasably connected to curved end member 460 with nut-and-bolt fasteners 490, and curved end member 450 is releasably connected to curved end member 470 with nut-and-bolt fasteners 492. Accordingly, in the closed position of frames 401 and 402 when bars 405 are installed on frame 402, frame 402 is within frame 401, curved end member 460 extends parallel to and is axially juxtaposed along and is in direct contact with the inner side of curved end member 440 that in turn extends parallel to and is axially juxtaposed along the outer side of curved end member 460, keys 521 extend into, being keyed into, keyways 445 of member 440, curved end member 470 extends parallel to and is axially juxtaposed along and is in direct contact with the inner side of curved end member 450 that in turn extends parallel to and is axially juxtaposed along the outer side of curved end member 470, keys 522 extend into, being keyed into, keyways 455 of member 450, curved end member 460 extends concurrently along the length of curved end member 440 of frame 401 from end 461 juxtaposed to end 441 to end 462 juxtaposed to end 442, and curved end member 470 extends concurrently along the length of curved end member 450 of frame 401 from end 471 juxtaposed to end 451 to end 472 juxtaposed to end 452.

In the closed position of frame 402 defining the closed position of concave 400 in FIGS. 67-72 when concave 400 is assembled, bars 405 are entrapped by frames 401 and 402. Frame 401 interacts with bars 405 preventing the opposite ends 510 and 511 of each of the bars 405 from being non-destructively removed/withdrawn from the corresponding angle slots 500 thereby preventing independent non-destructive removal of the bars 405 relative to each other from frame 402. The engagement of keys 521 to keyways 445 and the engagement of keys 522 to keyways 455 provide the added advantage of releasably coupling/restraining bars 405 to members 440 and 450 and entrapping bars 405 to frames 401 and 402. Each of the bars 405 is not affixed to either frame 401 or frame 402, when concave 400 is assembled, using any suitable technique, such as by welding, to be permanently connected to either frame 401 or frame 402, such that the only way to remove them would be to destroy such a permanent connection. The engagement between each bar 405 and frames 401 and 402 is non-destructive, removable, and impermanent, which means that the engagement between bars 405 and frames 401 and 402 does not require the destruction of the engagement, such as by cutting, in order to remove the various bars 405 from frame 402 and to remove frame 401 from frame 402 and from bars 405.

In the closed position of the frame assembly 420 of concave 400, curved end member 440 of frame 401 extends parallel to and is axially juxtaposed along the outer side of curved end member 460 of frame 402 and confronts and makes direct contact against ends 510 of bars 405 on one side of concave 400, and curved end member 450 of frame 401 extends parallel to and is axially juxtaposed along the outer side of curved end member 470 of frame 402 and confronts and makes direct contact against the opposed ends 511 of bars 405 on the opposed side of concave assembly 400, which interaction entraps bars 405 by and between frames 401 and 402. Curved end members 440 and 450 act as curved stops axially spaced from one another and juxtaposed on either side of the respective curved end members 460 and 470 of frame 402 and the respective ends 510 and 511 of the respective bars 405 for entrapping bars 405 to frame 402 by contacting the respective bar 405 ends 510 and 511 preventing the bars 405 from being displaced for, in turn, preventing the opposite ends 510 and 511 of each of the bars 405 from being non-destructively removed from the corresponding slots 500 thereby preventing independent non-destructive removal of the bars 405 relative to each other from frame 402.

Keys 521 and 522 carried by bars 405 are catch elements, and keyways 445 and 455 of members 440 and 450 of frame 401 are corresponding complemental catch elements. Keys 521 and 522 of each bar 405 and the corresponding keyways 445 and 455 that relate to keys 522 and 522 of each bar 405 define a catch assembly, in which each catch assembly non-destructively catches each of bars 405 to frame 401, when frame 402 is juxtaposed to frame 401 and when keys 521 and 522 are inserted into the respective keyways 445 and 455, in which the engagement of each of keys 521 and 522 to a corresponding one of keyways 445 and 455 forms a non-destructive removable catch connections. Although in each catch assembly keys 521 and 522 are carried by a bar 405 and the corresponding keyways 445 and 455 are carried by the respective members 440 and 450, this arrangement can be reversed in an alternate embodiment, in which keys 521 and 522 can be carried by members 440 and 450 and keyways 445 and 455 can be carried by the respective ends 510 and 511 of bars 405.

With concave 400 so assembled, concave 400 can be used in the customary manner in a rotary processing unit. In the rotary processing unit, bars 405 extend parallel to the axis of rotation of the rotating threshing drum, and separating grate 413, deflecting surface 412, and threshing edge 411A adjacent to top edges 465 and 475 of curved end members 460 and 470 of frame 402 to provide threshing of the harvested crop and openings 415 between corner segments 512 and openings 532 of separating grates 413 are for grain to pass through, in which continuous edges 354 of each separating grate 413 each define an aggressive continuous threshing edge for threshing crop material. Accordingly, each separating grate 413 concurrently serves the purposes threshing the crop and separating grain through openings 532 from the threshed crop material, each deflecting surface 412 gently loosens and peels the husks from the grain and inhibiting grain cracking and develops the previously-described grain-on-grain threshing, and threshing edge 411A provide additional downstream crop threshing, according to the principle of the invention.

In a rotary combine, a single concave 400 can be utilized as the concave or multiple shorter concaves 400 can be arranged end-to-end and side-to-side to form the concave. Should bars 405 become worn or damaged to require replacement or repair, nut-and-bolt fasteners 490 and 492 are simply removed to release frame 402 from frame 401, and frame 401 is removed from frame 402 to place frame 402 in its open position defining the open position of the frame assembly 420 and of concave 400 to allow any of the bars 405 needing replacement or repair to be easily removed, repaired or replaced, and reinstalled, in accordance with the principle of the invention.

The grate 413 of each bar 405 of concave 400 includes eleven openings 532 defined by twelve fingers 530 connecting corner segment 512 to distal extremity 411. Bars having the same construction with different grate configurations can be used in concave 400 without departing from the invention, such as, for example, bar 550 in FIGS. 88-91, and bar 560 in FIGS. 92-95.

Figure 67:
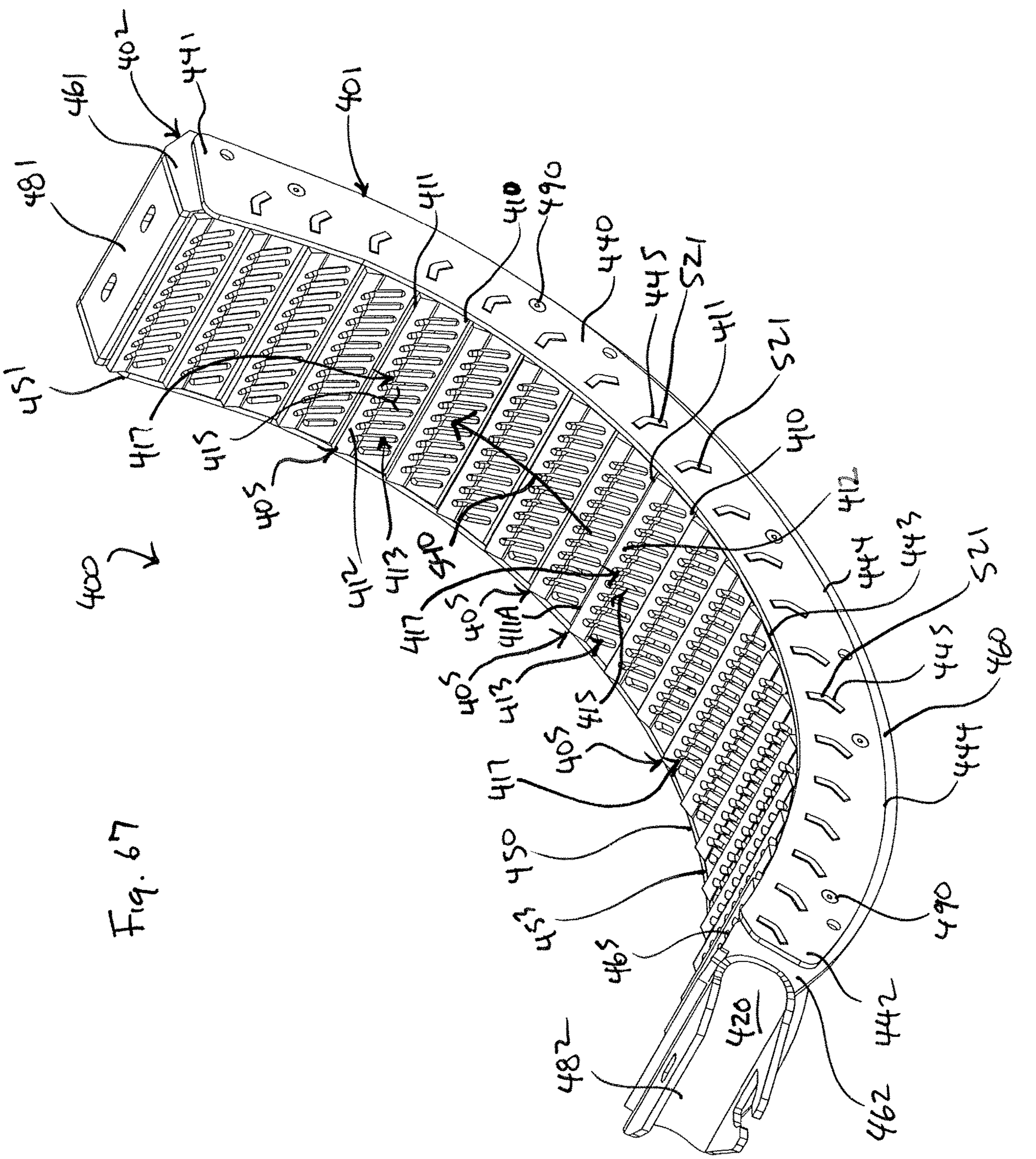
FIG. 67 is a left side perspective view of a concave constructed and arranged in accordance with the principle of the invention, the concave includes threshing bars carried by a base frame connected to a restraining frame and forming openings therebetween for grain to pass through, each threshing bar includes an inner extremity, a deflecting extremity including a deflecting surface, a separating grate between the inner extremity and the deflecting extremity, the separating grate extends across an adjacent one of the openings between the inner extremity and the deflecting extremity for separating grain from threshed crop material, the deflecting surface projects angularly upward relative to the separating grate, and the deflecting surface and the separating grate are arranged at an obtuse angle therebetween.
Figure 68:
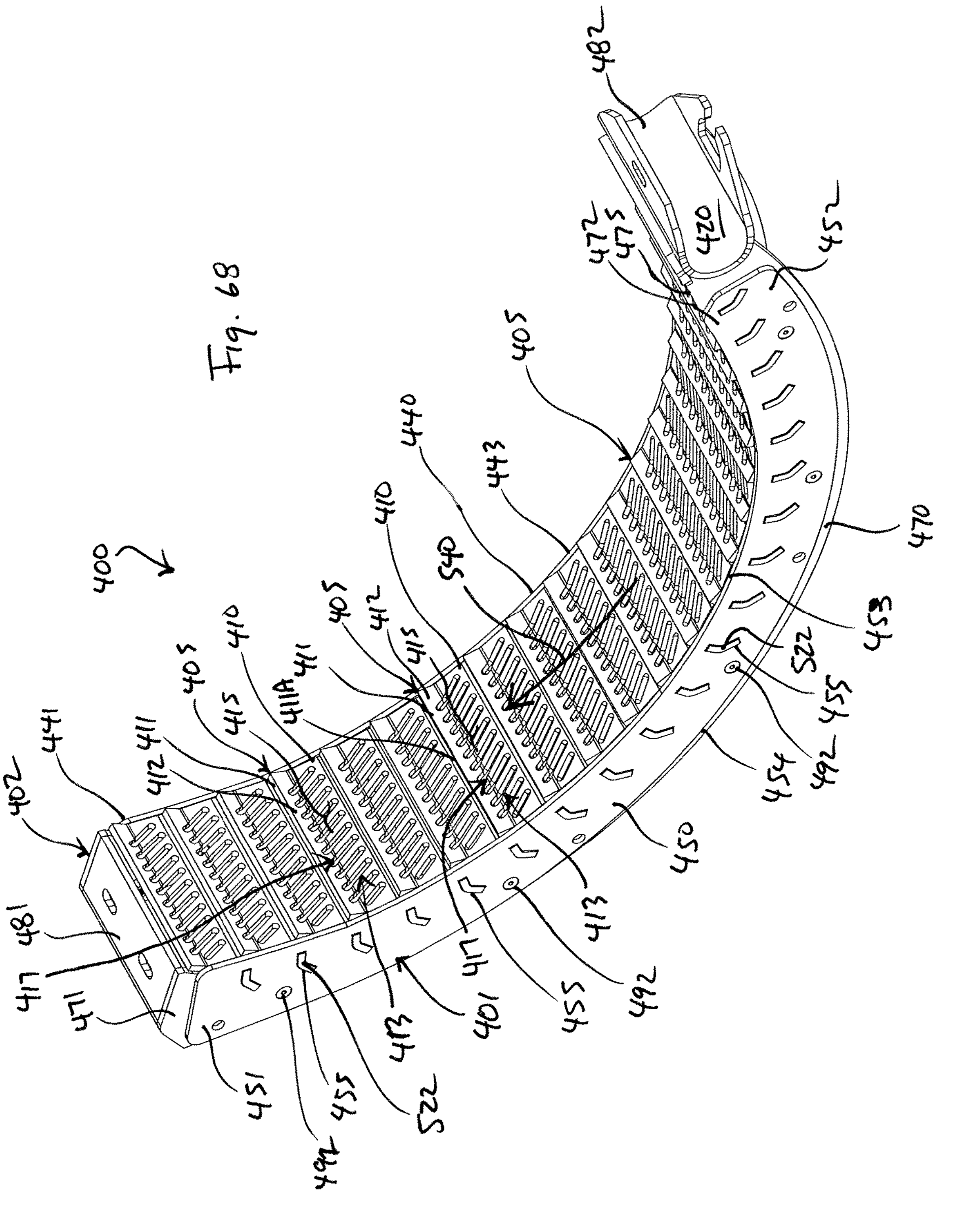
FIG. 68 is a right side perspective view of the embodiment of FIG. 67.
Figure 69:
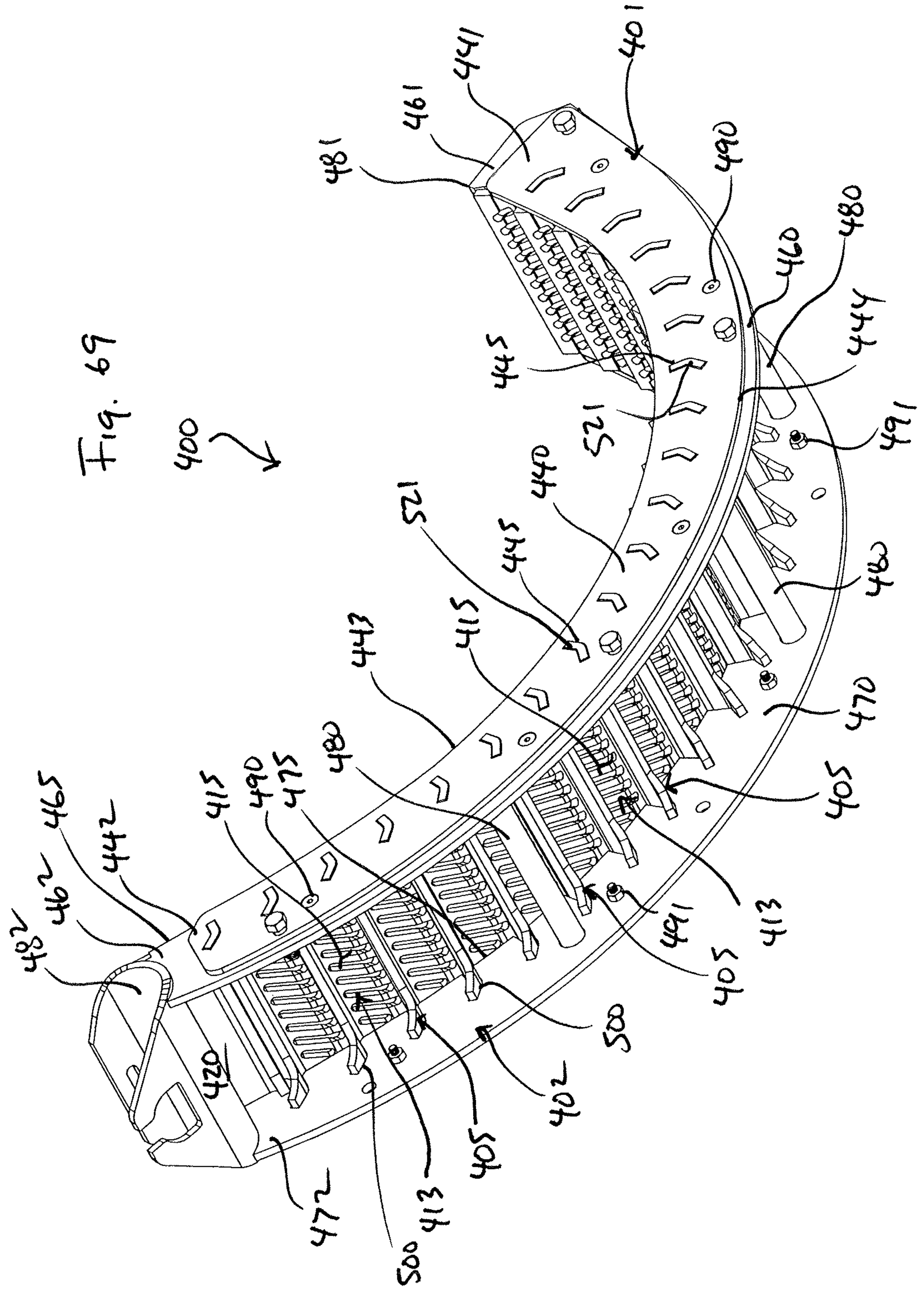
FIG. 69 is a left side bottom perspective view of the embodiment of FIG. 67.
Figure 7D:
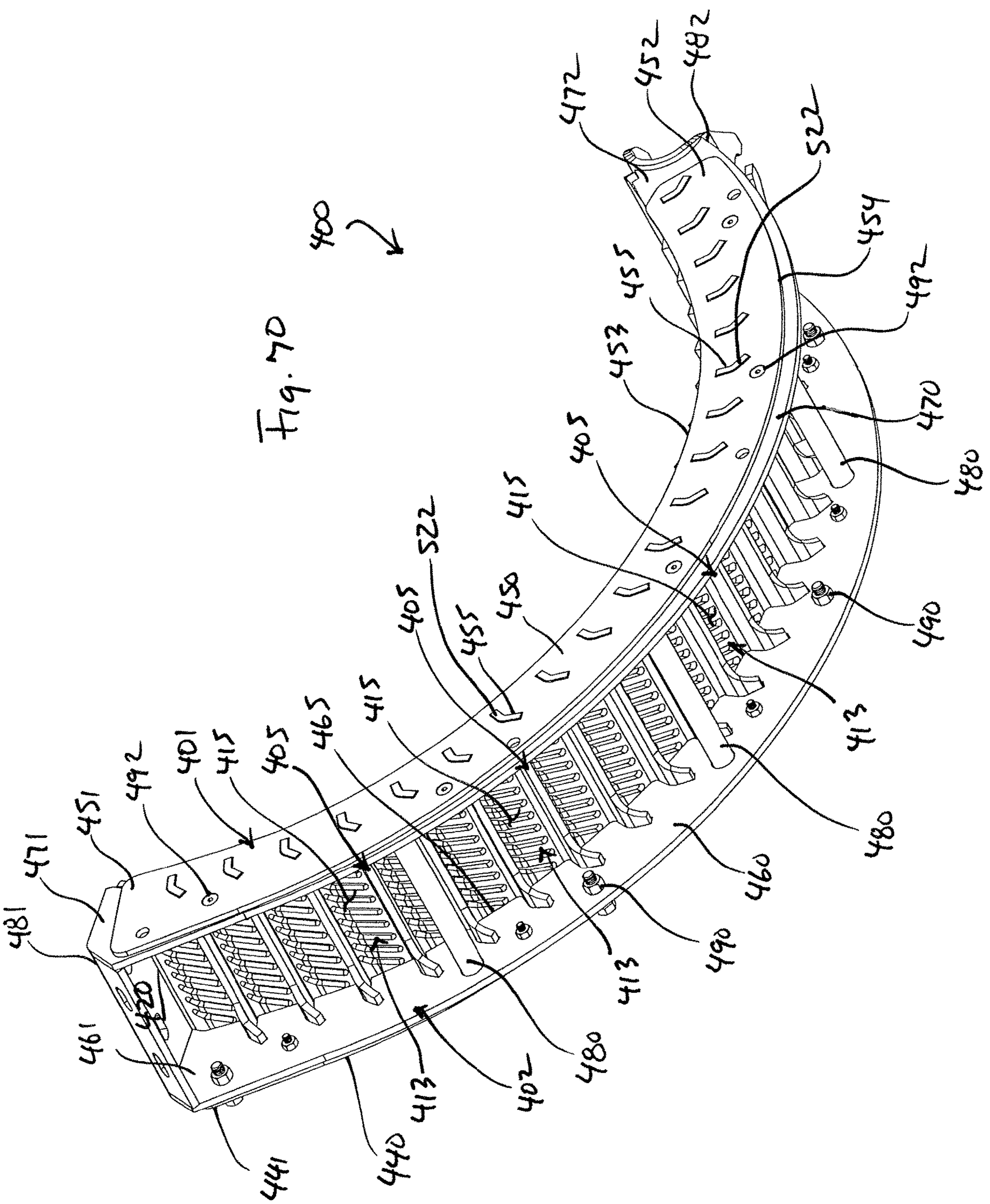
Figure 71:
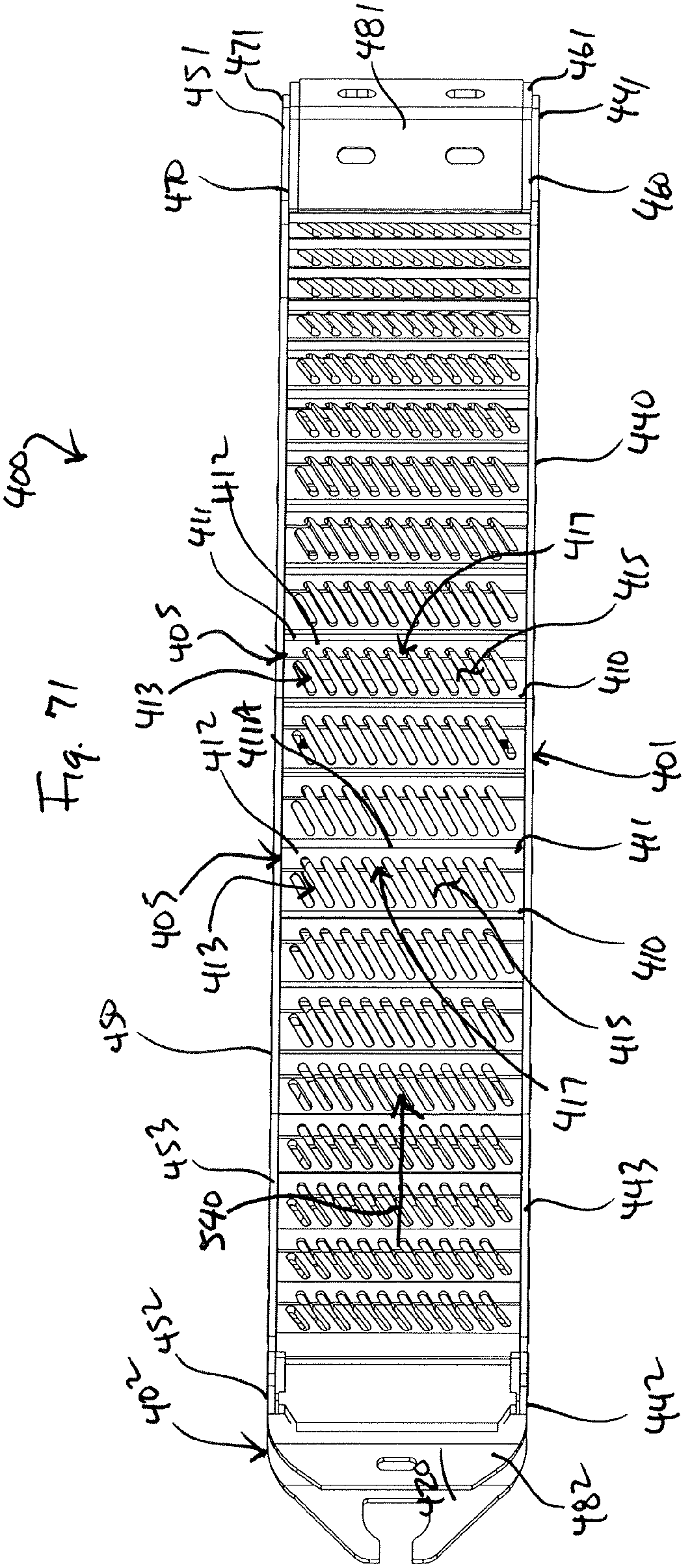
FIG. 71 is a top plan view of the embodiment of FIGS. 67 and 68.
Figure 72:
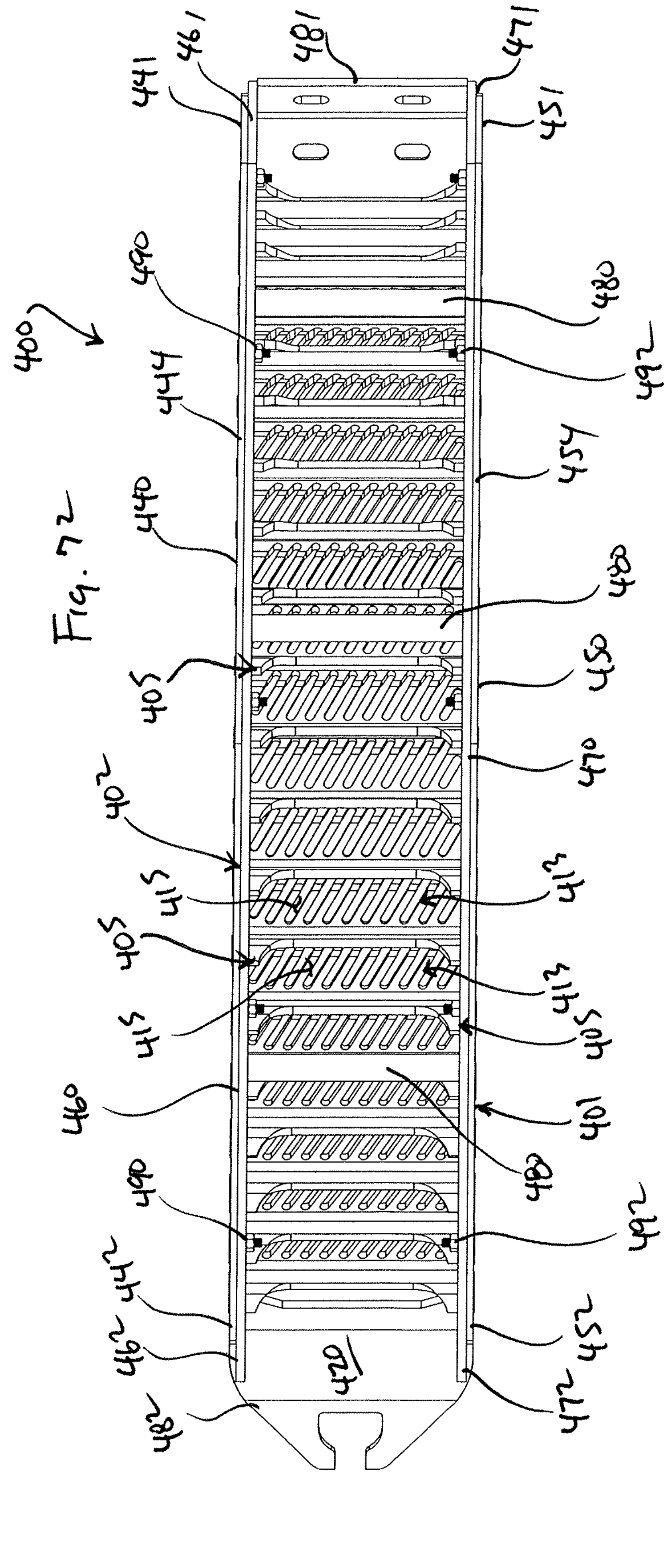
FIG. 72 is a bottom plan view of the embodiment of FIGS. 67 and 68.
Figure 73:
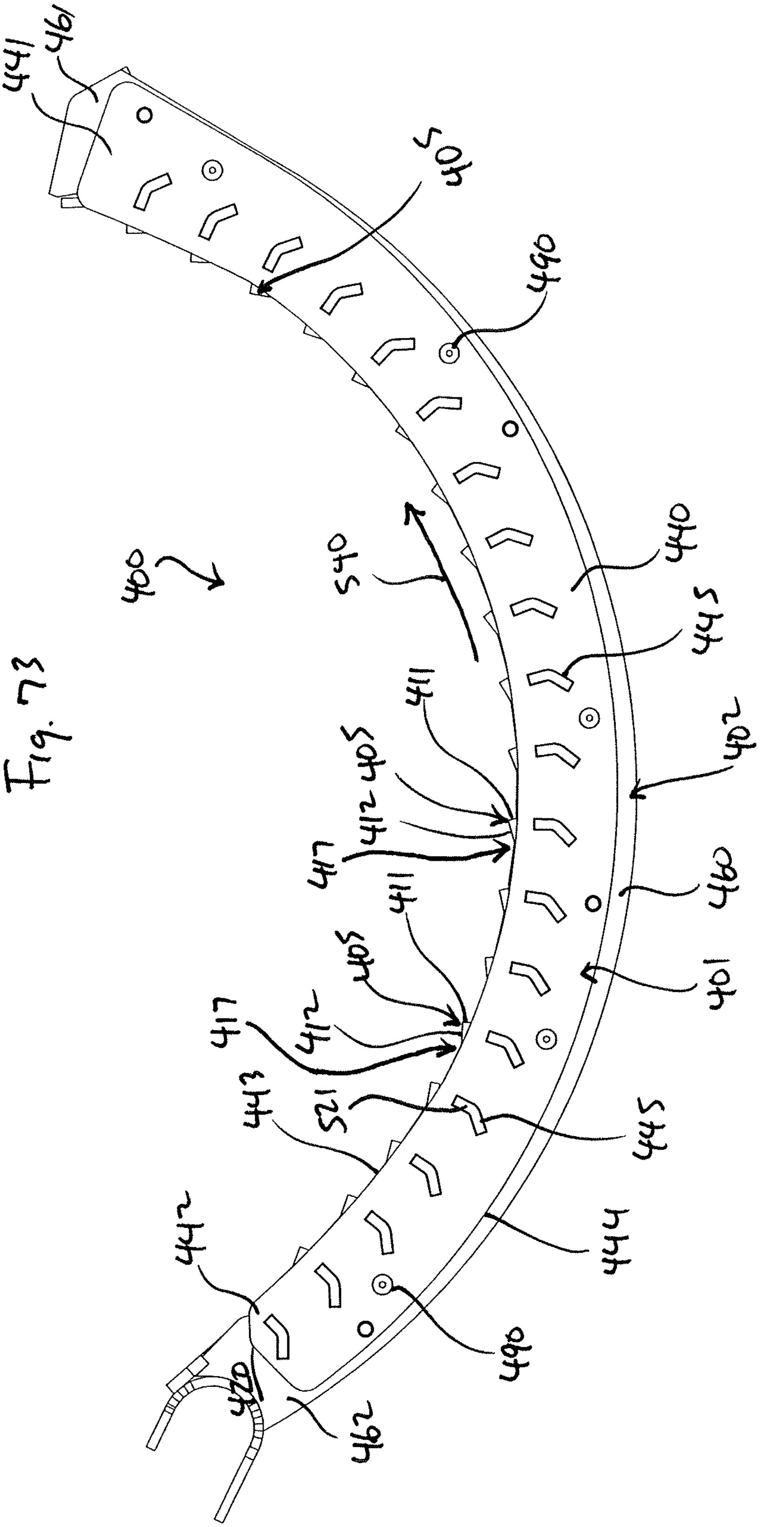
FIG. 73 is a left side elevation view of the embodiment of FIGS. 67 and 68.
Figure 74:
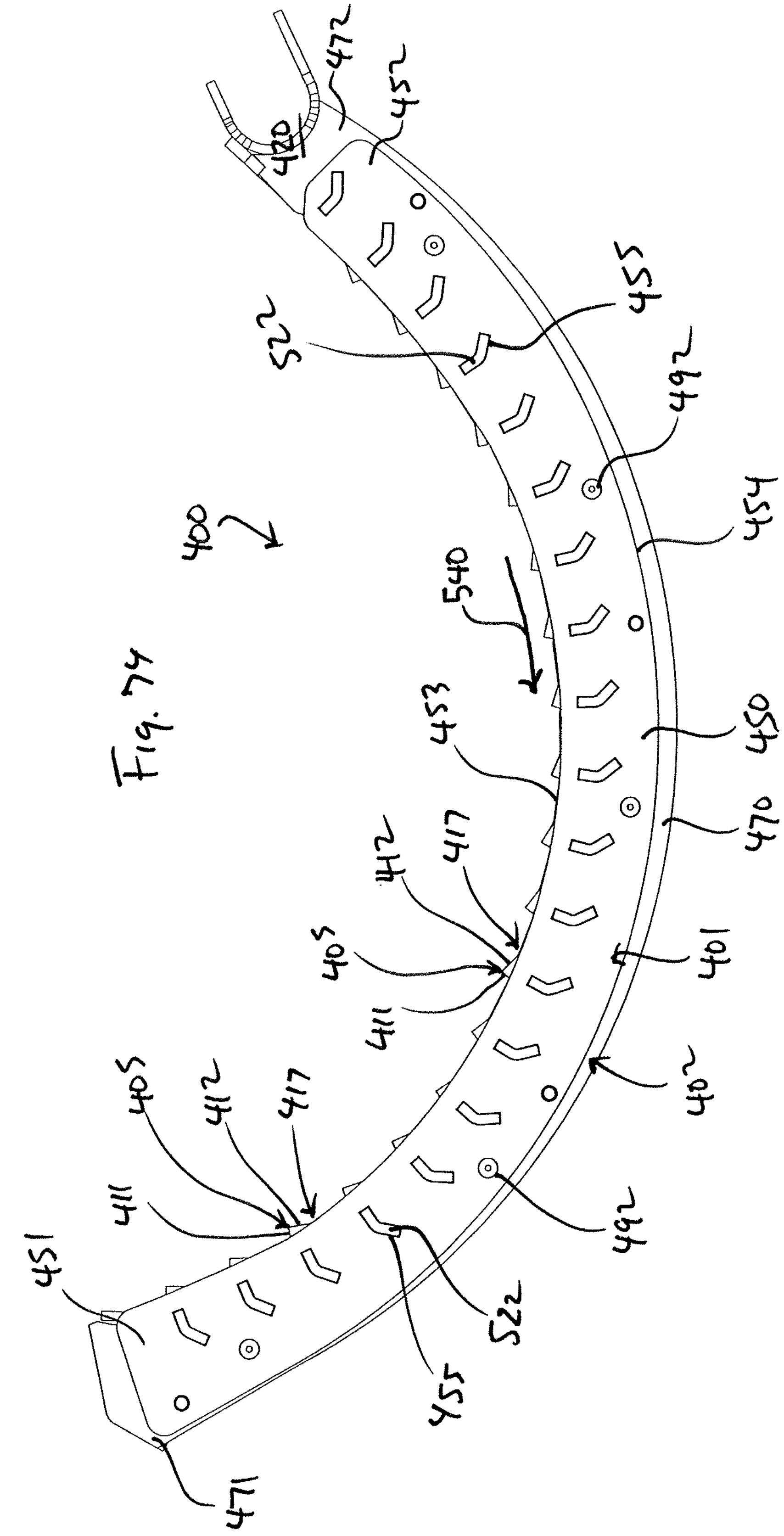
FIG. 74 is a right side elevation view of the embodiment of FIGS. 67 and 68.
Figure 75:
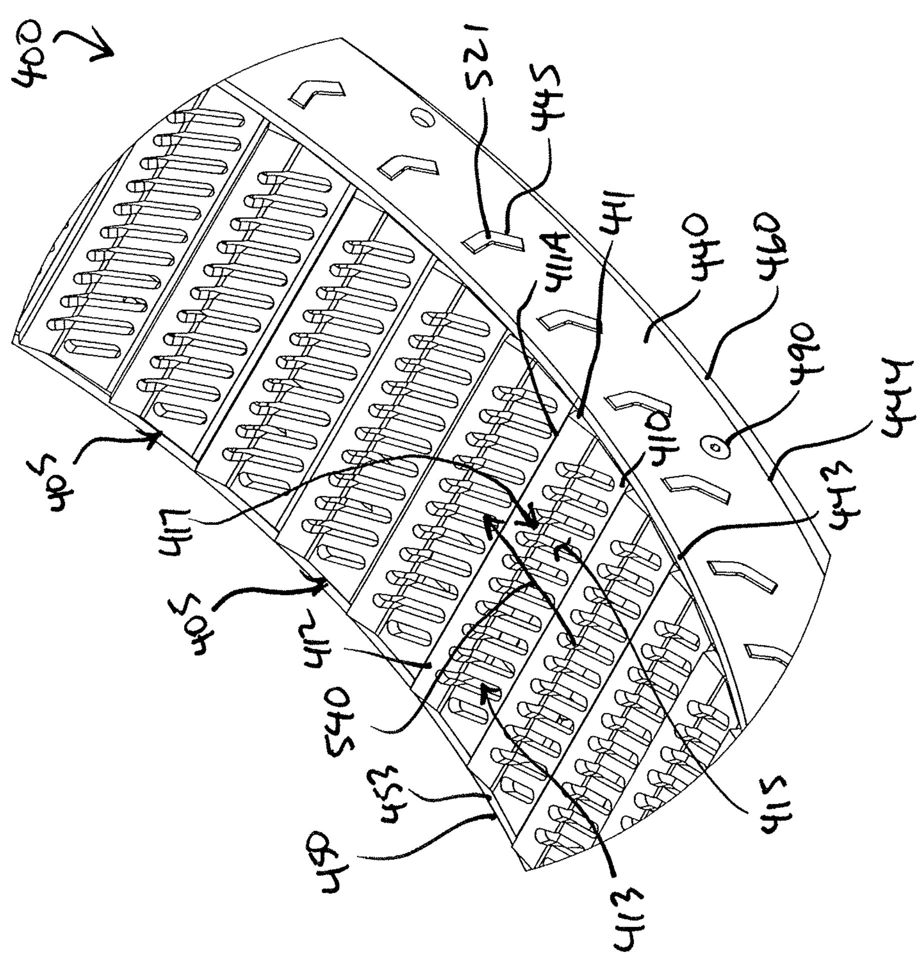
FIG. 75 is an enlarged, fragmented view corresponding to FIG. 67.
Figure 76:
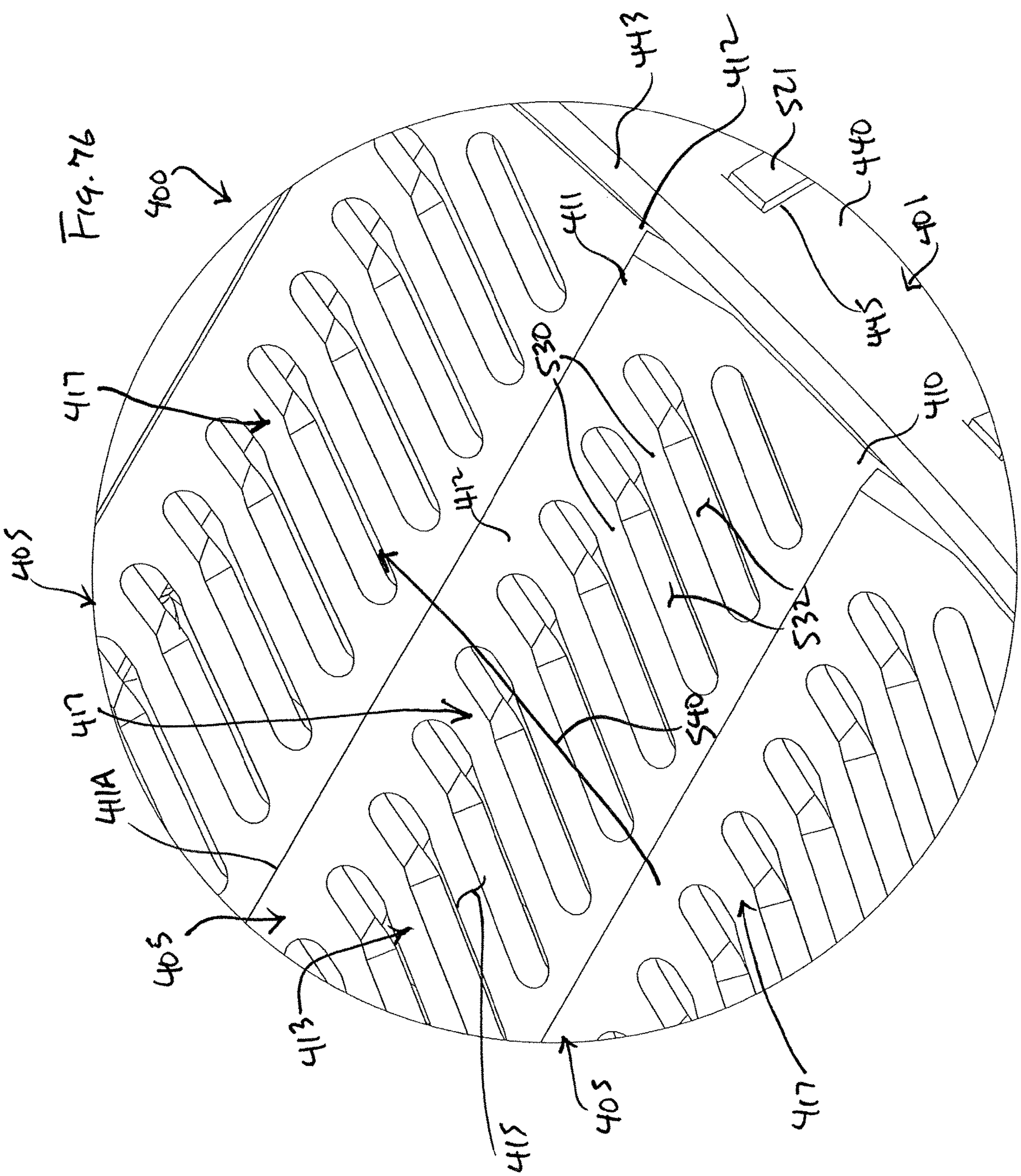
FIG. 76 is an enlarged fragmented view corresponding to FIG. 75.
Figure 77:
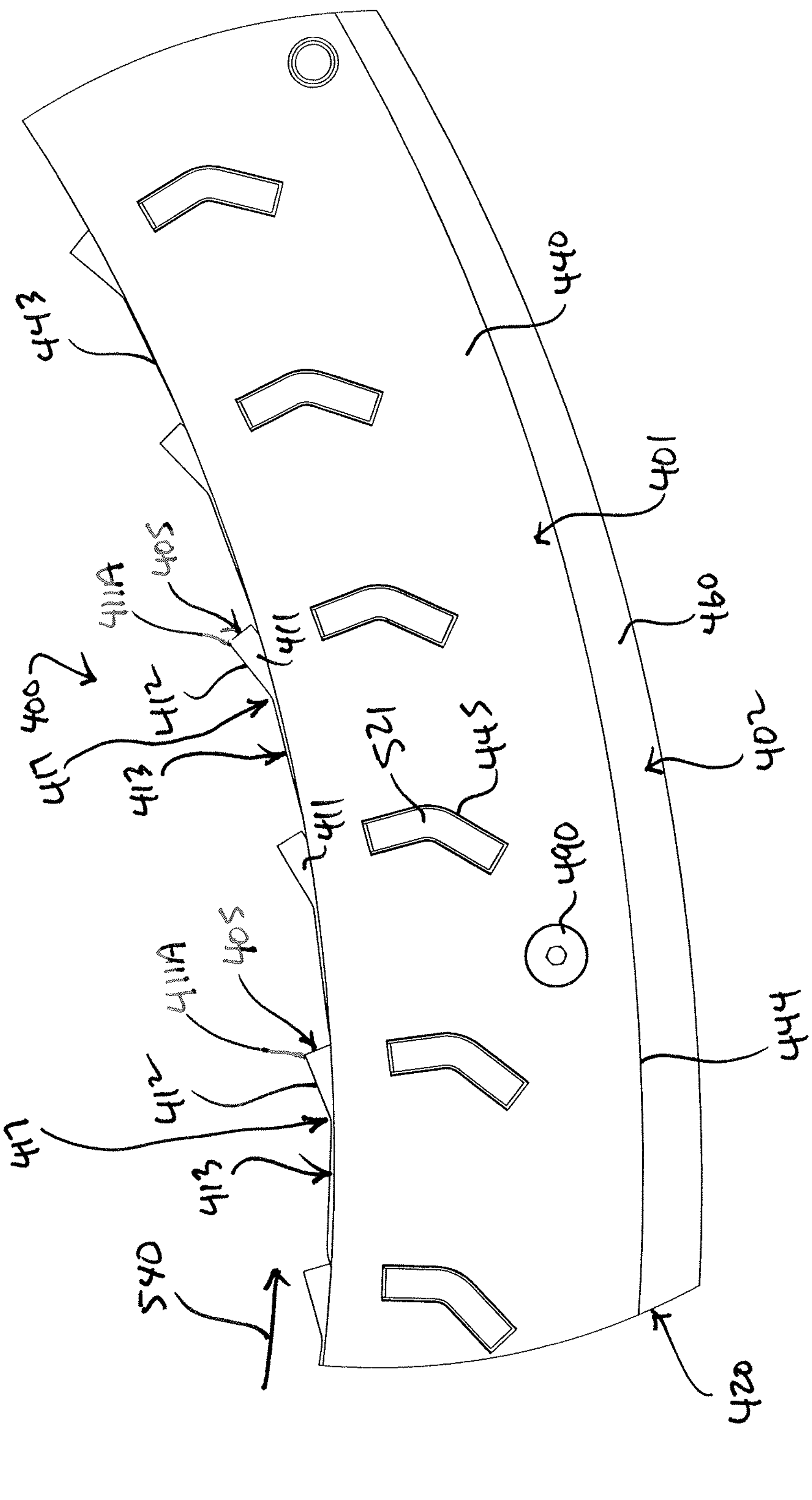
FIG. 77 is an enlarged fragmented left side elevation corresponding to FIG. 77 FIGS. 78 and 79 are enlarged fragmented left side elevation and right side elevation views, respectively, corresponding to FIG. 77 with portions of the restraining frame broken away to illustrate a tongue-and-groove engagement between either side of threshing bars and the base.
Figure 88:
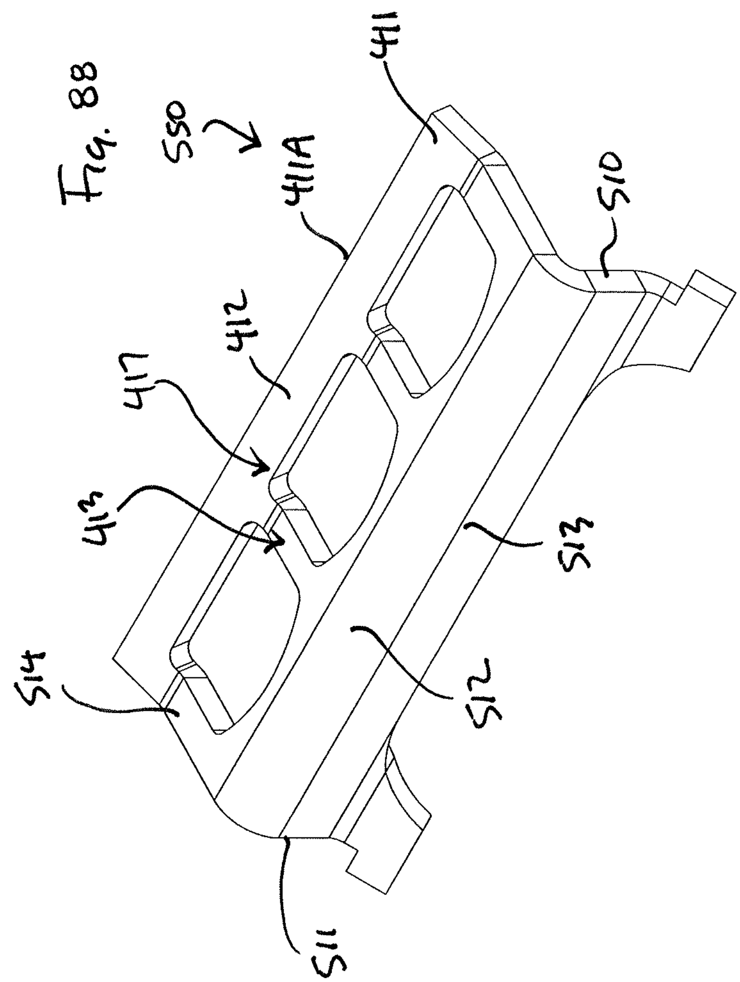
FIG. 88 is a top perspective view of a threshing bar constructed and arranged in accordance with the invention, a plurality thereof being useful for forming a concave like the embodiment first illustrated in FIG. 67.
Figure 89:
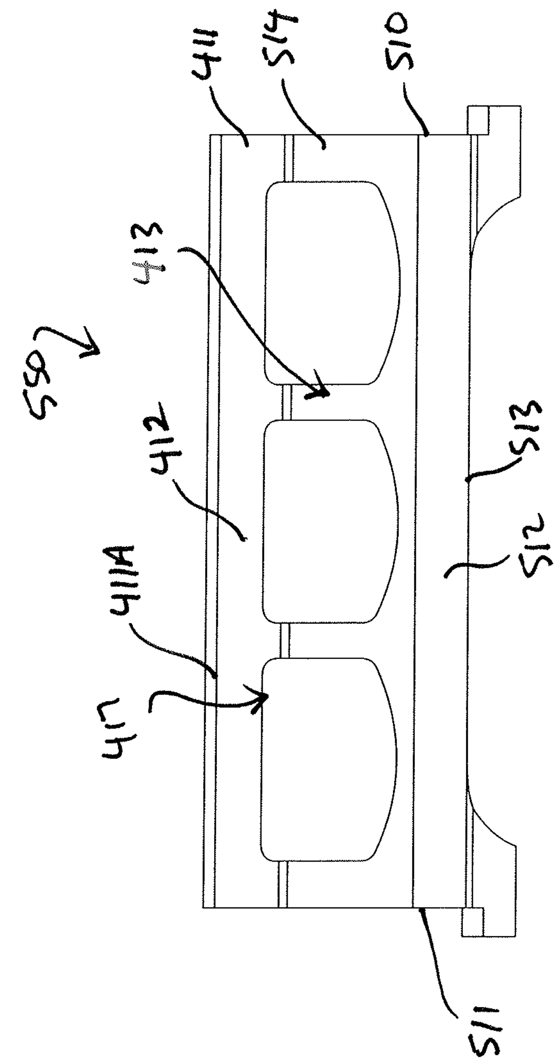
FIG. 89 is a top plan view of the embodiment of FIG. 88.
Figure 90:
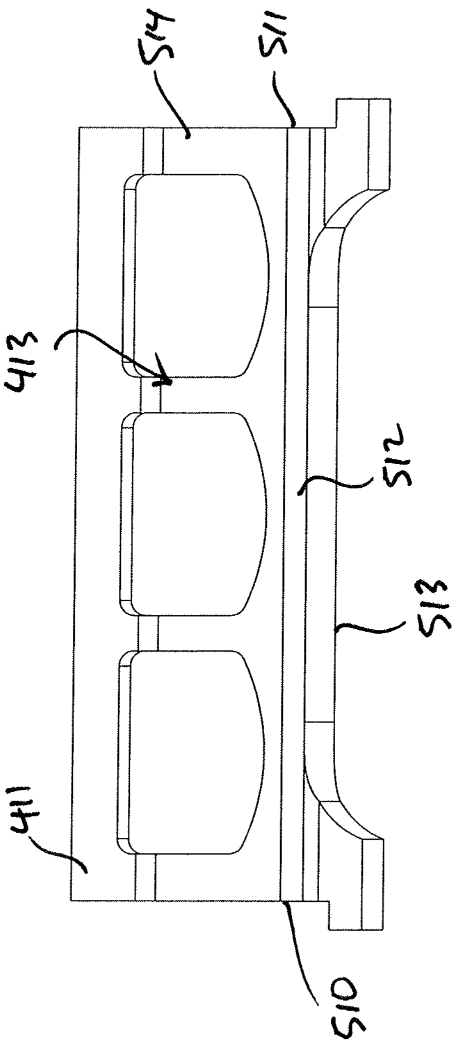
FIG. 90 is a bottom plan view of the embodiment of FIG. 88.
Figure 91:
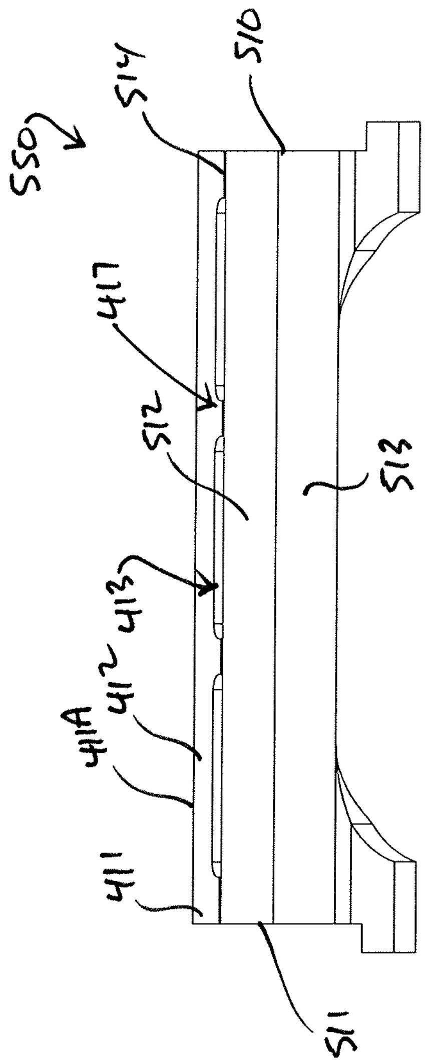
FIG. 91 is an end elevation view of the embodiment of FIG. 88.

FIG. 88 is a top perspective view of threshing bar 550 constructed and arranged in accordance with the invention, a plurality thereof being useful for forming a concave like the embodiment first illustrated in FIG. 67. FIG. 89 is a top plan view of the embodiment of FIG. 88, FIG. 90 is a bottom plan view of the embodiment of FIG. 88, and FIG. 91 is an end elevation view of the embodiment of FIG. 88. Like bars 405, bar 550 shares ends 510 and 511, corner segment 512, base segment 513, separating segment 514 including separating grate 413 and deflecting extremity 411 including deflecting surface 412 and threshing edge 411A, keys 521 and 522, and trough 417. In bar 550, grate 413 includes four fingers 530 defining three corresponding openings 532 that are larger than openings 532 of bars 405 for relating to larger grains.

Figure 92:
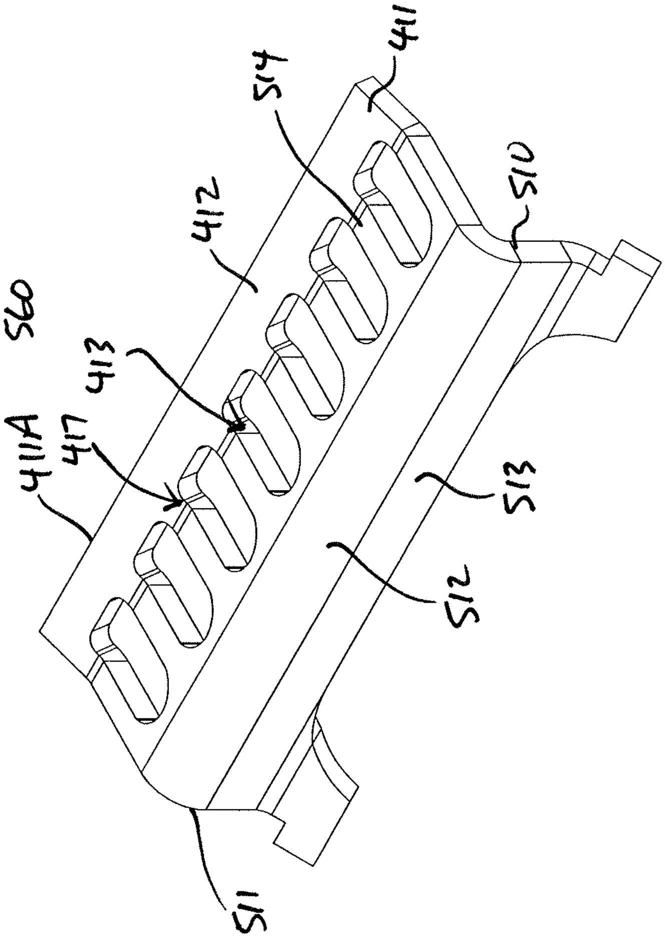
FIG. 92 is a top perspective view of a threshing bar constructed and arranged in accordance with the invention, a plurality thereof being useful for forming a concave like the embodiment first illustrated in FIG. 67.
Figure 93:
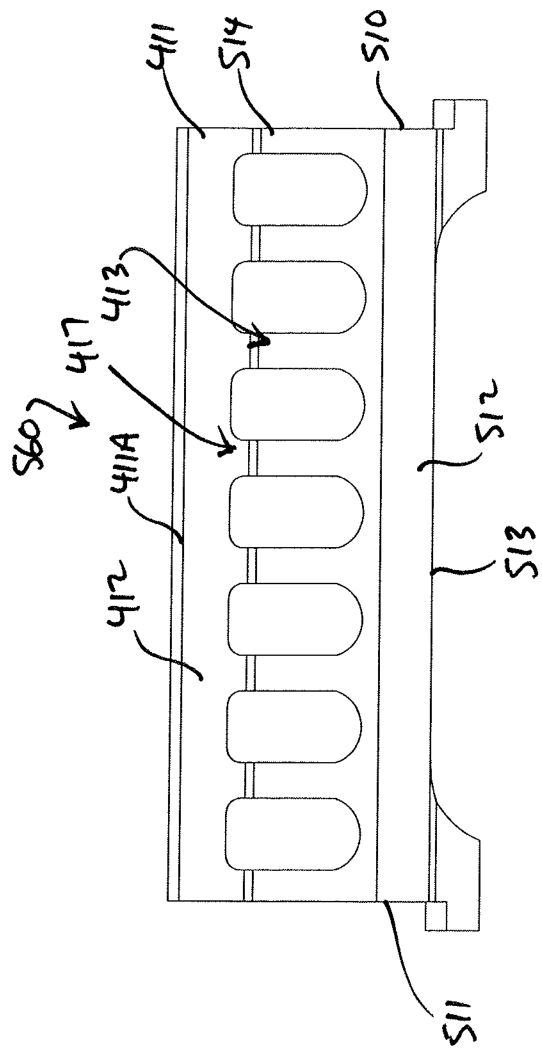
FIG. 93 is a top plan view of the embodiment of FIG. 92.
Figure 94:
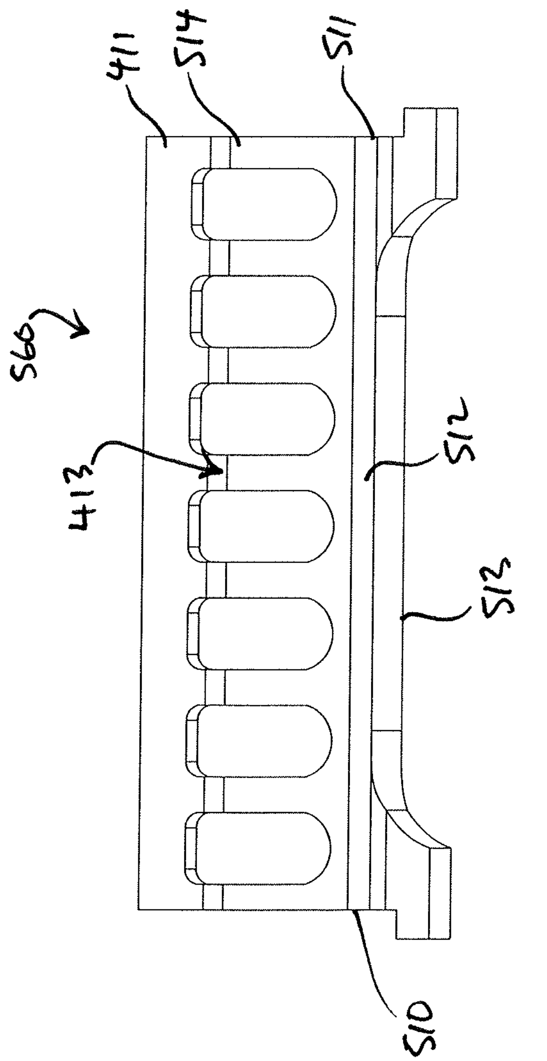
FIG. 94 is a bottom plan view of the embodiment of FIG. 92.
Figure 95:
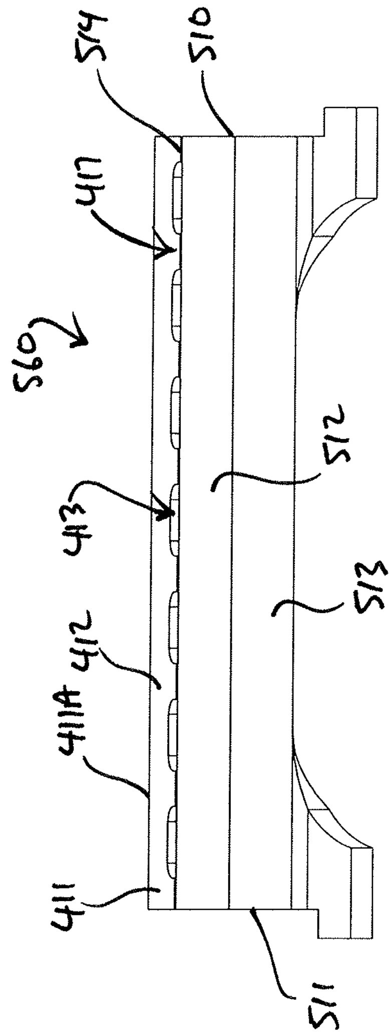
FIG. 95 is an end elevation view of the embodiment of FIG. 92.

FIG. 92 is a top perspective view of threshing bar 560 constructed and arranged in accordance with the invention, a plurality thereof being useful for forming a concave like the embodiment first illustrated in FIG. 67. FIG. 93 is a top plan view of the embodiment of FIG. 92, FIG. 94 is a bottom plan view of the embodiment of FIG. 92, and FIG. 95 is an end elevation view of the embodiment of FIG. 92. Like bars 405, bar 560 shares ends 510 and 511, corner segment 512, base segment 513, separating segment 514 including separating grate 413 and deflecting extremity 411 including deflecting surface 412 and threshing edge 411A, keys 521 and 522, and trough 417. In bar 560, grate 413 includes eight fingers 530 defining seven corresponding openings 532 that are somewhat larger than openings 532 of bars 405 for relating to larger grains and that are smaller than openings 532 of bar 550.

Figure 96:
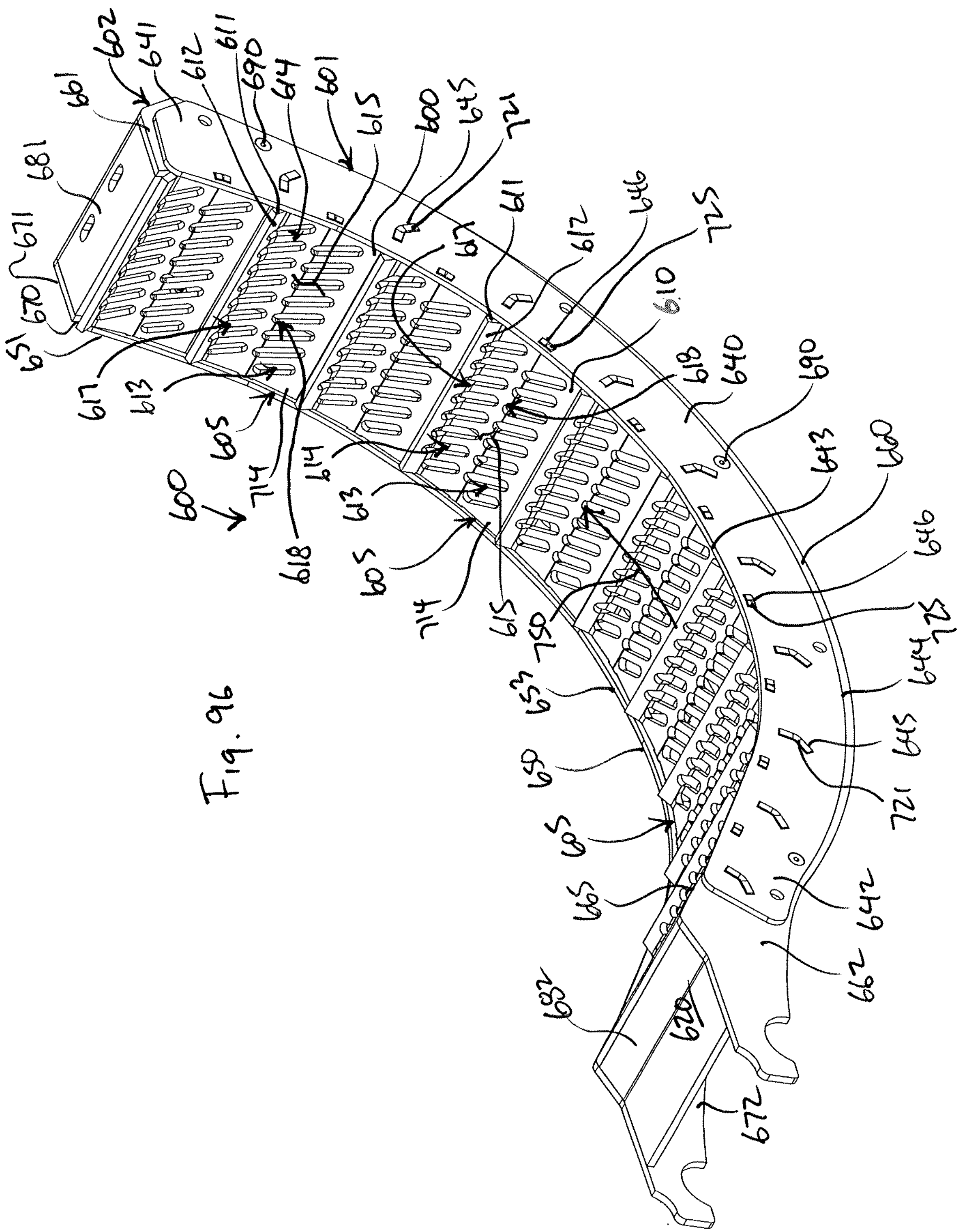
FIG. 96 is a left side perspective view of a concave constructed and arranged in accordance with the principle of the invention, the concave includes threshing bars carried by a base frame connected to a restraining frame and forming openings therebetween for grain to pass through, each threshing bar includes an inner extremity, a deflecting extremity including a deflecting surface, a plurality of separating grates extending across an adjacent one of the openings between the inner extremity and the deflecting extremity for separating grain from threshed crop material, the plurality of separating grates includes a first separating grate and a second separating grate, the first separating grate is between the inner extremity and the second separating grate, the second separating grate is between the first separating grate and the deflecting extremity, the deflecting surface projects angularly upward relative to the second separating grate, the second separating grate projects angularly upward relative to the first separating grate, the deflecting surface and the second separating grate are arranged at a first obtuse angle therebetween, and the second separating grate and the first separating grate are arranged at a second obtuse angle therebetween.
Figure 97:
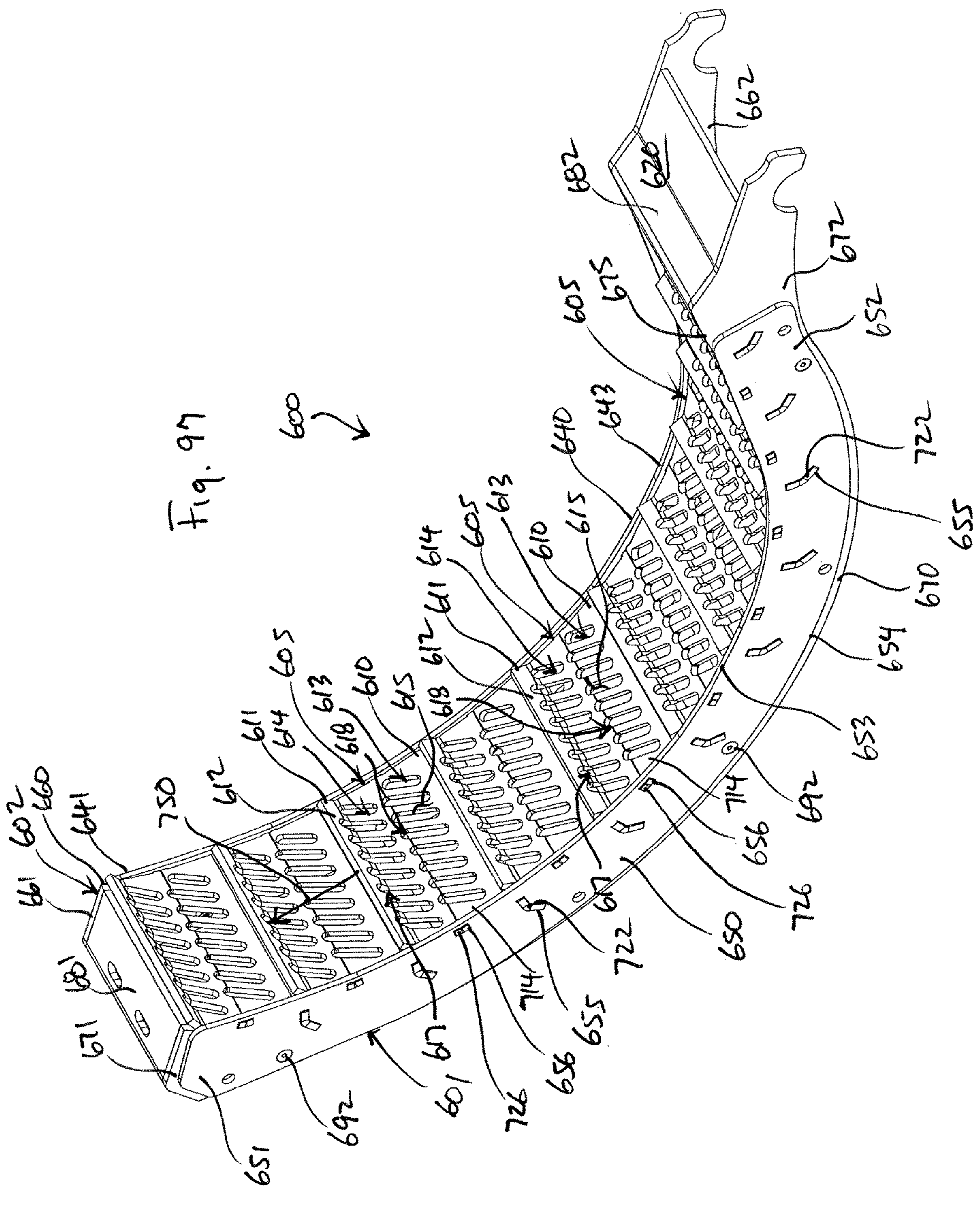
FIG. 97 is a right side perspective view of the embodiment of FIG. 96.
Figure 98:
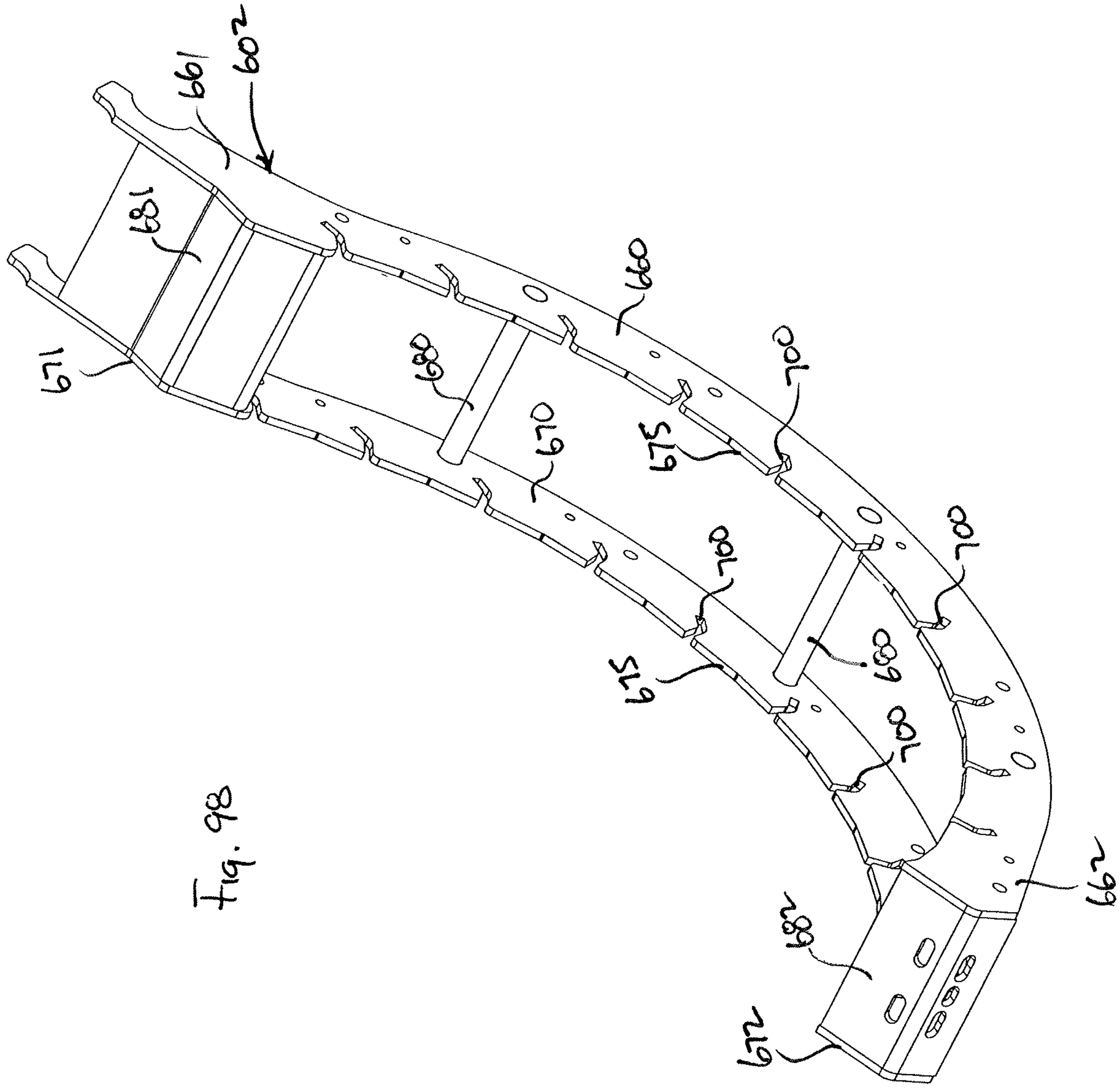
FIG. 98 is a left side perspective view of the base frame of the embodiment of FIG. 96.
Figure 99:
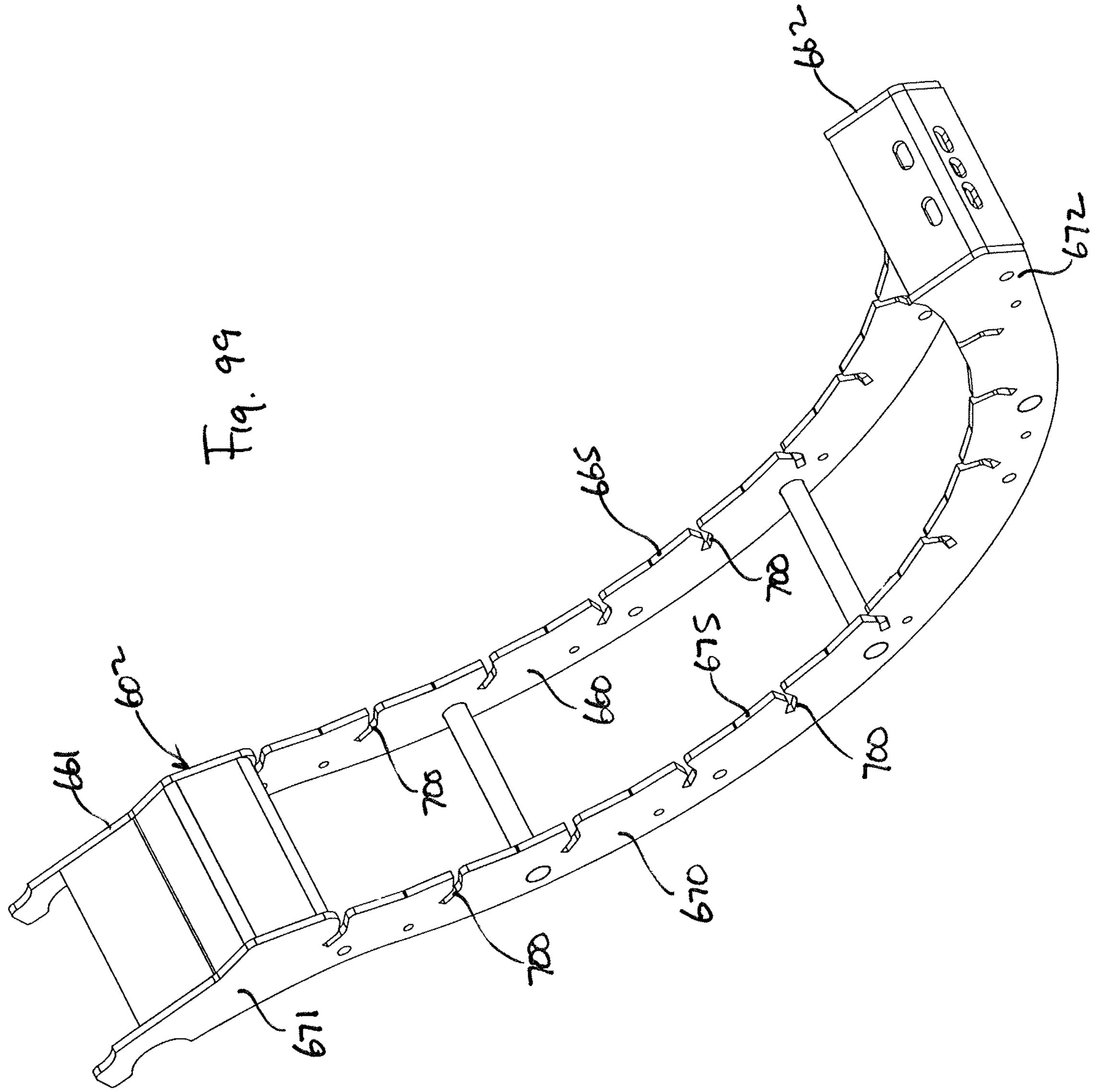
FIG. 99 is a right side elevation view of the embodiment of FIG. 98.

Attention is now directed to FIGS. 96 and 97 illustrating another embodiment of a concave 600 constructed and arranged in accordance with the principle of the invention. Concave 600 includes frame 601, frame 602, and threshing bars 605. Frame 601 is an outer or restraining frame. Frame 602 is an inner or base frame. In concave 600, threshing bars 605 are carried by frame 602, and frame 601 is juxtaposed to, and is additionally connected to, frame 602. Threshing bars 605 form openings 615 therebetween for grain to pass through. Threshing bars 605 each include inner extremity 610, outer deflecting extremity 611 including deflecting surface 612, and a plurality of separating grates extending across an adjacent one of openings 615 between inner extremity 610 and deflecting extremity 611 for separating grain from threshed crop material. The plurality of separating grates include separating grate 613 and separating grate 614. Separating grate 613 is between inner extremity 610 and separating grate 614. Separating grate 614 is between separating grate 613 and deflecting extremity 611. Deflecting surface 612 projects angularly upward relative to separating grate 614 between separating grate 613 and deflecting extremity 611 and into an upstream direction opposing the downstream direction of oncoming crop material to be threshed when driven by the rotor of the rotary processing unit. Separating grate 614 projects angularly upward relative to separating grate 613 between inner extremity 610 and separating grate 614. Deflecting surface 612 and separating grate 614 are arranged at a first obtuse angle therebetween. Separating grate 614 and separating grate 613 are arranged at an obtuse angle therebetween. The chosen angle of inclination of deflecting surface 612 is obtuse to the opposing downstream direction of the oncoming crop material, according to the principle of the invention. An engagement assembly non-destructively connects each threshing bar 605 to frame 602. Bars 605 are independently removably connected to frame 602 via the engagement assemblies enabling bars 605 to be selectively and independently attached to or otherwise installed on frame 602 in preparation for threshing and additionally detached or otherwise released from frame 602 for individual bar 605 repair or replacement.

Figure 110:
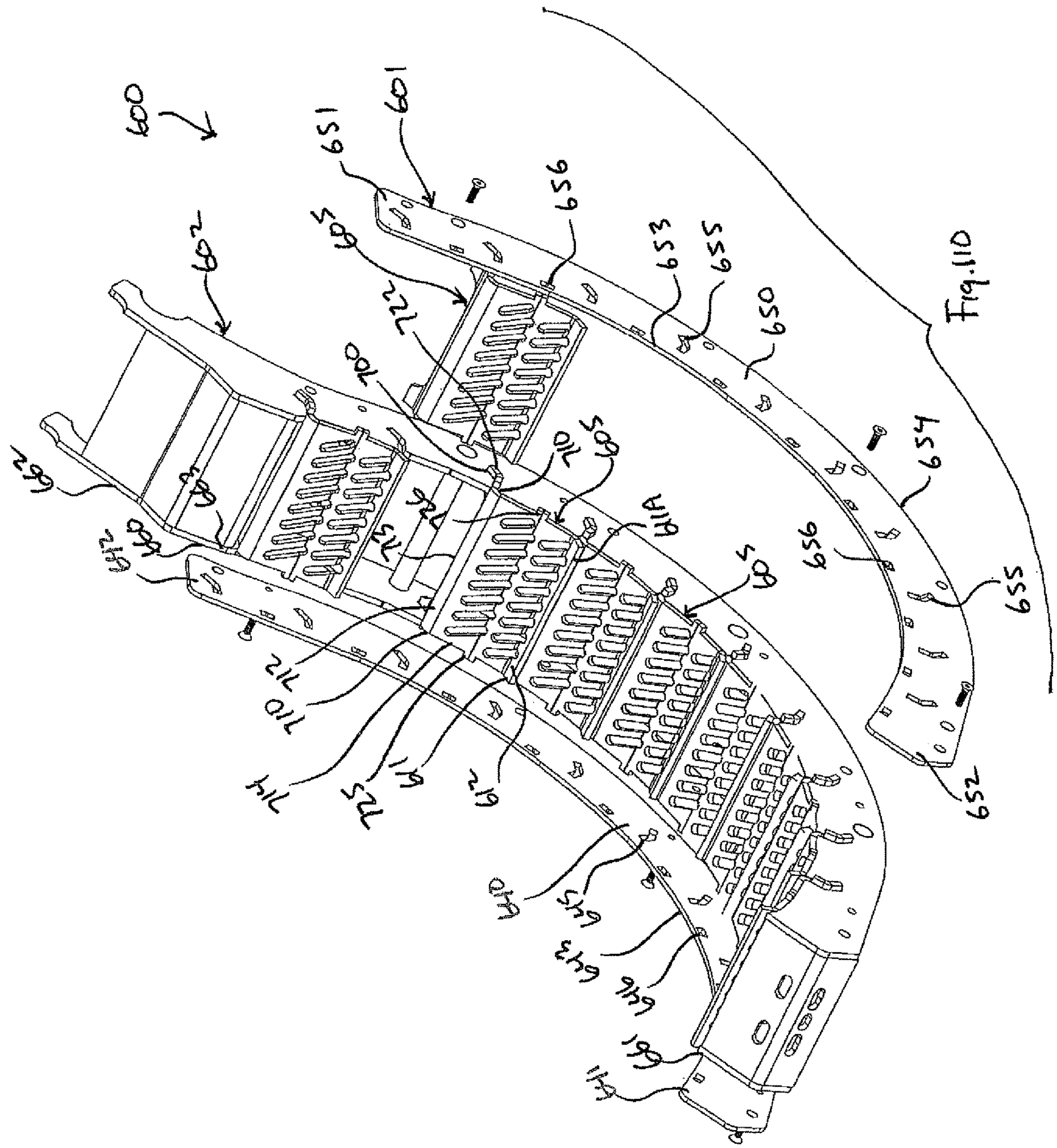
FIG. 110 is a perspective view corresponding to FIG. 96 illustrating the base frame, one of the threshing bars removed from the base frame, the remaining threshing bars installed on the base frame, and the restraining frame spaced apart from the base frame.

The engagement assemblies that non-destructively connect each of threshing bars 605 to frame 602 allow/enable the non-destructive removal of threshing bars 605 from frame 602, when frame 602 is spaced apart from frame 601, as in FIG. 110. Frame 601 restrains non-destructive removal of threshing bars 605 from frame 602 via the engagement assemblies that non-destructively connects each of threshing bars 605 to frame 602, when frame 601 is juxtaposed to frame 602 in FIGS. 96 and 97. Threshing bars 605 are non-destructively connected to frame 602 via the engagement assemblies, when frame 601 is spaced apart from frame 602, and when frame 601 is juxtaposed to frame 602. Frames 601 and 602, and bars 605 are made of the customary steel as is normal in the field of concaves. Threshing bars 605 are not affixed to frame 602 or to frame 601, such as by welding or other fixed or destructive connection as defined above in previously embodiments, and are independently removably connected to frame 602, which enables threshing bars 605 to be selectively detached, withdrawn, or otherwise released from frame 602 for repair or replacement and enabling frames 601 and 602 to be reused all without having to modify frames 601 and 602.

Frames 601 and 602 cooperate to form a frame assembly 620. Frames 601 and 602 are adjustable between a closed position in FIGS. 96 and 97, which defines the closed position of the frame assembly 620 and also concave 600 when threshing bars 605 are carried by frame 602, and an open position in FIG. 110, which defines the open position of the frame assembly 620 and also concave 600 when threshing bars 605 are carried by frame 602. In the closed position of the frame assembly 620 in FIGS. 96 and 97, when frame 601 is juxtaposed relative to frame 602, frame 601 interacts with threshing bars 605 removably connected to frame 602 to entrap threshing bars 605 between frames 601 and 602 and thereby hold and lock or otherwise secure threshing bars 605 in place to frame assembly 620. When frame 601 is juxtaposed relative to frame 602, frame 602 is, of course, juxtaposed relative to frame 601. The order of juxtaposing one frame relative to the other can be referred as either frame 601 juxtaposed relative to frame 602 or frame 602 juxtaposed relative to frame 601. In the open position of the frame assembly 620 in FIG. 100, when frame 601 is spaced apart from frame 602, threshing bars 605 are free from the influence of frame 601, which allows each of threshing bars 605 to be independently, readily and selectively removed, detached, or otherwise de-united or withdrawn from frame 602, such as for repair or replacement purposes, without modifying or altering frames 601 and 602.

Threshing bars 605 are not affixed to either frame 601 or frame 602, such as by welding or other fixed or destructive connection, both in the open position and in the closed position of the frame assembly 620. The assembly of threshing bars 605 and frames 601 and 602 is concave 600, or a concave section to which it may be referred. Accordingly, the engagement assemblies that non-destructively connect the respective threshing bars 605 to frame 602 enable/allow non-destructive independent removal of threshing bars 605 from frame 602, when frame 601 is spaced apart from frame 602, frame 601 disables/restrains non-destructive removal of threshing bars 605 from frame 602 via the engagement assemblies that non-destructively connects each of threshing bars 605 to frame 602, when frame 601 is juxtaposed to frame 602, and threshing bars 605 are non-destructively connected to frame 602 via the engagement assemblies, when frame 601 is spaced apart from frame 602 in FIG. 100 and when frame 601 is juxtaposed to frame 602 in FIGS. 96 and 97.

Referencing FIGS. 98-101 in relevant part, the outer or restraining frame 601 includes members 640 and 650. Members 640 and 650 are end members and are substantially identical and coextensive. Members 640 and 650 are thin and elongate and, in concave 600, are axially spaced from one another and extend parallel to one another, and are curved to extend circumferentially about a portion of the rotor of the rotary processing unit. Given that members 640 and 650 are end members and are curved, they may be referred to as either curved members, or curved end members.

Curved end member 640 has opposite ends 642 and 642, upper edge 643, lower edge 644, keyways 645, and keyways 646. Upper edge 643 and lower edge 644 concurrently extend from end 642 to end 642. Each keyway 645 is a through-hole formed through the middle thickness of member 640 between upper edge 643 and lower edge 644. Keyways 645 are equally spaced apart longitudinally from end 641 to end 642. Each keyway 646 is a through-hole formed through the thickness of member 640 adjacent to upper edge 643. Keyways 646 are equally spaced apart longitudinally from end 641 to end 642.

Curved end member 650 has opposite ends 651 and 652, upper edge 653, lower edge 654, keyways 655, and keyways 656. Upper edge 653 and lower edge 654 concurrently extend from end 651 to end 652. Each keyway 655 is a through-hole formed through the middle thickness of member 650 between upper edge 653 and lower edge 654. Keyways 655 are equally spaced apart longitudinally from end 651 to end 652. Each keyway 656 is a through-hole formed through the thickness of member 650 adjacent to upper 653. Keyways 656 are equally spaced apart longitudinally from end 651 to end 652.

Keyways 645 and 655 are identical in size and in shape, and are equal in number, there being ten keyways 645 and ten keyways 655, and less or more keyways 645 and 655 can be provided in alternative embodiments depending on the number of bars 605 and as long as keyways 645 are equal in number to keyways 655. The longitudinal spacing of keyways 645 between end 641 and 642 is identical to the longitudinal spacing of keyways 655 between end 651 and end 652, which results in keyways 645 and keyways 655 being axially aligned when frame 601 is in its closed position relative to frame 602, when frames 601 and 602 that form the frame assembly 620 of concave 600 are closed. Keyways 645 and 655 are each generally V-shaped in this example, being not round.

Keyways 646 and 656 are identical in size and in shape, and are equal in number, there being ten keyways 646 and ten keyways 656, and less or more keyways 646 and 656 can be provided in alternative embodiments depending on the number of bars 605 and as long as keyways 646 are equal in number to keyways 656. The longitudinal spacing of keyways 646 between end 641 and 642 is identical to the longitudinal spacing of keyways 656 between end 651 and end 652, which results in keyways 646 and keyways 656 being axially aligned when frame 601 is in its closed position relative to frame 602, when frames 601 and 602 that form the frame assembly 620 of concave 600 are closed. Keyways 645 and 655 are each generally square in shape in this example, being not round.

Frame 602, the inner or base frame of concave 600, includes members 660 and 670. Members 660 and 670 are substantially identical and coextensive. Members 660 and 670 are thin and elongate and are axially spaced from one another. Members 660 and 670 extend parallel relative to each other, and relative to members 640 and 650 in concave 600. Members 660 and 670 are curved like that of end members 640 and 650 to similarly extend circumferentially about a portion of the rotor of the rotary processing unit. Given that members 660 and 670 are end members and are curved, they may be referred to as either curved members, or curved end members. Members 640, 650, 660, and 670 have matching curvatures.

Curved end member 660 has opposed ends 661 and 662, and curved end member 670 has opposed ends 671 and 672. Spaced-apart, elongate, and parallel struts 680, three this example shown in FIGS. 69, 70, and 72, connect member 660 to member 670, imparting rigidity and ruggedness to frame 601. The opposite ends of struts 680 are preferably welded to the respective members 660 and 670, being rigidly affixed to the respective members 660 and 670. Transverse support member 681 at a downstream end of concave 600 extends between and is rigidly affixed to ends 661 and 671 of curved members 660 and 670 via welding, and transverse support member 682 at an upstream end of concave 600 extends between and is joined to ends 662 and 672 of curved end members 660 and 670 via welding. Transverse support members 681 and 682 are elongate caps.

Figure 100:
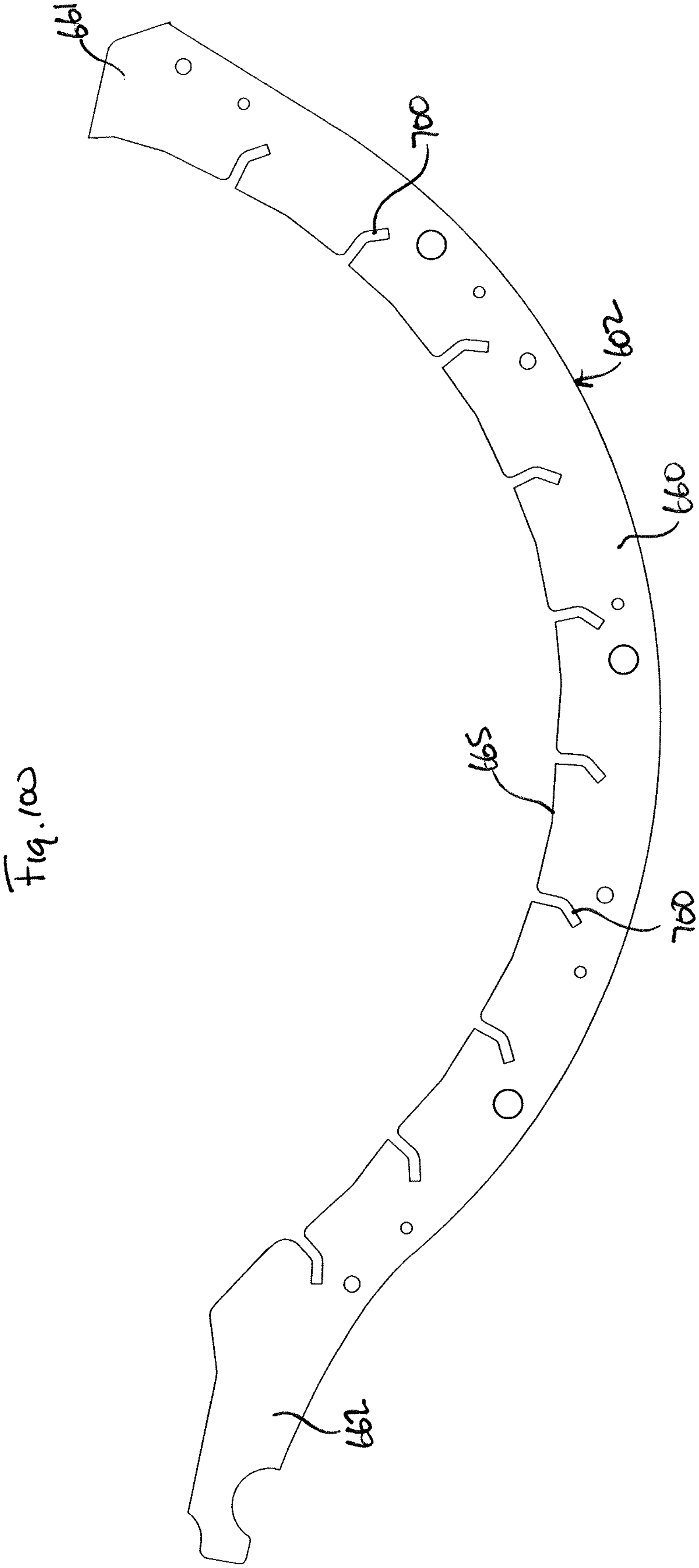
FIG. 100 is a left side elevation view of the embodiment of FIG. 98.
Figure 101:
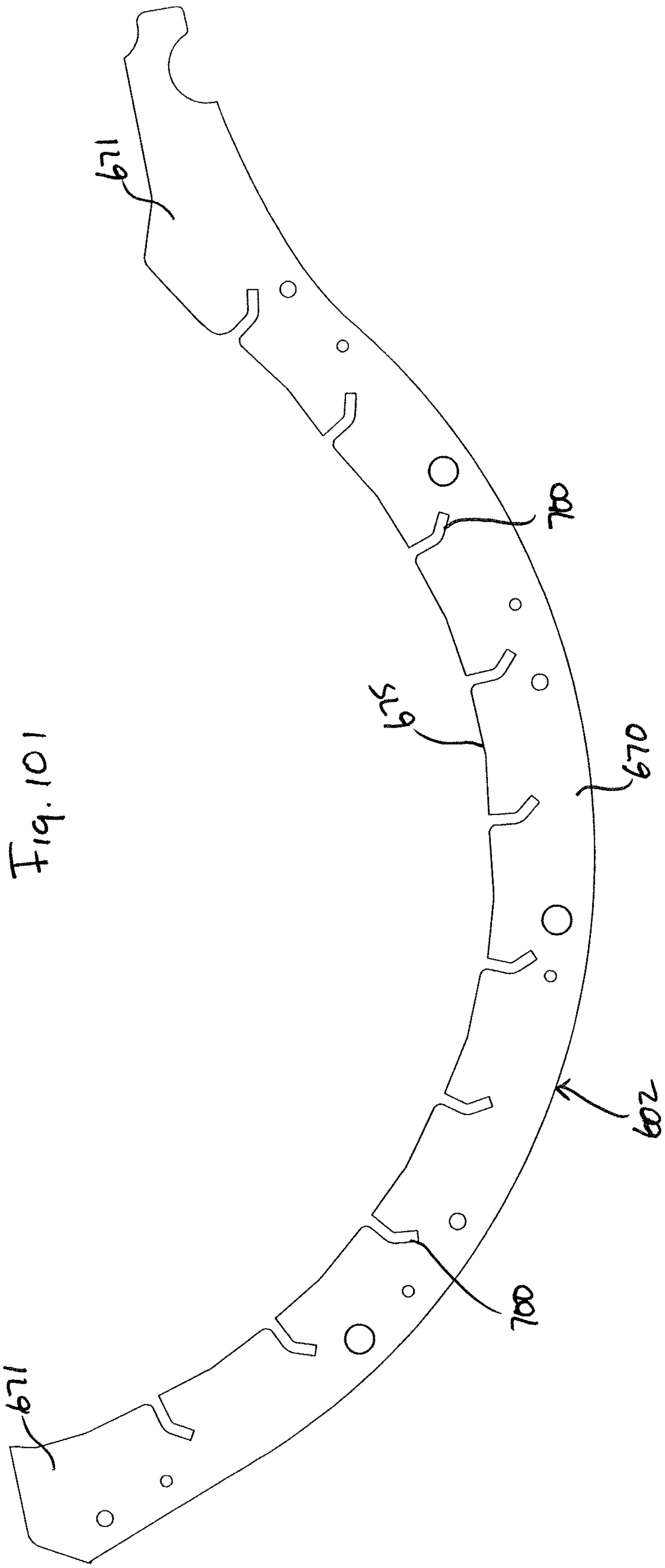
FIG. 101 is a right side elevation view of the embodiment of FIG. 98.

Frames 601 and 602 are adjustable between the closed position in FIGS. 96 and 97 defining the closed position of frame assembly 620, and the open position in FIG. 100 defining the open position of frame assembly 620. Frames 601 and 602 are axially aligned, and keyways 645 and 655 are axially aligned, in the closed position of frame assembly 620. Frame 601 is juxtaposed to frame 602, when frames 601 and 602 are in the closed position defining the closed position of frame assembly 620. Frame 602 is spaced apart from frame 602, when frames 601 and 602 are in the open position defining the open position of frame assembly 620 in FIG. 100.

When frames 601 and 602 are in the closed position in FIGS. 96 and 97, curved end member 640 is juxtaposed along, and is in direct contact against, the outer side of curved end member 660, curved end member 650 is juxtaposed along, and is in direct contact against, the outer side of curved end member 670, curved end member 640 extends along the length of curved end member 660 from end 642 juxtaposed to end 661 at the downstream end of concave 600 to end 642 juxtaposed to end 662 at the upstream end of concave 600, and curved end member 650 extends along the length of curved end member 670 from end 651 juxtaposed to end 671 at the downstream end of concave 600 to end 652 juxtaposed to end 672 at the upstream end of concave. Accordingly, in the closed position of frames 601 and 602, frame 602, the base frame of concave 600, is within frame 601, the restraining frame of concave 600, curved end member 660 extends parallel to and is axially juxtaposed along and is in direct contact with the inner side of curved end member 640 that in turn extends parallel to and is axially juxtaposed along the outer side of curved end member 660, curved end member 670 extends parallel to and is axially juxtaposed along and is in direct contact with the inner side of curved end member 650 that in turn extends parallel to and is axially juxtaposed along the outer side of curved end member 670, curved end member 660 extends concurrently along the length of curved end member 640 of frame 601 from end 661 juxtaposed to end 642 at the downstream end of concave 600 to end 662 juxtaposed to end 642 at the upstream end of concave 600, and curved end member 670 extends concurrently along the length of curved end member 650 of frame 601 from end 671 juxtaposed to end 651 at the downstream end of concave 600 to end 672 juxtaposed to end 652 at the upstream end of concave 600. In the assembly of concave 600, when frames 601 and 602 are in the closed position, curved end member 640 is releasably connected to curved end member 660, and curved end member 650 is releasably connected to curved end member 670.

Fasteners are used to removably connect frame 602 to frame 601, when frames 601 and 602 are in the closed position. Specifically, end members 640 and 660 are releasably connected to each other with longitudinally spaced fasteners, here in the form of nut-and-bolt assemblies 690 applied through appropriate holes therein, and end members 650 and 670 are releasably connected to each other with longitudinally spaced fasteners, here in the form of nut-and-bolt assemblies 692 applied through appropriate holes therein.

Referring in relevant part to FIGS. 98-101, curved end members 660 and 670 of frame 602 have top edges 465 and 675, respectively, and slots 700. Top edges 465 and 675 reside along a common curved plane or surface to extend circumferentially about a portion of the rotor of a rotary processing unit. Slots 700 are spaced apart from one another longitudinally along the lengths of the respective curved end members 660 and 670, between ends 661 and 662 of curved end member 660 and between ends 671 and 672 of curved end member 670. Slots 700 are formed through the thickness of curved end members 660 and 670 in the upper portions of each of the curved end members 660 and 670 and are open at top edges 465 and 675 and extend downwardly from top edges 465 and 675. Spaced apart slots 700 formed in curved end member 660 correspond, respectively, being axially aligned with, the spaced apart slots 700 formed in curved end member 670. Each one of angle slots 700 has an angle profile, a generally S-shaped angle profile in this example. Accordingly, slots 700 are angle slots. Slots 700 are identical in size and shape, wherein the angle profile of slots 700 is identical.

Figure 106:
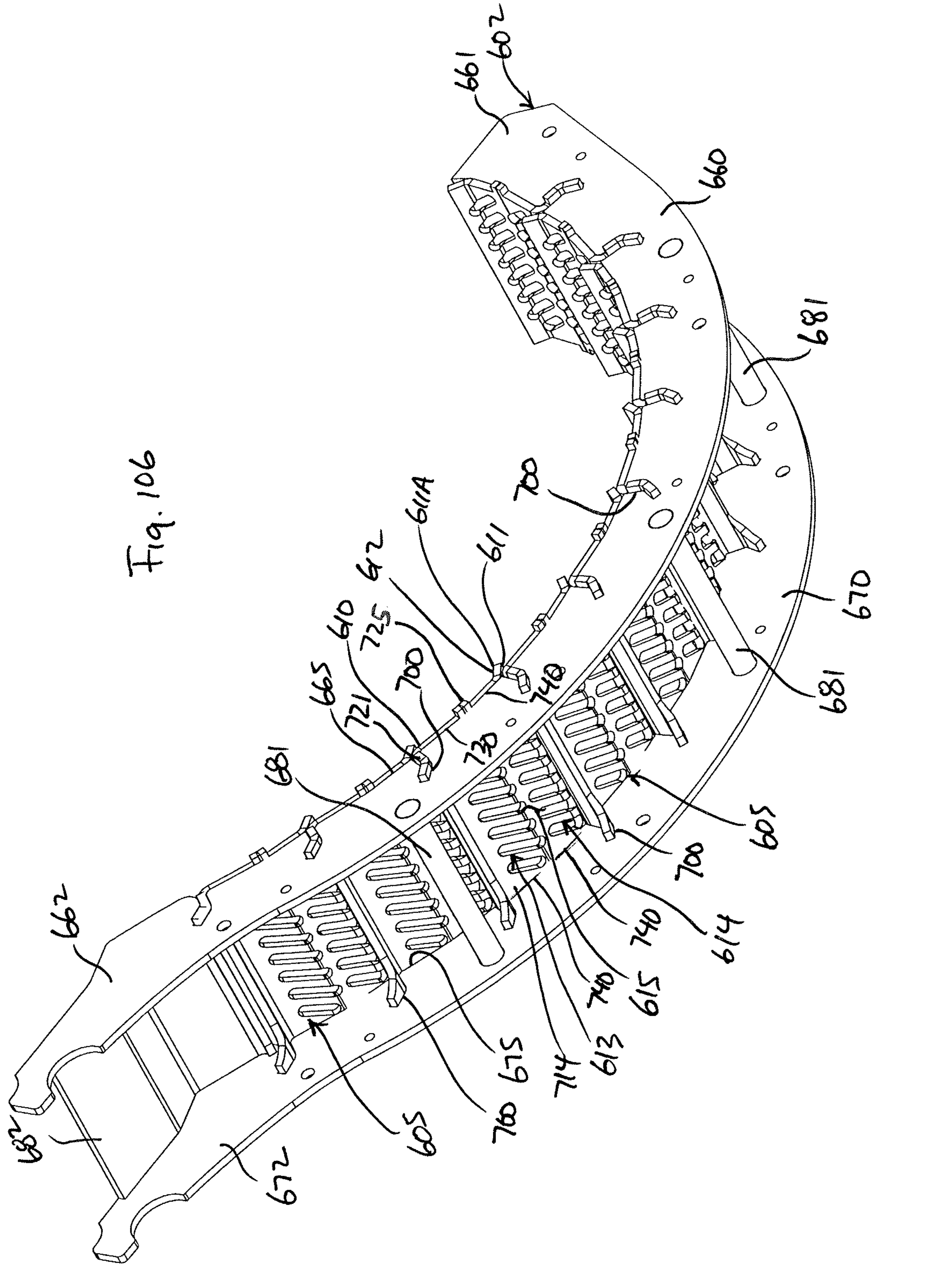
FIG. 106 is a perspective view of the threshing bars and the base frame of the embodiment of FIG. 96, the threshing bars shown as they would appear installed on the base frame.

In FIGS. 96, 97, and 106, frame 602 carries threshing bars 605, which forms a concave or concave section. Threshing bars 605, which can be referred to simply as bars, are identical, are set one adjacent to another and are parallel relative to each other from transverse support member 681 at the downstream end of concave 600 to transverse support member 682 at the upstream end of concave 600, and extend axially between curved end members 660 and 670.

Referring in relevant part to FIGS. 102-105, each threshing bar 605 has opposite ends 710 and 711 and is straight in longitudinal extent from end 710 to end 711. Bar 605, an angle member, has an angle profile from end 710 to end 711. The angle profile of bar 605 is the same from end 710 to end 711, and is characterized by corner segment 712, base segment 713, and separating segment 714, which includes separating grates 613 and 614 and deflecting extremity 611. Corner segment 713 defines inner extremity 610 of bar 605. Separating grates 613 and 614 are between inner extremity 610 and deflecting extremity 611. Separating grate 613 is between inner extremity 610 and separating grate 614. Separating grate 614 is between separating grate 613 of deflecting extremity 611.

Corner segment 712, base segment 713, and separating segment 714 are straight in longitudinal extent from end 710 to end 711. Base segment 713 extends downwardly from corner segment 712 to lower end 720 that extends from key 721 formed in end 710 of base segment 713 to key 722 formed in end 711 of base segment 713. Keys 721 and 722 each correspond to each of keyways 645 and each of keyways 655, being identical in size and shape and being generally V-shaped in this example, being not round, to correspond with the corresponding shape of each of keyways 645 and each of keyways 655. Additional keys 725 and 726 are formed in ends 610 and 611, respectively of bar 605 at intermediate locations of separating segment 614 between inner extremity 610 and deflecting extremity 611. Keys 725 and 726 project outwardly from either side of separating segment 714 and each correspond to each of keyways 646 and each of keyways 656, being identical in size and shape and being generally square in shape this example, being not round, to correspond with the corresponding shape of each of keyways 646 and each of keyways 656.

Figure 104:
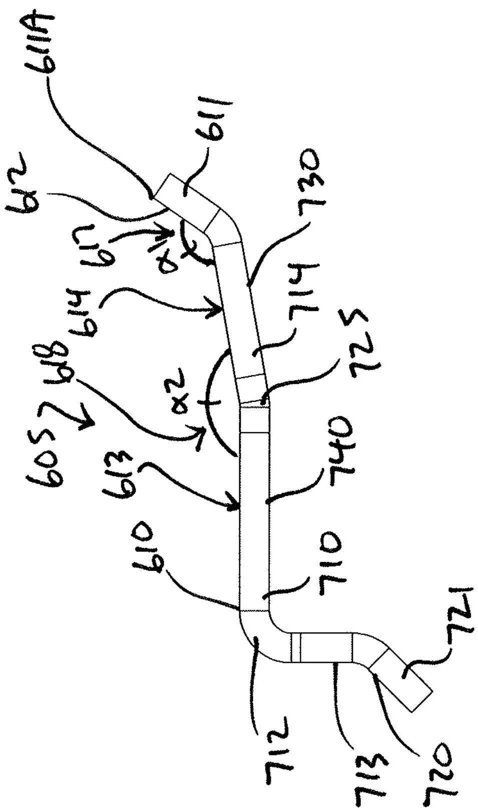
FIG. 104 is a side elevation view of the embodiment of FIG. 102, the opposite side elevation view being the same thereof.
Figure 105:
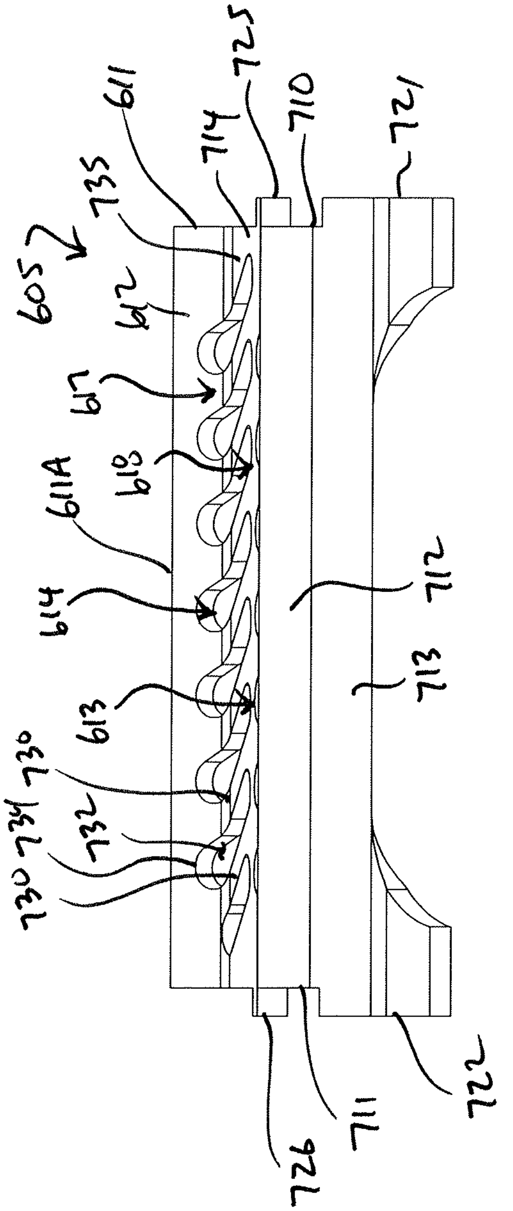
FIG. 105 is an end elevation view of the embodiment of FIG. 102.

In FIG. 104, end 710 of base segment 713 is generally S-shaped from corner segment 712 to lower end 720 when bar 605 is viewed from end 710, in which base segment 713 has a generally S-shaped angle profile from corner segment 712 to lower end 720. The angle profile of end 711 of base segment 713 from corner segment 712 to lower end 720 is the mirror image of the angle profile of end 710 of base segment 713 from corner segment 712 to lower end 720, in which end 711 of base segment 713 is generally reverse S-shaped from corner segment 712 to lower end 720 when bar 605 is viewed from end 711. Base segment 713 and separating segment 714 are generally perpendicular relative to one another, defining a 90-degree angle therebetween at corner segment 712. Base segment 713 and corner segment 712, including inner extremity 610, extend along the length of bar 605 between ends 710 and 711. Corner segment 712 and separating segment 714 formed with grates 613 and 614 and deflecting extremity 611 including deflecting surface 612 all concurrently extend along the length of bar 605 between ends 710 and 711 and define the threshing and separating component of bar 605.

Corner segment 712 defines inner extremity 610 of bar 605. Separating segment 714 is at the upper end of bar 605, and extends horizontally from inner extremity 610 of corner segment 712 to deflecting extremity 611 that terminates distally at threshing edge 611A of deflecting extremity 611. Separating grate 613 is between inner extremity 610 and separating grate 614. Separating grate 614 is between separating grate 613 and deflecting extremity 611. Deflecting extremity 611 and deflecting surface 612 of deflecting extremity 611 are concurrently angled upwardly relative to separating grate 614 between separating grate 613 and deflecting extremity 611. Deflecting extremity 611 and deflecting surface 612 concurrently project angularly upwardly from separating grate 614 between separating grate 613 and deflecting extremity 611 to threshing edge 611A, and separating grate 614 projects angularly upward relative to separating grate 613. Preferably, deflecting surface 612 projects angularly upward to threshing edge 611A relative to separating grate 614 between separating grate 613 and deflecting extremity 611. Deflecting surface 612 and separating grate 614 are arranged at obtuse angle α1 denoted in FIG. 104. Separating grate 614 projects angularly upward to deflecting extremity 611 relative to separating grate 613. Separating grate 614 and separating grate 613 are arranged at obtuse angle α2 denoted in FIG. 104. Obtuse angle α1 is different from obtuse angle α2.

Obtuse angle α1, an angle that that is greater than 90 degrees and less than 180 degrees, is from 125 degrees to 145 degrees in this example and, in a particular embodiment, is optimally 135 degrees. Obtuse angle α1 between deflecting surface 612 and separating grate 614 form pocket or trough 417 that extends along the length of bar 605 from end 710 to end 711, according to the principle of the invention. Trough 617, a shallow channel, is a grain receiving and holding trough, according to the principle of the invention. Separating grate 614 extends across trough 617 for enabling grain to fall therethrough and drain away from trough 617.

Obtuse angle α2, an angle that that is greater than 90 degrees and less than 180 degrees, is from 155 degrees to 175 degrees in this example and, in a particular embodiment, is optimally 165 degrees. Obtuse angle α2 between separating grate 613 and separating grate 614 form pocket or trough 618 that extends along the length of bar 605 from end 710 to end 711, according to the principle of the invention. Trough 618, a shallow channel, is a grain receiving and holding trough, according to the principle of the invention. Separating grate 614 extends across trough 618 for enabling grain to fall therethrough and drain away from trough 618. Troughs 617 and 618 are formed in bar 605, and not by adjacent bars 605, and are parallel relative to each other.

Figure 102:
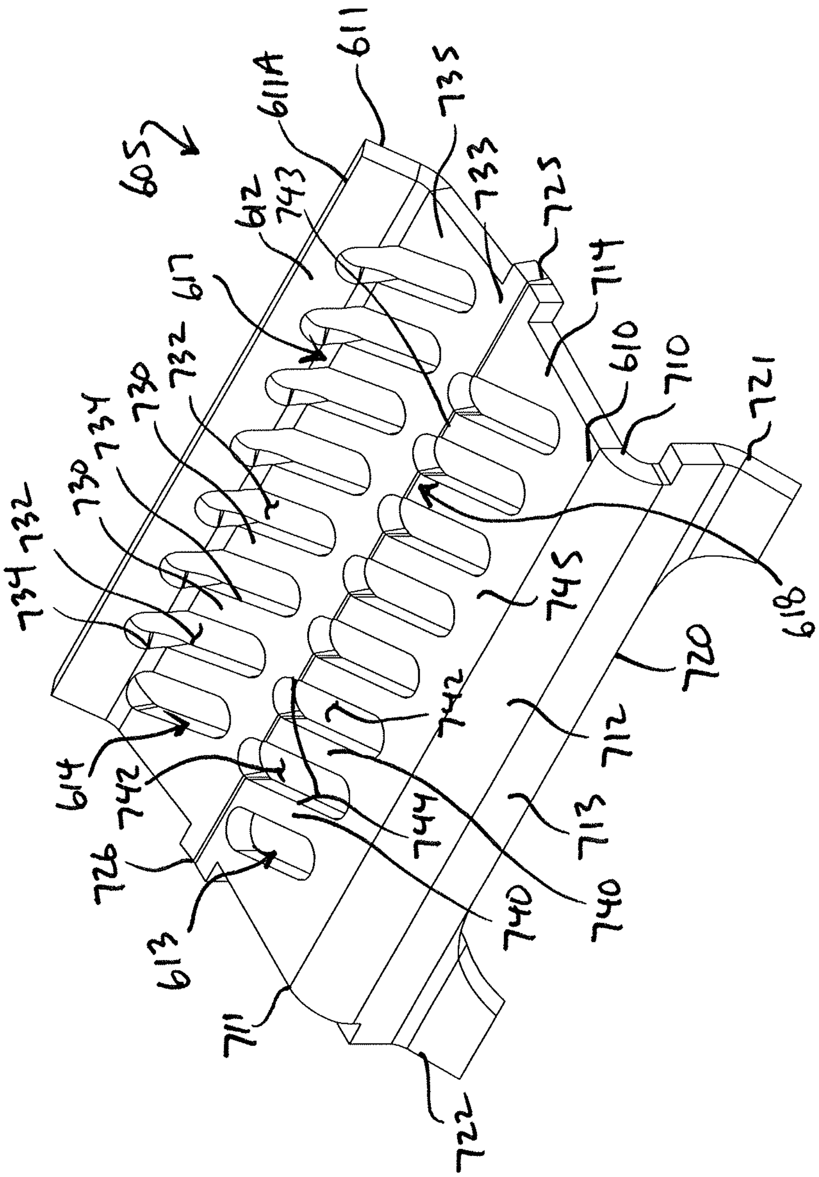
FIG. 102 is perspective view of one of the threshing bars of the embodiment of FIG. 96.
Figure 103:
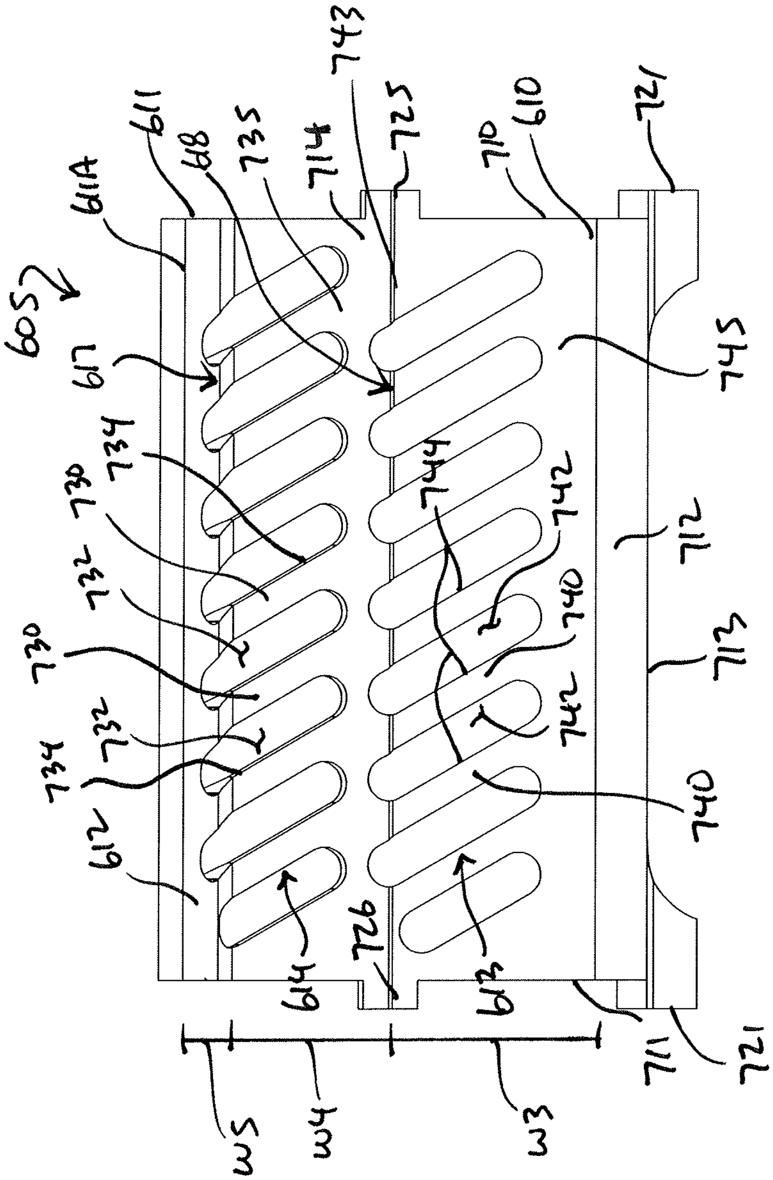
FIG. 103 is a top plan view of the embodiment of FIG. 102.

In FIGS. 102 and 103, part of separating grate 614 is formed in deflecting extremity 611 and across trough 617. Deflecting surface 612 is between the part of separating grate 614 formed in deflecting extremity 611 and threshing edge 611A of deflecting extremity 611, and extends along the length of bar 605 from end 710 to end 711. In FIG. 103, separating grate 613 has width W3 between inner extremity 610 and separating grate 614, separating grate 614 has width W4 between separating grate 613 and deflecting extremity 611, and deflecting extremity 611 has width W5 between separating grate 614 and threshing edge 611A. Width W4 of separating grate 614 is greater than width W5 of deflecting extremity 611, and width W3 of separating grate 613 is greater, slightly greater in this example, than width W4 of separating grate 614. Widths W3 and W4 are greater than width W5 to enable separating grates 613 and 614 to aggressively separate grain from threshed crop material.

Separating grate 613 and separating grate 614 are separate from one another. Separating grate 614 includes axially-aligned parallel fingers 730 that extend outwardly from inner extremity of separating grate 614 proximate to separating grate 613 to deflecting extremity 611 and further across trough 617 and along a portion deflecting extremity 611 inboard of outer edge 611A that interconnects the outer ends of fingers 730 and that extends from end 710 to end 711. Accordingly, part of separating grate 614 is formed across trough 617 and in deflecting extremity 611. Fingers 730 are axially spaced apart forming openings 732 therebetween that extend from inner extremity 533 to and across trough 617 through a portion of deflecting extremity 611 inboard of outer edge 611A. Each opening 732 is defined between adjacent fingers 730 and is closed proximally by inner extremity 533 and distally by deflecting extremity 611. Fingers 730 are equally spaced apart, and there are thirteen openings 732 in this bar 605 embodiment, in which twelve of openings 732 end into and are formed additionally through part of deflecting extremity 611. Openings 732, each of which is encircled by adjacent fingers 730, inner extremity 533, and deflecting extremity 611, are for grain to pass through. The continuous edge 734 to each opening 732 at uppermost surface 735 of separating grate 614 and deflecting surface 612, which is a part of uppermost surface 735 of bar 605, that face the rotary processing unit when concave 600 is installed in an agricultural combine is a continuous threshing edge of separating grate 614.

Separating grate 613 includes axially-aligned parallel fingers 740 that extend outwardly from inner extremity 610 to outer extremity 743 of separating grate 613. Part of separating grate 613 is formed across trough 618 and in separating grate 614. Fingers 740 are axially spaced apart forming openings 742 therebetween that extend from inner extremity 610 to outer extremity 743. Each opening 742 is defined between adjacent fingers 740 and is closed proximally by inner extremity 610 and distally by outer extremity 743. Fingers 740 are equally spaced apart, and there are seven openings 742 in this bar 605 embodiment. Openings 742, each of which is encircled by adjacent fingers 740, inner extremity 610, and outer extremity 743, are for grain to pass through. The continuous edge 744 to each opening 742 at uppermost surface 735 of bar 605 that face the rotary processing unit when concave 600 is installed in an agricultural combine is a continuous threshing edge of grate 613.

Bar 605 is formed from a piece of flat stock cut with separating grates 613 and 614, which is bent to shape to form the described angle profile. Each of the angle slots 700 of members 660 and 670 of frame 602, in FIGS. 100 and 101, has an angle profile that corresponds to the angle profile of each of the opposite ends 710 and 711, respectively, of base segment 713 of each one of the bars 605, in accordance with the principle of the invention.

Figures 107, 108:
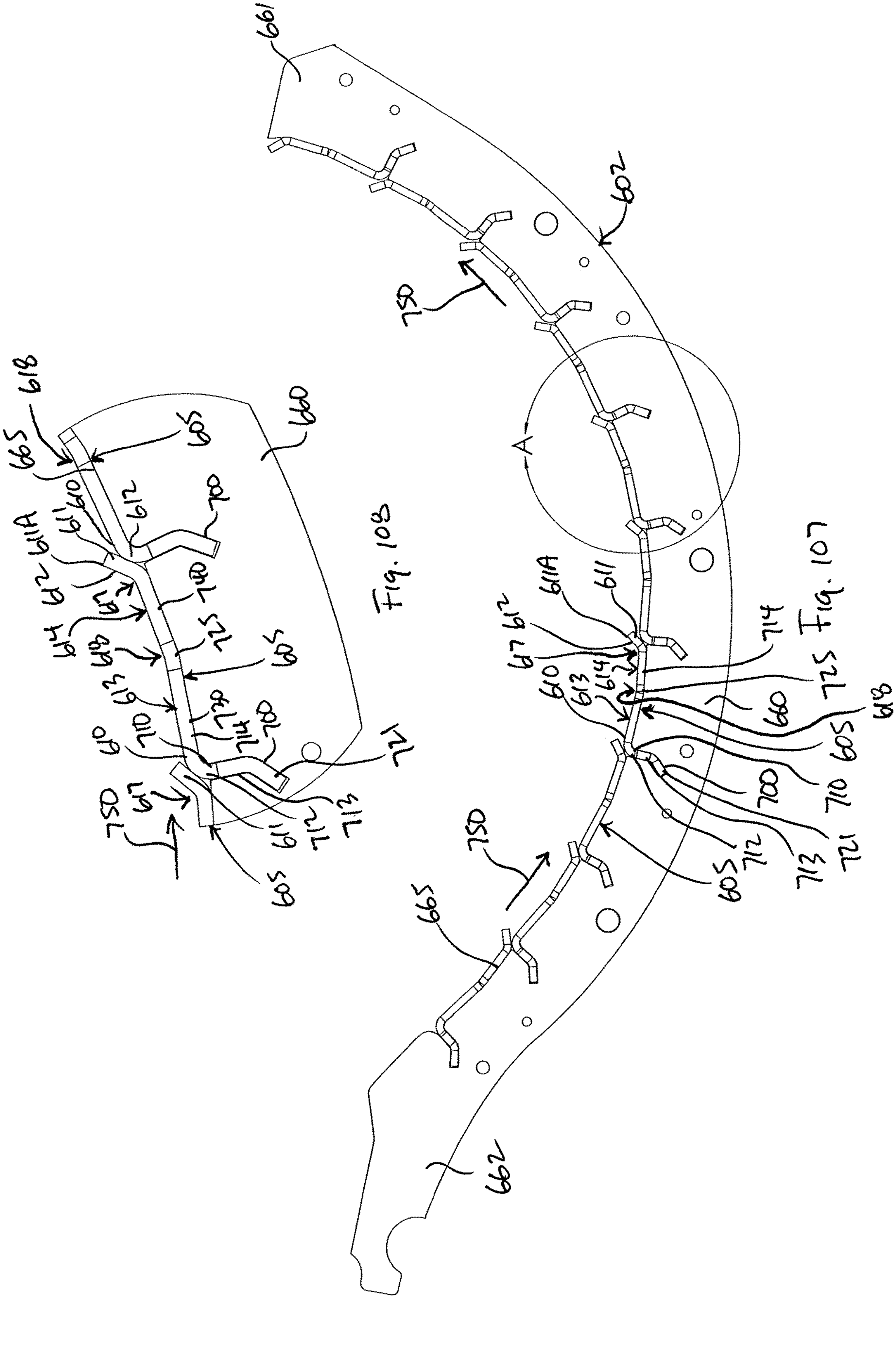
FIG. 107 is a left side elevation view of the embodiment of FIG. 106, the opposite right side elevation view being the same thereof.
FIGS. 108 and 109 are enlarged, fragmentary side elevation views corresponding to FIG. 107 illustrating a tongue-and-groove engagement between either side of threshing bar and the base frame.
Figure 109:
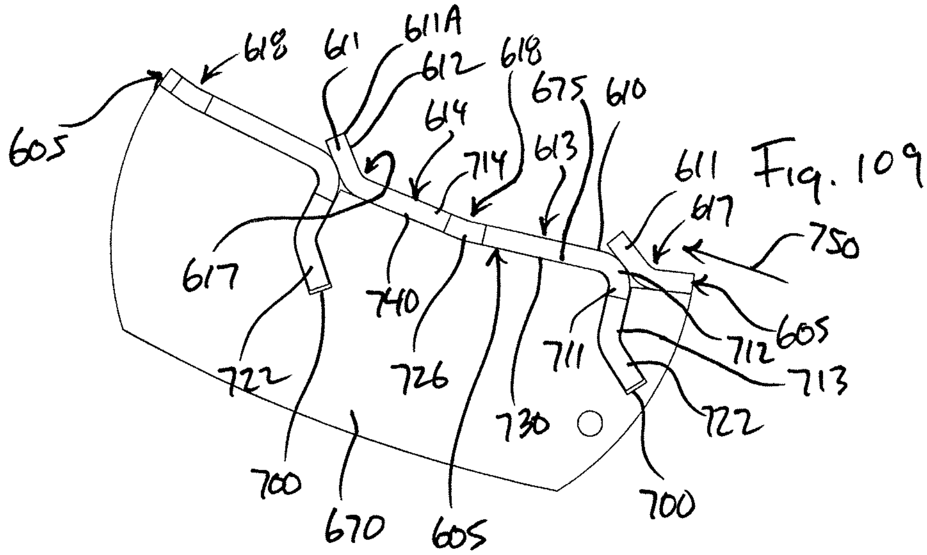

Referring in relevant part to FIGS. 107, 108, and 109, the opposite ends 710 and 711 of the base segment 713 of each of bars 605 are tongues and are non-destructively and removably held in corresponding, axially-aligned angle slots 700 of curved end members 660 and 670. Accordingly, an engagement assembly, a non-destructive removable connection, non-destructively connects each of bars 605 to frame 602, in which each engagement assembly includes engagement elements carried by each of threshing bars 605 and corresponding complemental engagement elements carried by frame 602, wherein the engagement elements of each bar are ends 710 and 711, tongues, and the complemental engagement elements for each bar 605 are a pair of axially-aligned slots 700 of members 660 and 670, respectively. The angle profiles of angle slots 700 and the opposite ends 710 and 711 of the base segments 713 of the bars 605 correspond enabling slots 700 to accept ends 710 and 711 and disabling axial rotation of each of the bars 605 relative to frame 602. The angle profile of slots 700 of member 660 when viewed from the side of frame 602 defined by member 660 in FIG.

108 is generally S-shaped to correspond to the angle profiles of ends 710 of bars 605, and the angle profile of slots 700 of member 670 when viewed from the opposed side of frame 602 defined by member 670 in FIG. 109 is generally reverse S-shaped to correspond to the angle profiles of ends 711 of bars 605. Referring in relevant part to FIGS. 108 and 109, ends 710 and 711 of base member 33 of each bar 605 extends downwardly from corner segment 712 through the corresponding axially-aligned angle slots 700 of members 660 and 670, respectively. Given the shapes of ends 710 and 711 and the corresponding shapes slots 700 of members 660 and 670, ends 710 and 711 of the base sections 713 extend downwardly through and follow the corresponding slots 700 in members 660 and 670, extending downwardly along an upper pitch as shown and then extending angularly along a lower pitch relative to the upper pitch in the direction of the upstream end of concave 600.

In FIG. 106, the opposite ends 710 and 711 of the base segment 713 of each of bars 605 are non-destructively and removably held in corresponding, axially-aligned angle slots 700 of curved end members 660 and 670, bars 605 extend between curved end members 660 and 670, from curved end member 660 to curved end member 670, are parallel relative to one another and to transverse support members 681 and 682, are perpendicular relative to members 660 and 670, and are spaced from one another and extend axially between curved end members 660 and 670 forming openings 615 between adjacent corner segments 712 for grain to pass through. Base segment 713 of each bar depends downwardly from corner segment 712 of each one of the bars 605 in FIG. 70, each corner segment 712 is adjacent or otherwise proximate to the top edges 465 and 675 of the respective curved end members 660 and 670, and each separating segment 714 extends over top edges 465 and 675 and across an adjacent opening 615 from the corner segment 712 thereof to outer deflecting extremity 611 at the corner segment 712 of an adjacent bar 605. The outermost fingers 730 and 740 of each separating segment 714 rest in direct contact against top edges 465 and 675, respectively, of members 660 and 670.

The separating segment 714 of each bar 605 is adjacent to and above the top edges 465 and 675 of the respective curved end members 660 and 670 and extends across an adjacent one of the openings 615 over top edges 465 and 675 of the respective curved end members 660 and 670 in the direction of the downstream end of concave 600 to outer deflecting extremity 611 at corner segment 712 of an adjacent bar 605. More specifically, separating grates 613 and 614 of each bar 605 between inner extremity 610 and deflecting extremity 611 thereof extend, respectively, across an adjacent one of openings 615 from inner extremity 610 to deflecting extremity 611, deflecting extremity 611 and deflecting surface 612 concurrently project angularly upwardly to threshing edge 611A toward the upstream end of concave 600 and away from the opposite downstream end of concave 600 and relative to separating grate 614 to adjacent to the back side of corner segment 712 of an adjacent bar 605, deflecting surface 612 and separating grate 614 are arranged at obtuse angle α1 (FIG. 104) therebetween, and separating grate 614 and separating grate 613 are arranged at α2 (FIG. 104) therebetween. Separating grate 613 extends across opening 615 between proximal extremity 610 and separating grate 614 from proximal extremity 610 to trough 618. Separating grate 614 extends across opening 615 between separating grate 613 and deflecting extremity 611 from trough 618 to trough 617. Separating grates 613 and 614 across opening 615 each separate grain from threshed crop material.

The chosen obtuse angle α1 between deflecting surface 612 and separating grate 614 inherently results in upward angle of inclination of deflecting surface 612 relative to separating grate 614 between separating grate 614 and deflecting surface 612 that is obtuse to, being not acute or perpendicular to, the opposing downstream direction of the oncoming crop material. This is particularly advantageous because it enables deflecting surface 612 to gently loosen and peel the husks away from the grain driven thereagainst without cracking and fracturing the grains when the crop material is driven over deflecting surface 612 by the rotor of the rotary processing unit in a direction from the upstream end of concave 600 to the downstream end of concave 600 that would otherwise occur if deflecting surface 612 was set at an acute or a perpendicular angle relative to the direction of the oncoming crop material as is the case in conventional threshing bars. At the same time, the upward obtuse angle of inclination of deflecting surface 612 into the opposing downstream direction of the oncoming crop material inherently enables deflecting surface 612 to partially and not completely restrict the flow of the grains driven over deflecting surface 612 by the rotor of the rotary processing unit in a direction from the upstream end of concave 600 to the downstream end of concave 600 causing grains to temporarily collect and be held as a mass of grains in trough 617 from end 710 to end 711 of bar 605 before they fall and drain away through separating grate 614 extending across trough 617 under the mass of temporarily collected and held grain. It is particularly advantageous that trough 617, during operation of the rotary processing unit, temporarily collects and holds the mass of grains therein because it causes the oncoming flow of grains to inherently drive over the mass of grains temporarily collected in trough 617 advantageously resulting in a grain-on-grain threshing at trough 617, according to the principle of the invention. This grain-on-grain threshing persists at trough 617 during operation of the rotatory processing unit, in which grain continuously temporarily collects and is held in trough 617 and steadily falls and is drained away from trough 617 through the section of separating grate 614 extending across trough 617, while at same time same time the oncoming grain is continuously driven over and threshed against and continually replenishes the temporarily collected and held mass of grain at trough 617 advantageously resulting in the continuing grain-on-grain threshing at trough 617. This grain-on-grain threshing is surprisingly inherently gentle and extraordinarily efficient compared to direct grain-on-threshing bar threshing and favorably influences grain loss and grain damage by favorably influencing grain cracking and fracturing, according to the principle of the invention.

Trough 618 contributes to the grain-on-grain threshing. The chosen obtuse angle α2 between separating grates 613 and 614 inherently results in upward angle of inclination of separating grate 614 relative to separating grate 613 between separating grates 613 and 614 that is obtuse to, being not acute or perpendicular to, the opposing downstream direction of the oncoming crop material. This is particularly advantageous because it enables grain to inherently collect in trough 618 when the crop material is driven over trough 618 between separating grates 613 and 614 by the rotor of the rotary processing unit in a direction from the upstream end of concave 600 to the downstream end of concave 600. At the same time, the upward obtuse angle of inclination of deflecting surface 612 into the opposing downstream direction of the oncoming crop material advantageously enables deflecting surface 612 to partially and not completely restrict the flow of the grains driven over deflecting surface 612 by the rotor of the rotary processing unit in a direction from the upstream end of concave 600 to the downstream end of concave 600 causing grains build up and temporarily collect and be held as a mass of grains not only in trough 617 from end 710 to end 711 of bar 605 before they fall and drain away through separating grate 614 extending across trough 617 under the mass of temporarily collected and held grain but also in trough 618 from end 710 to end 711 of bar 605 before they fall and drain away from separating grates 613 and 614 including the part of separating grate 613 extending across trough 618 under the mass of temporarily collected and held grain. This advantageously concurrently causes the oncoming flow of grains to inherently drive over the mass of grains temporarily collected and held in troughs 617 and 618 advantageously resulting in a grain-on-grain threshing at troughs 617 and 618, according to the principle of the invention. It is particularly advantageous that troughs 617 and 618, during operation of the rotary processing unit, concurrently temporarily collect and hold the mass of grains therein because it causes the oncoming flow of grains to inherently drive over the mass of grains temporarily collected in troughs 617 and 618 advantageously resulting in a concurrent grain-on-grain threshing at troughs 617 and 618, according to the principle of the invention. This grain-on-grain threshing persists at troughs 617 and 618 during operation of the rotary processing unit, in which grain continuously temporarily collects and is held in troughs 617 and 618 and steadily falls and is drained away from trough 617 through the section of separating grate 614 extending across trough 617 and from trough 618 through the section of separating grate 613 extending across trough 618, while at same time same time the oncoming grain is continuously driven over and threshed against and continually replenishes the temporarily collected and held mass of grain at troughs 617 and 618 advantageously resulting in the continuing grain-on-grain threshing at troughs 617 and 618. This grain-on-grain threshing is surprisingly inherently gentle and extraordinarily efficient compared to direct grain-on-threshing bar threshing and favorably influences grain loss and grain damage by favorably influencing grain cracking and fracturing, according to the principle of the invention.

And so in the installed position of the various bars 605 on frame 602, in reference in relevant part to FIGS. 96, 97, 107, 108, and 109, separating grates 613 and 614 of each bar 605 extend, one after the other, across an adjacent opening 615 in a direction toward the downstream end of concave 600 from inner extremity 610 of corner segment 712 to deflecting extremity 611 adjacent to the outer or back side of corner segment 712 of an adjacent bar 605. Deflecting extremity 611 of the separating segment 714 of each bar 605 is, in turn, adjacent to, and confronts, the corner segment 712 of the adjacent bar 605, deflecting surface 612 projects angularly upward relative to separating grate 614, extending between inner extremity 610 and deflecting extremity 611, toward the upstream end of concave 600 and upstream into the opposing downstream direction of oncoming crop material that is to be threshed driven by the rotor of the rotary processing unit, and deflecting surface 612 and separating grate 614 are arranged at obtuse angle α1 (FIG. 104) therebetween inherently setting deflecting surface 612 at a corresponding obtuse angle relative to the downstream direction of the oncoming crop material. Fingers 730 and 740 of each bar 605 are oblique relative to members 640, 650, 660, and 670. Grain falls through openings 732 of separating grate 614 and openings 742 of separating grate 613 and each corresponding opening 615 between corner segments 712 of adjacent bars 605 for separating grain from threshed crop material. Openings 732 of separating grate 614, including the part of the openings of separating grate 614 formed in deflecting extremity 611, and openings 742 of separating grate 613, reduce the corresponding opening 615 size for smaller grains.

In the rotary processing unit, the crop material is driven over concave 600 in the direction of arrowed line 750 in FIGS. 96, 97, 107, 108, and 109 in a direction from transverse support member 682 at the upstream end of concave 600 in FIGS. 96, 97, and 107, to transverse support member 681 at the downstream end of concave 600 shown in the same referenced figures. Bars 605 and troughs 617 and 618 of bars 605 extend parallel to the axis of rotation of the rotating threshing drum and transverse to direction 750. Separating grates 613 and 614 and deflecting surface 612 of each bar 605 adjacent to top edges 465 and 675 thresh the harvested crop and openings 732 of separating grate 614, openings 742 of separating grate 613, and openings 615 between corner segments 712 are for grain to pass through and for separating grain from threshed crop material. The continuous edges 734 to openings 732 at uppermost surface 735 of each separating grate 614 that faces the rotary processing unit when concave 600 is installed in an agricultural combine are continuous threshing edges of each separating grate 614. The continuous edges 744 to openings 742 at uppermost surface 745 of each separating grate 613 that faces the rotary processing unit when concave 600 is installed in an agricultural combine are continuous threshing edges of each separating grate 613.

Because of the chosen obtuse angle α1 between deflecting surface 612 and separating grate 614, the resulting upward angle of inclination of deflecting surface 612 into the direction of arrowed line 750 is obtuse to the opposing downstream direction 750 of the oncoming crop material enabling deflecting surface 612 to gently loosen and peel the husks away from the grain driven over deflecting surface 612 without cracking the grains when the crop material is driven over deflecting surface 612 by the rotor of the rotary processing unit in a direction from the upstream end of concave 600 to the downstream end of concave 600, according to the principle of the invention. At the same time, each threshing edge 611A, the point at which each deflecting surface 612 terminates distally, provides additional or supplemental crop threshing following separating grate 614 and deflecting surface 612, respectively, according to the principle of the invention. The chosen obtuse angle α1 between separating grate 614 and deflecting surface 612 of each bar 605 is sufficient to set deflecting surface 612 to a correspondingly sufficient obtuse angle to direction 750 of the oncoming crop material to enable each deflecting surface 612 gently deflect the crop material and gently loosen and peel the husks from the grain inhibiting grain cracking and pulverizing that customarily occurs in conventional concaves.

Again, the chosen obtuse angle α1 between deflecting surface 612 and separating grate 614 inherently results in upward angle of inclination of deflecting surface 612 relative to separating grate 614 between separating grate 614 and deflecting surface 612 that is obtuse to, being not acute or perpendicular to, the opposing downstream direction 750 of the oncoming crop material. This advantageously enables deflecting surface 612 to gently loosen and peel the husks away from the grain driven thereagainst without cracking and fracturing the grains when the crop material is driven over deflecting surface 612 by the rotor of the rotary processing unit in direction 750 from the upstream end of concave 600 to the downstream end of concave 600 that would otherwise occur if deflecting surface 612 was set at an acute or a perpendicular angle relative to the direction of the oncoming crop material as is the case in conventional threshing bars. At the same time, the upward obtuse angle of inclination of deflecting surface 612 into the opposing downstream direction 750 of the oncoming crop material advantageously enables deflecting surface 612 to partially and not completely restrict the flow of the grains driven over deflecting surface 612 by the rotor of the rotary processing unit in direction 750 from the upstream end of concave 600 to the downstream end of concave 600 causing grains to temporarily collect and be held as a mass of grains in trough 617 from end 710 to end 711 of bar 605 before they fall and drain away through separating grate 614 extending across trough 617 under the mass of temporarily collected and held grain. This, again, advantageously concurrently causes the oncoming flow of grains to inherently drive over the mass of grains temporarily collected and held in trough 617 advantageously resulting in grain-on-grain threshing at trough 617, according to the principle of the invention. This grain-on-grain threshing persists at trough 617 during operation of the rotary processing unit, in which grain continuously temporarily collects and is held in trough 617 and steadily falls and is drained away from trough 617 through the section of separating grate 614 extending across trough 617, while at same time same time the oncoming grain is continuously driven over and threshed against and continually replenishes the temporarily collected and held mass of grain at trough 617 advantageously resulting in the continuing grain-on-grain threshing at trough 617. This grain-on-grain threshing is surprisingly inherently gentle and extraordinarily efficient compared to direct grain-on-threshing bar threshing and favorably influences grain loss and grain damage by favorably influencing grain cracking and fracturing, according to the principle of the invention.

Trough 618 contributes to the grain-on-grain threshing. Again, the chosen obtuse angle α2 between separating grates 613 and 614 inherently results in upward angle of inclination of separating grate 614 relative to separating grate 613 between separating grates 613 and 614 that is obtuse to, being not acute or perpendicular to, the opposing downstream direction 750 of the oncoming crop material. This advantageously enables grain to inherently collect and be held in trough 618 when the crop material is driven over trough 618 between separating grates 613 and 614 by the rotor of the rotary processing unit in direction 750 from the upstream end of concave 600 to the downstream end of concave 600. At the same time, the upward obtuse angle of inclination of deflecting surface 612 into the opposing downstream direction of the oncoming crop material advantageously enables deflecting surface 612 to partially and not completely restrict the flow of the grains driven over deflecting surface 612 by the rotor of the rotary processing unit in direction 750 from the upstream end of concave 600 to the downstream end of concave 600 causing grains build up and temporarily collect and be held as a mass of grains not only in trough 617 from end 710 to end 711 of bar 605 before they fall and drain away through separating grate 614 extending across trough 617 under the mass of temporarily collected and held grain but also in trough 618 from end 710 to end 711 of bar 605 before they fall and drain away from separating grates 613 and 614 including the part of separating grate 613 extending across trough 618 under the mass of temporarily collected and held grain. This advantageously concurrently causes the oncoming flow of grains in direction 750 to inherently drive over the mass of grains temporarily collected and held in troughs 617 and 618 advantageously resulting in a grain-on-grain threshing at troughs 617 and 618, according to the principle of the invention. This grain-on-grain threshing persists at troughs 617 and 618 during operation of the rotary processing unit, in which grain continuously temporarily collects in troughs 617 and 618 and steadily falls and is drained away from trough 617 through the section of separating grate 614 extending across trough 617 and from trough 618 through the section of separating grate 613 extending across trough 618, while at same time same time the oncoming grain is continuously driven over and threshed against and continually replenishes the temporarily collected and held mass of grain at troughs 617 and 618 advantageously resulting in the continuing grain-on-grain threshing at troughs 617 and 618. This grain-on-grain threshing is surprisingly inherently gentle and extraordinarily efficient compared to direct grain-on-threshing bar threshing and favorably influences grain loss and grain damage by favorably influencing grain cracking and fracturing, according to the principle of the invention. Obtuse angle α2 between separating grate 612 and separating grate 614 is less than obtuse angle α2 in order to generally follow the curvature of frames 601 and 602, and is from 155 degrees to 175 degrees.

The bars 605, including at their opposite ends 710 and 711, are not affixed to be immovable using any suitable technique, such as by welding, to curved end members 660 and 670, after seating the opposite ends 710 and 711, opposed tongues, one after the other, into the corresponding angle slots 700, which removably connects bars 605 to frame 602. As a result, bars 605 are removably connected to frame 602 simply by seating/inserting the opposite ends 710 and 711, one after the other, of each bar 605 into a corresponding pair of aligned slots 700 of the respective curved end members 660 and 670, and readily removed from frame 602 by withdrawing the opposite ends 110 and 111, one after the other, from the respective angle slots 700.

As described above, the bars 605 are not affixed to frame 602 using any suitable technique, such as by welding, to members 660 and 670, to be permanently connected to frame 602, such that the only way to remove them would be to destroy such a permanent connection. The described engagement assembly between each bar 605 and frame 602, each engagement assembly being pairs of tongue-and-slot engagement assemblies, one being end 710 and a corresponding slot 700 of member 660 and the other being end 711 and a corresponding slot 700 of member 670, is a non-destructive, removable and impermanent connection, which means that the tongue-and-slot connection between each of ends 710 and 711 and each corresponding slot 700 does not require the destruction of the engagement assembly, such as by cutting, in order to remove the various bars 605 from frame 602.

To removably install the separate bars 605 on frame 602 in FIG. 110 in an example of an installation method when frame 601 is spaced apart from frame 602 when the frame assembly 620 is in the open position, each bar 605 is removably connected to frame 602 orienting the bar 605 between curved end members 660 and 670 and then axially aligning and axially seating the opposite ends 710 and 711, one after the other, into a corresponding pair of axially aligned angle slots 700 by maneuvering the bars 605 back and forth in one direction to insert one of the opposite ends 710 and 711 into one of a pair of corresponding slots 700 and then in another direction to insert the other one of the opposite ends 710 and 711 into the other one of the pair of corresponding slots 700. Each bar 605 is removed by reversing this operation. In FIG. 110, one bar 605 is shown as it would appear removed from frame 602, and the remaining bars 605 are shown as they would appear applied to frame 602. FIG. 106 is a perspective view illustrating all the bars 605 as they would appear installed on frame 602. In FIGS. 106 and 110, the opposite ends 710 and 711 of the installed bars 605 are substantially flush with respect to the outer sides of the respective curved end members 660 and 670, except for keys 721 and 722 and keys 725 and 726, and the corner segment 712 and the separating grate 614 of the installed bars 605 are adjacent to top edges 465 and 675 of the respective curved end members 660, when bars 605 are installed on frame 602. When bars 605 are installed on frame 602, keys 722 of end 711 extend outwardly from, i.e. are proud of, the outer side of curved end member 670 being available to be inserted into keyways 655 of member 650 when member 650 is juxtaposed to member 670, and identically keys 721 of end 710 extend outwardly from, i.e. are proud of, the outer side of curved end member 660 being available to be inserted into keyways 645 of member 640 when member 640 is juxtaposed to member 660. When bars 605 are installed on frame 602, keys 726 of end 711 extend outwardly from, i.e. are proud of, the outer side of curved end member 670 from separating segment 714 atop top edge 665 being available to be inserted into keyways 656 of member 650 when member 650 is juxtaposed to member 670, and identically keys 725 of end 710 extend outwardly from, i.e. are proud of, the outer side of curved end member 660 from separating segment 714 atop top edge 675 being available to be inserted into keyways 646 of member 640 when member 640 is juxtaposed to member 660.

Keys 721 are equally spaced apart longitudinally on the outer side of member 660 from end 661 to end 662, keys 722 are equally spaced apart longitudinally on the outer side of member 670 from end 671 to end 672, keys 725 are equally spaced apart longitudinally on the outer side of member 660 from end 661 to end 662, and keys 726 are equally spaced apart longitudinally on the outer side of member 670 from end 671 to end 672, when bars 605 are installed on frame 602. The spacing of keys 721 corresponds to the spacing of keyways 645 of member 640, the spacing keys 722 corresponds to the spacing of keyways 655 of member 650, the spacing of keys 725 corresponds to the spacing of keyways 646 of member 640, and the spacing keys 726 corresponds to the spacing of keyways 656 of member 650, when bars 605 are installed on frame 602.

Once all the bars 605 are installed on frame 602 in FIG. 106, the continued assembly of concave 600 includes juxtaposing frame 601 to frame 602, which is carried out by axially aligning members 640 and 650 relative to members 660 and 670, which, at the same time, axially aligns keys 645 relative to keyways 721, keys 655 relative to keyways 722, keys 725 relative to keyways 646, and keys 726 relative to keyways 656. Member 640 is then juxtaposed to member 660 by bringing it toward and in direct contact against the outer side of curved end member 660 while at the same time inserting keys 721 into corresponding keyways 645 and keys 725 into corresponding keyways 646, and member 650 is juxtaposed to member 670 by bringing it toward and in direct contact against the outer side of curved end member 670 while at the same time inserting keys 722 into corresponding keyways 655 and keys 726 into corresponding keyways 656, as shown, for example, in FIGS. 96 and 97, respectively. Since keys 721 and 722 correspond spatially to keyways 645 and 655, respectively, and keys 725 and 726 corresponding spatially to keyways 646 and 656 when bars 605 are installed on frame 602, keys 721 insert into keyways 645, keys 722 insert into keyways 655, keys 725 insert into keyways 646, and keys 726 insert into keyways 656, when members 640 and 650 are juxtaposed on either side of members 660 and 670, as in FIGS. 96 and 97, which concurrently catches and arrests bars 605 to members 640 and 650. Having juxtaposed members 640 and 650 to members 660 and 670, curved end member 640 is juxtaposed along, and is in direct contact against, the outer side of curved end member 660, curved end member 650 is juxtaposed along, and is in direct contact against, the outer side of curved end member 670, keys 721 extend into keyways 645 of member 640, keys 722 extend into keyways 655 of member 650, keys 725 extend into keyways 646 of member 640, keys 726 extend into keyways 656 of member 650, curved end member 640 extends along the length of curved end member 660 from end 642 juxtaposed to end 661 to end 642 juxtaposed to end 662, and curved end member 650 extends along the length of curved end member 670 from end 651 juxtaposed to end 671 to end 652 juxtaposed to end 672.

Bars 605 are releasably secured and locked in place to frames 601 and 602, when bars 605 are installed on frame 602 and when frame 602 is juxtaposed to frame 601, in which the tongue-and-slot engagement assemblies between bars 605 and frame 602 define non-destructive removable connections releasably connecting bars 605 to frame 602 and the key-and-keyway engagement assemblies between bars 605 and frame 601 define non-destructive removable catch connections releasably catching bars 605 to frame 601. Curved end member 640 is releasably connected to curved end member 660 with nut-and-bolt fasteners 690, and curved end member 650 is releasably connected to curved end member 670 with nut-and-bolt fasteners 692. Accordingly, in the closed position of frames 601 and 602 when bars 605 are installed on frame 602, frame 602 is within frame 601, curved end member 660 extends parallel to and is axially juxtaposed along and is in direct contact with the inner side of curved end member 640 that in turn extends parallel to and is axially juxtaposed along the outer side of curved end member 660, keys 721 extend into, being keyed into, keyways 645 of member 640, keys 725 extend into, being keyed into, keyways 646 of member 640, curved end member 670 extends parallel to and is axially juxtaposed along and is in direct contact with the inner side of curved end member 650 that in turn extends parallel to and is axially juxtaposed along the outer side of curved end member 670, keys 722 extend into, being keyed into, keyways 655 of member 650, keys 726 extend into, being keyed into, keyways 656 of member 650, curved end member 660 extends concurrently along the length of curved end member 640 of frame 601 from end 661 juxtaposed to end 642 to end 662 juxtaposed to end 642, and curved end member 670 extends concurrently along the length of curved end member 650 of frame 601 from end 671 juxtaposed to end 651 to end 672 juxtaposed to end 652.

In the closed position of frame 602 defining the closed position of concave 600 in FIGS. 96 and 97 when concave 600 is assembled, bars 605 are entrapped by frames 601 and 602. Frame 601 interacts with bars 605 preventing the opposite ends 710 and 711 of each of the bars 605 from being non-destructively removed/withdrawn from the corresponding angle slots 700 thereby preventing independent non-destructive removal of the bars 605 relative to each other from frame 602. The engagement of keys 721 to keyways 645 and keys 725 to keyways 646, and the engagement of keys 722 to keyways 655 and keys 726 to keyways 656 provide the added advantage of releasably coupling/restraining bars 605 to members 640 and 650, at two spaced-apart points on either side of each bar 606, and entrapping bars 605 to frames 601 and 602. Each of the bars 605 is not affixed to either frame 601 or frame 602, when concave 600 is assembled, using any suitable technique, such as by welding, to be permanently connected to either frame 601 or frame 602, such that the only way to remove them would be to destroy such a permanent connection. The engagement between each bar 605 and frames 601 and 602 is non-destructive, removable, and impermanent, which means that the engagement between bars 605 and frames 601 and 602 does not require the destruction of the engagement, such as by cutting, in order to remove the various bars 605 from frame 602 and to remove frame 601 from frame 602 and from bars 605.

In the closed position of the frame assembly 620 of concave 600, curved end member 640 of frame 601 extends parallel to and is axially juxtaposed along the outer side of curved end member 660 of frame 602 and confronts and makes direct contact against ends 710 of bars 605 on one side of concave 600, and curved end member 650 of frame 601 extends parallel to and is axially juxtaposed along the outer side of curved end member 670 of frame 602 and confronts and makes direct contact against the opposed ends 711 of bars 605 on the opposed side of concave assembly 600, which interaction entraps bars 605 by and between frames 601 and 602. Curved end members 640 and 650 act as curved stops axially spaced from one another and juxtaposed on either side of the respective curved end members 660 and 670 of frame 602 and the respective ends 710 and 711 of the respective bars 605 for entrapping bars 605 to frame 602 by contacting the respective bar 605 ends 710 and 711 preventing the bars 605 from being displaced for, in turn, preventing the opposite ends 710 and 711 of each of the bars 605 from being non-destructively removed from the corresponding slots 700 thereby preventing independent non-destructive removal of the bars 605 relative to each other from frame 602.

Keys 721 and 722 carried by bars 605 are catch elements, and keyways 645 and 655 of members 640 and 650 of frame 601 are corresponding complemental catch elements. Keys 721 and 722 of each bar 605 and the corresponding keyways 645 and 655 that relate to keys 722 and 722 of each bar 605 define a catch assembly, in which each catch assembly non-destructively catches each of bars 605 to frame 601, when frame 602 is juxtaposed to frame 601 and when keys 721 and 722 are inserted into the respective keyways 645 and 655, in which the engagement of each of keys 721 and 722 to a corresponding one of keyways 645 and 655 forms a non-destructive removable catch connections. Although in each catch assembly keys 721 and 722 are carried by a bar 605 and the corresponding keyways 645 and 655 are carried by the respective members 640 and 650, this arrangement can be reversed in an alternate embodiment, in which keys 721 and 722 can be carried by members 640 and 650 and keyways 645 and 655 can be carried by the respective ends 710 and 711 of bars 605.

Keys 725 and 726 carried by bars 605 are additional catch elements, and keyways 646 and 656 of members 640 and 650 of frame 601 are corresponding additional complemental catch elements. Keys 725 and 726 of each bar 605 and the corresponding keyways 646 and 656 that relate to keys 726 and 726 of each bar 605 define a catch assembly, in which each catch assembly additionally non-destructively catches each of bars 605 to frame 601, when frame 602 is juxtaposed to frame 601 and when keys 725 and 726 are inserted into the respective keyways 646 and 656, in which the engagement of each of keys 725 and 726 to a corresponding one of keyways 646 and 656 forms a non-destructive removable catch connections. Although in each catch assembly keys 725 and 726 are carried by a bar 605 and the corresponding keyways 646 and 656 are carried by the respective members 640 and 650, this arrangement can be reversed in an alternate embodiment, in which keys 725 and 726 can be carried by members 640 and 650 and keyways 646 and 656 can be carried by the respective ends 710 and 711 of bars 605.

With concave 600 so assembled, concave 600 can be used in the customary manner in a rotary processing unit. In the rotary processing unit, bars 605 extend parallel to the axis of rotation of the rotating threshing drum, and separating grates 613 and 614, deflecting surface 612, threshing edge 611A, and troughs 617 and 618 adjacent to top edges 465 and 675 of curved end members 660 and 670 of frame 602 to provide threshing, including the previously-described grain-on-grain threshing, of the harvested crop and openings 615 between corner segments 712 and the corresponding openings of separating grates 613 and 614 are for grain to pass through, in which continuous edges 734 of separating grate 614 and continuous edges 745 of separating grate 613 each define an aggressive continuous threshing edge for threshing crop material. Accordingly, each separating grate 614 concurrently serves the purposes threshing the crop and separating grain through openings 732 from the threshed crop material, each separating grate 613 concurrently serves the purposes threshing the crop and separating grain through openings 742 from the threshed crop material, each deflecting surface 612 gently loosens and peels the husks from the grain and inhibiting grain cracking, threshing edge 611A provide additional downstream crop threshing, and grain collected in troughs 617 and 618 provide the gain-on-grain threshing, according to the principle of the invention.

In a rotary combine, a single concave 600 can be utilized as the concave or multiple shorter concaves 600 can be arranged end-to-end and side-to-side to form the concave. Should bars 605 become worn or damaged to require replacement or repair, nut-and-bolt fasteners 690 and 692 are simply removed to release frame 602 from frame 601, and frame 601 is removed from frame 602 to place frame 602 in its open position defining the open position of the frame assembly 620 and of concave 600 to allow any of the bars 605 needing replacement or repair to be easily removed, repaired or replaced, and reinstalled, in accordance with the principle of the invention.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A concave for an agricultural combine comprising threshing bars carried by a base frame and forming openings therebetween for grain to pass through, each said threshing bar includes a first end, a second end, a length from the first end to the second end, and an inner extremity, a deflecting extremity, including a deflecting surface, and a separating grate each extending along the length from the first end to the second end, the separating grate is between the inner extremity and the deflecting extremity and extends across an adjacent one of the openings between the inner extremity and the deflecting extremity for separating grain from threshed crop material, the deflecting surface projects angularly upward relative to the separating grate and is unbroken along the length from the first end to the second end, and the deflecting surface and the separating grate are arranged at an obtuse angle therebetween forming a grain-collecting trough between the deflecting surface and the separating grate.

2. The concave according to claim 1, wherein the obtuse angle is from 125 degrees to 145 degrees.

3. The concave according to claim 1, additionally comprising part of the separating grate formed across the trough and in the deflecting extremity.

4. The concave according to claim 3, wherein the deflecting surface is between the part of the separating grate formed in the deflecting extremity and a threshing edge of the deflecting extremity, wherein the threshing edge extends along the length from the first end to the second end.

5. The concave according to claim 1, wherein the separating grate has a first width between the inner extremity and the deflecting extremity, the deflecting extremity has a second width between the separating grate and the threshing edge, and the first width is greater than the second width.

6. The concave according to claim 1, additionally comprising an engagement assembly non-destructively connecting each of the threshing bars to the base frame.

7. The concave according to claim 6, additionally comprising:

- a restraining frame;
- the engagement assemblies enable non-destructive removal of the threshing bars from the base frame, when the restraining frame is spaced apart from the base frame;
- the restraining frame restrains non-destructive removal of the threshing bars from the base frame via the engagement assemblies, when the restraining frame is juxtaposed to the base frame; and
- the threshing bars are non-destructively connected to the base frame via the engagement assemblies, when the restraining frame is spaced apart from the base frame and when the restraining frame is juxtaposed to the base frame.

8. The concave according to claim 7, wherein each said engagement assembly comprises engagement elements carried by each of the threshing bars and corresponding complemental engagement elements carried by the base frame.

9. The concave according to claim 8, wherein each said engagement element comprises a tongue, and each said complemental engagement element comprises a slot.

10. The concave according to claim 7, additionally comprising a catch assembly non-destructively catching each of the threshing bars to the restraining frame, when the restraining frame is juxtaposed to the base frame.

11. The concave according to claim 10, wherein each said catch assembly comprises catch elements carried by each of the threshing bars and corresponding complemental catch elements carried by the restraining frame.

12. The concave according to claim 11, wherein each said catch element comprises one of a key and a keyway, and each said complemental catch element comprises the other one of the key and the keyway.

13. The concave according to claim 11, wherein the restraining frame comprises stops, the stops are juxtaposed on either side of the base frame, interact with the threshing bars restraining the threshing bars from being non-destructively removed from the base frame, when the restraining frame is juxtaposed to the base frame, and carry the complemental catch elements.

14. A concave for an agricultural combine comprising threshing bars carried by a base frame and forming openings therebetween for grain to pass through, each said threshing bar includes a first end, a second end, a length from the first end to the second end, and an inner extremity, a deflecting extremity including a deflecting surface, and a plurality of separating grates each extending along the length from the first end to the second end, the plurality of separating grates extends across an adjacent one of the openings between the inner extremity and the deflecting extremity for separating grain from threshed crop material and includes a first separating grate and a second separating grate, the first separating grate is between the inner extremity and the second separating grate, the second separating grate is between the first separating grate and the deflecting extremity, the second separating grate projects angularly upward relative to the first separating grate, the deflecting surface projects angularly upward relative to the second separating grate and is unbroken along the length from the first end to the second end, the second separating grate and the first separating grate are arranged at a first obtuse angle therebetween forming a first grain-collecting trough between the first separating grate and the second separating grate, the deflecting surface and the second separating grate are arranged at a second obtuse angle therebetween forming a second grain-collecting trough between the deflecting surface and the second separating grate.

15. The concave according to claim 14, wherein the second obtuse angle is different from the first obtuse angle.

16. The concave according to claim 15, wherein the second obtuse angle is less than the first obtuse angle.

17. The concave according to claim 16, wherein the second obtuse angle is from 125 degrees to 145 degrees.

18. The concave according to claim 17, wherein the first obtuse angle is from 155 degrees to 175 degrees.

19. The concave according to claim 16, additionally comprising part of the first separating grate formed across the first trough and part of the second separating grate formed across the second trough.

20. The concave according to claim 16, wherein the deflecting surface is between the part of the second separating grate formed across second trough and a threshing edge of the deflecting extremity, wherein the threshing edge extends along the length from the first end to the second end.

21. The concave according to claim 16, wherein the second separating grate has a width between the first separating grate and the deflecting extremity, the deflecting extremity has a width between the second separating grate and the threshing edge, and the width of the second separating grate is greater than the width of the deflecting extremity.

22. The concave according to claim 21, wherein the first separating grate has a width between the inner extremity and the second separating grate, and the width of the first separating grate is greater than the width of the deflecting extremity.

23. The concave according to claim 14, additionally comprising an engagement assembly non-destructively connecting each of the threshing bars to the base frame.

24. The concave according to claim 23, additionally comprising:

- a restraining frame;

the engagement assemblies enable non-destructive removal of the threshing bars from the base frame, when the restraining frame is spaced apart from the base frame;

the restraining frame restrains non-destructive removal of the threshing bars from the base frame via the engagement assemblies, when the restraining frame is juxtaposed to the base frame; and the threshing bars are non-destructively connected to the base frame via the engagement assemblies, when the restraining frame is spaced apart from the base frame and when the restraining frame is juxtaposed to the base frame.

25. The concave according to claim 24, wherein each said engagement assembly comprises engagement elements carried by each of the threshing bars and corresponding complemental engagement elements carried by the base frame.

26. The concave according to claim 25, wherein each said engagement element comprises a tongue, and each said complemental engagement element comprises a slot.

27. The concave according to claim 24, additionally comprising a catch assembly non-destructively catching each of the threshing bars to the restraining frame, when the restraining frame is juxtaposed to the base frame.

28. The concave according to claim 27, wherein each said catch assembly comprises catch elements carried by each of the threshing bars and corresponding complemental catch elements carried by the restraining frame.

29. The concave according to claim 28, wherein each said catch element comprises one of a key and a keyway, and each said complemental catch element comprises the other one of the key and the keyway.

30. The concave according to claim 29, wherein the restraining frame comprises stops, the stops are juxtaposed on either side of the base frame, interact with the threshing bars restraining the threshing bars from being non-destructively removed from the base frame, when the restraining frame is juxtaposed to the base frame, and carry the complemental catch elements.

* * * * *